United States Patent [19]
Wozniak et al.

[11] Patent Number: 4,918,439
[45] Date of Patent: Apr. 17, 1990

[54] REMOTE CONTROL DEVICE

[75] Inventors: Steve Wozniak, Los Gatos; Charles H. Van Dusen, San Jose, both of Calif.

[73] Assignee: CL 9, Inc., Los Gatos, Calif.

[21] Appl. No.: 254,518

[22] Filed: Oct. 5, 1988

Related U.S. Application Data

[62] Division of Ser. No. 66,786, Jun. 23, 1987.

[51] Int. Cl.⁴ ..................... H04M 11/06; H04B 1/16
[52] U.S. Cl. ............................ 340/825.690; 379/102; 379/104; 379/105; 341/176; 455/231; 340/5.72; 358/194.1
[58] Field of Search ............ 340/825.69, 825.72, 340/825.52; 379/102, 104, 105, 106, 103; 358/194.1; 455/352, 353, 355, 231; 341/176

[56] References Cited

U.S. PATENT DOCUMENTS

| | | | |
|---|---|---|---|
| 4,540,851 | 9/1985 | Hashimoto | 310/825.69 |
| 4,623,887 | 11/1986 | Welles, II | 340/825.69 |
| 4,625,080 | 11/1986 | Scott | 379/104 |
| 4,656,655 | 4/1987 | Hashimoto | 379/105 |
| 4,658,417 | 4/1987 | Hashimoto et al. | 379/105 |
| 4,718,112 | 1/1988 | Shinoda | 455/231 |

FOREIGN PATENT DOCUMENTS

| | | | |
|---|---|---|---|
| 0278866 | 12/1987 | Japan | 379/102 |
| 0278867 | 12/1987 | Japan | 379/102 |
| 2166322 | 4/1986 | United Kingdom | 379/102 |

Primary Examiner—Donald J. Yusko
Assistant Examiner—E. O. Rudpud
Attorney, Agent, or Firm—Skjerven, Morrill, MacPherson, Franklin & Friel

[57] ABSTRACT

A remote control device is adapted to control a plurality of appliances such as televisions, VCRs, stereos, etc. The remote controller includes a first connector for mating with a plurality of transducer modules, so that the remote control device can be used to emit infrared, radio, or other signals. (In another embodiment, the remote control device includes a plurality of different transducers for providing a plurality of different types of control signals.) The remote control device includes a second connector for mating with a cradle. The cradle can receive signals from external source such as a telephone line. Thus, one can access the remote control device from a remote location and cause the remote control device to control selected appliances. The remote control device also includes a programmable timer so that various appliances can be turned on and off at selected times.

5 Claims, 20 Drawing Sheets

MODULATION SCHEMES
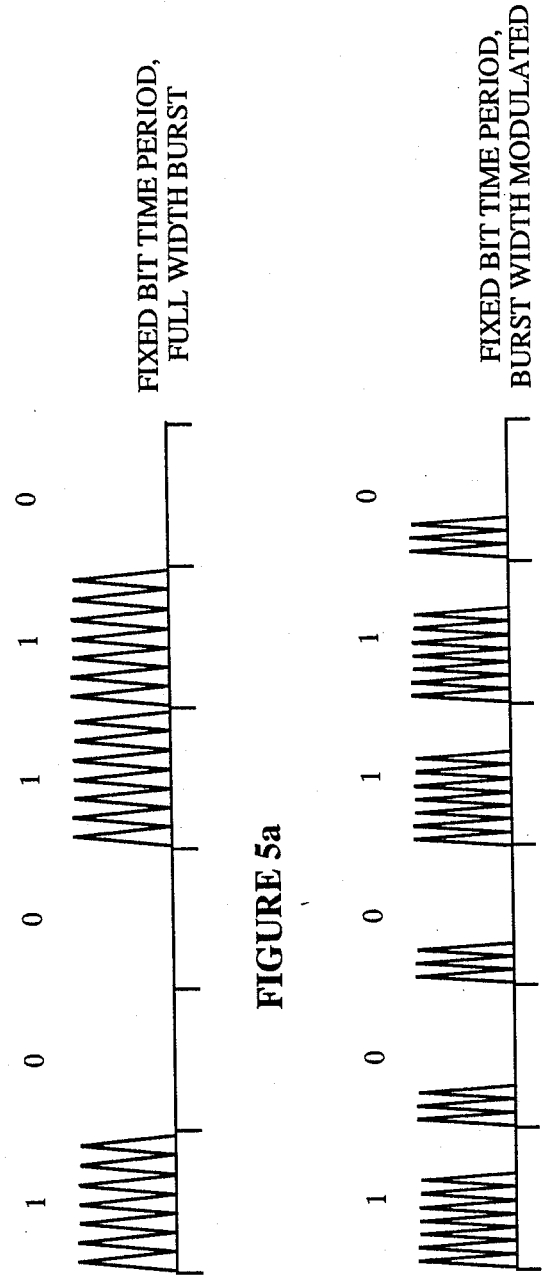
FIGURE 5a — FIXED BIT TIME PERIOD, FULL WIDTH BURST
FIGURE 5b — FIXED BIT TIME PERIOD, BURST WIDTH MODULATED
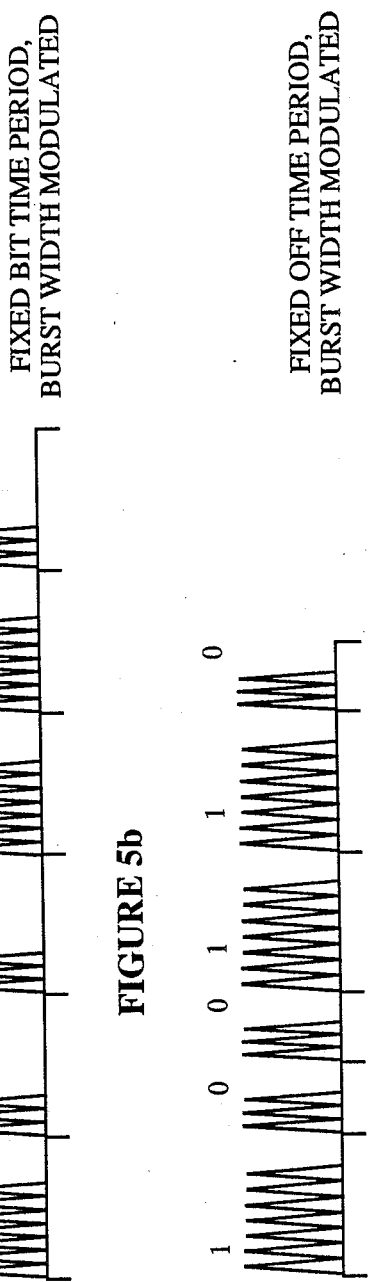
FIGURE 5c — FIXED OFF TIME PERIOD, BURST WIDTH MODULATED

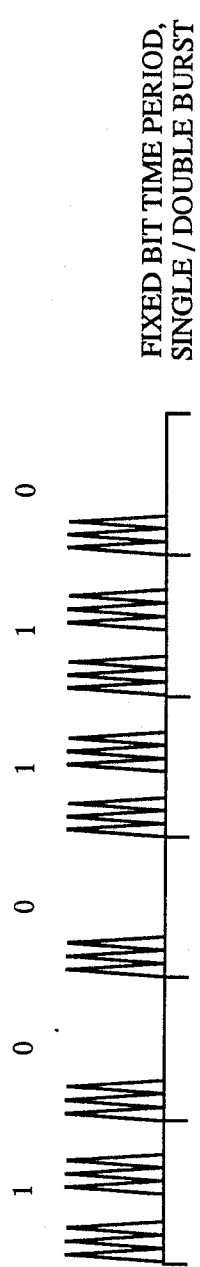
FIGURE 5d — FIXED BIT TIME PERIOD, SINGLE / DOUBLE BURST
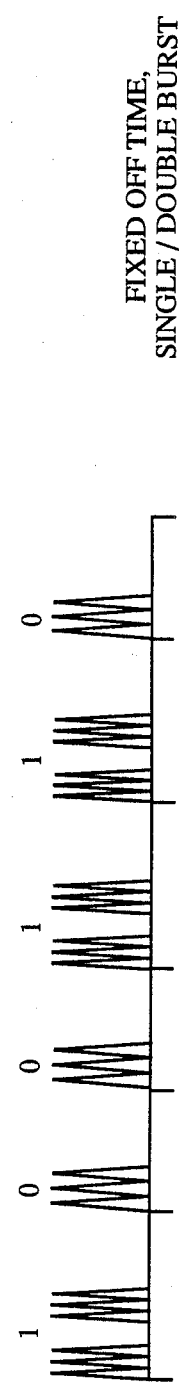
FIGURE 5e — FIXED OFF TIME, SINGLE / DOUBLE BURST
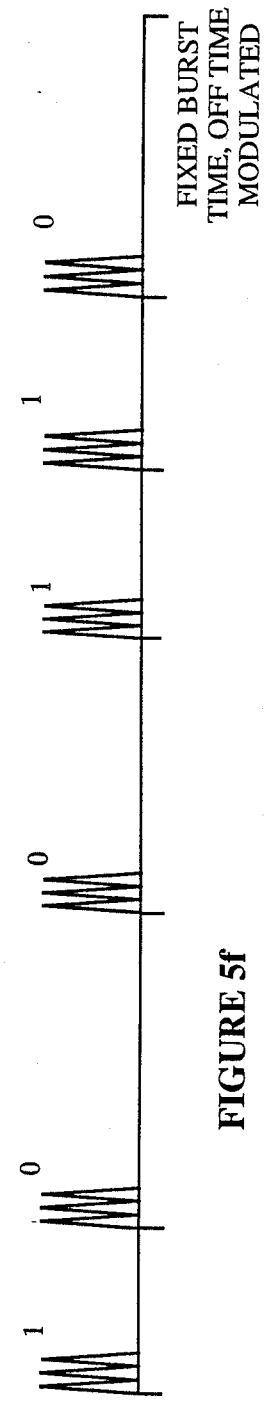
FIGURE 5f — FIXED BURST TIME, OFF TIME MODULATED

KEY TO FIGURE 7

| FIG. 7a | FIG. 7b | FIG. 7c |
| --- | --- | --- |
| FIG. 7d | FIG. 7e | FIG. 7f |

| | | | |
|---|---|---|---|
| ᑭ | (PAGE) | ⊇ | RPT |
| ▫ | (KEY) | ❘❘ | 2nd |
| ᒪ | DO | ᑌ | AM |
| ᒍ | OK | ᑎ | PM |
| ≡ | SET | + | WAIT |
| ᗉ | AT | ᒥ | BEGIN LOOP |
| ᓍ | EDIT | ᓄ | END LOOP |
| ᑕ | CAPTURE | Eᑎ | ENABLE (always at far right of of status line during use) |

FIGURE 9

REMOTE CONTROL DEVICE

This application is a division of application Ser. No. 07/066,786, filed Jun. 23, 1987.

BACGKROUND OF THE INVENTION

This invention relates to a single remote control device for controlling a plurality of appliances.

A number of home appliances available on the market are adapted for use with a remote controller. For example, it is known to use a remote controller to control a television set so that a person watching television does not have to get up from his seat and walk to the television to change the channel and then walk back to his seat. Similar remote controllers are used to control other appliances, such as VCRs, radios, and stereos. If a consumer has a number of these products, and therefore a number of remote controllers, it is confusing to know which remote controller to pick up in order to control a selected appliance. It has therefore been suggested to use a single remote control unit to control a plurality of appliances. For example, U.S. Pat. No. 4,623,887 issued to Welles and U.S. Pat. No. 4,626,848 issued to Ehlers, describe a single remote control unit which can control a number of different appliances. However, while the devices discussed by Welles and Ehlers provide a certain degree of convenience to the user, it would be desirable to further enhance the capabilities of such remote control devices.

SUMMARY

A remote controller constructed in accordance with our invention is adapted for use with a plurality of different appliances such as televisions, VCRs, radios, and stereos. In accordance with one embodiment of our invention, the remote controller includes a programmable timer so that the remote controller can be programmed to turn various appliances on and off automatically. Thus, if a person wanted to make sure that his television was on at a desired channel when he got home, or he wanted to have his VCR record a desired television program while he was away, or he wanted to have his radio on while he was out so that his home would not appear empty to potential burglars, he could easily do so.

In accordance with another embodiment of our invention, the remote controller is equipped with a cradle for coupling to the remote controller. Of importance, the cradle is electrically connected to a conventional telephone line. Thus, one can use a modem or other data communication device to access the cradle, and thereby cause the remote controller to turn various appliances on and off. For example, if a person was at work and wanted to turn on his VCR to record a desired television program, he could use a conventional modem and telephone line to access the remote controller via the cradle to turn on his VCR. In other embodiments of the invention, the cradle is coupled to data communication apparatus other than conventional telephone lines, e.g., a radio receiver.

In one embodiment of our invention, the remote controller includes an infrared transducer of a type such as described in the above-mentioned Welles and Ehlers patents. However, in another embodiment of our invention, other types of transducers are used in conjunction with the remote controller, e.g., conventional radio transmitters. In yet another embodiment of our invention, the transducer is part of a module which can be removed from the remote controller and replaced with a different transducer module. Thus, a first transducer can be used to communicate with appliances which are adapted to receive infrared signals. Then, the infrared transducer module can be removed and a radio transducer module can be affixed to the remote controller so that the remote controller can control appliances adapted to receive radio signals. The radio transducer module can then be removed and replaced with other types of transducers.

In another embodiment, the remote controller includes a plurality of types of transducers, e.g. both an infrared transducer and a radio transmitter. In this embodiment, the remote controller can communicate with appliances which receive infrared signals and with appliances which receive radio signals without having to change transducer modules.

In yet another embodiment of the invention, the remote controller plug which normally mates with one of the above-described transducer modules can also mate with various data communication devices so that the remote controller can receive and transmit other types of signals to other types of equipment such as digitally controlled equipment.

The remote controller includes a panel of buttons for causing the remote controller to emit control signals to various appliances. In one embodiment, the buttons are recessed relative to the panel surface. This prevents a user from inadvertently pressing two keys at once, and causing the remote controller to perform an undesired function. These and other advantages of the present invention will become apparent in light of the description below.

BRIEF DESCRIPTION OF THE DRAWINGS

FIG. 4b illustrates the top surface of the cradle of FIG. 4a.

FIGS. 5a to 5h illustrate a number of modulation techniques used to encode infrared signals with data.

FIG. 7 illustrates the manner in which FIGS. 7a, 7b and 7c are to be placed relative to one another.

FIG. 9 illustrates programming language symbols displayed by liquid crystal display 14 of device 10.

DETAILED DESCRIPTION

Figures 1A, 2:
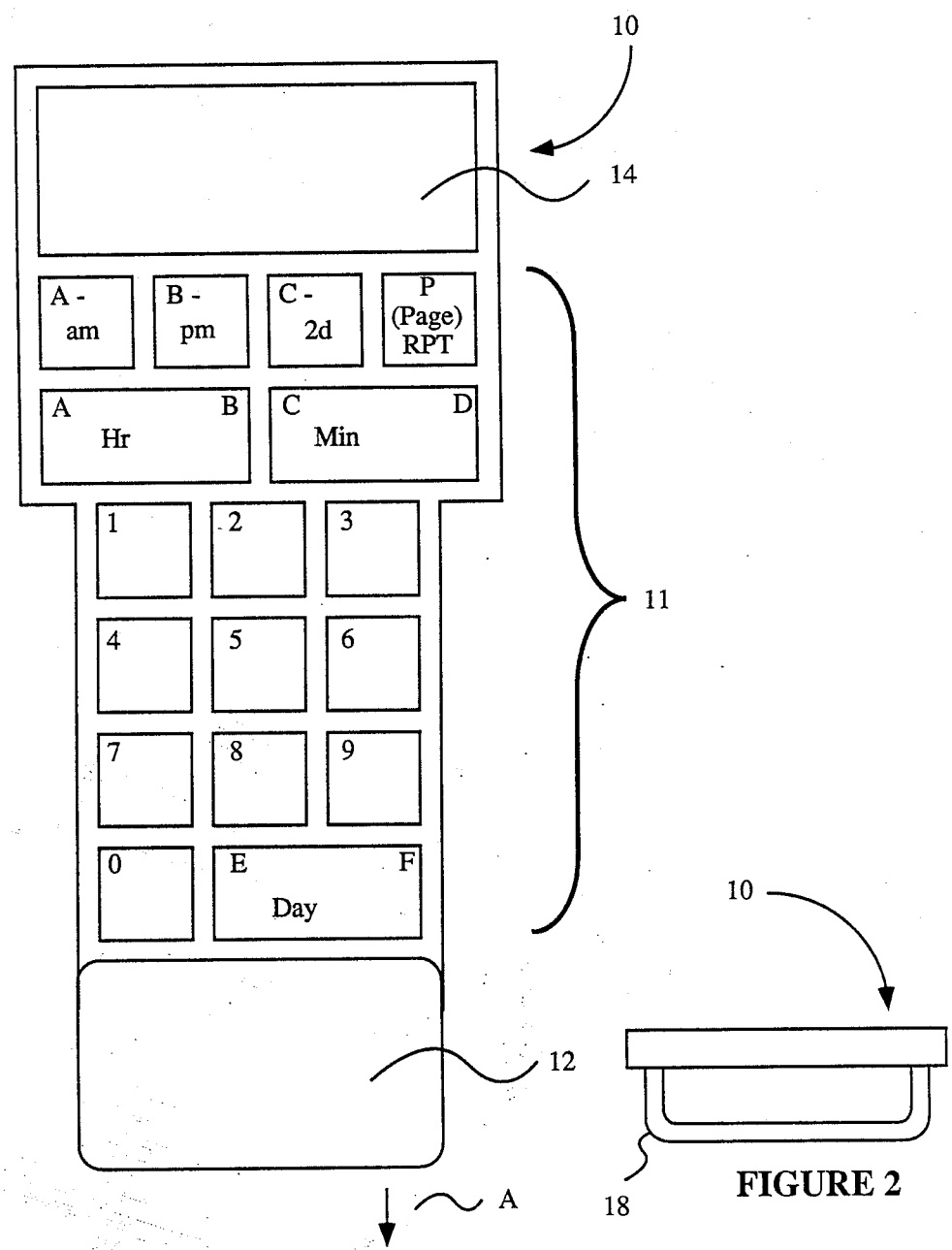
FIGS. 1a and 1b illustrate a remote control device 10 constructed in accordance with one embodiment of our invention.
FIG. 2 is a front view of remote control device 10 of FIGS. 1a and 1b.

FIG. 1a is a top view of a hand-held remote control device 10 constructed in accordance with our invention. Remote control device 10 can operate in a learning mode wherein device 10 learns to emulate signals provided by various dedicated remote controllers designed to control specific associated appliances. During the learning mode, a sensor within remote control device 10 receives a signal to be emulated (typically an infrared signal). Remote control device 10 stores data (described below) indicative of the characteristics of the received signal. Thereafter, remote control device 10 is operated in an emulation mode, wherein a user causes device 10 to use the stored data to reconstruct the received signal in order to control an appliance. (As described in detail below, during the learning mode, a user can also program device 10 to perform a number of different functions as well, e.g. to set a timer to cause device 10 to emit various desired control signals at selected times and to program device 10 to perform complex sequences of tasks.)

Figure 11:
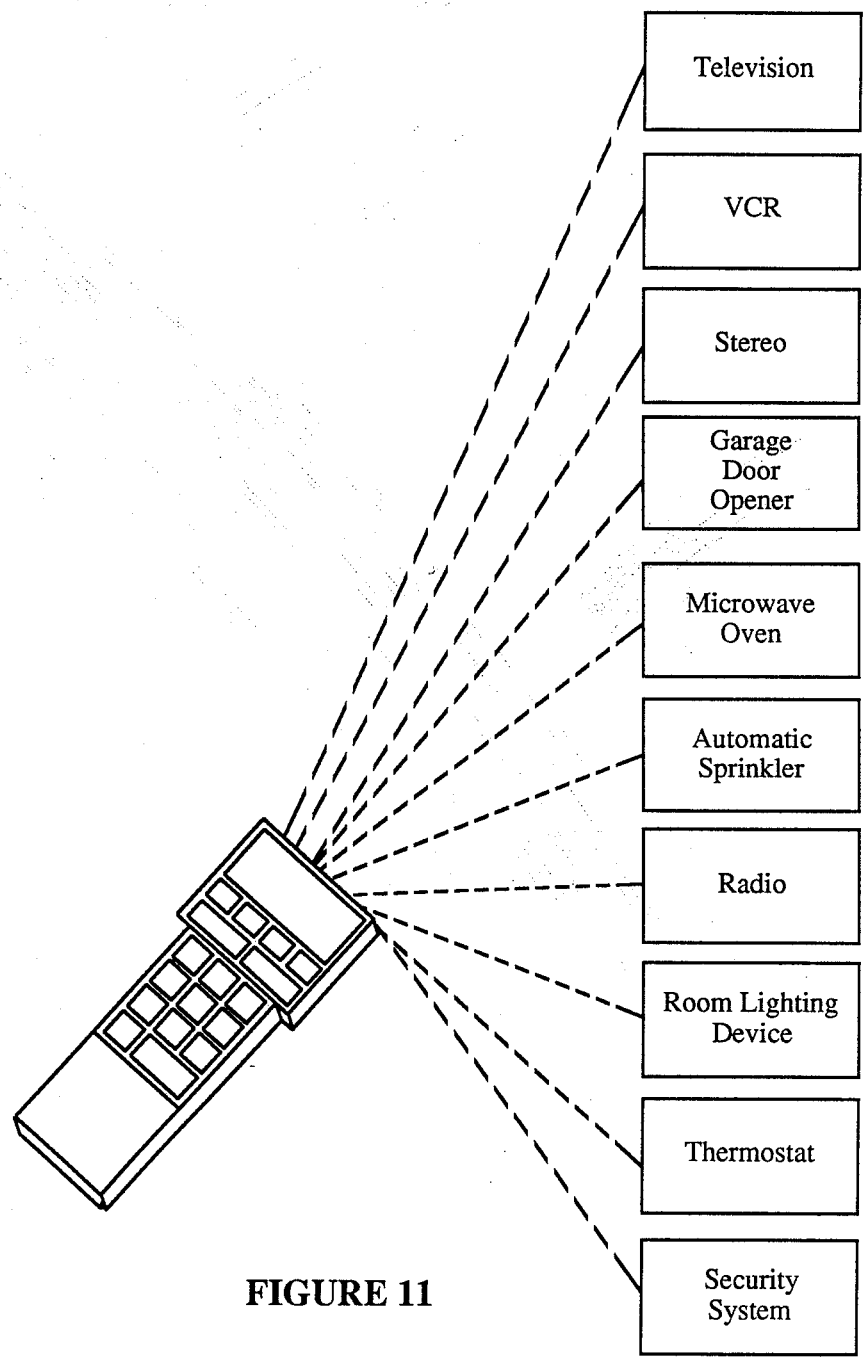
FIG. 11 schematically illustrates remote control device 10 controlling a number of appliances.

A user can cause device 10 to store data indicative of the characteristics of signals provided by a plurality of remote controllers, and therefore, instead of using the plurality of remote controllers, remote control device 10 can be used to generate infrared signals to control a plurality of appliances such as televisions, VCRs, stereos, garage door openers, microwave ovens, automatic sprinkler systems, radios, room lighting devices, thermostats, security systems, or other appliances (See FIG. 11). As described in greater detail below, remote control device 10 has a top surface including a first panel of buttons 11 used during the learning mode to cause device 10 to store data indicative of characteristics of a received signal and during emulation mode to cause device 10 to reconstruct the received signal. A portion 12 of the housing of device 10 is slideable in a direction indicated by arrow A to expose a second panel of buttons 13 (FIG. 1b), which is used during the learning mode to enable a user to program device 10 as described below.

Figure 1B:
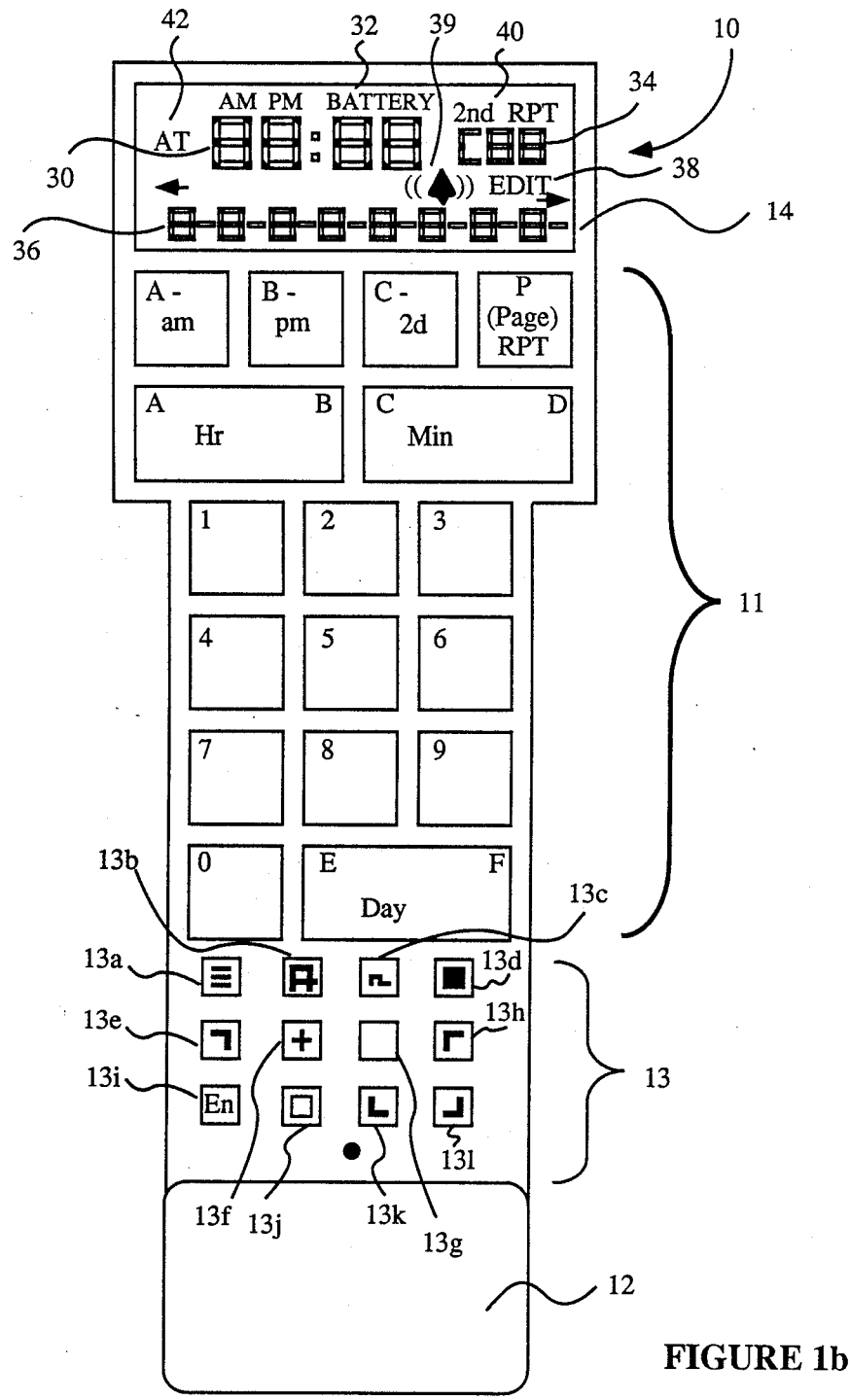

Remote control device 10 also includes a liquid crystal display (LCD) 14 which provides status information and the time to a user. Specifically, LCD 14 includes segments 30 for indicating the time, segments 32 for indicating when the battery within device 10 is low, segments 34 for indicating the day of the week, and segments 36, 38, 39, 40 and 42 which provide other information described in greater detail below. (FIG. 1b illustrates all the segments within LCD 14. However, all of these segments are not typically displayed simultaneously.)

THE LEARNING MODE

Figure 5G:
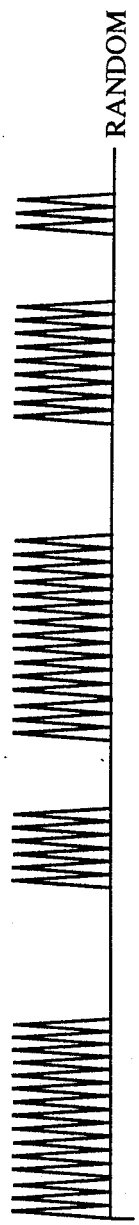
Figure 5H:
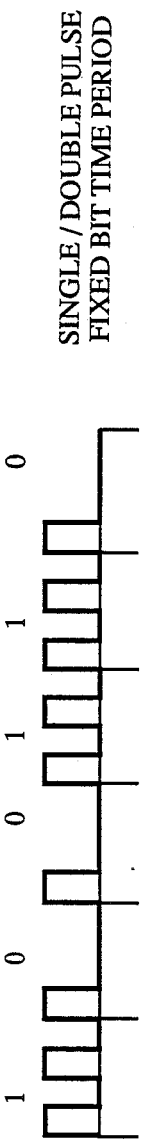

Infrared signals used to remotely control appliances typically comprise a plurality of pulse bursts separated by pauses. The pulses in the pulse bursts typically have a frequency of 20 to 45 KHz. FIGS. 5a to 5h illustrate a number of techniques typically used by remote controllers to encode control instructions in an infrared signal. Modulating techniques illustrated include fixed bit periods (FIGS. 5a, 5b, 5d, 5h), variable bit periods (FIGS. 5c and 5f), and aperiodic signals (FIG. 5g). These modulating techniques are also described in the Welles and Ehlers patents.

Remote control device 10 includes a receiver which during the learning mode, receives an infrared signal provided by a dedicated remote controller, modulated in accordance with a technique such as one of the techniques illustrated in FIGS. 5a to 5h. (In one embodiment, the receiver comprises an infrared sensitive transistor Q4 illustrated in FIG. 7a.) Remote control device 10 learns to emulate the received signal, i.e. remote control device 10 learns to provide an infrared signal or a set of infrared signals approximately identical to the signals provided by the dedicated remote controller.

In the learning mode, remote control device 10 determines the time duration of and the number of pulses in the first pulse burst, and then calculates the frequency of the pulses in the first pulse burst. Remote control device 10 then determines the time duration of each pause between pulse bursts and the time duration of each subsequent pulse burst. Device 10 then categorizes the pulse bursts and pauses into groups, each group consisting of a set of bursts and/or pauses of a certain time duration.

Figure 6:
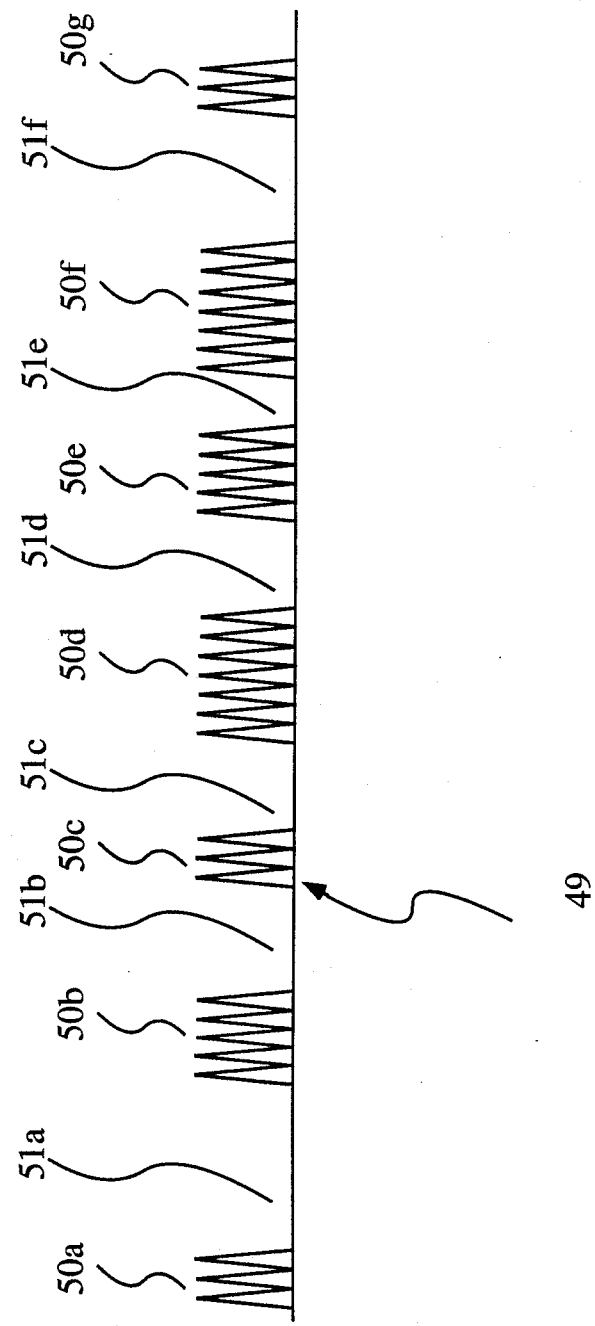
FIG. 6 illustrates an example of an infrared signal.

To better understand how this process is accomplished, reference is made to FIG. 6 which illustrates an example of a typical signal 49 comprising pulse bursts 50a to 50g and pauses 51a to 51f. When learning to emulate signal 49, remote control device 10 determines the time duration of pulses bursts 50a to 50g and pauses 51a to 51f and counts the number of pulses in burst 51a. In the example illustrated in FIG. 6, it is assumed that the durations of the bursts and pauses are as follows:

| Pulse Burst | Burst Time Duration | Pauses | Pause Time Duration |
| --- | --- | --- | --- |
| 50a | 101 μs | 51a | 504 μs |
| 50b | 200 μs | 51b | 408 μs |
| 50c | 105 μs | 51c | 508 μs |
| 50d | 311 μs | 51d | 302 μs |
| 50e | 204 μs | 51e | 410 μs |
| 50f | 309 μs | 51f | 311 μs |
| 50g | 102 μs | | |

Remote control device 10 then categorizes bursts 50a to 50g and pauses 51a to 51f into bins based on their time duration as follows:

| Bin A | Bin B | Bin C | Bin D | Bin E |
| --- | --- | --- | --- | --- |
| 50a | 51a | 50b | 51b | 50d |
| 50c | 51c | 50e | 51e | 50f |
| 50g | | | | 51d |
| | | | | 51f |

It is noted that the time duration of bursts 50a, 50c and 50g in bin A are not exactly equal. However, in establishing the bins, a tolerance is established so that all bursts and pauses within a nominal range are categorized into one or another of the bins. Thus, for example, any pulse burst having a duration between 91 μs and 111 μs may be placed in bin A. Any pause having a duration between 500 and 520 μs may be placed in bin B. The tolerances for the time duration of the various bins is determined by identifying the shortest time duration of a pulse burst or pause and multiplying the shortest time duration by a value such as 0.1. Thus, the tolerance in the above example is about 10 μs.

It is also noted that because pulses and bursts are categorized on the basis of time duration, bin E contains both bursts (e.g. bursts 50d and 50f) and pauses (e.g. pauses 51d and 51f).

Having categorized the elements of signal 49, signal 49 is stored as consisting of the pattern ABCDABEEC-DEEA, where "A" is a burst having the nominal time duration of bin A, B is a pause having the nominal time duration of bin B, etc. The nominal characteristics of each bin (i.e. time duration) are also stored. Thus, when it is desired to reconstruct a signal, a string of signal elements (i.e. bursts and pauses) are provided having the nominal characteristics of bins A, B, C, D, A, B, E, E, C, D, E, E and A, in that order.

It is noted that each bin may contain either pauses, bursts, or both pauses and bursts. Device 10 determines whether a signal element is a pause or a burst by noting its position in the string of signal elements. Thus, the first, third, fifth, and seventh elements (A, C, A and E) must be bursts, and the second, fourth, sixth and eighth elements (B, D, B, E) must be pauses.

As mentioned above, the number of pulses in burst 50a is also stored, and the frequency of pulses in burst 50a is calculated so that when signal 49 is reconstructed by remote control device 10, the frequency of the pulses in the pulse bursts generated by remote control device 10 approximately equals the frequency of the pulses in the bursts of signal 49.

In the above example, device 10 establishes five bins of time durations. In another embodiment, to minimize the memory requirements for device 10, the software is only capable of establishing four bins for each signal learned. A remote control device constructed in accordance with this other embodiment is only capable of learning to emulate signals having four or fewer different signal element time durations, and is therefore more limited as to the types of signals it can learn to emulate. However, we have discovered that the capability of providing only four bins of time duration is sufficient for emulating the vast majority of remote control signals currently on the market.

CONTROL CIRCUIT OF REMOTE CONTROL DEVICE 10

Figure 7A:
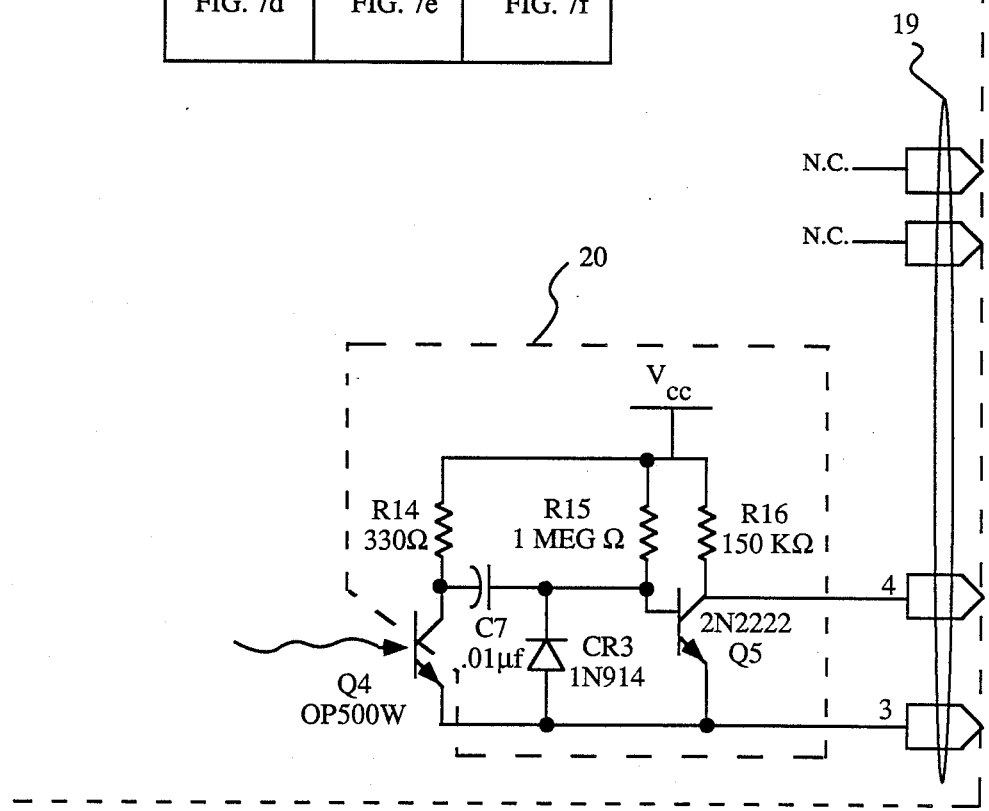
FIGS. 7a to 7f schematically illustrate a circuit included in remote control device 10 of FIGS. 1a and 1b.
Figure 7B:
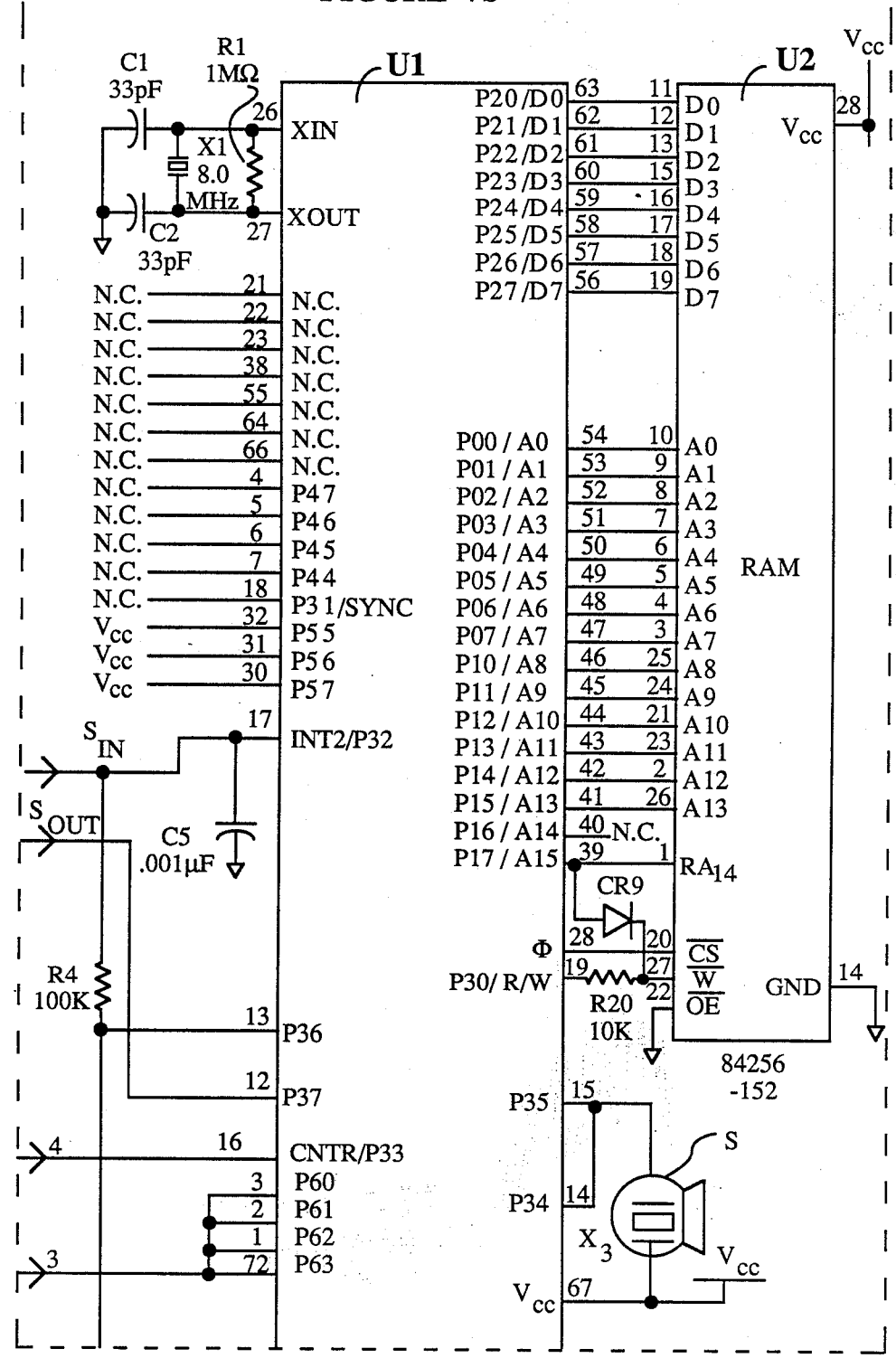
Figure 7C:
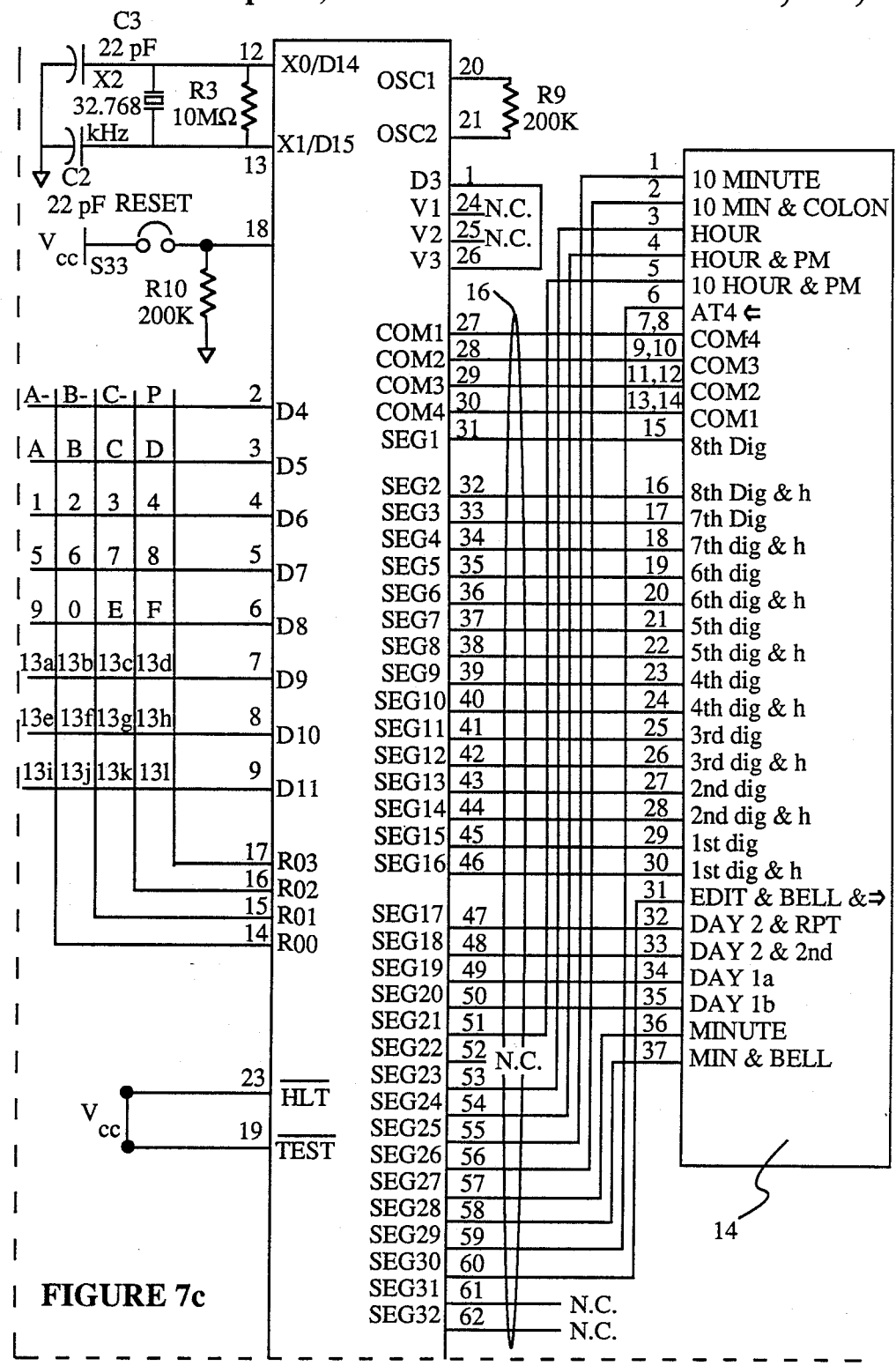

FIGS. 7a to 7f schematically illustrate the circuit within remote control device 10. As can be seen, remote control device 10 includes an eight bit microprocessor U1 (FIGS. 7b and 7e) such as device model number M50743, manufactured by Mitsubishi. Microprocessor U1 includes an internal mask-programmed ROM which contains the program executed by microprocessor U1. Input pins 16, 1, 2, 3, and 72 of microprocessor U1 are coupled to infrared sensitive transistor Q4 via a biasing and buffering circuit 20 (FIG. 7a). When infrared signals are not impinging on transistor Q4, transistor Q4 is off, and the collector voltage of transistor Q4 is high. Also, resistor R15 biases transistor Q5 so that transistor Q5 is on, and the collector voltage of transistor Q5 (tied to pin 16 of microprocessor U1) is pulled low. When infrared signals impinge on transistors Q4, transistor Q4 turns on, thereby pulling the voltage at the base of transistor Q5 low, turning off transistor Q5, and causing a high voltage to be applied to pin 16 of microprocessor U1. During learning mode, microprocessor U1 monitors the signal present at pin 16, determines the time duration of the various pulse bursts and pauses using a clock within microprocessor U1, determines the frequency of pulses in the first pulse burst of the signal, and stores this information in a 32K×8 static RAM U2.

Figure 7D:
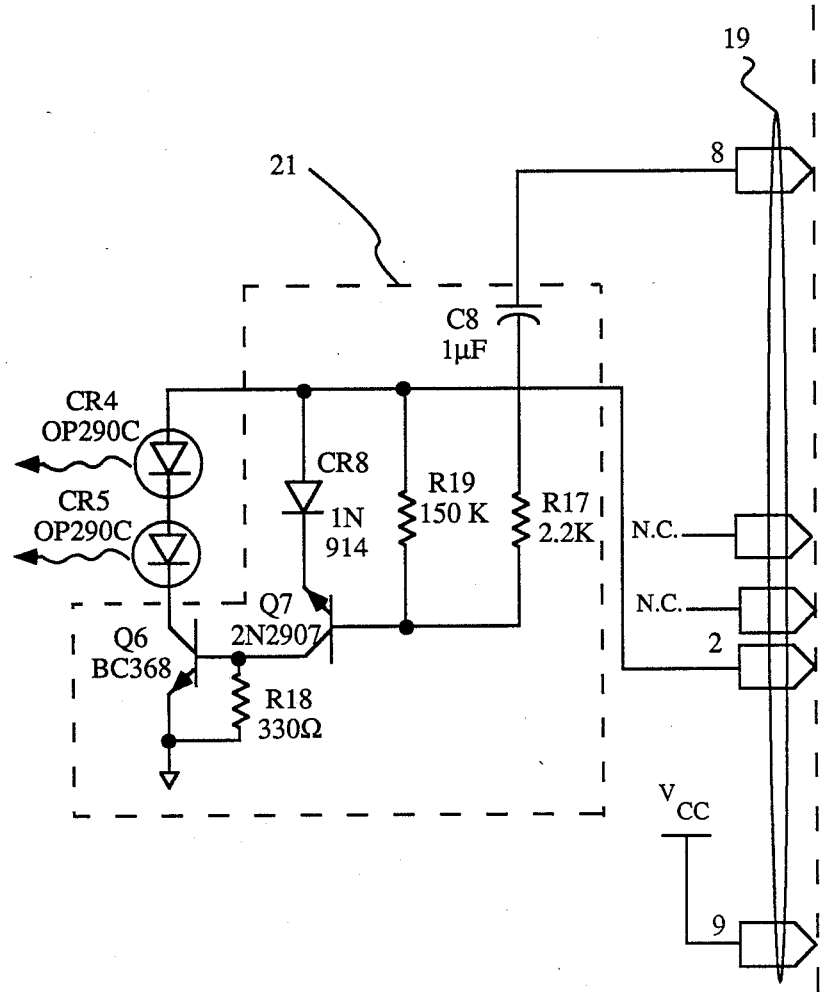
Figure 7E:
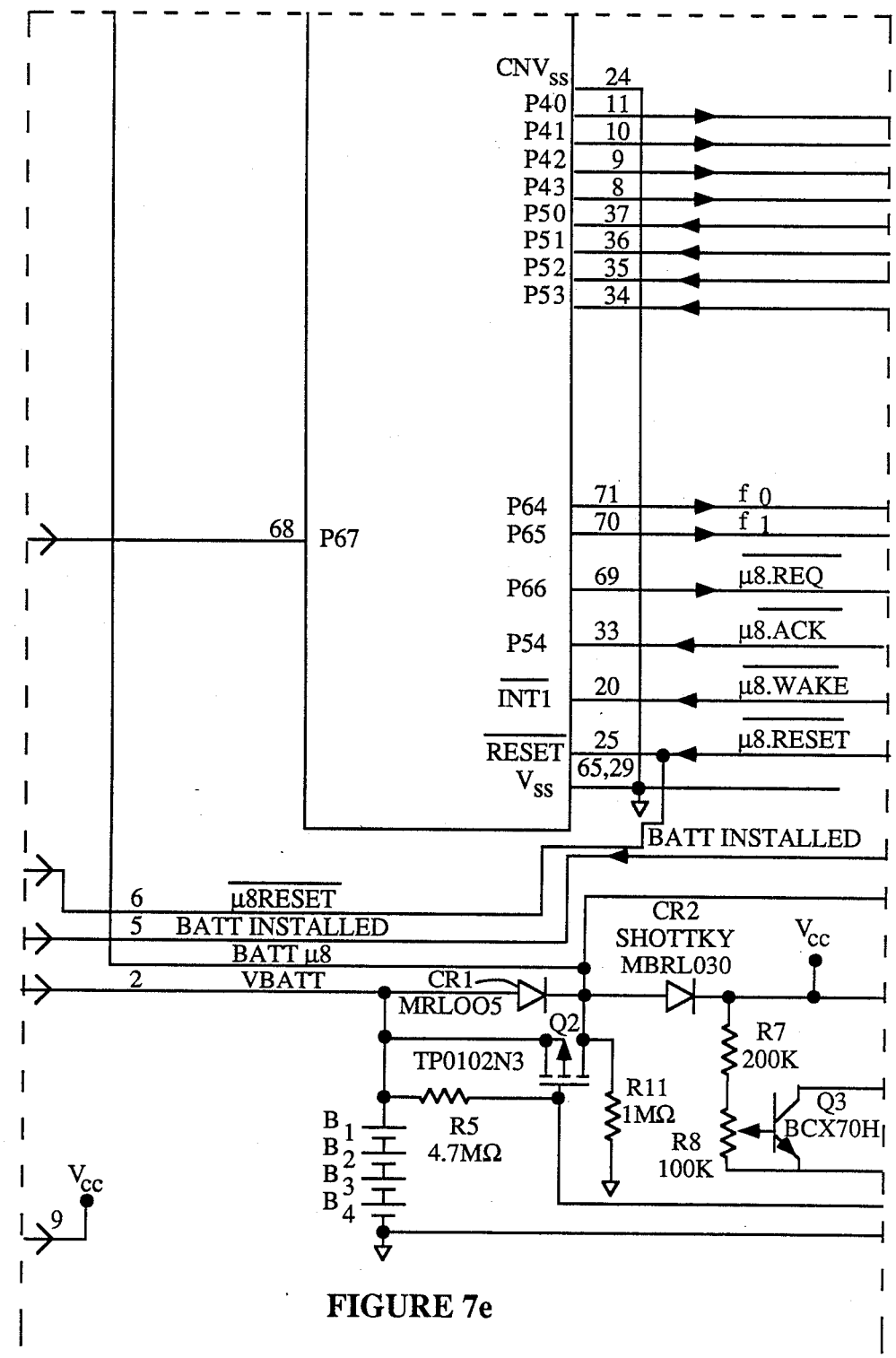
Figure 7F:
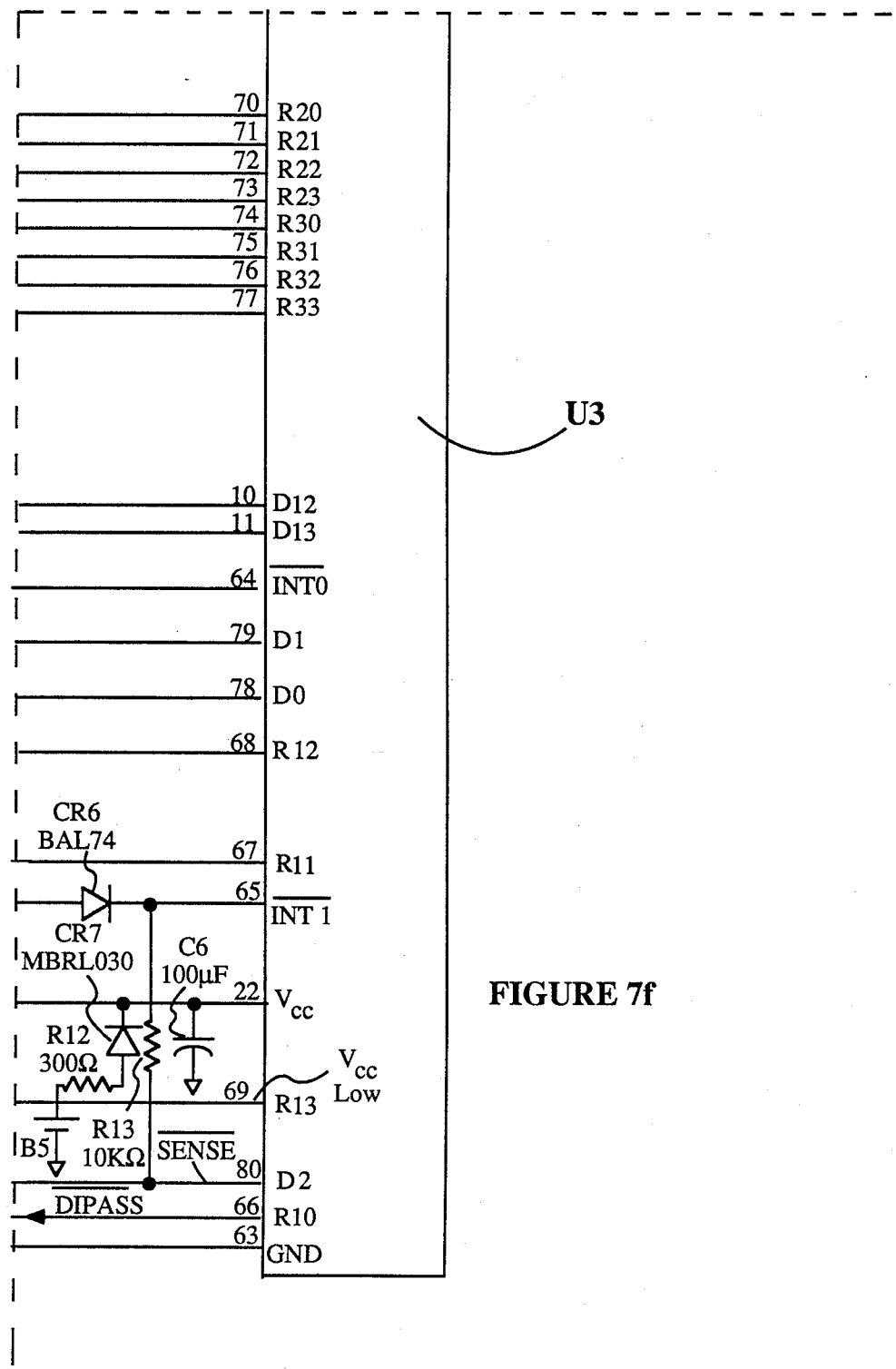

Pin 68 of microprocessor U1 provides an output signal to a buffer circuit 21, which in turn provides current through infrared light-emitting diodes (LEDs) CR4 and CR5 (FIG. 7d). Normally, the signal provided by pin 68 is high, the voltage at the base of PNP transistor Q7 is high, transistor Q7 is off, the voltage at the base of transistor Q6 is low, and transistor Q6 is off, thereby preventing current from flowing through LEDs CR4 and CR5. When the signal of pin 68 is pulled low by microprocessor U1, PNP transistor Q7 turns on, thereby turning on transistor Q6, and causing current to flow through LEDs CR4 and CR5. When a user pushes appropriate buttons on panel 11 (FIG. 1a), the program executed by microprocessor U1 causes microprocessor U1 to retrieve frequency and time duration data in RAM U2, and drive LEDs CR4 and CR5 to reconstruct an infrared signal comprising a sequence of bursts and pauses having the time durations retrieved from RAM U2. The frequency of the pulses in the pulse bursts to be reconstructed by microprocessor U1 is also controlled by the frequency data retrieved from RAM U2.

Microprocessor U1 also includes pins 16, 14 and VCC pin 67 coupled to a speaker S. Speaker S provides auditory signals to a user indicative of either error conditions or successful learning operations, as discussed in detail below.

A portion of the software executed by microprocessor U1 is stored in a block of locations within RAM U2. The portion of the software in this block is not altered during operation of device 10. A copy of this software within this block of locations is provided below as Appendix A in the Mitsubishi M50743 Assembler language. A copy of the software in the ROM internal to microprocessor U1 is provided below as Appendix B.

Also included in remote control device 10 is a four bit microprocessor U3 (FIGS. 7c and 7f), such as device number LCD3 manufactured by Hitachi. Microprocessor U3 also includes a mask programmed ROM which contains the program executed by microprocessor U3, provided as Appendix C in hexidecimal. Microprocessor U3 scans the buttons in panels 11 and 13 to determine when a user actuates one of the buttons and to provide appropriate instructions to microprocessor U1 in response thereto. In addition, microprocessor U3 controls the information displayed on LCD 14 by providing data on lines 16 connected to LCD 14. Microprocessor U3 also maintains a real time clock. As described below, the clock is used to enable a user to program remote control device 10 to transmit control signals at desired times.

Figure 10A:
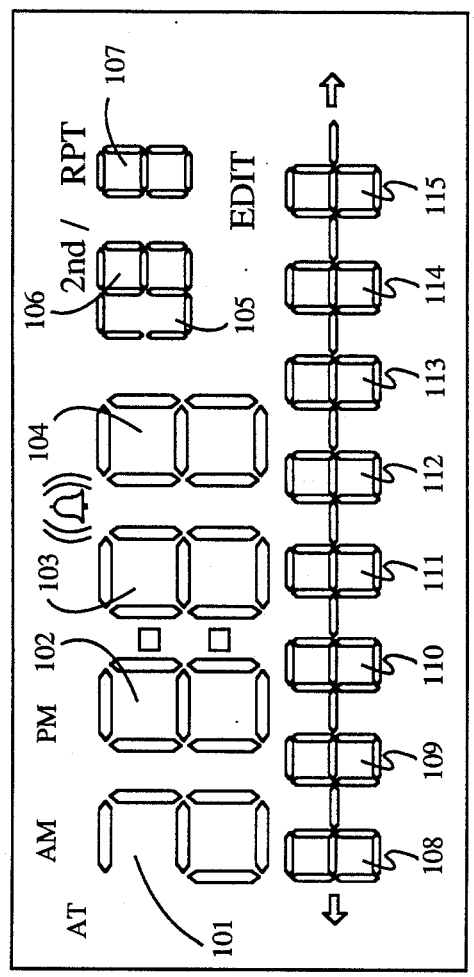
FIGS. 10a and 10b illustrate the various segments of LCD 14 within remote control device 10.
Figure 10B:
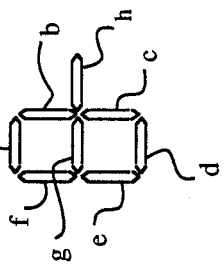

LCD 14 is a multiplexed LCD which receives signals from common lines COM1 to COM4 and segments driver lines SEG1 to SEG30 of microprocessor U3. Segment driver SEG1 controls segments 115d, 115e, 115g and 115f of character 115 when lines COM1, COM2, COM3 and COM4 are active, respectively. (FIGS. 10a, 10b). Similarly, each of segment drivers SEG2 to SEG30 control one of a plurality of segments depending on the state of common lines COM1 to COM4, e.g., as set forth in Table I below. The convention for identifying the various segments of characters 101 to 115 is illustrated in FIG. 10b. Thus, segment 104a is the top horizontal segment of character 104. Segment 104d is the bottom horizontal segment of character 104.

TABLE I

| LCD PIN | SEGMENT DRIVER | COM1 ACTIVE | COM2 ACTIVE | COM3 ACTIVE | COM4 ACTIVE |
| --- | --- | --- | --- | --- | --- |
| 1 | SEG25 | 103a | 103b | 103c | 103d |
| 2 | SEG26 | colon | 103f | 103g | 103e |
| 3 | SEG23 | 102a | 102b | 102c | 102d |
| 4 | SEG24 | PM | 102f | 102g | 102e |
| 5 | SEG21 | AM | 101b | 101c | 101a, 101d, 101e, 101g |
| 6 | SEG29 | ← | AT | | 102h |
| 7 | COM4 | | | | XX |
| 8 | COM4 | | | | XX |
| 9 | COM3 | | | XX | |
| 10 | COM3 | | | XX | |
| 11 | COM2 | | XX | | |
| 12 | COM2 | | XX | | |
| 13 | COM1 | XX | | | |
| 14 | COM1 | XX | | | |
| 15 | SEG 1 | 108d | 108e | 108g | 108f |
| 16 | SEG 2 | 108a | 108c | 108h | 108b |
| 17 | SEG 3 | 109d | 109e | 109g | 109f |
| 18 | SEG 4 | 109a | 109c | 109h | 109b |
| 19 | SEG 5 | 110d | 110e | 110g | 110f |
| 20 | SEG 6 | 110a | 110c | 110h | 110b |
| 21 | SEG 7 | 111d | 111e | 111g | 111f |
| 22 | SEG 8 | 111a | 111c | 111h | 111b |
| 23 | SEG 9 | 112d | 112e | 112g | 112f |
| 24 | SEG10 | 112a | 112c | 112h | 112b |
| 25 | SEG11 | 113d | 113e | 113g | 113f |
| 26 | SEG12 | 113a | 113c | 113h | 113b |
| 27 | SEG13 | 114d | 114e | 114g | 114f |
| 28 | SEG14 | 114a | 114c | 114h | 114b |
| 29 | SEG15 | 115d | 115e | 115g | 115f |
| 30 | SEG16 | 115a | 115c | 115h | 115b |
| 31 | SEG30 | EDIT | | → | BELL |
| 32 | SEG19 | 106d | 106a, 106f | 106g | 106c |
| 33 | SEG17 | RPT | 107a | 107b, 107c | 107g |
| 34 | SEG18 | 2nd | 107f | 107e | 107d |
| 35 | SEG20 | 105a | 106b, 105e, 105f | 105d | 106e |
| 36 | SEG27 | 104a | 104b | 104c | 104d |
| 37 | SEG28 | BATTERY | 104f | 104g | 104e |

TRANSDUCER MODULES

Figure 3:
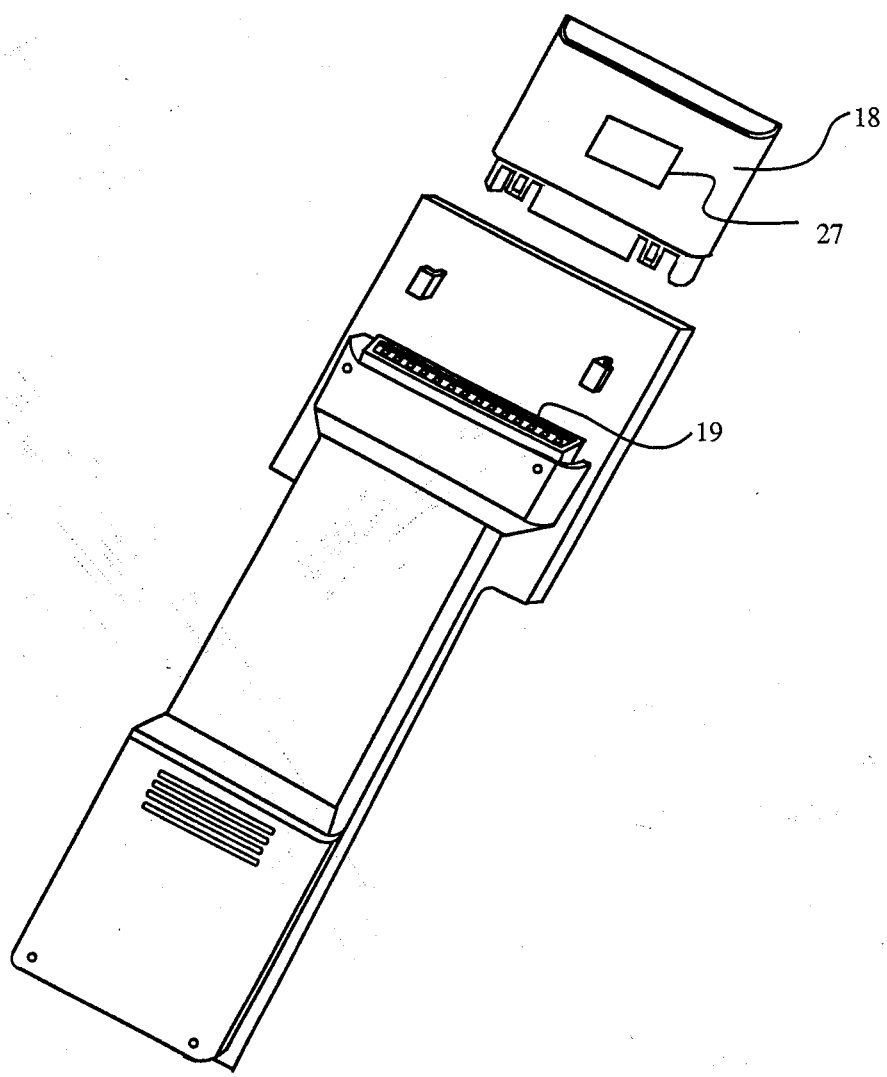
FIG. 3 is an exploded bottom perspective view of the device 10 of FIG. 1 and a replaceable transducer module.

Remote control device 10 includes a transducer module 18 (FIGS. 2 and 3) which includes infrared sensitive transistor Q4 buffer circuit 20, infrared light emitting diodes CR4 and CR5, and buffer circuit 21. In one embodiment of our invention, transducer module 18 is removably attached to remote control device 10. FIG. 3 illustrates transducer module 18 detached from remote control device 10, thereby exposing an edge connector 19. (Edge connector 19 is also schematically illustrated in FIGS. 7a and 7d.) In one embodiment of our invention, other transducer modules are attachable to edge connector 19, e.g., a second transducer module which receives and emits radio signals, or a third transducer module which receives and emits conventional electrical signals on a conventional set of electrical wires. Thus, if a user desires to use remote control device 10 to control appliances adapted to receive and transmit signals other than infrared signals, he easily does so by attaching an appropriate transducer module to remote control device 10. Such an appropriate transducer module may consist of a radio transmitter, an acoustic transmitter, or a light source, for example.

EMBODIMENT INCLUDING INTERFACE CRADLE

Figure 4A:
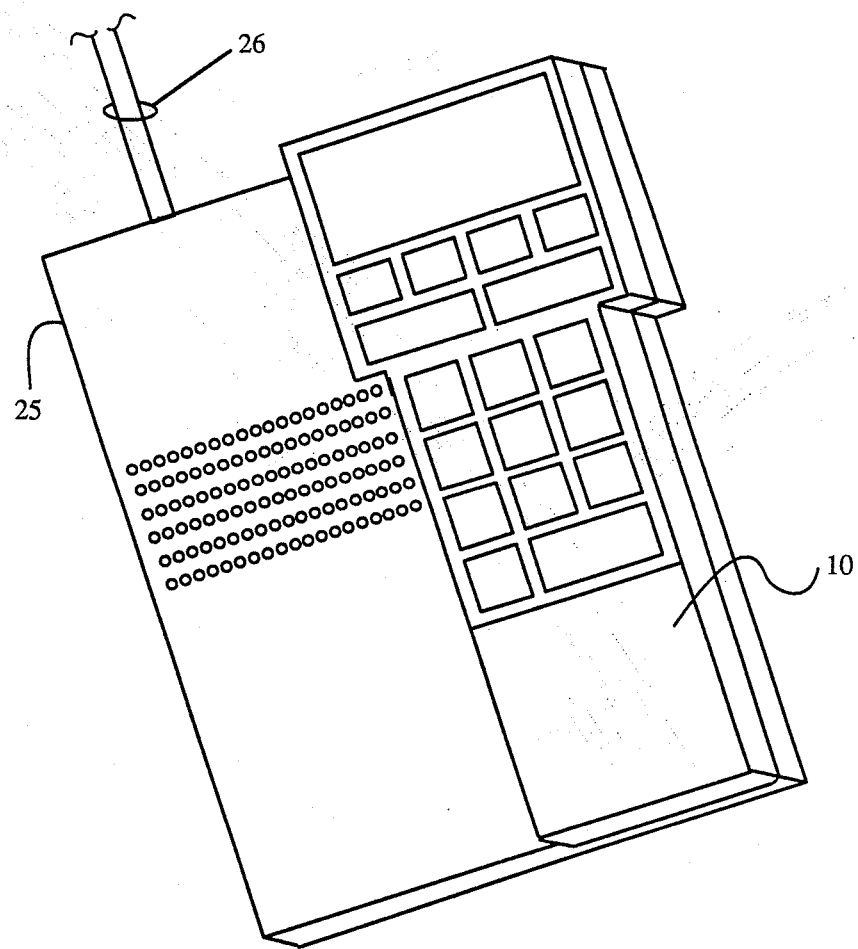
FIG. 4a illustrates remote control device 10 of FIGS. 1a and 1b coupled to a cradle for communicating with device 10.
Figure 4B:
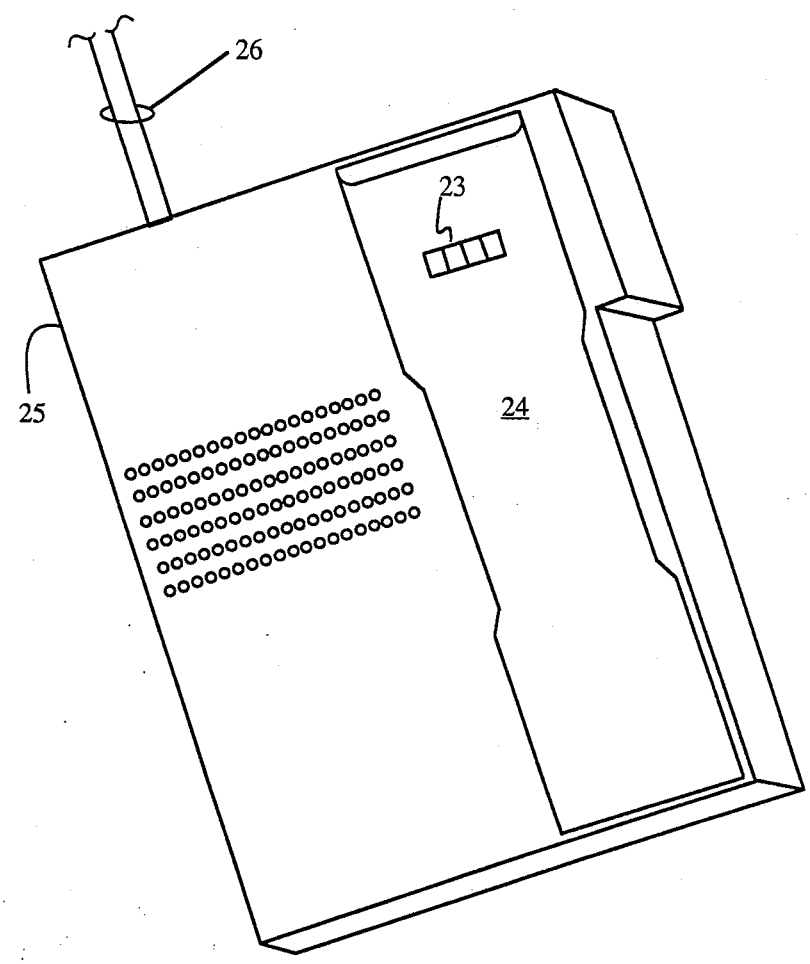

In one embodiment of our invention, remote control device 10 is adapted to rest in a cradle 25 (FIG. 4a) specifically designed for holding device 10. Of importance, an edge connector 23 on a surface 24 of cradle 25 (FIG. 4b) mates with a connector 27 (FIG. 3) on the bottom of transducer module 18 of remote control device 10. (In an embodiment in which cradle 25 is not used, connector 27 is typically not provided.) Crade 25 is coupled to a conventional set of telephone lines schematically illustrated as lines 26. Thus, if a user is away from home but desires to cause a VCR to record a television program, he can access cradle 25 in the same manner that one would access a conventional modem and then command remote control device 10 to emit control signals to turn on the VCR at appropriate times. In this embodiment, serial digital signals from cradle 25 are presented to pin 17 of microprocessor U1 to thereby cause microprocessor U1 to transmit a desired output signal to LEDs CR4 and CR5 (FIG. 7d). In addition, microprocessor U1 transmits signals to cradle 25 via pin 12 indicative of status information such as the information typically provided by LCD 14. In other embodiments, microprocessor U1 can also transmit to cradle 25 information indicative of the contents of locations within RAM U2 via pin 12 in response to a request signal from cradle 25. In one embodiment, the signals provided via pins 17 and 12 are typically 19.2 Kbaud signals. (Since typical modems provide data at a rate less than 19.2 Kbaud, cradle 25 buffers the data transmitted between device 10 and telephone lines 26.)

Although in the above-described embodiment, cradle 25 receives conventional digital signals via a modem, in other embodiments of our invention, cradle 25 receives conventional dual tone multifrequency (DTMF) signals. (DTMF signals are the audio signals provided by conventional touch-tone telephones.) Thus, in such an embodiment, instead of using a modem, the user accesses cradle 25 using a conventional touch-tone telephone.

Figure 4C:
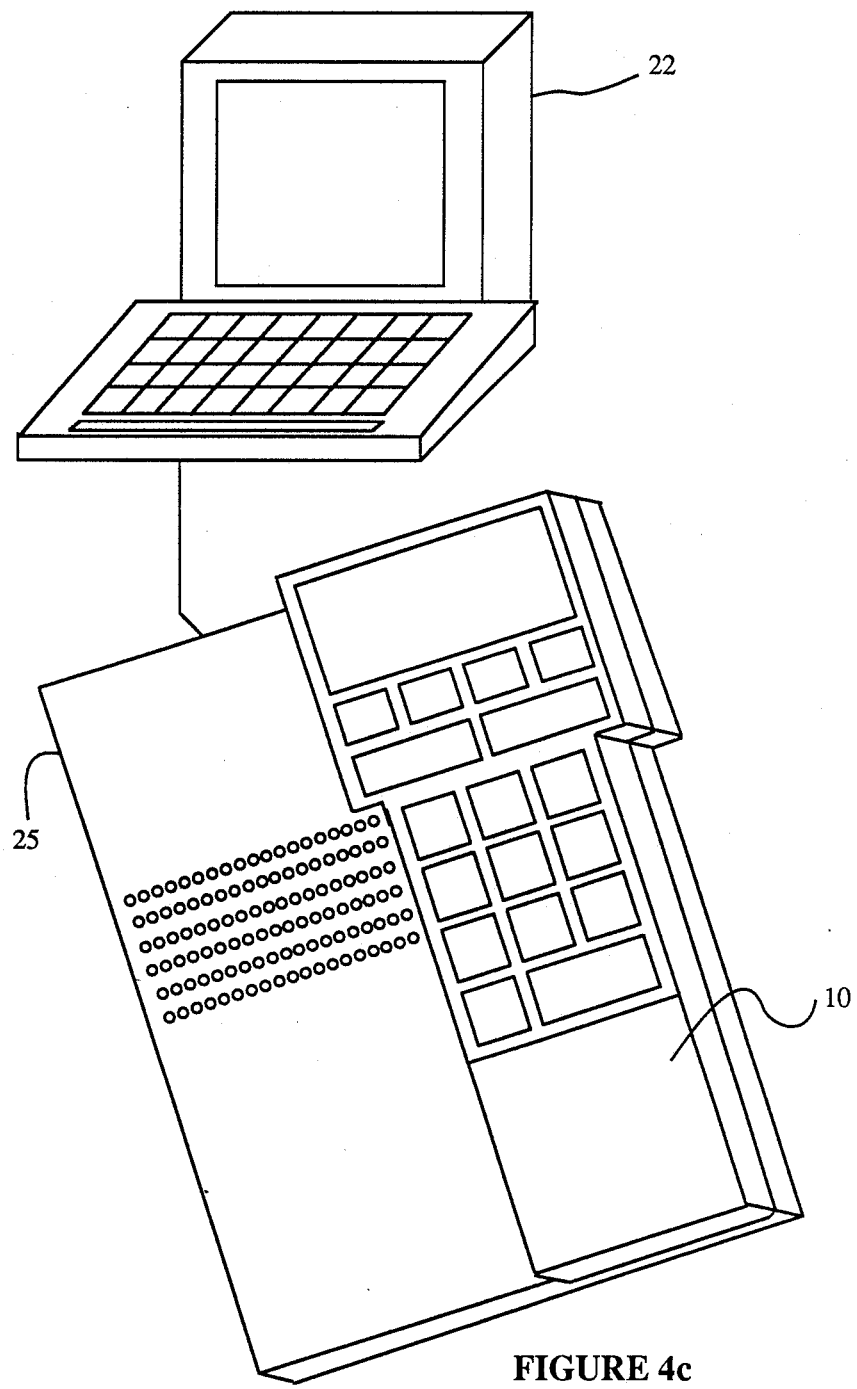
FIG. 4c illustrates remote control device 10 connected to a home computer 22.

In another embodiment, instead of using cradle 25 to communicate with telephone lines 26, cradle 25 communicates with other devices, such as a home computer 22 (FIG. 4c).

OPERATION OF DEVICE 10 DURING EMULATION MODE

As mentioned above, data is stored in RAM U2 such that when a user presses a button or sequence of buttons on panel 11, device 10 emits an infrared signal or a series of infrared signals.

RAM U2 includes a set of 16 pages of memory, each page including 16 key locations, each key location corresponding to one of buttons 0 to F of panel 11 (FIGS. 1a and 1b). Thus, if device 10 is accessing page 4 within RAM U2 (pages are accessed in a manner described below) and a user pushes button 4, a location within RAM U2 corresponding to page 4, button 4 is accessed by microprocessor U1. Microprocessor U1 reconstructs a signal or a set of signals having characteristics stored at the accessed page and key location. Thus, if the characteristics of signal 49 discussed above were stored at the memory location corresponding to page 4, button 4, microprocessor U1 would periodically lower and raise the voltage at pin 68 at a frequency equal to the frequency stored at the memory location corresponding to accessed page 4, button 4. After a time period equal to the nominal time duration of bin A, the voltage at pin 68 would go high and remain high for a time period equal to the nominal time duration of bin B. After that, microprocessor U1 would lower and raise the voltage at pin 68 to generate a pulse burst having a time duration equal to the nominal duration of bin C. Microprocessor U1 would continue until signal 49 is reconstructed. If a user pushes another button on panel 11, e.g. button C, microprocessor U1 then reconstructs a signal having characteristics stored in a location within RAM U2 corresponding to page 4, button C.

It is noted that in FIGS. 1a and 1b, buttons C and D appear as a single button. By pressing the left side of the button labeled C and D, button C is actuated. Pressing the right side of this button actuates button D. Buttons A, B, E and F are operated in a similar manner.

If a user desires to cause device 10 to access a page other than page 4, he pushes button P (the page select button) and then pushes a button within buttons O to F to select a desired one of pages O to F. Thus, by selecting a desired page and then pushing a button within buttons O to F, one causes device 10 to emit a signal or signals having characteristics stored at the key location within RAM U2 corresponding to that page and button.

RAM U2 also includes locations corresponding to buttons A-, B-, and C-. When a user presses one of buttons A-, B- or C-, remote control device 10 emits a signal having characteristics stored in the location within RAM U2 corresponding to the pressed button. Buttons A-, B-, and C- are not part of a page of key locations. Thus, when a user presses button A-, the same location within RAM U2 is accessed regardless of the page that device 10 is currently accessing. However, pressing button A-, B- or C- also causes device 10 to change the currently accessed page to page A, B or C, respectively.

As discussed in detail below, a user can also store programs in the locations within RAM U2 corresponding to the various pages and buttons. These programs are executed by pressing the appropriate buttons of panel 11 when device 10 is accessing an appropriate page. These programs are discussed in greater detail below.

OPERATION OF DEVICE 10 WHEN DEVICE 10 LEARNS TO EMULATE A SIGNAL

Figure 8A:
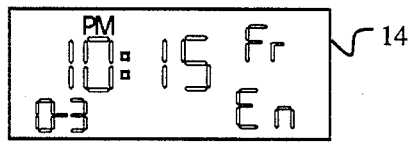
FIGS. 8a to 8k illustrate liquid crystal display 14 of device 10 during various operating states.

To teach device 10 to emulate an infrared signal, one first presses button 13i to indicate to device 10 that the learning mode is to begin. (The learning mode can also be used to program device 10 to perform complex sequences of functions and to program the timer within device 10, as discussed in detail below.) The symbol "En" then appears on segments 36 of LCD 14 as indicated in FIG. 8a.

Figure 8F:
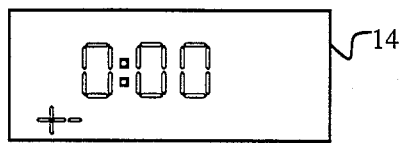
Figure 8B:
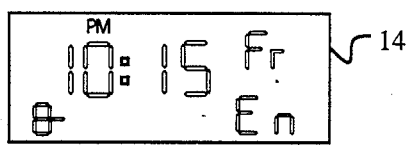

Next, a page is selected by pressing button P and then one of buttons O to F. LCD 14 responds by indicating the selected page. FIG. 8b illustrates LCD 14 indicating that page 8 has been selected.

Figure 8G:
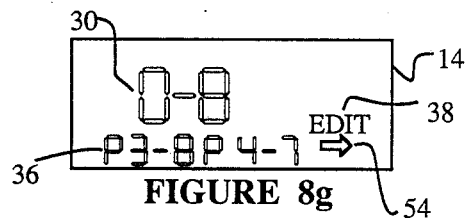
Figure 8C:
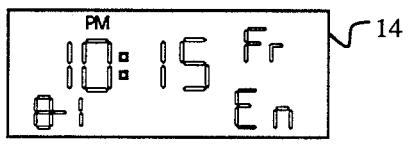

Next, a key location is selected by pressing button 13j and pressing one of buttons O to F, e.g., button 1. LCD 14 responds by displaying the selected button. FIG. 8c illustrates LCD 14 indicating that the key location corresponding to page 8, button 1 has been selected.

(Data can also be stored in locations within RAM U2 corresponding to buttons A-, B- or C-. When storing data in these locations, it is not necessary to select a page.)

Figure 8H:
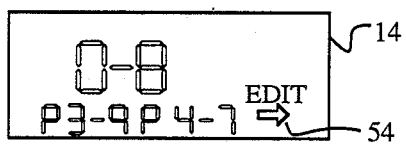
Figure 8D:
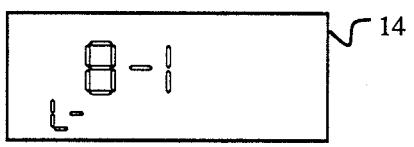

The user then presses button 13k to indicate to device 10 that an infrared signal is about to be emitted by another remote controller and that device 10 is to learn to emulate that signal. As illustrated in FIG. 8d, LCD 14 responds by indicating which page and button are being programmed at segments 30 of LCD 14 (segments 30 normally indicate the time). A symbol "L-" is also displayed by segments 36 of LCD 14 to indicate that device 10 is ready to accept an infrared signal from another remote controller. Device 10 is then placed in proximity to the other remote controller and the other remote controller is caused to emit the infrared signal. In one embodiment, device 10 is placed about 3 to 6 inches from the other remote controller during this step. If device 10 successfully stores the data necessary to reconstruct the infrared signal, microprocessor U1 causes speaker S to emit a high-frequency tone, and the symbol "C" appears at segments 36 of LCD 14. (If device 10 does not successfully store data necessary to reconstruct the infrared signal, microprocessor U1 causes speaker S to emit a low frequency tone, and the process of programming the desired page and key location within RAM U2 must be repeated.)

After successful storage of data in the appropriate page and key location in RAM U2, a user presses button 13l to indicate that storage of data in the page and key location in RAM U2 is complete. The user then presses button 13i to thereby exit the learning mode. Thereafter, during emulation mode, when a user accesses page 8 and presses button 1, device 10 reconstructs the signal having characteristics stored at the location within RAM U2 corresponding to page 8, button 1.

In accordance with one novel feature of our invention, a user can store data in a location within RAM U2 corresponding to a page and key location for reconstructing a plurality of infrared signals. For example, suppose a user wants to program device 10 so that when page 4 is accessed and button 9 is pressed, device 10 emits signals which would turn off the stereo, turn on the television, and select channel 2 on the television. To accomplish this, a user presses button 13*i* to enter the learning mode, presses buttons P and 4 to select page 4, presses buttons 13*j* and 9 to select the location corresponding to button 9, and presses button 13*k*. Then, the user places a first remote controller designed for use with the stereo about 3 to 6 inches from device 10, and causes the first remote controller to emit an infrared signal which normally causes the stereo to turn off. Then the user places a second remote controller designed for use with the television in proximity to device 10 and causes the second remote controller to emit an infrared signal which normally causes the television to turn on. Then, the user causes the second remote controller to emit a signal which normally causes the selection of channel 2. Then, the user presses button 13*l* and 13*i* to cause device 10 to exit the learning mode.

The above sequence of commands causes device 10 to store data such that when page 4 is accessed and button 9 is pressed during emulation mode, device 10 emits signals causing the stereo to turn off, the television to turn on, and channel 2 to be selected, all at the touch of a single button.

Another method for causing device 10 to emit a plurality of control signals is as follows. Again, suppose the user wants to program device 10 so that when page 4 is accessed and button 9 is pressed, device 10 emits signals which turn off the stereo, turn on the television, and select channel 2 on the television. In this example, the user first causes device 10 to store the signal for turning off the stereo at a location in RAM U2 corresponding to a selected page and button, e.g., page A, button B, in the manner discussed above. The user then stores the signal for turning on the television at a location in RAM U2 corresponding to a second page and button, e.g., page 0, button C. The user then stores the signal for selecting channel 2 at a location in RAM U2 corresponding to a third page and button, e.g., page 0, button 2. The user then programs the location at page 4, button 9 as follows:

(1) The user presses button 13*i* to indicate that the learning mode is to begin.

(2) The user then presses button P, 4, 13*j* and 9 to indicate that page 4, button 9 is being programmed.

(3) The user presses button 13*k*, P, A, B, P, O and C to indicate that when the user accesses page 4, button 9, device 10 is to emit the signals stored at page A, button B and page 0, button C.

(4) The user then presses button 2 to indicate that after emitting the signal at page 0, button C, the device 10 is to emit the signal at page 0, button 2. It is not necessary to pess buttons P and 0 before pressing button 2 to specify page 0, because when this portion of the program is executed, device 10 will already be accessing page 0 (since device 10 will have just emitted the signal at page 0, button C).

(5) The user presses button 13*l* to indicate that the signal stored at page 0, button 2 is the last signal to be emitted.

(6) The user presses button 13*i* to exit the learning mode.

Thereafter, during emulation mode, if the user accesses page 4, and presses button 9, device 10 emits the signals stored at page A, button B, page 0, button C and page 0, button 2. At the end of this sequence, device 10 will be accessing page 4.

PROGRAMMING DEVICE 10 TO REPETITIVELY EMIT SIGNALS

Certain appliances such as stereos are adapted to receive an infrared signal which cause the stereo sound volume to increase by a certain increment or decrease a certain increment. Suppose a user wants to program device 10 so that when page A is accessed and button 2 is pressed, device 10 sets the stereo volume to a desired level. The user can do this by programming device 10 to emit a sufficient number of volume decrement signals to ensure that the volume is adjusted to a minimum level (i.e. so that the volume is at a known initial value) and then to emit a specific number of volume increment signals to set the stereo volume to a desired level. Assume that the volume decrement signal is stored at page A, key O, and the volume increment signal is stored at page A, key 1. In this example, the user programs device 10 so that when the user accesses page A and presses button 2, device 10 emits 30 volume decrement signals (to ensure that the stereo volume is initially at a specific level, in this case, a minium level), and then emits 15 volume increment signals. The sequence for entering this program is as follows:

(1) The user presses key 13*i* to indicate to device 10 that a key is about to be programmed, and then presses buttons P, A and 2 to indicate that page A, button 2, is to be programmed.

(2) Button 13*k* is pressed to indicate that the user is going to enter a program.

(3) Button 13*h* is pressed to indicate the beginning of a programming loop.

(4) Buttons 3 and 0 are pressed to indicate that the instructions within the loop are to be executed 30 times.

(5) Buttons P, A, and 0 are pressed to indicate that the signal having characteristics stored at the location corresponding to page A, button 0 is to be emitted. Since this instruction is part of a loop that is repeated 30 times, the signal having characteristics stored at page A, key 0 is repeated 30 times.

(6) Button 13*e* is pressed to indicate the end of the program loop.

(7) Button 13*h* is pressed to indicate the beginning of a second program loop.

(8) Buttons 1 and 5 are pressed to indicate that the instructions in the second program loop are to be repeated 15 times.

(9) Buttons P, A, and 1 are pressed to indicate that the signal having characteristics stored at the location corresponding to page A, button 1, is to be emitted. Since this instruction is to be executed 15 times, the corresponding signal is emitted 15 times.

(10) Button 13*e* is pressed to indicate the end of the program loop.

(11) Buttons 13*l* and 13*i* are pressed to indicate the end of the program and to cause device 10 to exit the learning mode.

SETTING THE CLOCK WITHIN REMOTE CONTROL DEVICE 10

As mentioned above, microprocessor U3 keeps track of the time and thus serves as a clock. Microprocessor U3 displays the time and day on segments 30 and 34, respectively, of LCD 14. There are two ways to set the clock and day. In one method, button 13*a* within panel 13 is pressed, thereby causing LCD 14 to enter a time setting mode and to display the time, day of the week, and a.m. or p.m. Also, a display symbol 46 (FIG. 8*e*) is provided on segments 36 of LCD 14. To decrement the hour indicated on LCD 14, button A is pressed, whereas to increment the hour indicated on LCD 14, button B is pressed. Similarly, to decrement the number of minutes indicated on LCD 14, button C is pressed whereas to increment the number of minutes indicated, button D is pressed. To cause LCD 14 to indicate an earlier day of the week, button E is pressed whereas to cause LCD 14 to indicate a later day of the week, button F is pressed. If it is desired to cause LCD 14 to indicate either a.m. or p.m., button A- or button B- is pressed, respectively, as appropriate.

If the time display on LCD 14 is accurate, button 13*l* is pressed, thereby causing remote control device 10 to leave the time setting mode.

Another method for setting the clock in device 10 is to press button 13*a*, and then enter the correct time by pressing buttons 0 to 9 as appropriate. Thus, if one wanted to set the time to 11:59, one would press button 1 twice and then press buttons 5 and 9. If one wanted to set the time to 1:59, one would merely press buttons, 1, 5, and 9, in that order. The day of the wek, and a.m. or p.m. are selected as described above. The time setting mode is exited by pressing button 13*l*.

PROGRAMMING THE TIMER

In accordance with one embodiment of our invention, remote control device 10 can be programmed to emit various control signals at selected times. The manner in which this is done is best explained by example. Assume that a user wants to cause device 10 to turn on a VCR at 4:00 p.m., on Thursday, a record a program which lasts one hour, rewind the VCR, and turn the VCR off.

A user first causes remote control device 10 to learn to emulate the infrared signals which turn on the VCR, cause the VCR to record, rewind the VCR, and turn off the VCR. These signals can be stored at any page and key location. In this example, the user stores the signal for turning on the VCR and the signal for causing the VCR to record at the location corresponding to page 8, button 8, and stores the signals for causing the VCR to rewind and turn off at page 8, button 7, e.g., in the manner discussed above.

The user then programs the timer as follows:

(1) Button 13*i* is pressed to enter the learning mode and button 13*b* is pressed to indicate that the user is programming the timer. LCD responds by providing the symbol "AT" at segments 42 (FIG. 1*b*).

(2) LCD 14 then displays a time and day. The user then uses button A-, B-, and A to F to alter the time and day displayed by LCD 14 in the same manner as that used to set the clock within device 10. When LCD 14 displays the time 4:00 p.m., Thursday, the user presses button 13*k*. (While incrementing or decrementing through the days of the week, the day is provided on segments 34 of LCD 14. Between Sunday and Monday the symbol "MF" appears on segments 34. If the time is set to "MF", instead of a day of the week, device 10 executes the instructions in the timer program every weekday, Monday through Friday.)

(3) Buttons P, 8 and 8 are then pressed (in that sequence) to indicate to device 10 that at the above-indicated time, the signals stored at the location corresponding to page 8, button 8 are to be emitted (which turn on the VCR and cause the VCR to record). The user then presses button 13*l*.

(4) The user presses button 13*b* and enters the time 5:00 p.m. on Thursday. The user then presses buttons 13*k*, P, 8, and 7. This indicates to device 10 that at 5:00 p.m. on Thursday, device 10 is to emit the signal stored at the location corresponding to page 8, button 7. As mentioned above, this signal causes the VCR to rewind and turn off. The user then presses button 13*l*.

(5) Button 13*is* pressed to exit the learning mode. The above sequence of commands causes device 10 to store instructions into a portion of RAM U2 hereinafter designated as the timer queue. Thus, the timer queue will contain a first instruction which causes device 10 to emit the signals having characteristics stored at page 8, key 8 on Thursday at 4:00 pm., and a second instruction which causes device 10 to emit the signals having characteristics at page 7, key 7 on Thursday at 5:00. Device 10 stores those instructions chronologically in the timer queue. Device 10 then compares the desired execution time of the first instruction in the timer queue with the time provided by the real time clock within microprocessor U3. As soon as the real time clock indicates that it is Thursday at 4:00 p.m., the signals at page 8, key 8 are emitted, and the first instruction is removed from the queue. (Device 10 indicates to the user that an instruction in the timer queue is executed by displaying segments 39 of LCD 14.)

When the real time clock indicates that it is 5:00 on Thursday, device 10 executes the second instruction in the timer queue and then removes the second instruction from the queue.

The timer queue can be programmed to execute an instruction at the second occurrence of a time. For example, suppose the user in the previous example wanted to record a television program one week from Thursday at 4:00 p.m. The user would then follow the steps 1 to 3 above, but prior to pressing button 13*k* (step 2), the user presses button C- to indicate to device 10 that the event loaded into the timer queue is to be executed one week from Thursday. Similarly, the user follows steps 4 and 5 but prior to pressing button 13*k*, the user presses button C- so that the VCR will turn off at the appropriate time (i.e., one week from Thursday at 5:00).

The timer queue can also be programmed so that a control signal is executed every week. Thus, suppose a user wanted to record a television program every Thursday at 4:00 p.m. The user follows steps in 1 to 3 above, but prior to pressing button 13*k*, the user presses button P. The user then follows steps 4 and 5 above, but prior to pressing button 13*k*, the user presses button P. Thus, after executing the instruction at page 8, key 8 at 4:00 p.m. on Thursday, that instruction is reentered back into the timer queue to be executed the following Thursday at 4:00 p.m. Similarly, after executing the instruction at page 8, button 7 at 5:00 on Thursday, that instruction is also reentered into the timer queue.

It is noted that performing the steps 1 to 5 above will not delete instructions already present in the timer queue. Instead, the above steps will only enter additional instructions into the timer queue. Instructions are removed from the queue when they are performed (unless button P was pressed prior to pressing button 13*k*). Another method for removing instructions from the queue is described below.

Instead of programming two events to occur at two separate specified times, a user can specify a time when a first event is to occur, and then specify a waiting period before the second event is to occur. An example of how this is done is as follows. In this example, assume that a user wants to turn on his VCR at 4:00 p.m. on Thursday and record a program, and at 5:30, to rewind and turn the VCR off as discussed above.

In this example, the user again programs and stores the signals for turning on the VCR and the signal for causing the VCR to record at the location corresponding to page 8, button 8, and stores the signals for causing the VCR to rewind and turn off at page 8, button F. In this example, the user programs the location at page 8, button 6 to cause device 10 to emit the signals stored at page 8, button 8, wait one and a half hours, and emit the signals stored at page 8, button F. This is done by doing the following:

(1) The user presses button 13*i* to indicate that a programming session is to begin.

(2) The user presses buttons P, 8, 13*j* and 6 to indicate that it is page 8, button 6 that is being programmed.

(3) The user presses button 13*k* and 8 to indicate that when the program at page 8, button 6 is executed, device 10 is to first emit the signals stored at page 8, button 8. (It is not necessary to press buttons P and 8 after pressing button 13*k* to specify page 8 because device 10 will already be accessing page 8.)

(4) The user then presses button 13*f* to indicate that a delay is about to be programmed. LCD 14 responds by providing the display illustrated in FIG. 8*f*.

(5) The user then indicates the length of the desired time delay by pressing button A or B (at this point, buttons A and B have the same effect on device 10) to indicate that the next three digits entered into device 10 are to be interpreted as hours and minutes. The user then presses buttons 1, 3 and 0 to indicate that the time delay is to be one hour and 30 minutes. (If the user did not press button A or B, device 10 would insert a delay of one minute, 30 seconds instead of a delay of one hours, 30 minutes.)

(6) The user then presses buttons 13*k*, P, 8, F and 13*l* to indicate that after the delay has elapsed, device 10 is to emit the signal stored at page 8, button F.

(7) The user then presses button 13*l* again and presses button 13*i* to end the programming session.

(8) Thereafter, the user causes device 10 to enter into the timer queue an instruction to execute the program at page 8, button 6 on Thursday at 4.00 p.m. in the manner described above.

On Thursday, at 4:00 p.m., device 10 executes the instruction at page 8, button 6. This causes device 10 to emit the signals stored at page 8, button 8, and to calculate a second execution time by adding a delay of one hour and 30 minutes to the time indicated by the real time clock in microprocessor U3 (i.e., the second execution time will be Thursday at 5:30 p.m.). Device 10 then enters into the timer queue an instruction to emit the signals stored at page 8, button 8 at the second execution time. When it is 5:30 p.m., device 10 will then emit the signal stored at page 8, button F to rewind and turn off the VCR.

In one embodiment, a page and key location can be programmed so that when a button within buttons 11 is pushed, an instruction to execute a program at a specified time is loaded into the timer queue. This is done in a manner similar to steps 1 to 8 above, except instead of using button 13*f* to specify a time delay as part of a key definition, button 13*b* is pressed to specify an absolute time as part of the key definition.

CANCEL KEY

Device 10 includes button 13*d* which serves as a cancel key. If a user presses button 13*d* during a program execution, device 10 ceases executing the program. If button 13*d* is cancelled during learning mode, device 10 exits the learning mode and the program being stored during learning mode is cancelled. If button 13*d* is pressed during the programming of the timer, device 10 exits the timer programming mode.

EDIT MODE

In accordance with one novel feature of our invention, remote control device 10 permits a user to edit the programs stored at the various page and key locations in RAM U2. Pressing button 13*c* and then selecting a desired page and key (for example, by pressing appropriate keys on panel 11) permits a user to review the program stored at that page and key. This program appears on status line 36 of LCD 14. Device 10 uses a set of programming symbols illustrated at FIG. 9. These symbols appear on status line 36 of LCD 14 so that a user can determine what program steps will be executed if he presses a given key. If the user decides to alter the program, he first presses button 13*i* to indicate to device 10 that a program is to be altered.

To understand how the edit process works, assume that a user wants to review the program at page 0, key 8. The user thus presses key 13*c* to indicate that an edit session is to begin, and then presses buttons P, 0, and 8 to indicated that page 0, key 8, is to be reviewed. FIG. 8*g* illustrates information provided by LCD 14 in response thereto. Specifically, LCD 14 segments 38 indicate that device 14 is in the middle of an edit, segments 30 indicate that page 0, key 8, is being edited, and segments 36 illustrate that the instructions at page 0, key 8, cause device 10 to emit signals stored at page 3, key 8, and then emit signals stored at page 4, key 7. Although not illustrated in FIG. 8*g*, the first "P" illustrated by segments 36 blinks on and off, alternating with a dash. The dash in segments 36 which alternates with the "P" serves as a cursor which can be moved to the left by pressing button 13*e* and moved to the right by pressing button 13*h*. When the cursor reaches the 7th character on status line 36, the program scrolls 1 character so that the user can observe the remaining instructions in the program. Arrow 54 indicates that the program being edited includes additional instructions following the "7" in segments 36. A similar arrow is provided at the left of segments 36 pointing left (see FIG. 1*b*) which, if displayed, indicates that the program includes additional instructions before the instructions being displayed by LCD 14.

During the edit mode, if enable key 13*i* has been pressed, a user can remove the character to the left of the cursor (i.e. the blinking character in segments 36) by pressing delete button 13*g*.

Figure 8I:
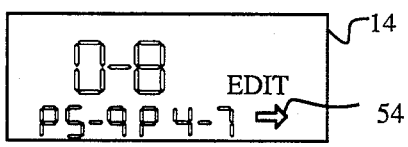
Figure 8E:
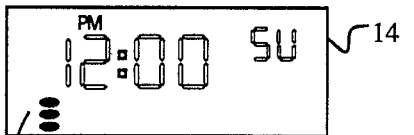

As can be seen in FIG. 8*g*, the program at page 0, key 3, merely executes the programs at page 3, key 8, and page 4, key 7. Suppose that a user wanted to replace page 3, key 8, with page 5, key 9. The user would move the cursor so that it is to the right of the "8", press delete button 13*g* and press button 9. At the end of that sequence, LCD 14 would display the program as illustrated in FIG. 8*h*. Thereafter, the user moves cursor 54 to the left and presses delete button 13*g* and button 5. The resulting program would be indicated by LCD 14 as illustrated in FIG. 8*i*.

Figure 8J:
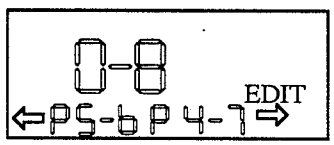

If a user merely wants to insert instructions into the program being edited, the user merely presses keys on panels 11 and 13 as desired. This inserts instructions into the program to the left of cursor 54. Thus, if the program for page 0, key 8, includes instructions to execute the programs at page 3, key 8, and page 4, key 7 (i.e., as illustrated in FIG. 8g), and the user wants to insert an instruction to cause device 10 to execute the program at page 5, key 6 after executing the program at page 3, key 8, the user would move the cursor to the left of the "8" and then press buttons P, 5 and 6. LCD 14 would respond by displaying the information illustrated at FIG. 8j. (Note that the instruction to execute the program at page 3, key 8 has scrolled off LCD 14.) Thereafter, the user presses buttons 13c and 13i to exit the edit mode.

Figure 8K:
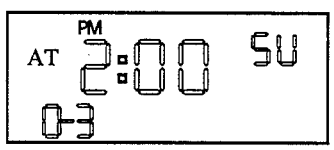

Device 10 also permits a user to monitor the instructions in the timer program. This is done by pressing edit buttons 13c and button 13b to indicate to device 10 that the timer program is to be monitored. If an event in the timer queue executed while LCD 14 was off (LCD 14 turns off if device 10 has not been used for a predetermined time period to save energy), it will be the first event displayed by LCD 14. LCD 14 will indicate the time at which that instruction was executed, and also the instruction (i.e. page and button) which was executed. If no instruction was executed by the queue since the display was off, LCD 14 will display the first instruction in the timer queue to be executed and the time at which it is to be executed. For example, if device 10 was programmed to emit the signal having characteristic stored at page 0, key 3, at 2:00 p.m. on Sunday, when editing the timer program, LCD 14 would display the information illustrated at FIG. 8k. A user presses button 13h to display the next instruction and execution time in the timer queue and presses button 13e to display the previous instruction and execution time in the timer queue. To enable removal of events in the timer program, a user pushes button 13i. A user can then press button 13g to remove an unwanted event displayed in the timer queue. However, a user cannot insert or change the instructions in the timer queue in edit mode. A user presses button 13d or 13c to exit the timer queue editing mode.

It will be appreciated in light of the above discussion that remote control device 10 permits a user great amount of flexibility. Device 10 can be programmed to perform a number of complex functions at the touch of a single button. Device 10 can also be programmed to emit desired signals at selected times.

While the invention has been described with reference to specific embodiments, those skilled in the art will appreciate that changes may be made in form and detail without departing from the spirit and scope of the invention. Accordingly, all such changes come within the present invention.

APPENDIX A

```
0000:              16  *               © 1987 CL9, Inc.
0000:              17  * RAM routines:
0000:              18  *
----- NEXT OBJECT FILE NAME IS ASM.O
8000:       8000   19           ORG      $8000
8000:CO DE         20           DFB      $CO,$DE
8002:4C 00 F1      21           JMP      $F100           RESET
8005:              22  *
8005:              23           INCLUDE RAM.SWITCHES
8005:               1  *
8005:               2  * RAM.SWITCHES:
8005:               3  * default values
8005:               4  *
8005:47 8C          5  INIT1.V     DW   INIT1.ram     new
8007:7A 8C          6  INIT2.V     DW   INIT2.RAM     new
8009:81 8C          7  INIT3.V     DW   INIT3.RAM     new
800B:1A 8E          8  MAINLOOP.V  DW   MAINLOOP.RAM  new
800D:               9  *
800D:76 8F         10  LEARN.V     DW   LEARN.RAM     new
800F:FF FF         11  ILLEGAL.V   DW   $ffff         doesn't do anything
8011:8C 99         12  ENDDO.V     DW   ENDDO.RAM     new
8013:17 8D         13  GOUSER.V    DW   GOUSER.RAM    new
8015:6A 94         14  STUFFIT.V   DW   STUFFIT.RAM   new
8017:54 F3         15  STUFFONE.V  DW   STUFFONE+3
8019:EC 93         16  XTIME.V     DW   XTIME.RAM     new
801B:70 8E         17  DELETEIT.V  DW   DELETEIT.RAM  new
801D:F2 F4         18  READTIME.V  DW   READTIME+3
801F:22 F5         19  WRITETIME.V DW   WRITETIME+3
8021:85 9B         20  FIXTIME2.V  DW   FIXTIME2.RAM  new
8023:87 93         21  ADDINTERVAL.V DW ADDINT.RAM    new
8025:B3 F7         22  DISPINT1.V  DW   DISPINT1+3
8027:59 8D         23  PUTDISP.V   DW   PUTDISP.RAM   new
8029:B8 95         24  DOITQ.V     DW   DOITQ.RAM     new
802B:A8 97         25  DONEDONE.V  DW   DONEDONE.RAM  new
802D:5F 96         26  DOITNEXT.V  DW   DOITNEXT.RAM  new
802F:43 97         27  DEFONSTACK.V DW  DEFONSTACK.RAM new
8031:70 F7         28  FLASHEM.V   DW   FLASHEM+3
8033:       0006   29           ds       $8039-*,$ff
```

```
8039:                30 *
8039:                31 *
8039:                24            INCLUDE RAMCODE
8039:                 2 * RAMCODE
8039:                 3 *****************************************
8039:                 4 * 1st time thru code
8039:                 5 *
8039:                 6 * INITIALIZE RAM POINTERS
8039:                 7 *
8039:AD 1B 7D         8 INITR1   LDA     FIRSTFLAG    if 1st time, initialize ptrs
803C:C9 AB            9          CMP     #$AB
803E:D0 03    8043   10          BNE     INITRTS
8040:4C FB 8E         11         JMP     INIT.PTRS
8043:60              12 INITRTS  RTS
8044:                13 *
8044:      0030      14          DS      $8074-*,$FF    room left by old routine
8074:                15 *
8074:60              16 INITR2   RTS
8075:                17 *
8075:                18 * TABLE OF ROUTINES TO CALL DEPENDING ON KEY
8075:                19 *
8075:F7 97           20 MAINRTNS DW      XMODE.RAM    $12 (ACTUAL 0-2)
8077:F3 97           21          DW      XKEY.RAM     $13 (ACTUAL 4-$13)
8079:                22 *
8079:66 F3           23          DW      SETTIME      $14:SET
807B:38 8D           24          DW      SETALARM.RAM $15:AT CHANGED FROM ROM
807D:5E 85           25          DW      EDIT         $16:EDIT SPECIAL CASE
807F:0F F3           26          DW      GOUSER       $17: CANCEL
8081:1C 98           27          DW      STEP.INIT    $18: SCRLEFT
8083:0F 93           28          DW      WAIT         $19:WAITKEY
8085:D0 9C           29          DW      BLATT        $1A: DELETE
8087:81 98           30          DW      VERSION      $1B: SCRRIGHT
8089:D0 92           31          DW      ENABLEIT     $1C:ENABLE
808B:DD F8           32          DW      FIXKEY       $1D: KEY
808D:F6 9C           33          DW      MAINDO.RAM   $1E: DO
808F:D0 9C           34          DW      BLATT        $1F: OK
8091:                35 *
8091:                37 *
8091:                38 * SET UP FOR TIME SET (SET OR ALARM)
8091:                39 * (I'm putting this in ram because 3 entry points)
8091:                40 *
8091:       8091    41 GOSET     EQU     *
8091:20 8D F8        42           JSR    CLRDISP
8094:20 3C F7        43           JSR    OFFTIME     DISABLE CLOCK FOR NOW
8097:                44 *
8097:3C 00 1E        45 GOSETPROG LDM    #0,TIMEDIG  entry pt for execution
809A:7F 32           46           CLB    ANYDIRECT   starting value
809C:                47 *
809C:77 33 0B80AA    48           BBC    XTFLAG,GSP1
809F:                49 * if xtflag, move exectime to time
809F:A2 05           50 MOVEXTIME LDX    #5
80A1:BD A7 7E        51 MVXTM     LDA    EXECTIME,X
80A4:95 18           52           STA    SECL,X
80A6:CA              53           DEX
80A7:10 F8  80A1     54           BPL    MVXTM
80A9:60              55           RTS
80AA:                56 *
80AA:4C E8 F4        57 GSP1      JMP    READTITIME  read time (not seconds)
80AD:                58 *
80AD:                59 ****************************************************
80AD:                60 *
80AD:                61 * TABLE OF ROUTINES TO CALL DEPENDING ON KEY
80AD:                62 * FOR TIMEINPUT
80AD:                63 * 1st byte: minimum keynum; 2nd & 3rd bytes: addr of routine
80AD:                64 *
80AD:00              65 SETRTNS   DFB    0
80AE:0B 8E           66           DW     SETAM.RAM
80B0:01              67           DFB    1
80B1:0F 8E           68           DW     SETPM.RAM
80B3:02              69           DFB    2
```

```
8084:10 81        70            DW    SET2ND
80B6:03           71            DFB   3              keynum will be changed to
80B7:02 81        72            DW    SETRPT         $20 in setrpt
80B9:04           73            DFB   4
80BA:F3 8D        74            DW    UPDOWN.RAM
80BC:08           75            DFB   8
80BD:7C 8D        76            DW    DDG.RAM
80BF:12           77            DFB   $12
80C0:F3 8D        78            DW    UPDOWN.RAM
80C2:14           79            DFB   $14
80C3:CD F3        80            DW    ILLSET
80C5:17           81            DFB   $17
80C6:0C F3        82            DW    ENDLEARN
80C8:18           83            DFB   $18
80C9:CD F3        84            DW    ILLSET
80CB:1A           85            DFB   $1A
80CC:6A 8E        86            DW    DELETETIME.RAM
80CE:1B           87            DFB   $1B
80CF:CD F3        88            DW    ILLSET
80D1:1E           89            DFB   $1E
80D2:19 9D        90            DW    SETDO.RAM
80D4:1F           91            DFB   $1F
80D5:E5 F3        92            DW    SETOK
80D7:       002A  93 SETRTNLEN EQU    *-SETRTNS
80D7:             94 *
80D7:             95 **********************************
80D7:             96 *
80D7:             98 *
80D7:CF FF        99 SETTX      SEB   TXENBL
80D9:60           100            RTS
80DA:             101 *
80DA:3C 20 22     102 SETRPT.PATCH LDM #$20,KEYNUM   for display purposes
80DD:A5 33        103            LDA   FLAGS2
80DF:80 23   8104 104            BRA   SETRPT1
80E1:             105 *
80E1:       0003  106            DS    3
80E4:             107 *
80E4:             108 *
80E4:             109 *
80E4:             110 * STARTING CONFIG
80E4:       80E4  111 STARTDEFS EQU   *
80E4:00 00 00     112            DFB   00,00,00      FIRST ENTRY
80E7:0F FF 00     113            DFB   $F,$FF,0      LAST ENTRY
80EA:             114 *
80EA:             115 ***********************
80EA:             116 *
80EA:             117 * these are the values which the pointers should be initialized
80EA:             118 * to, given this memory configuration.  Avoid $4100 page
80EA:             119 * in case of stack weirdness.
80EA:             120 *
80EA:00 41        121 RAMPTRS    DW    $4100         start of alarm queue
80EC:0A 41        122            DW    $410A         pointer to current alarm (variable)
80EE:13 41        123            DW    $4113         pointer to end of queue (variable)
80F0:             124 *
80F0:80 41        125            DW    $4180         key array
80F2:             126 * later have this be dependent on length of alarmq
80F2:85 41        127            DW    $4185         end of keydefs (variable)
80F4:             128 *
80F4:00 7A        129            DW    $7a00         ?bottom of execution stack
80F6:             130 *
80F6:             131 ***************************************************
80F6:             132 **********************************
80F6:             133 *
80F6:             134 * TABLE OF UP-DOWN ROUTINES FOR TIME-SETTING
80F6:             135 *
80F6:1A 94        136 UPDOWNJSRS DW  DECDAYZ         $12
80F8:0D 94        137            DW  INCDAYZ         $13
```

```
80FA:31 94           138            DW     DECHRZ      $4
80FC:2B 94           139            DW     INCHRZ      $5
80FE:04 94           140            DW     DECMINZ     $6
8100:FB 93           141            DW     INCMINZ     $7
8102:                142 *
8102:                143 ****************************************
8102:                144 ***************************
8102:                145 * RAM ROUTINES:
8102:                146 *
8102:                147 * NEW ROUTINE FOR SETRPT,SET2ND
8102:                148 *
8102:                149 * somewhat confusing terminology:
8102:                150 * calling setrpt,set2nd will TOGGLE the value of rptflag,
 flag2nd
8102:                151 * and display the result.
8102:                152 * calling togrpt,tog2nd will display the current value.
8102:                153 *
8102:                154 *
8102:80 D6     80DA  155 SETRPT     BRA    SETRPT.PATCH
8104:49 04           156 SETRPT1    EOR    #4          returns here
8106:85 33           157            STA    FLAGS2
8108:3C 10 36        158 TOGRPT     LDM    #$10,VAR1   entry pt if we're not changing value
810B:47 33 128120    159            BBS    RPTFLAG,TOGGLE2
810E:80 0C     811C  160            BRA    TOGGLE1
8110:                161 *
8110:           8110 162 FLASH2ND   EQU    *
8110:A5 3B           163 SET2ND     LDA    FLASHON     switch flag2nd
8112:49 10           164            EOR    #$10
8114:85 3B           165            STA    FLASHON
8116:3C 11 36        166 TOG2ND     LDM    #$11,VAR1   entry pt if not changing value
8119:87 3B 048120    167            BBS    FLAG2ND,TOGGLE2
811C:                168 *
811C:5F 32           169 TOGGLE1    CLB    ONTOG
811E:80 02     8122  170            BRA    TOGGLEIT
8120:4F 32           171 TOGGLE2    SEB    ONTOG
8122:                172 *
8122:17 31 1C8141    173 TOGGLEIT   BBC    0,TIMEFLAG,BLATTSET not alarm: illegal
8125:C7 31 198141    174            BBS    6,TIMEFLAG,BLATTSET interval: illegal
8128:                175 *
8128:20 36 F4        176            JSR    CHECKFLAG
812B:30 13     8140  177            BMI    TOGRTS
812D:                178 *
812D:A5 36           179            LDA    VAR1
812F:20 6D FF        180            JSR    PEEK8
8132:57 32 038138    181            BBC    ONTOG,TOGGLE3
8135:6B              182            SEB    3,A
8136:80 01     8139  183            BRA    TOGEND
8138:7B              184 TOGGLE3    CLB    3,A
8139:97 33 048140    185 TOGEND     BBC    ACTTIME,TOGRTS
813C:78              186            SEI
813D:22 1C           187            JSR    \POKE16
813F:58              188            CLI
8140:60              189 TOGRTS     RTS
8141:                190 *
8141:4C CD F3        191 BLATTSET   JMP    ILLSET      (changed from jsr)
8144:60              192            RTS                leave like this
8145:60              193            RTS
8146:                194 * (LEFT OVER FROM ARROW ROUTINES)
8146:                195 *
8146:                197 *
8146:                198 * TABLE OF EXECUTE ROUTINES
8146:                199 *
8146:FB F9           200 DOITJSR    DW     DOITSET     $14:SET
8148:54 93           201            DW     DOITAT.RAM  15:AT    new
814A:D0 9C           202            DW     BLATT,BLATT EDIT,CANCEL
814E:3C 97           203            DW     DOITLOOPEND 18:ENDLOOP
8150:82 93           204            DW     DOITWAIT    19:wait
8152:D0 9C           205            DW     BLATT       1A:DELETE
8154:E3 96           206            DW     DOITLOOP    1B:BEGINLOOP
8156:D0 9C           207            DW     BLATT       1C:ENABLE
```

```
8158:DD 96        208          DW    RDOITKEY      1D:KEY
815A:86 F9        209          DW    DOITLEARN     1E:DO
815C:D0 9C        210          DW    BLATT         1F:OK
815E:D0 9C        211          dw    blatt         $20:?
8160:B0 8B        212          dw    doitir.ram    $21:irsymbol
8162:D0 9C        213          dw    blatt         $22: ?
8164:             214 *
8164:B0 8B        215          DW    DOITIR.RAM    $23:oneshot
8166:             25           INCLUDE IRCODE
8166:              1 *
8166:              2 * IRCODE
8166:              3 *
8166:              5 *
8166:              6 *
8166:              7 * CHECK TO SEE WHETHER AN IR DEFINITION HAS A 2ND PART TO IT
8166:              8 * (INDICATED BY BIT 1, 2ND BYTE).
8166:              9 * INPUTS: PROGLEN = LENGTH OF 1ST PART; DIFF = OFFSET INTO IRDATA
8166:             10 * OUTPUT: PROGLEN = UPDATED LENGTH; DIFF NOT AFFECTED
8166:             11 * XREG PRESERVED (USING VAR1)
8166:             12 *
8166:8A           13 FOLLOWUP  TXA                  save x.
8167:48           14           PHA
8168:A6 25        15           LDX   DIFF
816A:BD 8C 7D     16           LDA   IRDATA+1,X    check for 2nd part
816D:29 02        17           AND   #2
816F:F0 10  8181  18           BEQ   FOLLOWDONE
8171:8A           19           TXA                  it exists
8172:18           20           CLC
8173:6D AD 7E     21           ADC   PROGLEN
8176:AA           22           TAX                  new index
8177:BD 8B 7D     23           LDA   IRDATA,X      new length
817A:18           24           CLC
817B:6D AD 7E     25           ADC   PROGLEN
817E:8D AD 7E     26           STA   PROGLEN
8181:68           27 FOLLOWDONE PLA                 restore x
8182:AA           28           TAX
8183:60           29 FRTS      RTS
8184:             30 *
8184:       0005  32           ds    $8189-*,$ff
8189:             33 **********
8189:             34 *
8189:             35 * THIS ROUTINE TAKES THE IR DATA STARTING AT LOCATION
8189:             36 * "IRDATA" AND INSERTS THEM IN THE PROGRAM FOLLOWING
8189:             37 * THE CAPTURE SYMBOL.
8189:             38 * returns acc=0 if room; acc=$ff if no room
8189:             39 *
8189:       8189  40 STUFFIRS  EQU   *             [THIS LOCATION MUST BE PRESERVED]
8189:             41 * we're using a temporary work area pointed to by zp1
8189:             42 *
8189:20 8D 94     43           JSR   STACKPAGE     a page available?
818C:90 06  8194  44           BCC   STIR0
818E:20 7D 94     45 STUFFOUT  JSR   BLATT2        no
8191:4C 83 99     46           JMP   STUFFGONE
8194:             47 *
8194:1F 8A        48 STIR0     CLB   REPEATER      default: no repeat status
8196:3F 8A        49           CLB   REPEATER1
8198:             50 *
8198:A2 01        51           LDX   #1            index to progbuf
819A:A0 00        52           LDY   #0            index to zp1
819C:84 25        53           STY   DIFF          and irdata
819E:8C A6 7E     54           STY   IRCOUNT       count of total ir bytes
81A1:             55 *
81A1:BD 4A 7D     56 STIR1     LDA   PROGBUF,X     get next byte from program
81A4:91 2B        57           STA   (ZP1),Y
81A6:E4 12        58           CPX   PROGINDEX     if x>length of program
81A8:B0 51  81FB  59           BCS   STIREND       done transferring
81AA:E8           60           INX
81AB:C8           61           INY
```

```
81AC:C0 FA          62              CPY     #250            too big?
81AE:90 02    81B2  63              BCC     STIRC
81B0:80 DC    818E  64              BRA     STUFFOUT
81B2:C9 21          65  STIRC       CMP     #IRSYMBOL       capture?
81B4:F0 08    81BE  66              BEQ     STIRZ           no: cancel repeater
81B6:1F 8A          67              CLB     REPEATER
81B8:2F 8A          68              SEB     REPEATER1
81BA:C9 23          69              CMP     #ONESHOT
81BC:D0 E3    81A1  70              BNE     STIR1
81BE:86 36          71  STIRZ       STX     VAR1            yes: save index
81C0:A6 25          72              LDX     DIFF            where we are in irdata
81C2:               73  *
81C2:37 8A 0481C9   74              BBC     REPEATER1,STIR1A if already 1 repeater
81C5:1F 8A          75              CLB     REPEATER        undo repeater status
81C7:80 04    81CD  76              BRA     STIR1B
81C9:0F 8A          77  STIR1A      SEB     REPEATER        else set this
81CB:2F 8A          78              SEB     REPEATER1       and this
81CD:BD 8B 7D       79  STIR1B      LDA     IRDATA,X
81D0:               80  ******************************
81D0:8D AD 7E       81              STA     PROGLEN
81D3:20 66 81       82              JSR     FOLLOWUP        adjust for 2nd part
81D6:AD AD 7E       83              LDA     PROGLEN
81D9:85 24          84              STA     DIGIT           length in proglen and digit 81DB:               85  * (x preserved now!)
81DB:               86  *
81DB:BD 8B 7D       87  STIR2       LDA     IRDATA,X
81DE:91 2B          88              STA     (ZP1),Y         transfer
81E0:EE A6 7E       89              INC     IRCOUNT
81E3:C8             90              INY
81E4:C0 FA          91              CPY     #250            too big?
81E6:90 02    81EA  92              BCC     STIRD
81E8:80 A4    818E  93              BRA     STUFFOUT
81EA:E8             94  STIRD       INX
81EB:CE AD 7E       95              DEC     PROGLEN
81EE:D0 EB    81DB  96              BNE     STIR2
81F0:               97  *
81F0:               98  * done with this ir
81F0:               99  *]
81F0:A5 25          100             LDA     DIFF
81F2:18             101             CLC
81F3:65 24          102             ADC     DIGIT           variable length!
81F5:85 25          103             STA     DIFF            update to next ir
81F7:A6 36          104             LDX     VAR1            restore
81F9:80 A6    81A1  105             BRA     STIR1
81FB:               106 *
81FB:AD A6 7E       107 STIREND     LDA     IRCOUNT
81FE:18             108             CLC
81FF:65 12          109             ADC     PROGINDEX
8201:85 12          110             STA     PROGINDEX       add ircount to length
8203:               111 *
8203:               112 * now transfer back to progbuf
8203:               113 *
8203:B1 2B          114 STIR3       LDA     (ZP1),Y         y might be 1 more than actual length: ok
8205:99 4B 7D       115             STA     PROGBUF+1,Y
8208:88             116             DEY
8209:D0 F8    8203  117             BNE     STIR3
820B:17 8A 078215   118             BBC     REPEATER,STIR4 if repeater
820E:AD 4D 7D       119             LDA     PROGBUF+3       should be 2nd byte after capture
8211:EB             120             SEB     7,A             this bit set means 1 & only 1 repeater
8212:               121 * CHECK IF ABOVE IS OK!!!
8212:8D 4D 7D       122             STA     PROGBUF+3
8215:               123 *
8215:A9 00          124 STIR4       LDA     #0              to indicate OK
8217:60             125             RTS                     that's all, folks
8218:               126 *
8218:               128 ************************************
8218:               129 *
```

```
8218:                130 * COMPUTE KEYPTR FOR CAPTURE
8218:                131 * (NO LONGER BEING USED FOR EDIT)
8218:                132 *
8218:20 C5 82        133 INSERTIR  JSR   GETIROFF    returns offset in DIFF
821B:                134 *
821B:                135 *
821B:                136 * compute location to put IR
821B:A9 8B           137 INSIR2    LDA   #>IRDATA
821D:18              138           CLC
821E:65 25           139           ADC   DIFF
8220:85 2F           140           STA   irptr
8222:A9 7D           141           LDA   #<IRDATA
8224:69 00           142           ADC   #0
8226:85 30           143           STA   irptr+1
8228:60              144           RTS
8229:                145 *
8229:                147 *
8229:                148 * WHEN GETTING PROGRAM DEFINITION IN EDIT MODE, STRIP OUT
8229:                149 * IR DEFS & PUT IN IRDATA
8229:                150 *
8229:      8229      151 STRIPIRS  EQU   *
8229:A0 00           152           LDY   #0          index to zp1 (where whole prog is )
822B:A2 00           153           LDX   #0          index to progbuf
822D:84 25           154           STY   DIFF        index to irdata
822F:                155 *
822F:CC 4A 7D        156 STRIP1    CPY   PROGBUF
8232:B0 3E   8272    157           BCS   STRIPEND    done with transfer
8234:                158 *
8234:E8              159           INX
8235:C8              160           INY               next indices (y always >=x )
8236:B1 2B           161           LDA   (ZP1),Y     move a byte
8238:9D 4A 7D        162           STA   PROGBUF,X
823B:C9 21           163           CMP   #IRSYMBOL
823D:F0 04   8243    164           BEQ   STRIP2
823F:C9 23           165           CMP   #ONESHOT
8241:D0 EC   822F    166           BNE   STRIP1
8243:                167 *
8243:                168 *
8243:98              169 STRIP2    TYA
8244:48              170           PHA               save new Y values
8245:C8              171           INY
8246:                172 *
8246:8A              173           TXA
8247:48              174           PHA               save X value
8248:                175 *
8248:A6 25           176           LDX   DIFF        index to irdata
824A:B1 2B           177           LDA   (ZP1),Y     count of # bytes transfered
824C:8D AD 7E        178           STA   PROGLEN
824F:                179 *
824F:                180 *
824F:B1 2B           181 STRIP3    LDA   (ZP1),Y     transfer IRSIZE bytes to ir data
8251:9D 8B 7D        182           STA   IRDATA,X
8254:C8              183           INY
8255:E8              184           INX
8256:CC 4A 7D        185           CPY   PROGBUF     transfer entire rest of def
8259:                186 *               (so we can use FOLLOWUP)
8259:90 F4   824F    187           BCC   STRIP3
825B:F0 F2   824F    188           BEQ   STRIP3
825D:                189 *
825D:20 66 81        190           JSR   FOLLOWUP    if extra part, add to DIFF
8260:                191 *
8260:A5 25           192           LDA   DIFF        inc DIFF by ir size
8262:18              193           CLC
8263:6D AD 7E        194           ADC   PROGLEN     size of this IR
8266:85 25           195           STA   DIFF
```

```
8268:68            196           PLA
8269:AA            197           TAX           restore X
826A:              198 *
826A:68            199           PLA
826B:18            200           CLC
826C:6D AD 7E      201           ADC  PROGLEN  update Y by length of IR
826F:A8            202           TAY           restore Y
8270:              203 *
8270:80 BD  822F   204           BRA  STRIP1
8272:              205 ***********
8272:8E 4A 7D      206 STRIPEND  STX  PROGBUF  new value of progbuf
8275:A9 7F         207           LDA  #$7F     fill remaining with spaces
8277:9D 4B 7D      208 STRIP4    STA  PROGBUF+1,X
827A:E8            209           INX
827B:E0 3F         210           CPX  #63
827D:D0 F8  8277   211           BNE  STRIP4
827F:60            212           RTS
8280:              213 *
8280:       0001   214           DS   $8281-*,$FF  to see if there's room
8281:            26               INCLUDE KEYBOARD
8281:          2 * KEYBOARD
8281:          3 *
8281:          4 ******************************************************
8281:          5 *
8281:          6 *  GETNEXT: GET INPUT FROM KEYBOARD
8281:          7 *  OR EDIT BUFFER DEPENDING ON
8281:          8 *  VALUE OF KEYINPUT
8281:          9 *
8281:      8281 10 GETNEXT   EQU  *
8281:27 32 3E82C2 11          BBS  KEYINPUT,GETKEY
8284:         12 *
8284:         13 *  GET NEXT CHAR FROM PROGBUF
8284:         14 *
8284:A4 12    15           LDY  PROGINDEX
8286:A7 34 0C8295 16        BBS  DELETEFLAG,GNXT1 if delete, don't check length!
8289:CC 4A 7D 17           CPY  PROGBUF   PAST END OF PROGRAM?
828C:90 07 8295 18         BCC  GNXT1
828E:F0 05 8295 19         BEQ  GNXT1
8290:68       20           PLA             ;YES: BYPASS 1 LEVEL
8291:68       21           PLA
8292:4C DE 9C 22          JMP  ILLEGAL.R
8295:         23 *
8295:C8       24 GNXT1     INY
8296:84 12    25           STY  PROGINDEX
8298:B9 4A 7D 26           LDA  PROGBUF,Y
829B:10 0C 82A9 27         BPL  GNXT2
829D:29 7F    28           AND  #$7F       CLR HIBIT
829F:C9 04    29           CMP  #4         IF A-/D-, CONVERT BACK TO 0/3
82A1:90 06 82A9 30         BCC  GNXT2      this should be OK for Page
82A3:C9 08    31           CMP  #8         since it should never have
82A5:B0 02 82A9 32         BCS  GNXT2      hibit set anyway
82A7:29 03    33           AND  #3
82A9:85 22    34 GNXT2     STA  KEYNUM
82AB:60       35           RTS
82AC:         36 *
82AC:         37 *
82AC:    0016 38           ds   $82c2-*,$ff
82C2:         39 *
82C2:         40 * GET KEYBOARD INPUT (WAITS FOR KEY)
82C2:         41 * RETURNS VALUE IN ACCUMULATOR (AND KEYNUM)
82C2:         42 *
82C2:         43 * ($82c2) GETKEY MUST REMAIN AT THIS ADDRESS!!
82C2:4C 70 9A 44 GETKEY    JMP  GETKEY.OUT  check kb first before waiting!
82C5:         45 *
82C5:         46 *
```

```
82C5:                   47 * COMPUTE OFFSET INTO IRDATA OF IR WE ARE CURRENTLY INSERTING
82C5:                   48 * OR DELETING. OFFSET RETURNED IN "DIFF", ALSO ACCUM.
82C5:                   49 *
82C5:3C 00 24           50 GETIROFF  LDM   #0,DIGIT        digit=# of IRs prior to current one
82C8:A2 01              51           LDX   #1
82CA:E4 12              52 GETOFF2   CPX   PROGINDEX       done w prog?
82CC:F0 02     82D0     53           BEQ   GETOFF2A        done if x>progindex
82CE:B0 10     82E0     54           BCS   GETOFF4
82D0:BD 4A 7D           55 GETOFF2A  LDA   PROGBUF,X       no:scan program for Captures
82D3:C9 23              56           CMP   #ONESHOT
82D5:F0 04     82DB     57           BEQ   GETOFFONE
82D7:C9 21              58           CMP   #IRSYMBOL
82D9:D0 02     82DD     59           BNE   GETOFF1
82DB:E6 24              60 GETOFFONE INC   DIGIT           count of ir's
82DD:E8                 61 GETOFF1   INX
82DE:80 EA     82CA     62           BRA   GETOFF2
82E0:                   63 *
82E0:                   64 * now go thru IRDATA to get offset of DIGITth IR
82E0:                   65 *
82E0:A2 00              66 GETOFF4   LDX   #0
82E2:8A                 67           TXA                   ;in case of zero progindex
82E3:86 25              68           STX   DIFF            start with zero offset
82E5:A0 FF              69           LDY   #$FF
82E7:C8                 70 GETOFF3   INY
82E8:C4 24              71           CPY   DIGIT
82EA:F0 14     8300     72           BEQ   GETOFFIT
82EC:BD 8B 7D           73           LDA   IRDATA,X        length byte
82EF:8D AD 7E           74           STA   PROGLEN
82F2:20 66 81           75           JSR   FOLLOWUP        adjust for possible 2nd part
82F5:AD AD 7E           76           LDA   PROGLEN
82F8:18                 77           CLC
82F9:65 25              78           ADC   DIFF            adjust offset
82FB:85 25              79           STA   DIFF
82FD:AA                 80           TAX                   update x!
82FE:80 E7     82E7     81           BRA   GETOFF3
8300:60                 82 GETOFFIT  RTS
8301:                   83 *
8301:                   84 *
8301:                   85 *
8301:                   87 * This routine checks the keydef & alarm structures to see if everything
8301:                   88 * is kosher. If not, 6-blatts & disable Enableflag.
8301:                   89 *
8301:          8301     90 crashtest equ   *
8301:AD 06 7D           91           lda   keydefs
8304:85 2B              92           sta   zp1
8306:AD 07 7D           93           lda   keydefs+1
8309:85 2C              94           sta   zp1+1
830B:A0 01              95           ldy   #1
830D:B1 2B              96 ct0       lda   (zp1),y
830F:D0 31     8342     97           bne   crash
8311:88                 98           dey
8312:10 F9     830D     99           bpl   ct0
8314:                  100 *
8314:AD 00 7D          101           lda   alarmq
8317:85 2B             102           sta   zp1
8319:AD 01 7D          103           lda   alarmq+1
831C:85 2C             104           sta   zp1+1
831E:A0 09             105           ldy   #9
8320:B1 2B             106 ct1       lda   (zp1),y
8322:D0 1E     8342    107           bne   crash
8324:88                108           dey
8325:10 F9     8320    109           bpl   ct1
8327:                  110 *
8327:AD 04 7D          111           lda   endq
832A:38                112           sec
```

```
832B:E9 09          113          sbc     #9
832D:85 2B          114          sta     zp1
832F:AD 05 7D       115          lda     endq+1
8332:E9 00          116          sbc     #0
8334:85 2C          117          sta     zp1+1
8336:A0 09          118          ldy     #9
8338:B1 2B          119 ct2      lda     (zp1),y
833A:C9 FF          120          cmp     #$ff
833C:D0 04  8342    121          bne     crash
833E:88             122          dey
833F:10 F7  8338    123          bpl     ct2
8341:60             124          rts
8342:               125 *
8342:FF 8A          126 crash    clb     enableflag
8344:20 7D 94       127          jsr     blatt2
8347:20 7D 94       128          jsr     blatt2
834A:20 7D 94       129          jsr     blatt2
834D:60             130          rts
834E:               131 *
834E:       0002    132          ds      $8350-*,$ff
8350:               133 * page
8350:               134 *
8350:       8350    135 EDITCODES EQU    *
8350:13             136          DFB     $13          AM
8351:46             137          DFB     $46          PM
8352:55             138          DFB     $55          2ND
8353:               139 *DFB $9C RPT may have to change this later
8353:97             140          DFB     $97          PAGE (P: FORMERLY PM)
8354:DE             141          DFB     $DE          A
8355:4F             142          DFB     $4F          B
8356:0E             143          DFB     $0E          C
8357:5E             144          DFB     $5E          D
8358:50             145          DFB     $50          1
8359:9E             146          DFB     $9E          2
835A:DA             147          DFB     $DA          3
835B:53             148          DFB     $53          4
835C:CB             149          DFB     $CB          5
835D:CF             150          DFB     $CF          6
835E:D0             151          DFB     $D0          7
835F:DF             152          DFB     $DF          8
8360:DB             153          DFB     $DB          9
8361:DD             154          DFB     $DD          0
8362:8F             155          DFB     $8F          E
8363:87             156          DFB     $87          F
8364:8A             157          DFB     $8A          SET
8365:F7             158          DFB     $F7          AT
8366:B1             159          DFB     $B1          EDIT
8367:00             160          DFB     0            CANCEL
8368:90             161          DFB     $90          SCRLEFT (ENDLOOP)
8369:72             162          DFB     $72          WAIT (PLUS)
836A:00             163          DFB     0            DELETE
836B:81             164          DFB     $81          SCRRIGHT (BEGINLOOP)
836C:00             165          DFB     $00          ENABLE
836D:4E             166          DFB     $4E          KEY
836E:0D             167          DFB     $0D          DO
836F:58             168          DFB     $58          OK
8370:               169 *
8370:               170 * PUT A SINGLE CHAR TO DISPLAY
8370:               171 * INPUT: SCRNPOS, EDCODE
8370:               172 *
8370:9C             173 PUTONE   DFB     $9c          $20:RPT (alarm)
8371:8D             174          DFB     $8D          $21:IRSYMBOL
8372:47             175          DFB     $47          $22:h (as in +h)
8373:D8             176          DFB     $D8          $23:oneshot
8374:00             177          DFB     00           $24:??
8375:               178 *
8375:               179 * ABOVE ARE EXTRA BYTES FOR EDITCODES
8375:               180 * PUTONE.PATCH JUMPS BACK TO HERE
8375:               181 *
8375:               182 *PUTONE LDA SCRNPOS
8375:               183 * ASL A
```

```
8375:                184 *JSR    \CLRINT
8375:22 0E           185 PUTONE0  JSR   \PEEK256        GET ADDRESS OF DISPLAY
8377:                186 *
8377:22 92           187 PUTONE1  JSR   \CLRINT
8379:A5 39           188          LDA   EDCODE          ENTRY IF ALREADY HAVE ADDRESS
837B:22 1C           189          JSR   \POKE16
837D:82 39           190          RRF   EDCODE
837F:A5 39           191          LDA   EDCODE
8381:B7 33 028386    192          BBC   DASHFLAG,PUTONE2
8384:09 02           193          ORA   #2              SET DASH
8386:22 1C           194 PUTONE2  JSR   \POKE16
8388:22 97           195          JSR   \ENBINT
838A:60              196          RTS
838B:                197 *
838B:                198 *
838B:                199 * VALUES TO DISPLAY TIME
838B:                200 *
838B:5F              201 TIMEVALS DFB   $5F             0
838C:06              202          DFB   $06             1
838D:3D              203          DFB   $3D             2
838E:2F              204          DFB   $2F             3
838F:66              205          DFB   $66             4
8390:6B              206          DFB   $6B             5
8391:7B              207          DFB   $7B             6
8392:0E              208          DFB   $0E             7
8393:7F              209          DFB   $7F             8
8394:6F              210          DFB   $6F             9
8395:3F              211          DFB   $3F             A
8396:73              212          DFB   $73             B
8397:31              213          DFB   $31             C
8398:37              214          DFB   $37             D
8399:79              215          DFB   $79             E
839A:78              216          DFB   $78             F
839B:00              217          DFB   00              blank (used in dispmk)
839C:                218 *
839C:                219 * ADDRESSES OF ROUTINES CORRESPONDING TO FLASHIND
839C:                220 *
839C:BF 8C           221 FLASHJSR DW    BELLFLASH
839E:F1 83           222          DW    TARGFLASH       mode/key in edit
83A0:CB 8C           223          DW    ATFLASH
83A2:B3 8C           224          DW    EDITFLASH
83A4:10 81           225          DW    FLASH2ND
83A6:B9 8C           226          DW    STEPFLASH       single step: right arrow
83A8:C9 83           227          DW    CURSORFLASH     program line cursor
83AA:                228 *DW 0 currently unused
83AA:                229 *
83AA:                231 *
83AA:                232 * THESE ROUTINES TOGGLE  THE SEGMENTS AT, EDIT AND BELL, ALL OF
83AA:                233 * WHICH ARE REPRESENTED BY BITS IN LOCATION $1C IN 4-BITTER.
83AA:                234 * "FLASHBYTE" CONTAINS THE CURRENT VALUE OF $1C.
83AA:                235 *
83AA:                236 * these routines are now in newcode because of display changes
83AA:                237 *
83AA:                238 * TOGGLE "EDIT"
83AA:                239 *
83AA:A5 3C           240 XDITFLASH LDA  FLASHBYTE
83AC:49 08           241          EOR   #8
83AE:B0 0A   83BA    242          BRA   PREFLASH
83B0:                243 *
83B0:                244 * TOGGLE "AT"
83B0:                245 *
83B0:A5 3C           246 XTFLASH  LDA   FLASHBYTE
83B2:49 04           247          EOR   #4
83B4:80 04   83BA    248          BRA   PREFLASH
83B6:                249 *
83B6:                250 * TOGGLE "BELL"
83B6:                251 *
83B6:A5 3C           252 XELLFLASH LDA  FLASHBYTE
```

```
83B8:49 01        253          EOR    #1
83BA:             254 *
83BA:85 3C        255 PREFLASH STA    FLASHBYTE
83BC:             256 *
83BC:             257 **************************
83BC:             258 * THIS ROUTINE MUST BE PRESERVED
83BC:             259 * the following FLASH1C has been totally replaced; # of bytes preserved
83BC:20 D1 8C     260 FLASHBOTH JSR   FLASH1C       3 bytes
83BF:4C C5 8C     261           JMP   FLASH1D       3 bytes
83C2:             262 * dangling:
83C2:22 92        263           JSR   \CLRINT
83C4:22 1C        264           JSR   \POKE16
83C6:22 97        265           JSR   \ENBINT
83C8:60           266           RTS
83C9:             267 *
83C9:             268 ******************************************************
83C9:             269 *
83C9:             270 * FLASH THE CURSOR AT THE CURRENT DISPLAY POSITION(S).
83C9:             271 * CURSORON MEANS THE DASH IS DISPLAYED, OFF MEANS CHAR OR BLANK.
83C9:             272 *
83C9:             273 * DISPVAL = 2 NYBBLES
83C9:             274 * XREG = CURSORVAL; YREG = CURSORVAL+1
83C9:A5 14        275 CURSORFLASH LDA CURRPOS      get start addr of display segment
83CB:0A           276           ASL
83CC:8D A4 7E     277           STA   CURSORADDR
83CF:             278 *
83CF:             279 *
83CF:C7 3B 0883DA 280           BBS   CURSORBIT,FLASHON,CURSOROFF
83D2:             281 *
83D2:CF 3B        282 CURSORON  SEB   CURSORBIT,FLASHON
83D4:A2 02        283           LDX   #2            cursor lo
83D6:A0 00        284           LDY   #0            cursor hi
83D8:80 06  83E0  285           BRA   DOCURSOR
83DA:             286 *
83DA:DF 3B        287 CURSOROFF CLB   CURSORBIT,FLASHON
83DC:A6 27        288 CURSOFF1  LDX   DISPVAL
83DE:A4 28        289           LDY   DISPVAL+1
83E0:             290 *
83E0:             291 * DISPLAY 1 CHAR
83E0:AD A4 7E     292 DOCURSOR  LDA   CURSORADDR
83E3:22 92        293           JSR   \CLRINT
83E5:22 0E        294           JSR   \PEEK256      peek8???
83E7:8A           295           TXA
83E8:22 1C        296           JSR   \POKE16
83EA:98           297           TYA
83EB:22 1C        298           JSR   \POKE16
83ED:22 97        299           JSR   \ENBINT
83EF:60           300           RTS
83F0:             301 *
83F0:60           302 TIMEFLASH RTS                 DUMMY
83F1:             303 *
83F1:             304 *
83F1:             305 *
83F1:             306 * FLASH CURSOR AT MODE/KEY FOR EDIT
83F1:             307 * (cursoraddr set separately in edit)
83F1:             308 *
83F1:27 3B 0883FC 309 TARGFLASH BBS  TARGBIT,FLASHON,TARGOFF
83F4:2F 3B        310 TARGON    SEB  TARGBIT,FLASHON
83F6:A2 00        311           LDX  #0
83F8:A0 02        312           LDY  #2
83FA:80 E4  83E0  313           BRA  DOCURSOR
83FC:3F 3B        314 TARGOFF   CLB  TARGBIT,FLASHON
83FE:80 DC  83DC  315           BRA  CURSOFF1
8400:             316 *
8400:             27            INCLUDE DEFS
8400:              2 * DEFS
8400:              3 *
8400:20 2C 85      4 WRITEDEF.PATCH JSR UPDATE.END
```

```
8403:20 0B 85          5              JSR     ENDDEFSZP1
8406:58                6              CLI
8407:60                7              RTS
8408:                  8  *
8408:         0034     9              DS      $843C-*,$FF
843C:                 10  *
843C:                 11  * STOREPROG: STORE PROGRAM IN KEYDEFS ARRAY
843C:                 12  *
843C:A2 02            13  STOREPROG LDX   #2
843E:B5 10            14  STPR1     LDA   CURRMODE,X    mode,key,progindex
8440:9D 48 7D         15            STA   NEWDEF,X
8443:CA               16            DEX
8444:10 F8    843E    17            BPL   STPR1
8446:CE 4A 7D         18            DEC   NEWDEF+2
8449:                 19  *
8449:                 20  *
8449:                 21  * INSERT DEF: PUT DEFINITION FOR CURRMODE, CURRKEY
8449:                 22  * IN KEYDEFS ARRAY AT PROPER PLACE.  REPLACE
8449:                 23  * OLD ONE IF NECESSARY.
8449:                 24  *
8449:A9 03            25  INSERTDEF LDA   #3
844B:18               26            CLC
844C:6D 4A 7D         27            ADC   NEWDEF+2
844F:85 24            28            STA   MAXDEF
8451:A9 00            29            LDA   #0
8453:85 25            30            STA   FROM
8455:85 26            31            STA   TO            initialize movement paramet
ers
8457:                 32  *
8457:                 33  * DEFINITION EXISTS?
8457:                 34  *
8457:20 9A 84         35            JSR   GETDEFAD      returns defptr=start of def
845A:D0 1D    8479    36            BNE   NOTTHERE      zflag set if present
845C:                 37  *
845C:                 38  *
845C:                 39  * DEF PRESENT: SEE IF NEW LENGTH IS >,= OR < OLD LENGTH
845C:                 40  *
845C:         845C    41  ITSTHERE EQU    *
845C:AD 4A 7D         42            LDA   NEWDEF+2      NEWLENGTH
845F:38               43            SEC
8460:A0 02            44            LDY   #2
8462:F1 29            45            SBC   (DEFPTR),Y    OLD LENGTH
8464:                 46  *
8464:F0 21    8487    47            BEQ   WRITEDEF
8466:B0 13    847B    48            BCS   DEFDOWN
8468:                 49  *
8468:                 50  * DIFF MINUS:
8468:                 51  * MOVE BOTTOM BLOCK UP
8468:49 FF            52            EOR   #$FF          get 2's complement
846A:3A               53            INC   A
846B:                 54  *
846B:85 25            55            STA   FROM
846D:                 56  *
846D:20 00 85         57            JSR   ZP1ENDDEFS
8470:20 41 85         58            JSR   CALCMBYTES    # bytes to move
8473:                 59  *
8473:                 60  *
8473:                 61  * START WITH TOP ELEMENT
8473:                 62  * MOVE UP BY "FROM" BYTES
8473:                 63  *
8473:78               64            SEI                 protect from batt removal
8474:20 C7 84         65            JSR   MOVEUP
8477:80 0E    8487    66            BRA   WRITEDEF
8479:                 67  *
8479:                 69  *
8479:A5 24            70  NOTTHERE LDA    MAXDEF
847B:                 71  *
847B:                 72  * MOVE BOTTOM
847B:                 73  * BLOCK DOWN TO MAKE ROOM
847B:                 74  *
```

```
847B:85 26        75 DEFDOWN    STA   TO
847D:4C DD 94     76            JMP   DEFDOWN.PATCH check for a page
8480:20 41 85     77 DEFDOWN2   JSR   CALCMBYTES   (doesn't affect zp1)
8483:78           78            SEI
8484:20 D3 84     79            JSR   MOVEDOWN
8487:             80 *
8487:             81 *
8487:             82 * WRITE NEW DEFINITION
8487:             83 *
8487:A0 00        84 WRITEDEF   LDY   #0              * change this?
8489:B9 48 7D     85 WRD1       LDA   NEWDEF,Y
848C:91 29        86            STA   (DEFPTR),Y
848E:C8           87            INY
848F:C4 24        88            CPY   MAXDEF
8491:90 F6   8489 89            BCC   WRD1
8493:             90 *
8493:20 00 85     91            JSR   ZP1ENDDEFS    recompute endq
8496:4C 00 84     92            JMP   WRITEDEF.PATCH
8499:      0001   93            DS    $849A-*,$FF
849A:             94 *
849A:             96 *
849A:             97 * SEARCH KEYDEF ARRAY TO FIND
849A:             98 * START ADDRESS OF KEYDEF WITH
849A:             99 * MATCHING CURRMODE, CURRKEY.
849A:            100 *
849A:            101 * RETURNS ZFLAG SET IF DEF
849A:            102 *  ALREADY EXISTS; DEFPTR POINTS
849A:            103 *  TO ADDR OF EXISTING DEF--
849A:            104 *  ZFLAG CLEAR IF DEF DOESN'T
849A:            105 *  EXIST; DEFPTR POINTS TO ADDR
849A:            106 *  OF FOLLOWING DEF.
849A:            107 *
849A:            108 *
849A:            109 *
849A:AD 06 7D    110 GETDEFAD   LDA   KEYDEFS
849D:85 29       111            STA   DEFPTR
849F:AD 07 7D    112            LDA   KEYDEFS+1
84A2:85 2A       113            STA   DEFPTR+1
84A4:            114 *
84A4:A0 00       115 GETDEF1    LDY   #0            compare modes
84A6:A5 10       116            LDA   CURRMODE
84A8:D1 29       117            CMP   (DEFPTR),Y
84AA:90 1A  84C6 118            BCC   GOTDEFAD      if less, it's not there (zflag clr)
84AC:D0 07  84B5 119            BNE   GETDEF2       if greater, try next
84AE:C8          120            INY                 equal; try key
84AF:B1 29       121            LDA   (DEFPTR),Y
84B1:C5 11       122            CMP   CURRKEY
84B3:B0 11  84C6 123            BCS   GOTDEFAD      key= table or >table: return
84B5:            124 *
84B5:            125 *
84B5:A0 02       126 GETDEF2    LDY   #2            <: try next
84B7:B1 29       127            LDA   (DEFPTR),Y
84B9:18          128            CLC
84BA:69 03       129            ADC   #3
84BC:65 29       130            ADC   DEFPTR        adjust defptr
84BE:85 29       131            STA   DEFPTR
84C0:90 E2  84A4 132            BCC   GETDEF1
84C2:E6 2A       133            INC   DEFPTR+1
84C4:80 DE  84A4 134            BRA   GETDEF1
84C6:            135 *
84C6:60          136 GOTDEFAD   RTS                 return
84C7:            137 *
84C7:            139 *
84C7:A9 00       140 MOVEUP     LDA   #0            (INCR=0001)
84C9:85 38       141            STA   INCR+1
84CB:3A          142            INC   A
84CC:85 37       143            STA   INCR
84CE:20 AE FA    144            JSR   ZP1DEFPTR
84D1:80 06  84D9 145            BRA   MOVEIT
```

```
84D3:              146 *
84D3:A9 FF         147 MOVEDOWN  LDA   #$FF           (INCR=FFFF)
84D5:85 37         148            STA   INCR
84D7:85 38         149            STA   INCR+1
84D9:              150 * (falls thru)
84D9:              151 *
84D9:              153 *
84D9:              154 *
84D9:              155 * THIS ROUTINE DOES A BLOCK MOVE UPWARD OR
84D9:              156 * DOWNWARD IN KEYDEFS OR ALARM QUEUE.
84D9:              157 * INPUTS: ZP1 POINTS TO ELEMENT TO BE MOVED
84D9:              158 * (ZP1 INITIALIZED TO CURRENT BOTTOM ELEMENT FOR
84D9:              159 * DOWN MOVE; TOP ELEMENT FOR UP MOVE)
84D9:              160 *
84D9:              161 * FROM set if movement is up; TO if movement down
84D9:              162 * INCR (DS2) = FFFF if down; 0001 if up
84D9:              163 *
84D9:A4 25         164 MOVEIT    LDY   FROM
84DB:B1 2B         165            LDA   (ZP1),Y
84DD:A4 26         166            LDY   TO
84DF:91 2B         167            STA   (ZP1),Y
84E1:              168 *
84E1:              169 * DECREMENT OR INCREMENT ZP1
84E1:              170 *
84E1:A5 2B         171            LDA   ZP1
84E3:18            172            CLC
84E4:65 37         173            ADC   INCR
84E6:85 2B         174            STA   ZP1
84E8:A5 2C         175            LDA   ZP1+1
84EA:65 38         176            ADC   INCR+1
84EC:85 2C         177            STA   ZP1+1
84EE:              178 *
84EE:              179 *
84EE:              180 * HAVE WE DONE ALL (MOVEBYTES)?
84EE:              181 *
84EE:              182 *
84EE:AD 93 7E      183            LDA   MOVEBYTES
84F1:D0 03  84F6   184            BNE   MVD3
84F3:CE 94 7E      185            DEC   MOVEBYTES+1
84F6:CE 93 7E      186 MVD3       DEC   MOVEBYTES
84F9:D0 DE  84D9   187            BNE   MOVEIT
84FB:              188 *LDA MOVEBYTES+1
84FB:              189 *BNE MOVEIT
84FB:              190 * above replaced by patch (no RTS!)
84FB:4C AF 95      191            JMP   DEF.PATCH
84FE:EA            192            NOP
84FF:EA            193            NOP
8500:              194 *
8500:              195 *
8500:              196 *
8500:              197 * NOTE: WE MUST DO OUT-OF-MEMORY
8500:              198 * CHECKING WHEN ADDING DEFS &
8500:              199 * RUNNING STACK
8500:              200 *
8500:              202 *
8500:       8500   203 ZP1ENDDEFS EQU  *
8500:AD 08 7D      204            LDA   ENDDEFS
8503:85 2B         205            STA   ZP1
8505:AD 09 7D      206            LDA   ENDDEFS+1
8508:85 2C         207            STA   ZP1+1
850A:60            208            RTS
850B:              209 *
850B:A5 2B         210 ENDDEFSZP1 LDA  ZP1
850D:8D 08 7D      211            STA   ENDDEFS
8510:A5 2C         212            LDA   ZP1+1
8512:8D 09 7D      213            STA   ENDDEFS+1
8515:60            214            RTS
8516:              215 *
8516:AD 04 7D      216 ZP1ENDQ   LDA   ENDQ
8519:85 2B         217            STA   ZP1
851B:AD 05 7D      218            LDA   ENDQ+1
```

```
851E:85 2C          219             STA     ZP1+1
8520:60             220             RTS
8521:               221 *
8521:A5 2B          222 ENDQZP1     LDA     ZP1
8523:8D 04 7D       223             STA     ENDQ
8526:A5 2C          224             LDA     ZP1+1
8528:8D 05 7D       225             STA     ENDQ+1
852B:60             226             RTS
852C:               227 *
852C:               228 *
852C:               229 * recompute endq or enddefs, which has been transfered
852C:               230 * to zp1 before calling this routine
852C:               231 *
852C:A5 2B          232 UPDATE.END LDA ZP1
852E:38             233             SEC
852F:E5 25          234             SBC     FROM
8531:AA             235             TAX
8532:B0 02   8536   236             BCS     WRD8
8534:C6 2C          237             DEC     ZP1+1
8536:8A             238 WRD8        TXA
8537:18             239             CLC
8538:65 26          240             ADC     TO
853A:90 02   853E   241             BCC     WRD9
853C:E6 2C          242             INC     ZP1+1
853E:85 2B          243 WRD9        STA     ZP1
8540:60             244             RTS
8541:               245 *
8541:               246 *
8541:               247 * calculate movebytes (ds2)= ZP1 - defptr - from + 1
8541:               248 * where zp1 has been set to either enddefs or endq
8541:A5 2B          249 CALCMBYTES LDA ZP1         ZP1 - defptr
8543:38             250             SEC
8544:E5 29          251             SBC     DEFPTR
8546:AA             252             TAX                 lobyte
8547:A5 2C          253             LDA     ZP1+1
8549:E5 2A          254             SBC     DEFPTR+1
854B:A8             255             TAY                 hibyte
854C:8A             256             TXA
854D:3A             257             INC     A           add 1
854E:D0 01   8551   258             BNE     CMB1
8550:C8             259             INY                 hibyte
8551:38             260 CMB1        SEC                 now subtract from
8552:E5 25          261             SBC     FROM
8554:8D 93 7E       262             STA     MOVEBYTES
8557:B0 01   855A   263             BCS     MVT1
8559:88             264             DEY
855A:8C 94 7E       265 MVT1        STY     MOVEBYTES+1
855D:60             266             RTS
855E:               267 *
855E:               28              INCLUDE EDIT
855E:                2 *   EDIT
855E:                3 *
855E:20 8D F8        4 EDIT         JSR     CLRDISP
8561:22 77           5              JSR     \SAVEMK     ;INITIALIZATIONS
8563:A9 16           6              LDA     #EDITKEY    DISPLAY "EDIT"
8565:20 01 F8        7              JSR     PUTDISP
8568:9F 32           8              CLB     GOTMODE
856A:                9 *
856A:               10 * GET NEXT KEY: SEE IF ALARM OR KEYDEF
856A:22 56          11              JSR     \KEYCANCEL
856C:F0 2A   8598   12              BEQ     GTOUT
856E:               13 *
856E:C9 15          14 EDIT1        CMP     #ATKEY
8570:D0 06   8578   15              BNE     GETTARGET
8572:4C D9 88       16              JMP     REVIEW      GOTO ALARM QUEUE REVIEW
8575:               17 *
8575:               19 *
8575:               20 **** KEY DEF EDITING ***
8575:               21 *
8575:               22 *
8575:20 C2 82       23 EDIT1A       JSR     GETKEY
```

```
8578:C9 17         24 GETTARGET CMP   #CANCEL
857A:F0 1C   8598  25           BEQ   GTOUT
857C:              26 *
857C:C9 03         27           CMP   #PAGEKEY
857E:F0 0E   858E  28           BEQ   GT0
8580:C9 1D         29           CMP   #KEYKEY
8582:F0 2E   85B2  30           BEQ   GT7
8584:20 69 92      31           JSR   CHECKPAGE    0-F OR A-/C-
8587:D0 3C   85C5  32           BNE   GT3
8589:20 D0 9C      33 GT5       JSR   BLATT        illegal key
858C:80 E7   8575  34           BRA   EDIT1A
858E:              35 *
858E:              36 *
858E:87 32 F88589  37 GT0       BBS   GOTMODE,GT5  "MODE"
8591:20 01 F8      38           JSR   PUTDISP
8594:              39 *
8594:22 56         40 GT1       JSR   \KEYCANCEL   ;GET KEY AFTER "MODE"
8596:              41 *
8596:D0 03   859B  42           BNE   GT1A
8598:4C 02 87      43 GTOUT     JMP   EDITOUT
859B:20 69 92      44 GT1A      JSR   CHECKPAGE
859E:D0 05   85A5  45           BNE   GT2
85A0:              46 *ILLEGAL MODE:
85A0:20 D0 9C      47           JSR   BLATT
85A3:80 EF   8594  48           BRA   GT1          TRY AGAIN
85A5:48            49 GT2       PHA
85A6:22 5C         50           JSR   \CONVMODE    LEGAL MODE
85A8:              51 *
85A8:68            52           PLA
85A9:AF 33         53           SEB   DASHFLAG
85AB:20 01 F8      54           JSR   PUTDISP
85AE:8F 32         55           SEB   GOTMODE
85B0:80 C3   8575  56           BRA   EDIT1A       GET NEXT KEY
85B2:              57 *
85B2:              58 *
85B2:              59 *
85B2:20 01 F8      60 GT7       JSR   PUTDISP      "KEY"
85B5:              61 *
85B5:22 56         62 GT8       JSR   \KEYCANCEL   NEXT KEY
85B7:              63 *
85B7:F0 DF   8598  64           BEQ   GTOUT
85B9:              65 *
85B9:              66 *
85B9:20 69 92      67           JSR   CHECKPAGE    0-F?
85BC:E0 01         68           CPX   #1
85BE:F0 09   85C9  69           BEQ   GT9
85C0:20 D0 9C      70           JSR   BLATT
85C3:80 F0   85B5  71           BRA   GT8
85C5:              72 *
85C5:              73 *
85C5:              74 *
85C5:E0 02         75 GT3       CPX   #2           0-F OR A-/D-
85C7:F0 04   85CD  76           BEQ   GT4
85C9:              77 * 0-F: KEY
85C9:22 62         78 GT9       JSR   \CONVKEY
85CB:80 05   85D2  79           BRA   EDITDEF
85CD:              80 *
85CD:              81 *
85CD:22 5C         82 GT4       JSR   \CONVMODE    A- TO D-
85CF:3C FF 11      83           LDM   #$FF,CURRKEY
85D2:              84 *
85D2:              86 *
85D2:              87 * DISPLAY TARGET & GET KEY DEFINITION
85D2:              88 *
85D2:4C 32 9C      89 EDITDEF   JMP   EDIT.PATCH   program buffer w spaces
85D5:              90 *         & get zp1 to put program
85D5:              91 *         Returns to below
85D5:              92 *
85D5:A0 02         93 EDD1      LDY   #2           def present
85D7:B1 29         94           LDA   (DEFPTR),Y
85D9:8D 4A 7D      95           STA   PROGBUF      length
```

```
85DC:18            96              CLC
85DD:69 03         97              ADC    #3
85DF:8D AD 7E      98              STA    PROGLEN      length of entire def
85E2:B1 29         99 EDD2         LDA    (DEFPTR),Y
85E4:88           100              dey
85E5:88           101              dey                 because defptr starts with page/key
85E6:91 2B        102              STA    (ZP1),Y
85E8:C8           103              INY
85E9:C8           104              iny
85EA:C8           105              iny
85EB:CC AD 7E     106              CPY    PROGLEN      length
85EE:D0 F2   85E2 107              BNE    EDD2
85F0:             108 * strip out irs
85F0:20 29 82     109              JSR    STRIPIRS
85F3:             110 *
85F3:             111 * PUT 1ST 8 CHARS IN DISPLAY
85F3:20 99 F7     112 PUT8CHARS    JSR    DISPTARGET
85F6:9C 00 14     113              LDM    #0,CURRPOS
85F9:A0 01        114              LDY    #1
85FB:             115 * note: yreg will stand for progindex throughout edit routines
85FB:             116 * therefore we must restore it:
85FB:             117 *
85FB:84 12        118 SHOW8        STY    PROGINDEX
85FD:             119 *
85FD:20 F0 8C     120              JSR    FILL.ARROWS  fill up display
8600:CF 3A        121              SEB    CURSORBIT,FLASHACT activate flashing
8602:6F 3C        122 EDDENBL      SEB    EDITBIT,BYTE1D try this here
8604:20 C5 8C     123              JSR    FLASH1D      illuminate edit (solid)
8607:F7 8A 02860C 124              BBC    ENABLEFLAG,EDDKEY
860A:6F 3A        125              SEB    EDITBIT,FLASHACT Edit flashing if Enabled 860C:             126 *
860C:20 07 87     127 EDDKEY       JSR    EDITORCANCEL get key input
860F:             128 * if we return, it's not edit or cancel
860F:A4 12        129              LDY    PROGINDEX    restore
8611:C9 18        130              CMP    #SCRLEFT
8613:F0 55   866A 131              BEQ    EDD4         <--
8615:C9 1B        132              CMP    #SCRRIGHT
8617:F0 42   865B 133              BEQ    EDD3         -->
8619:C9 1A        134              CMP    #DELETE
861B:F0 66   8683 135              BEQ    EDD5         delete
861D:C9 1C        136              CMP    #ENABLEKEY   if enable pressed,
861F:D0 05   8626 137              BNE    EDD7         set flag & allow editing
8621:20 AF 9B     138              JSR    EDITENABLE
8624:80 DC   8602 139              BRA    EDDENBL
8626:             140 *
8626:             141 *
8626:             143 *
8626:        8626 144 EDD7         EQU    *            INSERT KEY
8626:E7 8A 03862C 145              BBS    ENABLEFLAG,INSERTKEY
8629:4C BC 9B     146              JMP    IRCHANGES
862C:48           147 INSERTKEY    PHA                 ;STORE VALUE
862D:             148 *
862D:AE 4A 7D     149              LDX    PROGBUF
8630:E0 3F        150              CPX    #63
8632:90 05   8639 151              BCC    EDD7A        prog too long?
8634:20 7D 94     152              JSR    BLATT2
8637:80 D3   860C 153              BRA    EDDKEY
8639:E4 12        154 EDD7A        CPX    PROGINDEX
863B:90 09   8646 155              BCC    EDD7B
863D:BD 4A 7D     156              LDA    PROGBUF,X    SHIFT REMAINDER UP
8640:9D 4B 7D     157              STA    PROGBUF+1,X
8643:CA           158              DEX
8644:80 F3   8639 159              BRA    EDD7A
8646:             160 *
8646:             161 *
8646:68           162 EDD7B        PLA
8647:E8           163              INX                 at this pt x=progindex-1 so inc it
```

```
8648:                   164 * CONVERT 0-2 (DIRECT MODE) TO $84-86
8648:C9 03              165         CMP     #3
864A:B0 02    864E      166         BCS     EDD7C
864C:09 84              167         ORA     #$84
864E:                   168 *
864E:9D 4A 7D           169 EDD7C   STA     PROGBUF,X    NEW CHAR
8651:EE 4A 7D           170         INC     PROGBUF
8654:80 0C    8662      171         BRA     EDD3Z
8656:                   172 *
8656:                   173 *
8656:20 D0 9C           174 EDITBLATT JSR   BLATT        for errors
8659:80 B1    860C      175         BRA     EDDKEY
865B:                   176 *
865B:                   177 *
865B:                   179 *
865B:CC 4A 7D           180 EDD3    CPY     PROGBUF      right arrow
865E:90 02    8662      181         BCC     EDD3Z        IF AT END OF PROG, DON'T MOVE
8660:D0 F4    8656      182         BNE     EDITBLATT
8662:                   183 *
8662:20 59 9C           184 EDD3Z   JSR     CLRNUMIRS
8665:C8                 185         INY                  inc progindex
8666:E6 14              186 EDD3X   INC     CURRPOS
8668:80 91    85FB      187 EDD3A   BRA     SHOW8
866A:                   188 *
866A:20 59 9C           189 EDD4    JSR     CLRNUMIRS
866D:88                 190         DEY                  left arrow
866E:D0 06    8676      191         BNE     EDD4A
8670:F7 8A E38656       192         BBC     ENABLEFLAG,EDITBLATT no target editing if disabled
8673:4C 10 87           193         JMP     EDITTARGET
8676:C6 14              194 EDD4A   DEC     CURRPOS
8678:30 EC    8666      195         BMI     EDD3X        don't go negative
867A:D0 04    8680      196         BNE     EDDQ
867C:                   197 *
867C:                   198 * CURRPOS = 0: IF PROGINDEX >1 SCROLL IN ANOTHER CHAR
867C:C0 02              199         CPY     #2
867E:B0 E6    8666      200         BCS     EDD3X
8680:4C FB 85           201 EDDQ    JMP     SHOW8
8683:                   202 *
8683:                   203 *
8683:F7 8A D08656       204 EDD5    BBC     ENABLEFLAG,EDITBLATT
8686:AD 4A 7D           205         LDA     PROGBUF      delete
8689:F0 CB    8656      206         BEQ     EDITBLATT    LENGTH=0
868B:A5 14              207         LDA     CURRPOS
868D:F0 C7    8656      208         BEQ     EDITBLATT
868F:C6 14              209 EDD5D   DEC     CURRPOS      entry to delete ir after timeout
8691:                   210 *
8691:                   211 * SHIFT HIGHER ONES DOWN
8691:A6 12              212 EDD5B   LDX     PROGINDEX
8693:BD 49 7D           213         LDA     PROGBUF-1,X  are we deleting ir?
8696:C9 21              214         CMP     #IRSYMBOL
8698:D0 07    86A1      215         BNE     EDD5A
869A:20 36 92           216         JSR     DELETEIR     removes from irdata (can be inline)
869D:                   217 * [MAKE SURE THIS WORKS!]
869D:A6 12              218         LDX     PROGINDEX    restore x
869F:A4 12              219         LDY     PROGINDEX    & y
86A1:                   220 *
86A1:BD 4A 7D           221 EDD5A   LDA     PROGBUF,X    delete char BEFORE cursor
86A4:9D 49 7D           222         STA     PROGBUF-1,X
86A7:E8                 223         INX
86A8:EC 4A 7D           224         CPX     PROGBUF
86AB:90 F4    86A1      225         BCC     EDD5A
86AD:F0 F2    86A1      226         BEQ     EDD5A
86AF:CE 4A 7D           227         DEC     PROGBUF
86B2:A9 7F              228         LDA     #$7F
86B4:9D 49 7D           229         STA     PROGBUF-1,X
86B7:88                 230         DEY                  progindex
86B8:80 AE    8668      231         BRA     EDD3A        to show8
```

```
86BA:                    232 *
86BA:                    233 * "edit" key:
86BA:F7 8A 458702        234 EDFIN      BBC    ENABLEFLAG,EDITOUT
86BD:AE 98 7E            235            LDX    MAINSTAK       in case we got here via JSR
86C0:9A                  236            TXS
86C1:20 76 9B            237            JSR    TESTTARGET
86C4:30 79    873F       238            BMI    EDK5           in case no good target
86C6:                    239 *
86C6:AE 4A 7D            240            LDX    PROGBUF
86C9:E8                  241            INX
86CA:A9 1F               242            LDA    #OKKEY
86CC:9D 4A 7D            243            STA    PROGBUF,X      PUT FINAL OK
86CF:20 B9 87            244            JSR    SYNTAXCHECK
86D2:                    245 *
86D2:                    246 * ON RETURNING FROM "LEARN", ZFLAG CLEAR IF SYNTAX OK
86D2:                    247 * SET IF NOT OK
86D2:D0 19    86ED       248            BNE    EDFIN1
86D4:                    249 * SYNTAX ERROR:
86D4:A9 7F               250 EDFINO     LDA    #$7F           blank
86D6:AE 4A 7D            251            LDX    PROGBUF
86D9:                    252 *
86D9:9D 4B 7D            253            STA    PROGBUF+1,X    CLEAR FINAL "OK"
86DC:A6 12               254            LDX    PROGINDEX      IF PROGINDEX
86DE:E0 04               255            CPX    #4             >3
86E0:90 02    86E4       256            BCC    SYNERR         THEN CURRPOS =3
86E2:A2 04               257            LDX    #4             ELSE CURRPOS = PROGINDEX-1
86E4:CA                  258 SYNERR     DEX
86E5:86 14               259            STX    CURRPOS
86E7:20 F0 8C            260            JSR    FILL.ARROWS
86EA:4C 0C 86            261 SYNERR1    JMP    EDDKEY         RESUME EDITING
86ED:                    262 *
86ED:A5 12               263 EDFIN1     LDA    PROGINDEX
86EF:85 1E               264            STA    TIMEDIG
86F1:20 89 81            265            JSR    STUFFIRS
86F4:F0 06    86FC       266            BEQ    EDFIN2         if not room, allow more editing
86F6:A5 1E               267            LDA    TIMEDIG
86F8:85 12               268            STA    PROGINDEX
86FA:80 D8    86D4       269            BRA    EDFINO         resume editing
86FC:20 3C 84            270 EDFIN2     JSR    STOREPROG
86FF:20 C9 9C            271            JSR    GOODSOUND
8702:22 82               272 EDITOUT    JSR    \RESTOREMK
8704:4C 0C F3            273            JMP    ENDLEARN
8707:                    274 *
8707:22 56               275 EDITORCANCEL JSR  \KEYCANCEL      check for edit or cancel key
8709:F0 F7    8702       276            BEQ    EDITOUT        stack will be re-initialized
870B:C9 16               277            CMP    #EDITKEY
870D:F0 AB    86BA       278            BEQ    EDFIN
870F:60                  279            RTS
8710:                    280 *
8710:                    281 *
8710:                    282 *
8710:                    284 *
8710:                    285 * EDIT MODE-KEY IN TARGET (TIME AREA)
8710:DF 3A               286 EDITTARGET CLB   CURSORBIT,FLASHACT
8712:                    287 *
8712:20 F0 8C            288            JSR    FILL.ARROWS
8715:6F 34               289 EDK0       SEB    EKBIT
8717:20 9C F7            290            JSR    DISPMK
871A:A9 1A               291            LDA    #$1A           flash key
871C:8D A4 7E            292            STA    CURSORADDR
871F:2F 3A               293            SEB    TARGBIT,FLASHACT
8721:                    294 *
8721:20 07 87            295 EDK0A      JSR    EDITORCANCEL
8724:                    296 *
8724:C9 18               297            CMP    #SCRLEFT       <--
8726:F0 1C    8744       298            BEQ    EDM1
8728:                    299 *
```

```
8728:              300 *
8728:              301 *
8728:C9 1B         302 EDK1     CMP    #SCRRIGHT       -->
872A:D0 0A   8736  303          BNE    EDK2
872C:20 76 9B      304          JSR    TESTTARGET      CHECK FOR NON-BLANK KEY
872F:30 0E   873F  305          BMI    EDK5
8731:3F 3A         306          CLB    TARGBIT,FLASHACT
8733:4C F3 85      307          JMP    PUT8CHARS
8736:              308 *
8736:              309 *
8736:20 5A F4      310 EDK2     JSR    CHECKKEY        0-F
8739:F0 04   873F  311          BEQ    EDK5
873B:22 62         312          JSR    \CONVKEY
873D:80 D6   8715  313          BRA    EDK0
873F:              314 *
873F:              315 *
873F:20 D0 9C      316 EDK5     JSR    BLATT           NOGOOD
8742:80 DD   8721  317          BRA    EDK0A
8744:              318 *
8744:              320 *
8744:7F 34         321 EDM1     CLB    EKBIT           EDIT TARGET/MODE
8746:20 9C F7      322          JSR    DISPMK
8749:A9 16         323          LDA    #$16            flash mode
874B:8D A4 7E      324          STA    CURSORADDR
874E:              325 *
874E:20 07 87      326 EDM2     JSR    EDITORCANCEL
8751:              327 *
8751:C9 1B         328 EDM3     CMP    #SCRRIGHT       -->
8753:F0 C0   8715  329          BEQ    EDK0
8755:              330 *
8755:              331 *
8755:20 69 92      332 EDM4     JSR    CHECKPAGE
8758:F0 0B   8765  333          BEQ    EDM6
875A:E0 02         334          CPX    #2
875C:D0 03   8761  335          BNE    EDM5
875E:3C FF 11      336          LDM    #$FF,CURRKEY    DIRECT MODE
8761:              337 *
8761:22 5C         338 EDM5     JSR    \CONVMODE
8763:80 DF   8744  339          BRA    EDM1
8765:              340 *
8765:              341 *
8765:20 D0 9C      342 EDM6     JSR    BLATT           NOGOOD
8768:80 E4   874E  343          BRA    EDM2
876A:              344 *
876A:              345 *
876A:              347 *
876A:              348 *
876A:              349 * CREATE DISPLAY GIVEN PROGINDEX, CURRPOS
876A:              350 *
876A:A9 07         351 FILLDISP LDA    #7              if currpos>7, =7
876C:C5 14         352          CMP    CURRPOS
876E:B0 02   8772  353          BCS    FILLD0
8770:85 14         354          STA    CURRPOS
8772:A5 12         355 FILLD0   LDA    PROGINDEX
8774:38            356          SEC
8775:E5 14         357          SBC    CURRPOS
8777:18            358          CLC
8778:69 4A         359          ADC    #>PROGBUF
877A:85 2B         360          STA    ZP1
877C:A9 7D         361          LDA    #<PROGBUF
877E:69 00         362          ADC    #0
8780:85 2C         363          STA    ZP1+1
8782:              364 *
8782:A0 07         365          LDY    #7
8784:84 15         366 FILLD1   STY    SCRNPOS         get code for current scrnpos
8786:              367 *
8786:BF 33         368          CLB    DASHFLAG
8788:A4 15         369          LDY    SCRNPOS
878A:B1 2B         370          LDA    (ZP1),Y         get value from progbuf
878C:10 03   8791  371          BPL    FILLD2
```

```
878E:AF 33           372           SEB    DASHFLAG      dash
8790:FB              373           CLB    7,A
8791:D3 06    8799   374 FILLD2    BBC    6,A,FILLD3    blank?
8793:A9 00           375           LDA    #0
8795:85 39           376           STA    EDCODE
8797:80 05    879E   377           BRA    FILLD4
8799:                378 *
8799:85 22           379 FILLD3    STA    KEYNUM
879B:20 27 F8        380           JSR    GETCODE
879E:                381 *
879E:                382 * at this pt, a=edcode, y=scrnpos
879E:                383 *
879E:48              384 FILLD4    PHA
879F:20 DD 92        385           JSR    PUTONE.PATCH  display it (preserves yreg)

87A2:68              386           PLA
87A3:                387 *
87A3:C4 14           388           CPY    CURRPOS       if currpos, get dispval for
  flash
87A5:D0 0B    87B2   389           BNE    FILLD6
87A7:B7 33 0287AC    390           BBC    DASHFLAG,FILLD5
87AA:09 20           391           ORA    #$20          dash
87AC:85 27           392 FILLD5    STA    DISPVAL
87AE:22 68           393           JSR    \LSR4
87B0:85 28           394           STA    DISPVAL+1
87B2:                395 *
87B2:88              396 FILLD6    DEY
87B3:10 CF    8784   397           BPL    FILLD1
87B5:60              398           RTS
87B6:                399 *
87B6:                400 *
87B6:                401 *
87B6:                403 *
87B6:         0003   404           ds     $87B9-*,$ff
87B9:                405 * syntaxcheck loc must stay constant
87B9:                406 *
87B9:                407 * CHECK SYNTAX!
87B9:                408 *
87B9:3C 00 12        409 SYNTAXCHECK LDM #0,PROGINDEX
87BC:4C C6 92        410           JMP    SYNTAX.PATCH  patch in RAM
87BF:3F 32           411 syntback  CLB    KEYINPUT
87C1:                412 *
87C1:20 3C E3        413         * JSR    SETLEARN
87C4:20 BC F1        414           JSR    LEARN
87C7:60            * 415           RTS
87C8:                29            INCLUDE ALARM
87C8:                2 * ALARM
87C8:                3 *
87C8:                4 *   ALARM ROUTINES
87C8:                5 *
87C8:                6 ****************************************************
87C8:                7 *
87C8:                8 * Alarms are stored in ascending sequence by ID 87C8:                9 * ID bytes are: day, pm/hrh, hrl, minh, minl, sech, secl,
  flags.
87C8:                10 *
87C8:                11 *
87C8:                12 * STORE ALARM IN QUEUE
87C8:                13 *
87C8:AD 21 7D        14 STOREALARM LDA  TARGMODE+1    from learn
87CB:10 02    87CF   15            BPL    STAL1
87CD:A5 10           16            LDA    CURRMODE      no mode entered, therefore
  use current mode
87CF:85 48 7D        17 STAL1      STA    ALARMBUF+8
87D2:AD 34 7D        18            LDA    AQKEY
87D5:                19 *STA ALARMBUF+9
87D5:4C 5B 8B        20            JMP    STOREALARM.PATCH returns to below
87D8:20 5F 88        21 STAL2      JSR    ALARMID       create ID from alarm time
87DB:                22 *
87DB:                23 * (falls thru to insertq/alarmto4)
```

```
87DB:              24 *
87DB:              25 *
87DB:              27 *
87DB:              28 *******************************
87DB:              29 *
87DB:              30 * INSERT ALARM IN QUEUE:
87DB:              31 * ALARMBUF (0-9) MUST CONTAIN ALARM ID
87DB:              32 *
87DB:20 2A 88      33 INSERTQ    JSR    GETALARMAD    get defptr
87DE:3C 0A 26      34            LDM    #10,TO
87E1:3C 00 25      35            LDM    #0,FROM
87E4:4C A1 94      36            JMP    INSERTQ.PATCH checks to see if enuf room;

87E7:              37 * if not, moves keydefs down or blatts
87E7:78            38 OK2STORE   SEI
87E8:              39 *
87E8:20 D3 84      40            JSR    MOVEDOWN
87EB:              41 *
87EB:20 16 85      42            JSR    ZP1ENDQ       update endq
87EE:20 2C 85      43            JSR    UPDATE.END
87F1:4C 8A 8B      44            JMP    OK.PATCH
87F4:              45 *
87F4:A0 09         46 OK4        LDY    #9
87F6:B9 40 7D      47 WRTA1      LDA    ALARMBUF,Y
87F9:91 29         48            STA    (DEFPTR),Y
87FB:88            49            DEY
87FC:10 F8   87F6  50            BPL    WRTA1
87FE:58            51            CLI
87FF:EA            52            NOP
8800:              53 * (falls thru to alarmto4)
8800:              54 *
8800:              56 *
8800:              57 * PUT 1ST ALARM IN 4-BITTER
8800:              58 * if no alarm present, 4-bitter alarm is disabled & minus flag
8800:              59 * is set on return.
8800:              60 * if alarm present, 4-bitter enabled and minus flag cleared.
8800:              61 *
8800:        8800  62 ALARMTO4   EQU    *             see if this prevents timing screwups
8800:20 1D 88      63            JSR    ALARMOFF
8803:20 45 88      64            JSR    GETQPTR
8806:22 8D         65            JSR    \DEFZERO      read 1st element of "alarm"

8808:30 12   881C  66            BMI    ALRTS         if neg, no such alarm
880A:              67 *
880A:20 9E 89      68            JSR    GETAQTIME     create time from ID of alarm
880D:20 09 F5      69            JSR    WRITEAQTIME   write to 4-bitter
8810:              70 *
8810:22 92         71 ALARMON    JSR    \CLRINT       prevent interference w 4-bit routines
8812:A9 F0         72            LDA    #$F0          enable alarm
8814:22 0E         73            JSR    \PEEK256
8816:A9 00         74            LDA    #0
8818:22 1C         75            JSR    \POKE16       should return pos.
881A:22 97         76            JSR    \ENBINT
881C:60            77 ALRTS      RTS
881D:              78 *
881D:22 92         79 ALARMOFF   JSR    \CLRINT
881F:A9 F0         80            LDA    #$F0          turn off alarm enable
8821:22 0E         81            JSR    \PEEK256
8823:A9 01         82            LDA    #1
8825:22 1C         83            JSR    \POKE16
8827:22 97         84            JSR    \ENBINT
8829:60            85            RTS
882A:              86 *
882A:              87 *
882A:              89 *
882A:              90 * SET UP SEARCH FOR ALARM QUEUE
```

```
882A:              91 * THIS WILL RETURN ADDRESS OF 1ST ENTRY>TARGET
882A:              92 *
882A:20 89 FA      93 GETALARMAD  JSR    DEFPTRALARMQ
882D:A0 00         94 GTLM1       LDY    #0
882F:B1 29         95 GTLM2       LDA    (DEFPTR),Y    FOR REST OF BYTES
8831:D9 40 7D      96             CMP    ALARMBUF,Y
8834:F0 07  883D   97             BEQ    GTLM4
8836:B0 0C  8844   98             BCS    GOTLOC
8838:              99 * DEFPTR<ID: KEEP LOOKING
8838:20 97 FA     100 GTLM3       JSR    DEFPLUS10     next entry
883B:80 F0  882D  101             BRA    GTLM1
883D:C8           102 GTLM4       INY                  DEFPTR=ID: TRY NEXT BYTE
883E:C0 08        103             CPY    #8            IDLENGTH
8840:D0 ED  882F  104             BNE    GTLM2
8842:F0 F4  8838  105             BEQ    GTLM3
8844:60           106 GOTLOC      RTS                  THIS IS IT
8845:             107 *
8845:             108 *
8845:             109 * FIND ADDRESS OF NEXT ALARM TO GO OFF
8845:             110 *
8845:20 4F 8B     111 GETQPTR     JSR    GETQP         modified to allow for no ad
just
8848:20 7D 89     112             JSR    ADJUST
884B:4C 54 88     113             JMP    GETQP1
884E:     0006    114             ds     6
8854:             115 *
8854:A5 29        116 GETQP1      LDA    DEFPTR        this is it
8856:8D 02 7D     117             STA    QPTR
8859:A5 2A        118             LDA    DEFPTR+1
885B:8D 03 7D     119             STA    QPTR+1
885E:60           120             RTS
885F:             121 *
885F:             123 *
885F:             124 * CREATE ALARM ID (8 BYTES) FROM TIME DATA
885F:             125 *
885F:             126 * STRUCTURE OF ID BYTES:
885F:             127 * 0:BIT7=HIDAY; 0-2=DAY
885F:             128 * 1:7=PMFLAG; 0=HRH
885F:             129 * 2: HRL
885F:             130 * 3: MINH
885F:             131 * 4: MINL
885F:             132 * 5: SECH
885F:             133 * 6: SECL
885F:             134 * 7: FLAGS: BIT0=2ND;BIT1=2ND READY;BIT2=RPT;BIT3=MF
885F:             135 *
885F:A2 03        136 ALARMID     LDX    #3            secl,sech,minl,minh
8861:A0 00        137             LDY    #0
8863:B9 18 00     138 AID0        LDA    SECL,Y
8866:9D 43 7D     139             STA    ALARMBUF+3,X
8869:C8           140             INY
886A:CA           141             DEX
886B:10 F6  8863  142             BPL    AID0
886D:             143 *
886D:20 71 8B     144             JSR    HR1TO2.REV
8870:A5 16        145             LDA    HRH           HOURS
8872:17 1D 028877 146             BBC    0,DAY,ALARMID1
8875:09 80        147             ORA    #$80          SET PM
8877:8D 41 7D     148 ALARMID1    STA    ALARMBUF+1
887A:A5 17        149             LDA    HRL
887C:8D 42 7D     150             STA    ALARMBUF+2
887F:             151 *
887F:             152 * DO DAY/FLAGS
887F:             153 *
887F:3C 00 35     154 IDDAY       LDM    #0,QFLAGS     flag byte
8882:A5 1D        155             LDA    DAY
8884:4A          156             LSR    A
8885:D0 02  8889  157             BNE    IDDAY1
8887:6F 35       158             SEB    MFQ           MF flag
8889:8D 40 7D    159 IDDAY1      STA    ALARMBUF      day byte
888C:A5 35       160 IDFLAGS     LDA    QFLAGS
888E:97 3B 028893 161            BBC    FLAG2ND,IDFLAGS1
```

```
8891:09 01            162            ORA     #1              SET "2ND"; CLEAR "2ND READY"
8893:57 33 028898     163 IDFLAGS1   BBC     RPTFLAG,ALARMID3
8896:09 04            164            ORA     #4              SET "RPT"
8898:                 165 *
8898:8D 47 7D         166 ALARMID3   STA     ALARMBUF+7
889B:                 167 *
889B:                 168 *
889B:                 170 *
889B:                 171 * HERE WE NEED TO SET THE CORRECT DAY IF MFQ=1.
889B:                 172 * Method: compare current time (not including day) with
889B:                 173 * alarm time. If alarm time >current time, then day =
889B:                 174 * today (or Monday if it's a weekend). Otherwise
889B:                 175 * day = tomorrow.
889B:                 176 *
889B:67 35 01889F     177            BBS     MFQ,GETTODAY    if not mfq, day has already been set
889E:60               178            RTS
889F:                 179 *
889F:20 CD 88         180 GETTODAY   JSR     BUFTOID         alarmbuf-->idbytes
88A2:20 EB F4         181            JSR     READT1TIME
88A5:20 5F 88         182            JSR     ALARMID         curr time-->alarmbuf 88A8:                 183 *
88A8:A0 01            184            LDY     #1              compare bytes 1-6 (NOT FLAGS)
88AA:B9 40 7D         185 CMPTIME    LDA     ALARMBUF,Y      current time
88AD:D9 8A 7E         186            CMP     IDBYTES,Y       alarm time
88B0:D0 06    88B8    187            BNE     CMPTIME2
88B2:C8               188            INY                     if = try compare next bytes
88B3:C9 07            189            CMP     #7
88B5:D0 F3    88AA    190            BNE     CMPTIME
88B7:38               191            SEC                     if all =, assume next day
88B8:                 192 *
88B8:                 193 * at this point, carry set if currtime>alarm time
88B8:                 194 *
88B8:AD 40 7D         195 CMPTIME2   LDA     ALARMBUF
88BB:90 01    88BE    196            BCC     CMPTIME3
88BD:3A               197            INC     A               next day
88BE:20 37 8B         198 CMPTIME3   JSR     SETMF           get day value -->alarmbuf
88C1:A0 07            199            LDY     #7              transfer 1-7
88C3:B9 8A 7E         200 IDTOBUF    LDA     IDBYTES,Y       put back in alarmbuf
88C6:99 40 7D         201            STA     ALARMBUF,Y
88C9:88               202            DEY
88CA:D0 F7    88C3    203            BNE     IDTOBUF
88CC:60               204            RTS
88CD:                 205 *
88CD:                 206 *
88CD:                 207 *
88CD:                 208 * TRANSFER ID TO IDBYTES FOR SEARCH
88CD:                 209 *
88CD:A2 07            210 BUFTOID    LDX     #7
88CF:BD 40 7D         211 ALARMID4   LDA     ALARMBUF,X
88D2:9D 8A 7E         212            STA     IDBYTES,X
88D5:CA               213            DEX
88D6:10 F7    88CF    214            BPL     ALARMID4
88D8:60               215            RTS
88D9:                 216 *
88D9:                 217 *
88D9:                 219 *
88D9:                 220 * ALARM QUEUE REVIEW
88D9:                 221 *
88D9:20 3C F7         222 REVIEW     JSR     OFFTIME
88DC:20 74 99         223            JSR     ATENABLE        AT solid or flashing?
88DF:3C 01 31         224            LDM     #1,TIMEFLAG     so 2nd,Rpt will show
88E2:EA               225            NOP
88E3:EA               226            NOP
88E4:                 227 *
88E4:17 3A 0C88F3     228 REVIEWX    BBC     BELLBIT,FLASHACT,REVIEW1 did an alarm go off?
```

```
88E7:3C 99 29      229              LDM   #>LASTALARM,DEFPTR  yes: review it
88EA:3C 7E 2A      230              LDM   #<LASTALARM,DEFPTR+1
88ED:80 13   8902  231              BRA   SHOWALARM
88EF:              232 *
88EF:1F 3A         233 REVIEW0      CLB   BELLBIT,FLASHACT  clear bell & display fut
ure alarms
88F1:1F 3C         234              CLB   BELLBIT,BYTEID
88F3:              235 *
88F3:20 A3 FA      236 REVIEW1      JSR   DEFQPTR   set defptr to 1st alarm
88F6:22 8D         237 REVIEW2      JSR   \DEFZERO  look at 1st byte of ID
88F8:10 08   8902  238              BPL   SHOWALARM  if neg, we're pointing to
end of q
88FA:20 D0 9C      239              JSR   BLATT     therefore no alarms
88FD:              240 *
88FD:        88FD  241 ENDREVIEW EQU *               done w review
88FD:1F 3A         242              CLB   BELLBIT,FLASHACT
88FF:              243 *JSR ALARMTO4 in case we deleted top alarm
88FF:4C 02 87      244              JMP   EDITOUT   finishing stuff
8902:              245 *
8902:20 BC 83      246 SHOWALARM JSR FLASHBOTH
8905:20 9E 89      247              JSR   GETAQTIME  get time values
8908:20 BF 89      248              JSR   GETAQFLAGS get flags; display time
890B:              249 *
890B:A0 08         250              LDY   #8        display mode-key of alarm
890D:B1 29         251              LDA   (DEFPTR),Y
890F:85 10         252              STA   CURRMODE
8911:C8            253              INY
8912:B1 29         254              LDA   (DEFPTR),Y
8914:85 11         255              STA   CURRKEY
8916:20 C4 F8      256              JSR   DISPCURR
8919:              257 *
8919:22 56         258 REVKEY       JSR   \KEYCANCEL  get input
891B:F0 E0   88FD  259              BEQ   ENDREVIEW   if cancel or OK, finished
891D:              260 *CMP #OKKEY
891D:              261 *BEQ ENDREVIEW
891D:              262 * PATCH FOR ABOVE:
891D:4C 55 99      263              jmp   revkey.patch
8920:EA            264              nop              get ok,enable
8921:              265 *
8921:C9 18         266 REVKEY9      CMP   #SCRLEFT     <--
8923:D0 28   894D  267              BNE   REVRIGHT
8925:07 3A C788EF  268 REVLEFT      BBS   BELLBIT,FLASHACT,REVIEW0 past alarm
8928:              269 *
8928:20 C3 FA      270 REVL1        JSR   CMPDEFQ    if =qptr, can't go left
892B:F0 3F   896C  271              BEQ   REVKEY3
892D:A5 29         272 REVL0        LDA   DEFPTR     next lower alarm
892F:38            273              SEC              (subtract 10 from addr)
8930:E9 0A         274              SBC   #10
8932:85 29         275              STA   DEFPTR
8934:B0 02   8938  276              BCS   REVL2
8936:C6 2A         277              DEC   DEFPTR+1
8938:22 8D         278 REVL2        JSR   \DEFZERO
893A:              279 *
893A:D0 C6   8902  280              BNE   SHOWALARM  if top of q,
893C:AD 04 7D      281              LDA   ENDQ       wrap to bottom alarm
893F:38            282              SEC
8940:E9 13         283              SBC   #19
8942:85 29         284              STA   DEFPTR
8944:AD 05 7D      285              LDA   ENDQ+1
8947:E9 00         286              SBC   #0
8949:85 2A         287              STA   DEFPTR+1
894B:80 B5   8902  288              BRA   SHOWALARM
894D:              289 *
894D:              290 *
894D:C9 1B         291 REVRIGHT     CMP   #SCRRIGHT    -->
894F:D0 17   8968  292              BNE   REVKEY2
8951:              293 *
8951:07 3A 9B88EF  294              BBS   BELLBIT,FLASHACT,REVIEW0 past alarm done
8954:20 97 FA      295 REVR1        JSR   DEFPLUS10  next higher alarm
8957:22 8D         296              JSR   \DEFZERO
8959:10 03   895E  297              BPL   REVR2
```

```
895B:20 94 FA      298         JSR    AQPLUS10        if neg, wrap to top
895E:20 C3 FA      299 REVR2   JSR    CMPDEFQ         compare to qptr
8961:D0 9F   8902  300         BNE    SHOWALARM
8963:20 D0 9C      301         JSR    BLATT           if equal, go back left
8966:80 C5   892D  302         BRA    REVLO
8968:              303 *
8968:              304 *
8968:              305 *
8968:C9 1A         306 REVKEY2 CMP    #DELETE         DELETE
896A:F0 05   8971  307         BEQ    REVDEL
896C:20 D0 9C      308 REVKEY3 JSR    BLATT           illegal key
896F:80 A8   8919  309         BRA    REVKEY
8971:              310 *
8971:07 3A B18925  311 REVDEL  BBS    BELLBIT,FLASHACT,REVLEFT past alarm
8974:4C 94 8E      312         JMP    DELETE.PATCH    add check for Enableflag
8977:              313 *
8977:20 00 88      314 REVDEL1 JSR    ALARMTO4
897A:4C F3 88      315         JMP    REVIEW1
897D:              316 *
897D:              317 *
897D:22 8D         318 ADJUST  JSR    \DEFZERO
897F:10 03   8984  319         BPL    ADJ1
8981:20 94 FA      320         JSR    AQPLUS10        goto top
8984:60            321 ADJ1    RTS
8985:              322 *
8985:              323 *
8985:              325 *
8985:              326 *
8985:              327 * DELETE AN ALARM (DEFPTR MUST BE SET ALREADY)
8985:              328 *
8985:        8985  329 DELETE.ALARM EQU *
8985:3C 00 26      330         LDM    #0,TO
8988:3C 0A 25      331         LDM    #10,FROM
898B:20 16 85      332         JSR    ZP1ENDQ         get # of bytes to move
898E:20 41 85      333         JSR    CALCMBYTES
8991:78            334         SEI
8992:EA            335         NOP
8993:EA            336         NOP
8994:20 C7 84      337         JSR    MOVEUP          delete
8997:              338 *
8997:20 16 85      339         JSR    ZP1ENDQ         adjust endq
899A:4C 26 95      340         JMP    DELETE.CHECK    see if keydefs can be moved up
899D:60            341         RTS
899E:              342 *
899E:              344 *
899E:              345 * THIS ROUTINE IS USED DURING THE ALARM REVIEW
899E:              346 * (also called when putting aqtime in 4-bitter)
899E:              347 * CONVERT ALARM ID BYTES TO TIME & DISPLAY
899E:              348 *
899E:A0 04         349 GETAQTIME LDY  #4              store time values
89A0:B1 29         350         LDA    (DEFPTR),Y
89A2:85 1A         351         STA    MINL
89A4:88            352         DEY
89A5:B1 29         353         LDA    (DEFPTR),Y
89A7:85 1B         354         STA    MINH
89A9:88            355         DEY
89AA:B1 29         356         LDA    (DEFPTR),Y
89AC:85 17         357         STA    HRL
89AE:88            358         DEY
89AF:B1 29         359         LDA    (DEFPTR),Y
89B1:85 16         360         STA    HRH
89B3:FF 16         361         CLB    7,HRH           MASK FM
89B5:88            362         DEY                    DAY
89B6:0A            363         ASL    A               ROTATE IN FMFLAG
89B7:B1 29         364         LDA    (DEFPTR),Y
89B9:2A            365         ROL    A
89BA:85 1D         366         STA    DAY
89BC:              367 *
89BC:4C 7F 8B      368         JMP    HR2TO1.REV
89BF:              369 *
```

```
89BF:              370 * THIS IS CALLED IMMED AFTER ABOVE IN Q REVIEW
89BF:              371 *
89BF:         89BF 372 GETAQFLAGS EQU  *
89BF:5F 33         373            CLB  RPTFLAG
89C1:9F 3B         374            CLB  FLAG2ND      defaults
89C3:A0 07         375            LDY  #7           FLAGS
89C5:B1 29         376            LDA  (DEFPTR),Y
89C7:53 02    89CB 377            BBC  2,A,AQT1
89C9:4F 33         378            SEB  RPTFLAG      SET RPT
89CB:73 06    89D3 379 AQT1       BBC  3,A,AQT2     MF
89CD:3F 1D         380            CLB  1,DAY        DAY = 0
89CF:5F 1D         381            CLB  2,DAY
89D1:7F 1D         382            CLB  3,DAY
89D3:13 08    89DD 383 AQT2       BBC  0,A,AQT9     2ND
89D5:23 04    89DB 384            BBS  1,A,AQT8.    2ND READY
89D7:              385 *
89D7:8F 3B         386            SEB  FLAG2ND      SOLID: NO 2ND READY
89D9:80 02    89DD 387            BRA  AQT9
89DB:8F 3A         388 AQT8       SEB  BIT2ND,FLASHACT INITIATE FLASHING
89DD:              389 *
89DD:4C 58 F5      390 AQT9       JMP  FIXTIME2     this displays time2
89E0:              391 *               & value of 2nd, rpt
89E0:              392 *
89E0:              393 *
89E0:              395 *
89E0:              396 * (some of the following addresses have been changed; the
re
89E0:              397 * are no calls to them from ROM)
89E0:              398 *
89E0:              399 * TIME FOR AN ALARM TO HAPPEN.
89E0:              400 * WE CHECK TO SEE IF THE ALARM SHOULD
89E0:              401 * BE EXECUTED, AND WHETHER IT SHOULD BE RE-INSERTED IN
89E0:              402 * THE QUEUE, AND WHEN.
89E0:              403 *
89E0:5F 34         404 PROCESS.ALARM CLB ALARM.WAITING
89E2:3F 34         405            CLB  ALARM.ENABLE
89E4:20 A3 FA      406            JSR  DEFQPTR      address of alarm
89E7:              407 *
89E7:22 8D         408            JSR  \DEFZERO     check 1st element
89E9:F0 07    89F2 409            BEQ  APRTS        if zero
89EB:30 05    89F2 410            BMI  APRTS        or neg, exit
89ED:20 41 8B      411            JSR  DEF2BUFTEMP  real alarm
89F0:80 01    89F3 412            BRA  PROC0
89F2:60            413 APRTS      RTS
89F3:              414 *
89F3:AD 47 7D      415 proc0      LDA  ALARMBUF+7   flags byte
89F6:85 35         416            STA  QFLAGS       zp variable
89F8:              417 *
89F8:AD 40 7D      418            LDA  ALARMBUF     save day to deal with Rpt a
larms
89FB:8D 19 7D      419            STA  DAYSAVE
89FE:20 85 89      420            JSR  DELETE.ALARM now get rid of it
8A01:              421 *
8A01:2F 33         422            SEB  EXECFL
8A03:              423 *
8A03:77 35 1D8A23  424            BBC  MFQ,PROC4
8A06:17 35 0C8A15  425            BBC  Q2ND,PROC1
8A09:27 35 098A15  426            BBS  Q2R,PROC1
8A0C:              427 *
8A0C:20 3B 8B      428            JSR  MFEQ1        DAY = 1
8A0F:              429 *
8A0F:              430 *
8A0F:2F 35         431            SEB  Q2R
8A11:3F 33         432            CLB  EXECFL
8A13:80 1F    8A34 433            BRA  PROC9
8A15:              434 *
8A15:20 33 8B      435 PROC1      JSR  INCMF        MF; (2ND,2R=1) OR (NO 2ND)
8A18:C9 01         436            CMP  #1
8A1A:D0 18    8A34 437            BNE  PROC9
8A1C:57 35 268A45  438            BBC  RPTQ,PROC9A  DAY =1 (MON); NO PUTINQ
8A1F:3F 35         439            CLB  Q2R          RPT
```

```
8A21:80 11    8A34   440              BRA    PROC9
8A23:                441 *
8A23:                442 *
8A23:17 35 0B8A31    443 PROC4        BBC    Q2ND,PROC6       NO MF;2ND
8A26:27 35 068A2F    444              BBS    Q2R,PROC5
8A29:3F 33           445              CLB    EXECFL           NO 2R
8A2B:2F 35           446              SEB    Q2R
8A2D:80 05    8A34   447              BRA    PROC9
8A2F:                448 *
8A2F:3F 35           449 PROC5        CLB    Q2R              2R
8A31:57 35 118A45    450 PROC6        BBC    RPTQ,PROC9A      NO RPT
8A34:                451 *
8A34:                452 *
8A34:A5 35           453 PROC9        LDA    QFLAGS           PUT BACK IN Q
8A36:AE 40 7D        454              LDX    ALARMBUF         compare day w previous day
8A39:EC 19 7D        455              CPX    DAYSAVE          if same, flag it
8A3C:D0 01    8A3F   456              BNE    NEWFLAGS
8A3E:EB              457              SEB    7,A
8A3F:8D 47 7D        458 NEWFLAGS     STA    ALARMBUF+7
8A42:                459 *
8A42:                460 *
8A42:20 DB 87        461              JSR    INSERTQ          put back in q w revised day
,flags
8A45:                462 *
8A45:                463 *
8A45:27 33 048A4C    464 PROC9A       BBS    EXECFL,PROC9B    don't execute but check nex
t
8A48:2F 34           465              SEB    ALARM.ENABLE
8A4A:80 41    8A8D   466              BRA    MOREALARMS
8A4C:                467 *
8A4C:A0 09           468 PROC9B       LDY    #9               NOW get lastalarm because w
e know it's been executed
8A4E:B9 35 7D        469 TEMPLAST     LDA    TEMPALARM,Y
8A51:99 99 7E        470              STA    LASTALARM,Y
8A54:88              471              DEY
8A55:10 F7    8A4E   472              BPL    TEMPLAST
8A57:                473 *
8A57:                474 *
8A57:22 77           475              JSR    \SAVEMK          execute
8A59:AD 49 7D        476              LDA    ALARMBUF+9
8A5C:85 11           477              STA    CURRKEY
8A5E:AD 48 7D        478              LDA    ALARMBUF+8
8A61:85 10           479              STA    CURRMODE
8A63:                480 *
8A63:20 98 9C        481              JSR    CHIME
8A66:1F 34           482              CLB    DISPOFF
8A68:20 8F 95        483              JSR    READD3.NEW       if display off
8A6B:F0 02    8A6F   484              BEQ    TL1
8A6D:0F 34           485              SEB    DISPOFF          set flag
8A6F:0F 3A           486 TL1          SEB    BELLBIT,FLASHACT flash bell
8A71:                487 *
8A71:AD 02 7D        488              LDA    QPTR             save value of qptr in morep
tr in case executing
8A74:8D 4B 7A        489              STA    MOREPTR          program adds an alarm!
8A77:AD 03 7D        490              LDA    QPTR+1
8A7A:8D 4C 7A        491              STA    MOREPTR+1
8A7D:                492 *
8A7D:CF 34           493              SEB    ALARMFLAG        so we'll return here
8A7F:BA              494              TSX                     save stack for
8A80:8E 0E 7D        495              STX    ALARMSTACK       forced return
8A83:20 05 F9        496              JSR    DOITQ            EXECUTE KEY (& preserve mod
e,key)
8A86:         8A86   497 RETQ         EQU    *
8A86:DF 34           498              CLB    ALARMFLAG
8A88:2F 34           499              SEB    ALARM.ENABLE
8A8A:20 59 9B        500              JSR    ENABLECHECK
8A8D:                501 *
```

```
8A8D:                  503 *
8A8D:                  504 * Check to see whether any alarms at the beginning of
8A8D:                  505 * the queue should have gone off by now but haven't
8A8D:                  506 * had time.
8A8D:                  507 *
8A8D:AD 4B 7A          508 MOREALARMS LDA  MOREPTR       transfer moreptr to defptr
8A90:85 29             509            STA  DEFPTR
8A92:AD 4C 7A          510            LDA  MOREPTR+1
8A95:85 2A             511            STA  DEFPTR+1
8A97:                  512 *
8A97:20 7D 89          513 MORE1      JSR  ADJUST        if end of q, point to 1st alarm
8A9A:22 8D             514            JSR  \DEFZERO      see if there IS another alarm!
8A9C:30 14     8AB2    515            BMI  QSRTS         if not, scram
8A9E:                  516 *
8A9E:A0 07             517            LDY  #7            check flags
8AA0:B1 29             518            LDA  (DEFPTR),Y
8AA2:10 14     8AB8    519            BPL  MORE2         if hibit set, skip this one
8AA4:FB                520            CLB  7,A
8AA5:91 29             521            STA  (DEFPTR),Y    clear it
8AA7:20 97 FA          522            JSR  DEFPLUS10     advance it
8AAA:20 7D 89          523            JSR  ADJUST
8AAD:20 C3 FA          524            JSR  CMPDEFQ       if it's the same one,
8AB0:D0 01     8AB3    525            BNE  MORE4
8AB2:60                526 QSRTS      RTS
8AB3:          8AB3    527 MORE4      EQU  *
8AB3:20 54 88          528            JSR  GETQP1        back to QPTR
8AB6:80 DF     8A97    529            BRA  MORE1         try next one
8AB8:                  530 *
8AB8:20 AE FA          531 MORE2      JSR  ZP1DEFPTR     store in zp1 for now
8ABB:                  532 * move next alarm to NEXTALARM
8ABB:A0 09             533            LDY  #9
8ABD:B1 29             534 MORE3      LDA  (DEFPTR),Y
8ABF:99 0F 7D          535            STA  NEXTALARM,Y
8AC2:88                536            DEY
8AC3:10 F8     8ABD    537            BPL  MORE3
8AC5:                  538 *
8AC5:20 4F 8B          539            JSR  GETQP         put current time into ALARMBUF
8AC8:                  540 *
8AC8:                  541 * compare times to see if next one should be executed now
8AC8:                  542 *
8AC8:20 59 95          543            JSR  CBUFNEXT      BUF>=NEXT
8ACB:90 0C     8AD9    544            BCC  CTIME1
8ACD:20 6B 95          545            JSR  CNEXTTEMP
8AD0:B0 11     8AE3    546            BCS  REPROC
8AD2:20 7D 95          547            JSR  CBUFTEMP
8AD5:90 0C     8AE3    548 CTIME0     BCC  REPROC
8AD7:80 21     8AFA    549            BRA  DONT
8AD9:                  550 *
8AD9:20 6B 95          551 CTIME1     JSR  CNEXTTEMP     BUF<NEXT
8ADC:90 1C     8AFA    552            BCC  DONT
8ADE:20 7D 95          553            JSR  CBUFTEMP
8AE1:80 F2     8AD5    554            BRA  CTIME0
8AE3:                  555 *
8AE3:                  556 *
8AE3:                  557 *
8AE3:                  558 *
8AE3:A5 2C             559 REPROC     LDA  ZP1+1
8AE5:8D 03 7D          560            STA  QPTR+1        restore next-->qptr
8AE8:A5 2B             561            LDA  ZP1
8AEA:8D 02 7D          562            STA  QPTR
8AED:                  563 *
8AED:27 34 078AF7      564            BBS  ALARM.ENABLE,PROCAG1
8AF0:4F 34             565            SEB  ALARM.WAITING not enabled
8AF2:A9 02             566            LDA  #2
8AF4:4C 9A 9C          567            JMP  CHIME0
```

```
8AF7:4C E0 89    568 PROCAG1   JMP   PROCESS.ALARM  enabled: do it
8AFA:            569 *
8AFA:37 34 358B32 570 DONT     BBC   ALARM.ENABLE,SRTS
8AFD:9F 34       571           CLB   COUNTDOWN      default
8AFF:20 00 88    572           JSR   ALARMTO4       put next alarm in 4-bitter
8B02:30 2E  8B32 573           BMI   SRTS           if doesn't exist, exit
8B04:
8B04:            575 * there is one: compare times except for seconds
8B04:            576 *
8B04:            577 *
8B04:A0 04       578           LDY   #4
8B06:B9 40 7D    579 SAMEMIN   LDA   ALARMBUF,Y     current time
8B09:D9 0F 7D    580           CMP   NEXTALARM,Y    new alarm (this gets set in getqptr)
8B0C:D0 24  8B32 581           BNE   SRTS           not equal: exit
8B0E:88          582           DEY
8B0F:10 F5  8B06 583           BPL   SAMEMIN
8B11:            584 *
8B11:            585 * next alarm due to go off BEFORE next minute so we have to
8B11:            586 * calculate how many seconds left.
8B11:            587 *
8B11:AD 46 7D    588           LDA   ALARMBUF+6     calculate next secs - current time
8B14:AE 45 7D    589           LDX   ALARMBUF+5
8B17:20 27 F7    590           JSR   ADD10X
8B1A:85 37       591           STA   INCR
8B1C:A0 05       592           LDY   #5
8B1E:B1 29       593           LDA   (DEFPTR),Y
8B20:AA          594           TAX
8B21:C8          595           INY
8B22:B1 29       596           LDA   (DEFPTR),Y
8B24:20 27 F7    597           JSR   ADD10X
8B27:38          598           SEC
8B28:E5 37       599           SBC   INCR
8B2A:B0 02  8B2E 600           BCS   SMIN1          if negative, assume same secs
8B2C:65 37       601           ADC   INCR
8B2E:       8B2E 602 SMIN1     EQU   *
8B2E:85 20       603           STA   SECTIME
8B30:8F 34       604           SEB   COUNTDOWN
8B32:60          605 SRTS      RTS
8B33:            606 *
8B33:            607 *
8B33:            608 * INCREMENT DAY FOR MF
8B33:            609 *
8B33:AD 40 7D    610 INCMF     LDA   ALARMBUF
8B36:3A          611           INC
8B37:C9 06       612 SETMF     CMP   #6
8B39:90 02  8B3D 613           BCC   INCMF1
8B3B:A9 01       614 MFEQ1     LDA   #1             monday
8B3D:8D 40 7D    615 INCMF1    STA   ALARMBUF
8B40:60          616 INCMF2    RTS
8B41:            617 *
8B41:            618 *
8B41:A0 09       619 DEF2BUFTEMP LDY #9             transfer alarm to alarmbuf for later use
8B43:B1 29       620 PP99      LDA   (DEFPTR),Y
8B45:99 40 7D    621           STA   ALARMBUF,Y
8B48:99 35 7D    622           STA   TEMPALARM,Y    will be put in lastalarm later if execfl
8B4B:88          623           DEY
8B4C:10 F5  8B43 624           BPL   PP99
8B4E:60          625           RTS
8B4F:            626 *
8B4F:            627 *
8B4F:       8B4F 628 GETQP     EQU   *              1st part of getqptr
8B4F:20 EB F4    629           JSR   READTITIME     get current time values
8B52:20 DF F4    630           JSR   READSECONLY    read seconds
8B55:20 5F 88    631           JSR   ALARMID        create ID from current time
```

```
8B58:4C 2A 88    632           JMP    GETALARMAD    find where it would go (ret
urns defptr)
8B5B:            633 *
8B5B:8D 49 7D    634 STOREALARM.PATCH STA ALARMBUF+9
8B5E:            635 * allow for intervals within Step mode
8B5E:            636 *
8B5E:C7 32 038B64 637          BBS    STEPFLAG,SAP1
8B61:4C D8 87    638           JMP    STAL2         store alarm
8B64:85 11       639 SAP1      STA    CURRKEY
8B66:AD 48 7D    640           LDA    ALARMBUF+8
8B69:85 10       641           STA    CURRMODE
8B6B:20 98 9C    642           JSR    CHIME
8B6E:4C A0 96    643           JMP    RDOITXK1
8B71:            644 *
8B71:            645 * modifications to hr conversions. if time = 12:00, then
8B71:            646 * HR = 0 and HRH=0;HRL=0. (Used to be HRH=1;HRH=2)
8B71:            647 * This is necessary for ordering in alarm queue
8B71:            648 * since 12 PM comes BEFORE 1 PM!!!!!
8B71:            649 *
8B71:A5 1C       650 HR1TO2.REV LDA HR
8B73:D0 07  8B7C 651           BNE    HRR1          if hr=0
8B75:A9 00       652           LDA    #0            then hrh,hrl=0
8B77:85 17       653           STA    HRL
8B79:85 16       654           STA    HRH
8B7B:60          655           RTS
8B7C:4C 03 F7    656 HRR1      JMP    HR1TO2
8B7F:            657 *
8B7F:20 18 F7    658 HR2TO1.REV JSR HR2TO1
8B82:C9 04       659           CMP    #4            if hr=4
8B84:D0 03  8B89 660           BNE    HRR2
8B86:3C 00 1C    661           LDM    #0,HR         then make 0
8B89:60          662 HRR2      RTS
8B8A:            663 *
8B8A:20 21 85    664 OK.PATCH  JSR    ENDQZP1
8B8D:A5 2A       665           LDA    DEFPTR+1      see whether Moreptr needs t
o
8B8F:CD 4C 7A    666           CMP    MOREPTR+1     be moved down
8B92:90 0B  8B9F 667           BCC    ADJUST.MORE
8B94:D0 17  8BAD 668           BNE    DONT.ADJUST
8B96:A5 29       669           LDA    DEFPTR
8B98:CD 4B 7A    670           CMP    MOREPTR
8B9B:90 02  8B9F 671           BCC    ADJUST.MORE
8B9D:D0 0E  8BAD 672           BNE    DONT.ADJUST
8B9F:AD 4B 7A    673 ADJUST.MORE LDA MOREPTR
8BA2:18          674           CLC
8BA3:69 0A       675           ADC    #10
8BA5:8D 4B 7A    676           STA    MOREPTR
8BA8:90 03  8BAD 677           BCC    DONT.ADJUST
8BAA:EE 4C 7A    678           INC    MOREPTR+1
8BAD:4C F4 87    679 DONT.ADJUST JMP OK4            back there
8BB0:            30 *

8BB0:            31        lst  on
8BB0:            32        include newcode

8BB0:            2 * NEWCODE
8BB0:            3 *
8BB0:            4 * patches to previous code.
8BB0:            5 * don't forget: ALL RAM ADDRESSES prior to here must stay
the same.
8BB0:            6 *
8BB0:       8BB0  7 *
8BB0:             8 DOITIR.ram EQU *               "IR" SYMBOL
8BB0:            9 *
8BB0:20 23 FA    10          JSR    NEXTINST       point to length byte
8BB3:            11 * (returns acc = next inst, y = index)
8BB3:C9 21       12          CMP    #33            if length >32 something's w
rong
```

```
8BB5:90 06    8BBD   13              BCC      DOIR2
8BB7:20 D0 9C        14  BADIR       JSR      BLATT
8BBA:4C 36 F9        15              JMP      DONEDONE
8BBD:18              16  DOIR2       CLC
8BBE:65 23           17              ADC      INDEX           point to last byte of IR si
nce
8BC0:1A              18              DEC      A               it will be inc'd in doit1

8BC1:85 23           19              STA      INDEX
8BC3:                20  * check for keepalive code
8BC3:84 24           21              STY      DIGIT           save index of current instr
uction
8BC5:C8              22              INY                      point to keepalive status
byte
8BC6:B1 2D           23              LDA      (STAKPTR),Y     if bit 1 = 1
8BC8:29 02           24              AND      #2
8BCA:F0 0E    8BDA   25              BEQ      KEEPIT
8BCC:A4 23           26              LDY      INDEX           look at length byte
8BCE:C8              27              INY                      of keepalive
8BCF:B1 2D           28              LDA      (STAKPTR),Y     length
8BD1:C9 21           29              CMP      #33             if too long
8BD3:B0 E2    8BB7   30              BCS      BADIR           quit
8BD5:18              31              CLC
8BD6:65 23           32              ADC      INDEX           add it to index
8BD8:85 23           33              STA      INDEX           to get real last byte of IR 8BDA:A4 24           34  KEEPIT      LDY      DIGIT           restore current index
8BDC:                35  * so we can compute keyptr
8BDC:                36  *
8BDC:98              37              TYA                      keyptr=stakptr+index
8BDD:18              38              CLC
8BDE:65 2D           39              ADC      STAKPTR
8BE0:85 93           40              STA      KEY.PTR.L
8BE2:A5 2E           41              LDA      STAKPTR+1
8BE4:69 00           42              ADC      #0
8BE6:85 94           43              STA      KEY.PTR.H
8BE8:                44  *
8BE8:22 92           45              JSR      \CLRINT         no keys
8BEA:                46  *
8BEA:B7 8E 03BBF0    47              BBC      LOOP2ND,DOITIRZ if 2nd time
8BED:67 8E 03BBF3    48              BBS      LOOPREPEAT,DOITIROUT if in repeatloop, no
delay
8BF0:17 8E 05BBF8    49  DOITIRZ     BBC      SAMEKEY,DOITIREXP or if same key down,
8BF3:20 09 A8        50  DOITIROUT   JSR      OUTPUT          then don't expand again
8BF6:80 40    8C38   51              BRA      DOITIRDONE
8BF8:20 CB 99        52  DOITIREXP   JSR      DISPC           else short delay &display "
C"
8BFB:                53  *
8BFB:A0 03           54              LDY      #3
8BFD:B1 93           55              LDA      (KEY.PTR.L),Y check one-shot bit
8BFF:93 05    8C06   56              BBC      4,A,            EXPRPT
8C01:20 06 A8        57              JSR      EXPAND          if one-shot, expand
8C04:80 32    8C38   58              BRA      DOITIRDONE      & exit (don't check for loo
p)
8C06:                59  *
8C06:                60  *
8C06:                61  * Expand: check number of times to send.  If one-shot, se
t one-shot
8C06:                62  * bit, expand & exit.  If 2 or more times, expand, then o
utput
8C06:                63  * n-2 times.
8C06:                64  *
8C06:A0 01           65  EXPRPT      LDY      #1
8C08:B1 93           66              LDA      (KEY.PTR.L),Y read numirs (bits 4-6)
8C0A:29 70           67              AND      #$70
8C0C:22 68           68              JSR      \LSR4
8C0E:8D 0D 7D        69              STA      NUMIRS          =number of sends -1
8C11:D0 13    8C26   70              BNE      TWOPLUS
8C13:                71  *
8C13:A0 03           72              LDY      #3              one time: set one-shot bit
```

```
8C15:B1 93           73             LDA    (KEY.PTR.L),Y
8C17:8B              74             SEB    4,A
8C18:91 93           75             STA    (KEY.PTR.L),Y
8C1A:20 06 A8        76             JSR    EXPAND        only sends once
8C1D:A0 03           77             LDY    #3
8C1F:B1 93           78             LDA    (KEY.PTR.L),Y
8C21:9B              79             CLB    4,A           now set it back to a repeater
8C22:91 93           80             STA    (KEY.PTR.L),Y
8C24:80 0D   8C33    81             BRA    IRLOOPCHECK   & see if it's in a loop
8C26:                82     *************
8C26:20 06 A8        83  TWOPLUS    JSR    EXPAND        sends twice
8C29:CE 0D 7D        84  TWOPLUS1   DEC    NUMIRS
8C2C:F0 05   8C33    85             BEQ    IRLOOPCHECK   done
8C2E:20 09 A8        86             JSR    OUTPUT        doitagain
8C31:80 F6   8C29    87             BRA    TWOPLUS1
8C33:                88  **
8C33:77 8E 02BC38    89  IRLOOPCHECK BBC  LOOPREPEAT,DOITIRDONE
8C36:AF 8E           90             SEB    LOOP2ND       set this for future repeats 8C38:CF FE           91  DOITIRDONE SEB   INT1ENBL      & back to normal
8C3A:                92  *
8C3A:                93  * (falls thru)
8C3A:                94  *
8C3A:                95  * do all timer x functions
8C3A:3C FF FD        96  SETTX.ALL  LDM    #$FF,TX
8C3D:3C FF FC        97             LDM    #$FF,TXPRE
8C40:5F FF           98             CLB    2,TCR
8C42:7F FF           99             CLB    3,TCR
8C44:CF FF          100             SEB    TXENBL
8C46:60             101             RTS
8C47:               102  *
8C47:               104  *
8C47:        8C47   105  INIT1.ram  equ    *
8C47:78             106             SEI
8C48:3C 0F 03       107             ldm    #15,const15
8C4B:3C 5F D0       108             ldm    #>in19200,int2vect
8C4E:3C 9C D1       109             ldm    #<in19200,int2vect+1
8C51:3C A5 DA       110             LDM    #>BREAK,BRKVECT
8C54:3C 8C DB       111             LDM    #<BREAK,BRKVECT+1 point BRK to sound/reset
8C57:FF 8A          112             CLB    ENABLEFLAG
8C59:FF 8E          113             CLB    STOPFLAG
8C5B:3C 5D D6       114             LDM    #>MYTX.ram,TXVECT   SET TX VECTOR TO MY ROUTINE
8C5E:3C 8E D7       115             LDM    #<MYTX.ram,TXVECT+1
8C61:               116  *
8C61:A9 00          117             lda    #0
8C63:8D AD 7E       118             sta    proglen
8C66:4C AA 8E       119             JMP    RESET.KEYS
8C69:               120  *
8C69:        8C69   121  INIT.CONT  equ    *             return here
8C69:               122  *
8C69:A9 F7          123             LDA    #KBUF4        clear 4-bit buffer!!
8C6B:22 0E          124             JSR    \PEEK256
8C6D:               125  *
8C6D:A9 00          126             LDA    #0
8C6F:22 1C          127             JSR    \POKE16
8C71:3C 5D D8       128             LDM    #>INT1.MULT,INT1VECT set up kbd routine
8C74:3C 91 D9       129             LDM    #<INT1.MULT,INT1VECT+1
8C77:               130  *
8C77:CF FE          131             SEB    INT1ENBL
8C79:               132  *
8C79:60             133             RTS
8C7A:               134  *
8C7A:A2 40          135  INIT2.RAM  LDX    #ZPLEN-1      clear zpage
8C7C:A9 00          136             LDA    #0
8C7E:4C 5E F1       137             JMP    INIT2A
8C81:               138  *****************
8C81:               139  *
```

```
8C81:                    141 *
8C81:                    142 * new INIT3 to initialize time
8C81:                    143 *
8C81:          8C81      144 init3.ram equ    *
8C81:20 28 F4            145           jsr    initstak
8C84:A9 OF               146           lda    #$f              clear kb.curr
8C86:A2 07               147           ldx    #7
8C88:9D 41 7A            148 iii       sta    kbd.curr,x
8C8B:CA                  149           dex
8C8C:10 FA     8C88      150           bpl    iii
8C8E:                    151 *
8C8E:58                  152           CLI                     allow ints
8C8F:5F 8E               153           CLB    OUTMEMFLAG
8C91:3C 00 8B            154           LDM    #0,MITSFLAG
8C94:                    155 *[check for move in progress]
8C94:                    156 *
8C94:DF FF               157           CLB    TXENBL
8C96:20 3A 8C            158           JSR    SETTX.ALL
8C99:3C OF 1D            159           LDM    #$F,DAY          Sunday
8C9C:20 39 F5            160           JSR    CLRSEC           to prevent illegal seconds
8C9F:20 80 F6            161           JSR    DISPTIME         includes Alarmto4
8CA2:4C OF F3            162           JMP    GOUSER            ends up at mainloop
8CA5:                    163 **
8CA5:                    164 *
8CA5:20 AB 8C            165 BREAK     JSR    HIPITCH          break (should be error): make sound
8CA8:4C 00 F1            166           JMP    $F100            and reset
8CAB:                    167 *
8CAB:3C 01 36            168 HIPITCH   LDM    #1,VAR1
8CAE:A9 28               169           LDA    #40
8CB0:4C AE 9C            170           JMP    SOUND
8CB3:                    171 *
8CB3:                    173 *
8CB3:                    174 * NEW FLASHING ROUTINES
8CB3:                    175 *
8CB3:A5 3C               176 EDITFLASH LDA    BYTE1D           bit3, byte1d
8CB5:49 08               177           EOR    #8
8CB7:80 0A     8CC3      178           BRA    GO1D
8CB9:                    179 *
8CB9:A5 3C               180 STEPFLASH LDA    BYTE1D           bit 1,byte1d
8CBB:49 02               181           EOR    #2
8CBD:80 04     8CC3      182           BRA    GO1D
8CBF:                    183 *
8CBF:A5 3C               184 BELLFLASH LDA    BYTE1D           bit 0,byte1d
8CC1:49 01               185           EOR    #1
8CC3:85 3C               186 GO1D      STA    BYTE1D
8CC5:                    187 *
8CC5:A2 1D               188 FLASH1D   LDX    #$1D
8CC7:A4 3C               189           LDY    BYTE1D
8CC9:80 0A     8CD5      190           BRA    FLASH1X
8CCB:                    191 *
8CCB:                    192 *
8CCB:A5 89               193 ATFLASH   LDA    BYTE1C
8CCD:49 04               194           EOR    #4               bit 2, byte1c
8CCF:85 89               195           STA    BYTE1C
8CD1:                    196 *
8CD1:A2 1C               197 FLASH1C   LDX    #$1C
8CD3:A4 89               198           LDY    BYTE1C
8CD5:                    199 *
8CD5:8A                  200 FLASH1X   TXA                     general poke routine: x=addr, y=value
8CD6:22 92               201           JSR    \CLRINT
8CD8:22 0E               202           JSR    \PEEK256         (use to be peek8)
8CDA:98                  203           TYA
8CDB:22 1C               204           JSR    \POKE16
8CDD:22 97               205           JSR    \ENBINT
8CDF:60                  206           RTS
8CE0:                    207 *
```

```
8CE0:            209 *
8CE0:            210 * turn on, off arrows
8CE0:            211 *
8CE0:7F 89       212 LEFTOFF   CLB   LABIT,BYTE1C
8CE2:80 ED  8CD1 213           BRA   FLASH1C
8CE4:6F 89       214 LEFTON    SEB   LABIT,BYTE1C
8CE6:80 E9  8CD1 215           BRA   FLASH1C
8CE8:3F 3C       216 RIGHTOFF  CLB   RABIT,BYTE1D
8CEA:80 D9  8CC5 217           BRA   FLASH1D
8CEC:2F 3C       218 RIGHTON   SEB   RABIT,BYTE1D
8CEE:80 D5  8CC5 219           BRA   FLASH1D
8CF0:            220 *
8CF0:            221 *
8CF0:20 6A 87    222 FILL.ARROWS JSR FILLDISP
8CF3:            223 *
8CF3:            224 * HANDLE LEFT & RIGHT ARROWS
8CF3:            225 *LEFTON IF PROGINDEX-CURRPOS>1
8CF3:A5 12       226 ARROWS    LDA   PROGINDEX
8CF5:38          227           SEC
8CF6:E5 14       228           SBC   CURRPOS
8CF8:C9 02       229           CMP   #2
8CFA:B0 05  8D01 230           BCS   ARROW1
8CFC:20 E0 8C    231           JSR   LEFTOFF
8CFF:80 03  8D04 232           BRA   ARROW3
8D01:20 E4 8C    233 ARROW1    JSR   LEFTON
8D04:            234 *RIGHTON IF PROGBUF>PROGINDEX-CURRPOS+7
8D04:A5 12       235 ARROW3    LDA   PROGINDEX
8D06:38          236           SEC
8D07:E5 14       237           SBC   CURRPOS
8D09:18          238           CLC
8D0A:69 07       239           ADC   #7
8D0C:CD 4A 7D    240           CMP   PROGBUF
8D0F:90 03  8D14 241           BCC   ARROW4
8D11:4C E8 8C    242           JMP   RIGHTOFF
8D14:4C EC 8C    243 ARROW4    JMP   RIGHTON
8D17:            244 *
8D17:            246 *
8D17:            247 * this is new RAM version of GOUSER
8D17:       8D17 248 GOUSER.RAM EQU *
8D17:20 2B F3    249           JSR   INITEM
8D1A:20 01 83    250           jsr   crashtest   REMOVE LATER
8D1D:3C 00 89    251           LDM   #0,BYTE1C   clr at, left arrow
8D20:3C FF 12    252           LDM   #$FF,PROGINDEX
8D23:20 27 98    253           JSR   CLRSTEP
8D26:A5 3A       254           LDA   FLASHACT
8D28:29 01       255           AND   #1          clr all except bell
8D2A:85 3A       256           STA   FLASHACT
8D2C:20 BC 83    257           JSR   FLASHBOTH   was flash1c
8D2F:20 C4 F8    258           JSR   DISPCURR
8D32:20 59 9B    259           JSR   ENABLECHECK
8D35:4C 24 F3    260 GORAM1    JMP   GOUSER1+3   back
8D38:            261 *
8D38:            262 * SET ALARM
8D38:            263 *
8D38:            264 *(we're now using a ram routine because of 1c-1d problem)
8D38:E7 8A 038D3E 265 SETALARM.RAM BBS ENABLEFLAG,SETAL11
8D3B:4C D0 9C    266           JMP   BLATT
8D3E:20 91 80    267 SETAL11   JSR   GOSET
8D41:            268 *
8D41:3C 01 31    269           LDM   #1,TIMEFLAG
8D44:A9 15       270           LDA   #ATKEY
8D46:22 AC       271           JSR   \PUTDISP.FF
8D48:            272 *
8D48:3C FF 12    273           LDM   #$FF,PROGINDEX
8D4B:4F 89       274           SEB   ATBIT,BYTE1C   solid "AT"
8D4D:20 BC 83    275           JSR   FLASHBOTH
8D50:            276 *
8D50:20 81 82    277           JSR   GETNEXT
8D53:            278 * CALL TIMESET INPUT ROUTINE
8D53:            279 *
```

```
8D53:20 73 F3      280 SETALXX  JSR    XTIME          timeinput w/o getting 1st key
8D56:              281 *
8D56:              282 * RETURN FROM SET ROUTINE
8D56:4C F3 F3      283          JMP    SETRTN         CAN WE GET HERE??
8D59:              284 *
8D59:              285 *
8D59:              287 *
8D59:              288 * (this is replacement for ROM routine because of
8D59:              289 * reference to LEFTON which was stubbed out
8D59:              290 *
8D59:              291 * DISPLAY CHARACTER AT CURRENT
8D59:              292 * DISPLAY POSITION (CURRPOS)
8D59:              293 *
8D59:              294 * ACC CONTAINS KEYNUM ON ENTRY
8D59:              295 *
8D59:         8D59 296 PUTDISP.RAM EQU *
8D59:85 22         297          STA    KEYNUM
8D5B:20 27 F8      298          JSR    GETCODE
8D5E:A5 14         299          LDA    CURRPOS
8D60:C9 07         300          CMP    #7
8D62:D0 08    8D6C 301          BNE    PUTDISPx
8D64:              302 *
8D64:C6 14         303          DEC    CURRPOS
8D66:20 2F F8      304          JSR    BLANKRIGHT     CURRPOS=7:SCROLL
8D69:20 E4 8C      305          JSR    LEFTON
8D6C:              306 *
8D6C:A5 14         307 PUTDISPx LDA    CURRPOS
8D6E:85 15         308          STA    SCRNPOS
8D70:20 DD 92      309          JSR    PUTONE.PATCH
8D73:A9 00         310          LDA    #0             for program only
8D75:85 27         311          STA    DISPVAL
8D77:85 28         312          STA    DISPVAL+1
8D79:E6 14         313          INC    CURRPOS
8D7B:60            314          RTS
8D7C:              315 *
8D7C:              316 *
8D7C:              318 *
8D7C:              319 * HANDLE DIRECT-DIGIT TIME INPUT
8D7C:              320 *
8D7C:              321 ****** this is replacement for ROM routine
8D7C:6F 32         322 DDG.RAM  SEB    ANYDIRECT
8D7E:22 9C         323          JSR    \CONVOF
8D80:85 24         324          STA    DIGIT
8D82:              325 * Convert hr to hrh,hrl in case we altered hr separately
8D82:20 03 F7      326          JSR    HR1TO2
8D85:              327 *
8D85:              328 * JSR OFFTIME this has been called in goset
8D85:A6 1E         329          LDX    TIMEDIG        WHICH DIGIT?
8D87:D0 13    8D9C 330          BNE    DDIG.1
8D89:              331 *
8D89:              332 * TIMEDIG = 0
8D89:              333 *
8D89:              334 *
8D89:A5 24         335          LDA    DIGIT
8D8B:C7 31 028D90  336          BBS    6,TIMEFLAG,DDIG.0A for interval
8D8E:F0 60    8DF0 337          BEQ    DDIG.NO        DON'T ALLOW 0 AS 1ST DIGIT
8D90:85 17         338 DDIG.0A  STA    HRL
8D92:A9 00         339          LDA    #0
8D94:85 1A         340          STA    MINL           CLEAR TIME VALUES
8D96:85 1B         341          STA    MINH
8D98:85 16         342          STA    HRH
8D9A:80 16    8DB2 343          BRA    PUT.DIGIT
8D9C:              344 *
8D9C:              345 ****************************************************
8D9C:              346 *
8D9C:              347 * TIMEDIG = 1
8D9C:              348 *
8D9C:CA            349 DDIG.1   DEX
8D9D:D0 0C    8DAB 350          BNE    DDIG.2
```

```
8D9F:A5 24           351            LDA     DIGIT
8DA1:C9 06           352            CMP     #6
8DA3:B0 4B   8DF0    353            BCS     DDIG.NO
8DA5:                354  *
8DA5:A5 24           355            LDA     DIGIT
8DA7:85 1B           356            STA     MINH
8DA9:80 07   8DB2    357            BRA     PUT.DIGIT
8DAB:                358  *
8DAB:                359  *****************************************************
8DAB:                360  *
8DAB:                361  * TIMEDIG = 2
8DAB:                362  *
8DAB:                363  *
8DAB:CA              364  DDIG.2    DEX
8DAC:D0 18   8DC6    365            BNE     DDIG.3
8DAE:A5 24           366  DDIG.2A   LDA     DIGIT
8DB0:85 1A           367            STA     MINL
8DB2:20 18 F7        368  PUT.DIGIT JSR     HR2TO1
8DB5:E6 1E           369            INC     TIMEDIG        next digit
8DB7:20 36 F4        370            JSR     CHECKFLAG
8DBA:30 09   8DC5    371            BMI     PUTDIG.4       program: don't display
8DBC:C7 31 038DC2    372            BBS     6,TIMEFLAG,PUTDIG.2 interval: use separat
e routine
8DBF:4C 58 F5        373            JMP     FIXTIME2
8DC2:20 A5 F7        374  PUTDIG.2  JSR     DISPINT        interval
8DC5:60              375  PUTDIG.4  RTS
8DC6:                376  *
8DC6:                377  *
8DC6:                378  *****************************************************
8DC6:                379  *
8DC6:                380  * TIMEDIG = 3
8DC6:                381  *   CHECK VALUES BEFORE SHIFTING
8DC6:                382  *
8DC6:                383  *
8DC6:CA              384  DDIG.3    DEX
8DC7:D0 27   8DF0    385            BNE     DDIG.NO
8DC9:C7 31 248DF0    386            BBS     6,TIMEFLAG,DDIG.NO for interval
8DCC:A5 16           387            LDA     HRH
8DCE:D0 20   8DF0    388            BNE     DDIG.NO
8DD0:A5 17           389            LDA     HRL
8DD2:C9 01           390            CMP     #1
8DD4:D0 1A   8DF0    391            BNE     DDIG.NO
8DD6:A5 1B           392            LDA     MINH
8DD8:C9 03           393            CMP     #3
8DDA:B0 14   8DF0    394            BCS     DDIG.NO
8DDC:A5 1A           395            LDA     MINL
8DDE:C9 06           396            CMP     #6
8DE0:B0 0E   8DF0    397            BCS     DDIG.NO
8DE2:                398  *
8DE2:                399  * SHIFT
8DE2:A5 17           400            LDA     HRL
8DE4:85 16           401            STA     HRH
8DE6:A5 1B           402            LDA     MINH
8DE8:85 17           403            STA     HRL
8DEA:A5 1A           404            LDA     MINL
8DEC:85 1B           405            STA     MINH
8DEE:80 BE   8DAE    406            BRA     DDIG.2A
8DF0:                407  *
8DF0:4C CD F3        408  DDIG.NO   JMP     ILLSET         much ado about this!!
8DF3:                409  *
8DF3:                410  *
8DF3:                412  *
8DF3:C7 31 128E08    413  UPDOWN.RAM BBS    6,TIMEFLAG,GOILLSET
8DF6:A5 22           414            LDA     KEYNUM         check for value in range (2
-7)
8DF8:29 0F           415            AND     #$F
8DFA:C9 08           416            CMP     #8
8DFC:B0 07   8E05    447            BCS     BADUPDOWN
8DFE:C9 02           418            CMP     #2
8E00:90 03   8E05    419            BCC     BADUPDOWN
```

```
8E02:4C 78 F5       420           JMP    UPDOWNX         ($F578)
8E05:4C 92 96       421 BADUPDOWN JMP    WEIRDINST
8E08:               422 *
8E08:4C CD F3       423 GOILLSET  JMP    ILLSET
8E0B:               424 *
8E0B:1F 1D          425 SETAM.RAM CLB    0,DAY
8E0D:80 02    8E11  426           BRA    SRAM1
8E0F:0F 1D          427 SETPM.RAM SEB    0,DAY
8E11:D7 31 038E17   428 SRAM1     BBC    6,TIMEFLAG,SRAM2
8E14:4C CD F3       429           JMP    ILLSET
8E17:4C 55 F5       430 SRAM2     JMP    SETAMPM1        back to ROM routine
8E1A:               431 *
8E1A:               432 *
8E1A:               434 *
8E1A:               435 *  MAIN KEYBOARD LOOP
8E1A:               436 *  (replaces ROM routine)
8E1A:20 5B 8F       437 MAINLOOP.RAM jsr checkcheck   for testing
8E1D:               438 *
8E1D:2F 34          439 MAINLA    SEB    ALARM.ENABLE    allow alarms
8E1F:57 34 038E25   440           BBC    ALARM.WAITING,MAINLX alarm pending?
8E22:20 E0 89       441           JSR    PROCESS.ALARM yes:execute it
8E25:20 4F 8B       442 MAINLX    JSR    GETQP           get current time-->tempalarm for
8E28:20 4D 9B       443           JSR    BUFTOTEMP       morelarms purposes
8E2B:               444 *
8E2B:0F 32          445 MainLR    Seb    MainFlag        ;Ok to do Mits stuff.
8E2D:20 C2 82       446           Jsr    GetKey          ;Get next Key (could be alarm).
8E30:1F 32          447 MAIN2     Clb    MainFlag        ;We're out of main now.
8E32:3F 34          448           CLB    ALARM.ENABLE    prevent alarms till done w current action
8E34:C9 20          449           CMP    #32
8E36:B0 E2    8E1A  450           BCS    MAINLOOP.RAM    if by some chance an illegal key got in
8E38:C9 03          451           cmp    #3              for new Page
8E3A:D0 05    8E41  452           bne    main1b
8E3C:20 99 92       453           JSR    FIXPAGE         do Page separately
8E3F:80 D9    8E1A  454           bra    mainloop.ram
8E41:               455 *
8E41:               456 * GET ADDR OF ROUTINE TO JSR TO  DEPENDING ON KEY
8E41:C9 14          457 main1b    CMP    #$14            not xmode,xkey
8E43:B0 06    8E4B  458           BCS    MAINLR1
8E45:C9 04          459           CMP    #4              mode or key?
8E47:A9 12          460           LDA    #$12
8E49:69 00          461           ADC    #0              $12 if 0-3, $13 if 4-$13
8E4B:               462 *
8E4B:0A             463 MAINLR1   ASL    A
8E4C:AA             464           TAX                    KEYNUM * 2 = INDEX
8E4D:BD 51 80       465           LDA    MAINRTNS-$24,X
8E50:85 2F          466           STA    ZPJSR
8E52:BD 52 80       467           LDA    MAINRTNS-$23,X
8E55:85 30          468           STA    ZPJSR+1
8E57:               469 *
8E57:A5 22          470           LDA    KEYNUM
8E59:02 2F          471           JSR    (ZPJSR)
8E5B:80 BD    8E1A  472           BRA    MAINLOOP.RAM
8E5D:               473 *
8E5D:               474 ***********************************************
8E5D:               475 ***********************************************
8E5D:               476 *
8E5D:               478 *
8E5D:               479 * new timer x int
8E5D:               480 *
8E5D:C6 1F          481 MYTX.RAM  dec    flashtime
8E5F:C6 21          482           dec    eighths
8E61:10 05    8E68  483           bpl    mytx.ram2
8E63:C6 20          484           dec    sectime         GETS DEC'D EVERY 8 TIMES
8E65:3C 07 21       485           ldm    #7,eighths      reset
8E68:         8E68  486 mytx.ram2 equ    *
8E68:68             487           pla
8E69:40             488           rti
8E6A:               489 *
```

```
8E6A:                         491 *
8E6A:            8E6A         492 DELETETIME.RAM EQU *      don't allow unless program
8E6A:E7 31 038E70             493           BBS    7,TIMEFLAG,DELETEIT.RAM
8E6D:4C 28 9D                 494           JMP    ILLSET.RAM
8E70:                         495 *
8E70:            8E70         496 DELETEIT.RAM EQU *
8E70:A5 31                    497           LDA    TIMEFLAG             don't allow for alarm or interval
8E72:30 04       8E78         498           BMI    RDELETE0             [this may be changed]
8E74:29 01                    499           AND    #1
8E76:D0 06       8E7E         500           BNE    RDELETE2
8E78:           8E78           501 RDELETE0 EQU    *
8E78:A5 14                    502           LDA    CURRPOS              don't go back to 1st pos
8E7A:C9 02                    503           CMP    #2
8E7C:B0 03       8E81         504           BCS    RDELETE1
8E7E:                         505 *
8E7E:4C D0 9C                 506 RDELETE2  JMP    BLATT                return to where we came from
8E81:                         507 *
8E81:AF 34                    508 RDELETE1  SEB    DELETEFLAG           to prevent blatt
8E83:20 DA 83                 509           JSR    CURSOROFF            turn off cursor
8E86:C6 14                    510           DEC    CURRPOS
8E88:A9 1C                    511           LDA    #ENABLEKEY
8E8A:20 51 F3                 512           JSR    STUFFONE             will be displayed blank
8E8D:AE 98 7E                 513           LDX    MAINSTAK             reset stack
8E90:9A                       514           TXS
8E91:4C B9 87                 515           JMP    SYNTAXCHECK          and will halt syntax check
8E94:                         516 *
8E94:                         517 *
8E94:            8E94         518 DELETE.PATCH EQU *        check for enableflag when deleting alarm
8E94:E7 8A 038E9A             519           BBS    ENABLEFLAG,DELOK
8E97:4C 6C 89                 520           JMP    REVKEY3
8E9A:20 85 89                 521 DELOK     JSR    DELETE.ALARM
8E9D:4C 77 89                 522           JMP    REVDEL1
8EA0:                         523 *
8EA0:                         525 *
8EA0:                         526 * peek 1 nybble: like \peek8 except no sei/cli
8EA0:22 0E                    527 PEEKIT    JSR    \PEEK256
8EA2:97 EC FD8EA2             528           BBC    ACK4,*
8EA5:A5 EC                    529           LDA    FROM4
8EA7:29 0F                    530           AND    #$F
8EA9:60                       531           RTS
8EAA:                         532 *
8EAA:                         533 * check for key held down in reset
8EAA:                         534 *
8EAA:            8EAA         535 RESET.KEYS EQU *
8EAA:A9 55                    536           LDA    #$55                 read 2nd row
8EAC:20 A0 8E                 537           JSR    PEEKIT
8EAF:C9 07                    538           CMP    #$7
8EB1:D0 0D       8EC0         539           BNE    C.KEY
8EB3:A9 00                    540           LDA    #0                   D:download
8EB5:8D 00 80                 541           STA    $8000
8EB8:AD 00 80                 542           LDA    $8000                if write protected, don't go to download
8EBB:D0 1A       8ED7         543           BNE    R.OUT1
8EBD:4C 00 F0                 544           JMP    $F000
8EC0:                         545 *
8EC0:C9 0B                    546 C.KEY     CMP    #$B
8EC2:D0 16       8EDA         547           BNE    B.KEY
8EC4:A9 AB                    548           LDA    #$AB                 C:clear
8EC6:8D 1B 7D                 549           STA    FIRSTFLAG
8EC9:80 09       8ED4         550           BRA    R.OUT0
8ECB:A9 54                    551 R.OUT     LDA    #$54                 a- key
8ECD:20 A0 8E                 552           JSR    PEEKIT
8ED0:C9 0E                    553           CMP    #$E
8ED2:D0 03       8ED7         554           BNE    R.OUT1
8ED4:20 2A 8F                 555 R.OUT0    JSR    CLEARQ
8ED7:                         556 *
8ED7:4C 69 8C                 557 R.OUT1    JMP    INIT.CONT
```

```
8EDA:C9 0D           558 B.KEY      CMP    #$D
8EDC:D0 0B    8EE9   559            BNE    A.KEY
8EDE:AD 00 B8        560            LDA    $B800          B:test system
8EE1:C9 4C           561            CMP    #$4C           make sure JMP is there
8EE3:D0 EF    8ED4   562            BNE    R.OUT0
8EE5:58              563            CLI
8EE6:4C 00 B8        564            JMP    $B800
8EE9:                565 *
8EE9:C9 0E           566 A.KEY      CMP    #$E
8EEB:D0 DE    8ECB   567            BNE    R.OUT
8EED:EE AD 7E        568            inc    proglen
8EF0:AD 02 A0        569            LDA    $A002          A:monitor
8EF3:C9 A2           570            CMP    #$A2           make sure LDX is there
8EF5:D0 D4    8ECB   571            BNE    R.OUT
8EF7:58              572            CLI
8EF8:4C 02 A0        573            JMP    $A002
8EFB:                574 *
8EFB:                575 *
8EFB:                576 * INITIALIZE RAM POINTERS
8EFB:                577 *
8EFB:         8EFB   578 INIT.PTRS  EQU    *
8EFB:20 E0 99        579            jsr    calcsum        compute checksum initially
8EFE:A5 37           580            lda    incr
8F00:8D 28 7D        581            sta    checksum
8F03:A5 38           582            lda    incr+1
8F05:8D 29 7D        583            sta    checksum+1
8F08:A0 0B           584            LDY    #11            initialize all 12 ptrs
8F0A:20 51 8F        585            JSR    INITRAM
8F0D:                586 *
8F0D:AD 06 7D        587            LDA    KEYDEFS        move pointers to zero-page
8F10:85 29           588            STA    DEFPTR
8F12:AD 07 7D        589            LDA    KEYDEFS+1
8F15:85 2A           590            STA    DEFPTR+1
8F17:                591 *
8F17:A0 05           592            LDY    #5             move startdefs
8F19:B9 E4 80        593 INITP1     LDA    STARTDEFS,Y
8F1C:91 29           594            STA    (DEFPTR),Y
8F1E:88              595            DEY
8F1F:10 F8    8F19   596            BPL    INITP1
8F21:                597 *
8F21:20 2A 8F        598            JSR    CLEARQ         initialize queue
8F24:A9 00           599            LDA    #0
8F26:8D 1B 7D        600            STA    FIRSTFLAG
8F29:60              601            RTS
8F2A:                602 *
8F2A:A0 05           603 CLEARQ     LDY    #5
8F2C:20 51 8F        604            JSR    INITRAM
8F2F:                605 *
8F2F:AD 00 7D        606            LDA    ALARMQ
8F32:85 2B           607            STA    ZP1
8F34:AD 01 7D        608            LDA    ALARMQ+1
8F37:85 2C           609            STA    ZP1+1
8F39:AD 02 7D        610            LDA    QPTR
8F3C:85 2D           611            STA    STAKPTR
8F3E:AD 03 7D        612            LDA    QPTR+1
8F41:85 2E           613            STA    STAKPTR+1
8F43:A0 09           614            LDY    #9             INIT DEFS & ALARM Q
8F45:A9 00           615 CQ1        LDA    #0
8F47:91 2B           616            STA    (ZP1),Y
8F49:A9 FF           617            LDA    #$FF
8F4B:91 2D           618            STA    (STAKPTR),Y
8F4D:88              619            DEY
8F4E:10 F5    8F45   620            BPL    CQ1
8F50:60              621            RTS
8F51:                622 * initialize y+1 pointers
8F51:                623 *
8F51:B9 EA 80        624 INITRAM    LDA    RAMPTRS,Y
8F54:99 00 7D        625            STA    ALARMQ,Y
8F57:88              626            DEY
8F58:10 F7    8F51   627            BPL    INITRAM
8F5A:60              628            RTS
```

```
8F5B:                    629 *
8F5B:                    630 *
8F5B:                    631 * temporary test routine for checksum
8F5B:                    632 *
8F5B:20 E0 99            633 checkcheck jsr  calcsum
8F5E:A5 37               634         lda  incr
8F60:CD 28 7D            635         cmp  checksum
8F63:D0 07    8F6C       636         bne  badsum
8F65:A5 38               637         lda  incr+1
8F67:CD 29 7D            638         cmp  checksum+1
8F6A:F0 09    8F75       639         beq  goahead
8F6C:20 C9 9C            640 badsum  jsr  goodsound
8F6F:20 C9 9C            641         jsr  goodsound
8F72:20 C9 9C            642         jsr  goodsound
8F75:60                  643 goahead rts
8F76:                     33         include nocopy
8F76:                      2 * NOCOPY
8F76:                      3 *
8F76:                      4 * this file contains routines and patches which implement the
8F76:                      5 * "no copy key" rule for learning ir's
8F76:                      6 *
8F76:                      7 * the following is a replacement for the learn routine
8F76:                      8 *
8F76:37 32 098F82          9 LEARN.RAM BBC  KEYINPUT,LEARNON allow learn for alarm- or-
8F79:                     10 * interval-setting within executing program
8F79:E7 8A 068F82         11         BBS  ENABLEFLAG,LEARNON
8F7C:                     12 * [allow in alarm/interval syntax??]
8F7C:20 D0 9C             13         JSR  BLATT      not enabled
8F7F:4C 0C F3             14         JMP  ENDLEARN
8F82:                     15 *
8F82:BF 33                16 LEARNON CLB  DASHFLAG
8F84:A5 31                17         LDA  TIMEFLAG
8F86:D0 0C    8F94        18         BNE  LEARNR     only do capture in DIRECT LEARN
8F88:37 32 098F94         19         BBC  KEYINPUT,LEARNR
8F8B:07 8B 068F94         20         BBS  MITSMODE,LEARNR don't capture if mits
8F8E:47 8E 038F94         21         BBS  OUTMEMFLAG,LEARNR don't capture if too many
8F91:20 3A 90             22         JSR  GOCAPTURE.NOCOPY
8F94:                     23 * falls thru with keypress or alarms or max IRs
8F94:                     24 *
8F94:         8F94        25 LEARNR  equ  *          continue w normal
8F94:20 32 99             26         JSR  NEXTLEARN  get next input
8F97:                     27 *
8F97:C9 1A                28 LEARNOR CMP  #DELETE
8F99:D0 05    8FA0        29         BNE  LEARN1R
8F9B:20 70 8E             30 LEARNO1R JSR DELETEIT.RAM DELETE
8F9E:80 D6    8F76        31         BRA  LEARN.RAM  gets here only if delete illegal
8FA0:                     32 *****************************
8FA0:                     33 *
8FA0:C9 1F                34 LEARN1R CMP  #OKKEY     OK
8FA2:D0 1A    8FBE        35         BNE  LEARN1BR
8FA4:                     36 *
8FA4:17 31 038FAA         37         BBC  0,TIMEFLAG,LEARN1CR this test IS nec.
8FA7:F7 32 3A8FE4         38         BBC  DONEALARM,ILLEGALR if alarm & not done, don't allow OK
8FAA:                     39 *
8FAA:22 A9                40 LEARN1CR JSR \STUFFIT.FF
8FAC:                     41 *
8FAC:C6 13                42         DEC  NEST
8FAE:D0 06    8FB6        43         BNE  LEARN1AR
8FB0:47 8E CF8F82         44         BBS  OUTMEMFLAG,LEARNON
8FB3:                     45 *
8FB3:4C CF F2             46 LEND    JMP  ENDDO      LAST OK
8FB6:                     47 *
8FB6:3C 00 31             48 LEARN1AR LDM #0,TIMEFLAG IN CASE WE WERE IN DO-ALARM
```

```
8FB9:                       49 *           NOT LAST OK
8FB9:20 19 F4               50             JSR     CLRTARG
8FBC:80 B8      8F76        51             BRA     LEARN.RAM
8FBE:                       52 ********************************
8FBE:                       53 *
8FBE:                       54 * NOT "OK": IF DONEALARM, ALL INPUT ILLEGAL
8FBE:E7 32 238FE4           55 LEARN1BR  BBS     DONEALARM,ILLEGALR
8FC1:                       56 *
8FC1:                       57 *
8FC1:20 69 92               58 LEARN4R   JSR     CHECKPAGE    0-F OR A- TO D-
8FC4:F0 12      8FD8        59             BEQ     LEARN5R
8FC6:                       60 *
8FC6:17 31 028FCB           61             BBC     0,TIMEFLAG,LEARN4CR
8FC9:                       62 *
8FC9:                       63 *
8FC9:                       64 ** IF PROGRAMMING AN ALARM, WE CAN'T ALLOW ANY MORE INPUT
8FC9:                       65 * EXCEPT "OK"; THEREFORE DONEALARM = 1
8FC9:EF 32                  66             SEB     DONEALARM
8FCB:                       67 *
8FCB:E0 02                  68 LEARN4CR  CPX     #2
8FCD:F0 03      8FD2        69             BEQ     LEARN4DR
8FCF:4C 02 F2               70             JMP     LEARNCHAR    (preserved back in ROM)
8FD2:                       71 *
8FD2:                       72 * DIRECT MODE (A- TO D-)
8FD2:A7 32 0F8FE4           73 LEARN4DR  BBS     ALARMMODE,ILLEGALR
8FD5:                       74 *
8FD5:4C 6E F2               75             JMP     DLEARNMODE
8FD8:                       76 *
8FD8:                       77 ********************************
8FD8:C9 03                  78 LEARN5R   CMP     #PAGEKEY
8FDA:D0 0B.     8FE7        79             BNE     LEARN5BR
8FDC:                       80 *
8FDC:A7 32 058FE4           81             BBS     ALARMMODE,ILLEGALR    MODE ALREADY SET?
8FDF:                       82 *
8FDF:22 A9                  83             JSR     \STUFFIT.FF    ;MODE
8FE1:4C 59 92               84             JMP     LEARNPAGE
8FE4:                       85 *
8FE4:4C DE 9C               86 ILLEGALR  JMP     ILLEGAL.R    for branching
8FE7:                       87 ********************************
8FE7:                       88 *
8FE7:                       89 *   THE FOLLOWING KEYS ARE NOT ALLOWED IN ALARM PROGRAMMING
8FE7:                       90 *
8FE7:07 31 FA8FE4           91 LEARN5BR  BBS     0,TIMEFLAG,ILLEGALR
8FEA:                       92 *
8FEA:                       93 *
8FEA:                       94 *
8FEA:C9 1E                  95 LEARN2R   CMP     #DOKEY
8FEC:D0 08      8FF6        96             BNE     LEARN3R
8FEE:20 01 F4               97             JSR     CHECKTARG    ;DO
8FF1:F0 F1      8FE4        98             BEQ     ILLEGALR
8FF3:                       99 *
8FF3:4C B9 F1              100             JMP     MAINDO2      LEGAL TARGET
8FF6:                      101 ********************************
8FF6:                      102 *
8FF6:C9 21                 103 LEARN3R   CMP     #IRSYMBOL    can only happen if keyinput = 0
8FF8:F0 04      8FFE       104             BEQ     LEARN3RA
8FFA:C9 23                 105             CMP     #ONESHOT
8FFC:D0 05      9003       106             BNE     LEARN6R
8FFE:22 A9                 107 LEARN3RA  JSR     \STUFFIT.FF    ;IR
9000:                      108 *
9000:4C 76 8F              109             JMP     LEARN.RAM
9003:                      110 ********************************
9003:                      111 *
9003:                      112 * [may want to allow this for alarm:]
9003:C9 1D                 113 LEARN6R   CMP     #KEYKEY
9005:D0 05      900C       114             BNE     LEARN7R
9007:22 A9                 115             JSR     \STUFFIT.FF    ;KEY
```

```
9009:4C 80 92    116           JMP     LEARNKEY
900C:            117 *
900C:            118 ***********************************
900C:            119 *
900C:C9 15       120 LEARN7R   CMP     #ATKEY
900E:D0 03  9013 121           BNE     LEARN8R
9010:4C F3 92    122           JMP     DOALARM.RAM    ;AT
9013:            123 *
9013:            124 ***********************************
9013:C9 14       125 LEARN8R   CMP     #SETKEY
9015:D0 03  901A 126           BNE     LEARN9R
9017:4C 8E F4    127           JMP     DOSET          ;SET
901A:            128 ***********************************
901A:C9 19       129 LEARN9R   CMP     #WAITKEY
901C:D0 09  9027 130           BNE     LEARN10R
901E:3C C1 31    131           LDM     #$C1,TIMEFLAG WAIT
9021:            132 *
9021:3C 00 1E    133           LDM     #0,TIMEDIG
9024:4C 22 93    134           JMP     INTERVALS.RAM
9027:            135 ***********************************
9027:       9027 136 LEARN10R  EQU     *
9027:C9 1B       137           CMP     #BEGINLOOP     ;BEGIN LOOP
9029:D0 05  9030 138           BNE     LEARN11R
902B:22 A9       139           JSR     \STUFFIT.FF
902D:4C CB 98    140           JMP     LEARNLOOP
9030:            141 *
9030:C9 16       142 LEARN11R  CMP     #EDITKEY
9032:D0 B0  8FE4 143           BNE     ILLEGALR
9034:            144 * if here we broke out of capture
9034:20 97 90    145           JSR     GOTIR3         process stuff
9037:4C 94 8F    146           JMP     LEARNR         process next key
903A:            147 *
903A:            149 *
903A:            150 * new version of GOCAPTURE to allow for NOCOPY
903A:            151 *
903A:3C 02 95    152 GOCAPTURE.NOCOPY LDM #2,TIMEOUT
903D:22 92       153 GCN1      JSR     \CLRINT
903F:A6 4F       154           LDX     KB.PTR         if any unprocessed keys,
9041:E4 4E       155           CPX     KB.END
9043:F0 10  9055 156           BEQ     GONO
9045:B5 3D       157           LDA     KB,X
9047:10 09  9052 158           BPL     GCN2           if keyup, adjust pointers
9049:EF 34       159           SEB     CAPTUREFLAG
904B:20 C7 9A    160           JSR     MOREKEYS
904E:FF 34       161           CLB     CAPTUREFLAG
9050:80 EB  903D 162           BRA     GCN1
9052:22 97       163 GCN2      JSR     \ENBINT
9054:60          164           RTS                    process 'em before capturing
9055:            165 *
9055:20 1D 88    166 GONO      JSR     ALARMOFF       disable 4-bitter alarm
9058:AD 02 7D    167           lda     qptr           save current alarmq ptr
905B:8D 1E 7D    168           sta     qptrsave
905E:AD 03 7D    169           lda     qptr+1
9061:8D 1F 7D    170           sta     qptrsave+1
9064:20 18 82    171 GOCAPTURE1 jsr    insertir       (computes diff, irptr)
9067:            172 *
9067:            173 * ADD 2 MIN TO CURRENT TIME & CREATE ALARM
9067:            174 *
9067:20 E8 F4    175 GOCAPTURE0 jsr    readtitime
906A:9F 33       176           clb     acttime        because time has to carry
906C:20 FB 93    177           JSR     INCMINZ
906F:20 FB 93    178           JSR     INCMINZ
9072:20 09 F5    179           jsr     writeaqtime    write time to 4-bitter
9075:20 10 88    180           jsr     alarmon        enable 4-bit alarm
9078:8F 33       181           seb     acttime
907A:            182 *
907A:22 92       183           JSR     \CLRINT        turn off timer interrupt for cursor
907C:DF 3B       184           clb     cursorbit,flashon 'off' so it will go 'on'
```

```
907E:20 C9 83      185              jsr      cursorflash    turn on cursor
9081:              186 *
9081:         9081 187 GOCAPTURE2 EQU *                     means current alarm not in
q
9081:22 92         188              JSR      \CLRINT        turn off ints before captu
re
9083:BA            189              TSX
9084:8E 49 7A      190              STX      CAPTURESTACK
9087:EF 34         191              SEB      CAPTUREFLAG    so interrupt will go to INT
CAPTURE
9089:CF FE         192              SEB      INT1ENBL
908B:3C 02 95      193              LDM      #2,TIMEOUT
908E:20 00 A8      194              JSR      CAPTURE        go to capture routine
9091:              195 *
9091:              196 * if we return from capture, we've got an IR
9091:              197 *
9091:22 92         198 GOTIR        JSR      \CLRINT
9093:FF 34         199              CLB      CAPTUREFLAG
9095:22 97         200              JSR      \ENBINT        can allow now
9097:A5 95         201 GOTIR3       LDA      TIMEOUT
9099:C9 02         202              CMP      #2
909B:B0 16    90B3 203              BCS      GOTIR2
909D:              204 *
909D:              205 * good capture:
909D:20 8D 94      206              JSR      STACKPAGE      see if enuf room at above e
ndstack
90A0:B0 52    90F4 207              BCS      TOOMUCH
90A2:A5 2B         208              LDA      ZP1            ok: transfer to keyptr
90A4:85 93         209              STA      KEY.PTR.L
90A6:A5 2C         210              LDA      ZP1+1
90A8:85 94         211              STA      KEY.PTR.H
90AA:20 03 A8      212              JSR      COMPRESS
90AD:A5 95         213              LDA      TIMEOUT
90AF:C9 10         214              CMP      #16
90B1:D0 05    90B8 215              BNE      GOTIR1
90B3:              216 *
90B3:20 D0 9C      217 GOTIR2       JSR      BLATT          bad capture or compress
90B6:80 5E    9116 218              BRA      WAITSOME       delay
90B8:              219 *
90B8:              220 * good capture: now check to see if there's enough room
90B8:              221 * in IRDATA, then transfer ir
90B8:A0 00         222 GOTIR1       LDY      #0
90BA:B1 93         223              LDA      (KEY.PTR.L),Y  get length
90BC:C9 21         224              CMP      #33            if too long, try again
90BE:B0 F3    90B3 225              BCS      GOTIR2
90C0:85 36         226              STA      VAR1
90C2:              227 *
90C2:              228 * if repeater, set default send value to 2
90C2:A0 03         229              LDY      #3
90C4:B1 93         230              LDA      (KEY.PTR.L),Y
90C6:83 0C    90D4 231              BBS      4,A,GOTIR1A
90C8:A0 01         232              LDY      #1
90CA:B1 93         233              LDA      (KEY.PTR.L),Y  repeater: set hinybble to 1
90CC:29 0F         234              AND      #$F
90CE:09 10         235              ORA      #$10
90D0:91 93         236              STA      (KEY.PTR.L),Y
90D2:80 04    90D8 237              BRA      GOTIR1B
90D4:A0 01         238 GOTIR1A      LDY      #1
90D6:B1 93         239              LDA      (KEY.PTR.L),Y
90D8:              240 * see if there's a keepalive
90D8:29 02         241 GOTIR1B      AND      #2
90DA:F0 0D    90E9 242              BEQ      NOKEEP
90DC:C9 21         243              CMP      #33
90DE:B0 D3    90B3 244              BCS      GOTIR2         if too long, try again
90E0:A4 36         245              LDY      VAR1           1st length
90E2:B1 93         246              LDA      (KEY.PTR.L),Y  2nd length
90E4:18            247              CLC
90E5:65 36         248              ADC      VAR1
90E7:85 36         249              STA      VAR1
90E9:A5 36         250 NOKEEP       LDA      VAR1
```

```
90EB:18              251              CLC
90EC:65 25           252              ADC    DIFF
90EE:B0 04    90F4   253              BCS    TOOMUCH
90F0:C9 FA           254              CMP    #250
90F2:90 06    90FA   255              BCC    NOTMUCH
90F4:20 7D 94        256  TOOMUCH     JSR    BLATT2
90F7:4C 67 90        257              JMP    GOCAPTURE0     no room:try again
90FA:                258  *
90FA:A0 00           259  NOTMUCH     LDY    #0             move data to IRDATA
90FC:B1 93           260  NOT1        LDA    (KEY.PTR.L),Y
90FE:91 2F           261              STA    (IRPTR),Y
9100:C8              262              INY
9101:C4 36           263              CPY    VAR1
9103:90 F7    90FC   264              BCC    NOT1
9105:                265  *
9105:20 C9 9C        266              JSR    GOODSOUND      good one
9108:                267  *
9108:A0 03           268              LDY    #3             check one-shot bit
910A:B1 93           269              LDA    (KEY.PTR.L),Y
910C:93 04    9112   270              BBC    4,A,NOT2       if set, oneshot
910E:A9 23           271              LDA    #ONESHOT
9110:80 02    9114   272              BRA    NOT3
9112:A9 21           273  NOT2        LDA    #IRSYMBOL      (this may be a different #)

9114:22 A9           274  NOT3        JSR    \STUFFIT.FF    put in program
9116:20 24 91        275  WAITSOME    JSR    WAITASEC
9119:20 19 9B        276              JSR    MORETIME       update display time
911C:22 92           277              JSR    \CLRINT
911E:20 E6 92        278              JSR    RESTOREQ
9121:4C 3A 90        279              JMP    GOCAPTURE.NOCOPY set up for next capture 9124:                280  *                  (get keys 1st)
9124:                281  *
9124:A9 0A           282  WAITASEC    LDA    #10            1 second delay
9126:48              283  WAITASEC1   PHA
9127:A9 64           284              LDA    #100
9129:20 0F A8        285              JSR    MILLIWAIT
912C:68              286              PLA
912D:1A              287              DEC
912E:D0 F6    9126   288              BNE    WAITASEC1
9130:60              289              RTS
9131:                290  *
9131:                291  * if here, we were interrupted by a keypress or alarm
9131:                292  * (captureflag was cleared)
9131:                293  *
9131:78              294  INTCAPTURE  SEI
9132:A6 4F           295              ldx    kb.ptr         check next key: if keyup, try again
9134:B5 3D           296              lda    kb,x
9136:58              297              cli
9137:10 15    914E   298              BPL    CAPTUREOUT     hibit set = keyup
9139:C9 B0           299              CMP    #ALARMVAL      or alarm
913B:D0 09    9146   300              BNE    GOCAPTURE3
913D:20 E6 92        301              JSR    RESTOREQ       put alarm back
9140:20 00 88        302              JSR    ALARMTO4       & in 4-bitter
9143:4C 0C F3        303              JMP    ENDLEARN       timeout: exit
9146:EF 34           304  GOCAPTURE3  SEB    CAPTUREFLAG
9148:20 C7 9A        305              jsr    morekeys       will update ptrs
914B:4C 3A 90        306              JMP    GOCAPTURE.NOCOPY
914E:                307  *
914E:20 E6 92        308  CAPTUREOUT  JSR    RESTOREQ       keypress: restore alarm
9151:47 34 06 915A   309              BBS    ALARM.WAITING,CAPTOUT1 if already 1 waiting, skip
9154:                310  *
9154:20 A3 FA        311              JSR    DEFQPTR
9157:20 97 8A        312              JSR    MORE1          replaces call to morealarms 915A:                313  *
915A:4C 3A 8C        314  CAPTOUT1    JMP    SETTX.ALL
915D:                315  *
915D:                316  *******************************
```

```
915D:           318 * 
915D:           319 * new keyboard interrupt handler
915D:           320 *
915D:           321 * (preceded by int1rom:
915D:           322 * clt, pha, lda tcr, seb memxpnd, jmp (int1vect)
915D:           323 *
915D:      915D 324 INT1.MULT EQU    *
915D:22 92      325           JSR   \CLRINT         to avoid re-interruption
915F:           326 * acc already pushed above!
915F:58         327           CLI                   allow battery interrupt
9160:98         328           TYA                   preserve y
9161:48         329           PHA
9162:8A         330           TXA                   preserve x
9163:48         331           PHA
9164:           332 *
9164:A9 F7      333           LDA   #KBUF4          # of keys in buffer
9166:22 0E      334           JSR   \PEEK256        get value
9168:           335 *
9168:A9 00      336           LDA   #0              now clear it
916A:22 1C      337           JSR   \POKE16
916C:A5 EC      338           LDA   FROM4           data from previous peek
916E:29 0F      339           AND   #$F             clr hi nybble
9170:8D 40 7A   340           STA   ROW.PTR         save it
9173:F0 35 91AA 341           BEQ   INT1END         if zero, exit: NO KEYS!
9175:A8         342           TAY                   buffer index
9176:8D 40 7A   343           STA   ROW.PTR         save it
9179:18         344           CLC
917A:69 60      345           ADC   #$60            addr of highest row.data
917C:48         346           PHA                     save it on stack
917D:69 10      347           ADC   #$10            address of highest row.num
917F:22 0E      348           JSR   \PEEK256        peek 1st row.num
9181:           349 *
9181:           350 * read row values
9181:           351 *
9181:1A         352 PEEKROW   DEC   A               read next lower byte
9182:88         353           DEY                   next one
9183:30 10 9195 354           BMI   GETDATA         if minus, continue w rowdata
9185:D0 01 9188 355           BNE   PEEKROW1
9187:68         356           PLA                   if zero, we're done w rown
ums so
9188:           357 *                               peek $60+row.ptr to set up
9188:22 0E      358 PEEKROW1  JSR   \PEEK256        read one
918A:48         359           PHA
918B:A5 EC      360           LDA   FROM4           data from previous peek
918D:29 0F      361           and   #$f
918F:99 21 7A   362           STA   ROW.NUM+1,Y
9192:68         363           PLA
9193:80 EC 9181 364           BRA   PEEKROW         repeat
9195:           365 *
9195:           366 *
9195:AC 40 7A   367 GETDATA   LDY   ROW.PTR
9198:1A         368 PEEKDATA  DEC   A               read next lower
9199:22 0E      369           JSR   \PEEK256
919B:48         370           PHA
919C:A5 EC      371           LDA   FROM4           data from prev peek
919E:29 0F      372           and   #$f
91A0:99 30 7A   373           STA   ROW.DATA,Y
91A3:68         374           PLA
91A4:88         375           DEY
91A5:D0 F1 9198 376           BNE   PEEKDATA        if zero we're done
91A7:           377 *
91A7:20 BE 91   378           JSR   CREATE.KB       routine to get keynums (can
be inline)
91AA:           379 *
91AA:      91AA 380 INT1END   EQU   *
91AA:           381 *
91AA:           382 * restore regs & return
91AA:           383 *
91AA:68         384           PLA
```

```
91AB:AA           385            TAX                        restore x
91AC:68           386            PLA
91AD:A8           387            TAY                        restore y
91AE:68           388            PLA                        restore a
91AF:22 97        389            JSR    \ENBINT             allow further ints
91B1:             390 *
91B1:E7 34 0191B5 391            BBS    CAPTUREFLAG,ABORT.CAPTURE in capture?
91B4:40           392            RTI                        no
91B5:             393 *
91B5:FF 34        394 ABORT.CAPTURE CLB CAPTUREFLAG
91B7:AE 49 7A     395            LDX    CAPTURESTACK   restore stack ptr to what
91BA:             396 * it was when capture was called
91BA:9A           397            TXS
91BB:4C 31 91     398            JMP    INTCAPTURE     & go back
91BE:             399 *
91BE:             400 *
91BE:             401 * kb.end points to next available location.
91BE:             402 * if kb.beg = kb.beg, no key
91BE:             403 *
91BE:             404 * getkey routine should look at codes starting at kb.beg
91BE:             405 * if key down (msb=0), process key (with exception of capture)
91BE:             406 * DON'T INCREMENT KB.BEG UNTIL KEY GOES UP.
91BE:             407 * then look at next key:
91BE:             408 * if there is a key up, search back until finding corresponding
91BE:             409 *   keydown; set flag (bit 7) to indicate this key not active.
91BE:             410 *   if kb.beg = this key, inc kb.beg until finding an active one,
91BE:             411 *   or reaching kb.end.
91BE:             412 *
91BE:             414 *
91BE:             415 * this routine computes keynum values + keyup/down values
91BE:             416 * for keys processed by this interrupt
91BE:             417 *
91BE:        91BE 418 CREATE.KB EQU    *
91BE:A0 00        419            LDY    #0                  start with #1
91C0:C8           420 LOOPKEY    INY
91C1:8C 20 7A     421            STY    ROW.NUM             1st byte of row.num for temp storage
91C4:B9 20 7A     422            LDA    ROW.NUM,Y           row number
91C7:D0 04   91CD 423            BNE    GOTKEY              if zero, it's an alarm
91C9:             424 *
91C9:A9 B0        425            LDA    #ALARMVAL           defined in equates
91CB:80 38   9205 426            BRA    SETKEYNUM
91CD:             427 *
91CD:        91CD 428 GOTKEY     EQU    *                   it's an actual key
91CD:38           429            SEC                        row.num - 4 = index to kbd.curr
91CE:E9 04        430            SBC    #4
91D0:C9 08        431            CMP    #8                  if >7, illegal: ignore
91D2:B0 46   921A 432            BCS    KEYEND
91D4:AA           433            TAX
91D5:BD 41 7A     434            LDA    KBD.CURR,X          previous value for this row
91D8:59 30 7A     435            EOR    ROW.DATA,Y          eor w new value
91DB:F0 3D   921A 436            BEQ    KEYEND              no change (possible?)
91DD:85 8C        437            STA    NEWVAL              one (OR MORE!) bits will be set
91DF:             438 *
91DF:B9 30 7A     439            LDA    ROW.DATA,Y
91E2:9D 41 7A     440            STA    KBD.CURR,X          this is new value
91E5:             441 *******************
91E5:             442 * go thru 1-bits of NEWVAL
91E5:A0 03        443            LDY    #3
91E7:8C 30 7A     444 GOTKEY1    STY    ROW.DATA            temp
91EA:A5 8C        445            LDA    NEWVAL
91EC:39 23 92     446            AND    MASK,Y              is bit y on or off?
91EF:F0 23   9214 447            BEQ    GOTKEY2             off:loop
```

```
91F1:BD 41 7A    448           LDA    KBD.CURR,X   on: up or down?
91F4:39 23 92    449           AND    MASK,Y
91F7:F0 02  91FB 450         * BEQ    GOTKEY3
91F9:A9 80       451           LDA    #$80         up
91FB:85 8D       452 GOTKEY3   STA    KEYUP
91FD:            453 * get keynum:
91FD:8A          454           TXA                 row #  (0-7)
91FE:0A          455           ASL    A
91FF:0A          456           ASL    A            *4
9200:6D 30 7A    457           ADC    ROW.DATA     + bitnum
9203:05 8D       458           ORA    KEYUP        this is it
9205:            459 *
9205:            460 *
9205:            461 *
9205:A4 4E       462 SETKEYNUM LDY    KB.END
9207:C0 10       463           CPY    #$10
9209:B0 1C  9227 464           BCS    STACKCRASH
920B:99 3D 00    465           STA    KB,Y         put value in kb queue
920E:C8          466           INY
920F:98          467           TYA
9210:29 0F       468           AND    #$F
9212:85 4E       469           STA    KB.END       update kb.end
9214:            470 *
9214:AC 30 7A    471 GOTKEY2   LDY    ROW.DATA     get next bit
9217:88          472           DEY
9218:10 CD  91E7 473           BPL    GOTKEY1
921A:            474 *******************
921A:            475 *
921A:AC 20 7A    476 KEYEND    LDY    ROW.NUM      any more to process?
921D:CC 40 7A    477           CPY    ROW.PTR
9220:90 9E  91C0 478           BCC    LOOPKEY      yes
9222:60          479           RTS                 no
9223:            480 *
9223:01 02 04 08 481 MASK      DFB    1,2,4,8
9227:            482 *
9227:4C 00 F1    483 STACKCRASH JMP   $F100        reset
922A:            484 ******************************
922A:            486 *
922A:            487 * set bit 6 of appropriate value in KB array
922A:            488 * to indicate repeater
922A:            489 *
922A:       922A 490 SETREPEAT EQU    *
922A:A5 4F       491           LDA    KB.PTR
922C:1A          492           DEC
922D:29 0F       493           AND    #$F
922F:AA          494           TAX                 get index to PREVIOUS one
9230:B5 3D       495           LDA    KB,X
9232:CB          496           SEB    6,A
9233:95 3D       497           STA    KB,X
9235:60          498           RTS
9236:            499 *
9236:            500 **************************
9236:            501 * DELETE DATA FOR THIS PARTICULAR IR WHEN IN EDIT MODE;
9236:            502 * SHIFT EVERYTHING ELSE DOWN
9236:            503 *
9236:20 C5 82    504 DELETEIR  JSR    GETIROFF     returns offset in acc, DIFF
9239:AA          505           TAX
923A:BD 8B 7D    506           LDA    IRDATA,X     length byte
923D:8D AD 7E    507           STA    PROGLEN
9240:20 66 81    508           JSR    FOLLOWUP     another one?
9243:AD AD 7E    509           LDA    PROGLEN
9246:18          510           CLC
9247:A6 25       511           LDX    DIFF
9249:65 25       512           ADC    DIFF         add diff to proglen
924B:A8          513           TAY
924C:            514 *
924C:B9 8B 7D    515 DELIR1    LDA    IRDATA,Y     high one to
924F:9D 8B 7D    516           STA    IRDATA,X     low one
9252:C8          517           INY
9253:E8          518           INX
```

```
9254:C0 FF         519           CPY     #IRLEN
9256:D0 F4   924C  520           BNE     DELIR1
9258:60            521           RTS
9259:              522 *
9259:              524 *
9259:              525 * GET INPUT AFTER "PAGE" IN A
9259:              526 * LEARNING SEQUENCE
9259:              527 *
9259:              528 *
9259:20 32 99      529 LEARNPAGE JSR     NEXTLEARN
925C:              530 *
925C:20 69 92      531           JSR     CHECKPAGE
925F:F0 03   9264  532           BEQ     LEARNPAGE2
9261:4C 75 F2      533           JMP     LEARNMODE1    DIR MODE ALREADY ALTERED IN
CHECKMODE
9264:              534 *  (back to ROM)
9264:              535 * ILLEGAL MODE
9264:              536 *
9264:20 3A 99      537 LEARNPAGE2 JSR    CHECKDEL      checks for delete
9267:80 F0   9259  538           BRA     LEARNPAGE     or illegal key
9269:              539 *
9269:              540 ******************************
9269:              541 *
9269:              542 * IF VALUE IN ACCUM (KEYNUM) IS LEGAL MODE,
9269:              543 * RETURN X=2 FOR DIRECT (A- TO D-);
9269:              544 * X=1 FOR 0-F; X=0 FOR ILLEGAL
9269:              545 * (ALSO ZERO FLAG SET IF ILLEGAL)
9269:              546 *  ACCUM CONTAINS KEYNUM ON EXIT
9269:              547 *
9269:A5 22         548 CHECKPAGE LDA    KEYNUM         ASSUMES ASSIGNKEY HAS BEEN
CALLED
926B:A2 00         549           LDX     #0
926D:C9 14         550           CMP     #$14
926F:B0 0C   927D  551           BCS     CHECKPAGE1
9271:C9 03         552           CMP     #3
9273:F0 08   927D  553           BEQ     CHECKPAGE1
9275:B0 05   927C  554           BCS     CHECKPAGE2
9277:              555 *
9277:69 04         556           ADC     #4            IF 0-3,CONVERT TO 4-7 (A-D)
9279:85 22         557           STA     KEYNUM
927B:              558 *
927B:E8            559           INX                   A- TO D-
927C:E8            560 CHECKPAGE2 INX                  LEGAL
927D:E0 00         561 CHECKPAGE1 CPX    #0            TO SET ZERO FLAG
927F:60            562           RTS
9280:              563 *
9280:              565 *
9280:              566 *
9280:              567 * GET INPUT AFTER "KEY" IN
9280:              568 * LEARNING SEQUENCE
9280:              569 *
9280:              570 *
9280:20 32 99      571 LEARNKEY  JSR     NEXTLEARN     gets key & takes care of ca
ncel
9283:              572 *
9283:20 5A F4      573           JSR     CHECKKEY
9286:F0 0C   9294  574           BEQ     LEARNKEY2
9288:              575 * LEGAL KEY
9288:48            576           PHA
9289:22 9C         577           JSR     \CONVOF
928B:A6 13         578           LDX     NEST
928D:9D 2A 7D      579           STA     TARGKEY,X
9290:68           580           PLA
9291:4C 02 F2      581           JMP     LEARNCHAR
9294:              582 *
9294:              583 *ILLEGAL KEY
9294:              584 *
9294:20 3A 99      585 LEARNKEY2 JSR    CHECKDEL
9297:80 E7   9280  586           BRA     LEARNKEY
```

```
9299:              588 *
9299:              589 * FIXPAGE: ENTERED WITH "PAGE" KEY
9299:              590 *
9299:20 8D F8      591 FIXPAGE   JSR   CLRDISP
929C:20 59 9B      592           JSR   ENABLECHECK
929F:A5 22         593           LDA   KEYNUM          display 'page'
92A1:22 AC         594           JSR   \PUTDISP.FF
92A3:22 56         595 FIXPAGE1  JSR   \KEYCANCEL
92A5:F0 04   92AB  596           BEQ   FIXPAGE2A
92A7:C9 03         597           CMP   #PAGEKEY        if page again,
92A9:D0 06   92B1  598           BNE   FIXPAGE2        clear
92AB:20 C4 F8      599 FIXPAGE2A JSR   DISPCURR
92AE:4C 59 9B      600           JMP   ENABLECHECK
92B1:20 69 92      601 FIXPAGE2  JSR   CHECKPAGE
92B4:F0 0B   92C1  602           BEQ   NOPAGE
92B6:22 5C         603           JSR   \CONVMODE
92B8:              604 *
92B8:3C FF 11      605           LDM   #$FF,CURRKEY    temporarily
92BB:3C 00 14      606           LDM   #0,CURRPOS
92BE:4C C7 F8      607           JMP   DISPCURZ
92C1:              608 *
92C1:20 D0 9C      609 NOPAGE    JSR   BLATT           illegal page
92C4:80 DD   92A3  610           BRA   FIXPAGE1
92C6:              611 *
92C6:20 2B F3      612 syntax.patch jsr initem         extra stuff in syntaxcheck
92C9:1F 8A         613           clb   repeater
92CB:3F 8A         614           clb   repeater1
92CD:4C BF 87      615           jmp   syntback
92D0:              616 *
92D0:        92D0  617 ENABLEIT  EQU   *               'Enable key' in User
92D0:20 D6 92      618           JSR   TOGENBL
92D3:4C 0F F3      619           JMP   GOUSER
92D6:              620 *
92D6:        92D6  621 TOGENBL   EQU   *               toggle Enableflag
92D6:A5 8A         622           LDA   REPEATBITS      toggle bit 7 (enableflag)
92D8:49 80         623           EOR   #$80
92DA:85 8A         624           STA   REPEATBITS
92DC:60            625           RTS
92DD:              626 *
92DD:              627 *
92DD:A5 15         628 PUTONE.PATCH LDA SCRNPOS
92DF:0A            629           ASL   A
92E0:22 92         630 PP1       JSR   \CLRINT         entry pt when have address
92E2:4C 75 83      631           JMP   PUTONE0         allowing 5 extra bytes for Editcodes
92E5:              632 *
92E5:              633 *
92E5:        92E5  634 CLEARKEYS EQU   *               clear kb stuff in case of screwup
92E5:60            635           RTS
92E6:              636 *
92E6:AD 1E 7D      637 RESTOREQ  LDA   QPTRSAVE        keypress:restore alarm
92E9:8D 02 7D      638           STA   QPTR
92EC:AD 1F 7D      639           LDA   QPTRSAVE+1
92EF:8D 03 7D      640           STA   QPTR+1
92F2:60            641           RTS
92F3:              642 *
92F3:               34           include waitkey
92F3:                2 * WAITKEY
92F3:                3 *
92F3:                4 * new routines to handle the fact that intervals are now handled by
92F3:                5 * Wait, not At-At
92F3:                6 *
92F3:               .7 *
92F3:                8 *NEW ALARM ROUTINE WHICH MAKES 2ND "AT" ILLEGAL"
92F3:        92F3   9 DOALARM.RAM EQU  *
92F3:3C 81 31      10           LDM   #$81,TIMEFLAG
92F6:A9 15         11           LDA   #ATKEY
92F8:22 A9         12           JSR   \STUFFIT.FF
```

```
92FA:3C 00 1E      13            LDM   #0,TIMEDIG
92FD:20 81 82      14 DOAR1      JSR   GETNEXT
9300:C9 1C         15            CMP   #ENABLEKEY   a char was deleted
9302:D0 05   9309  16            BNE   DOAR2
9304:20 CD F3      17            JSR   ILLSET
9307:80 F4   92FD  18            BRA   DOAR1
9309:20 73 F3      19 DOAR2      JSR   XTIME
930C:4C 5C F1      20            JMP   LEARN
930F:              21 *
930F:              23 *
930F:              24 * DIRECT INTERVALS
930F:              25 *
930F:        930F  26 WAIT       EQU   *
930F:E7 8A 039315  27            BBS   ENABLEFLAG,WAIT9
9312:4C D0 9C      28            JMP   BLATT
9315:        9315  29 WAIT9      EQU   *
9315:20 91 80      30            JSR   GOSET
9318:3C 41 31      31            LDM   #$41,TIMEFLAG
931B:A9 19         32            LDA   #WAITKEY
931D:22 AC         33            JSR   \PUTDISP.FF
931F:3C FF 12      34            LDM   #$FF,PROGINDEX
9322:              35 * (falls thru)
9322:              36 *
9322:              37 * handle input after WAIT (short intervals)
9322:              38 *
9322:A9 00         39 INTERVALS.RAM LDA #0
9324:85 17         40            STA   HRL
9326:85 1A         41            STA   MINL
9328:85 1B         42            STA   MINH
932A:20 36 F4      43            JSR   CHECKFLAG
932D:30 03   9332  44            BMI   INTER2
932F:20 A5 F7      45            JSR   DISPINT      display interval digits
9332:              46 *
9332:20 81 82      47 INTER2     JSR   GETNEXT      check for "h" (A or B)
9335:C9 04         48            CMP   #KEYA
9337:F0 0D   9346  49            BEQ   INTER3
9339:C9 05         50            CMP   #KEYB
933B:F0 09   9346  51            BEQ   INTER3
933D:C9 22         52            CMP   #HKEY
933F:F0 05   9346  53            BEQ   INTER3       for edit only
9341:20 73 F3      54            JSR   XTIME
9344:80 0B   9351  55            BRA   INTER4
9346:              56 *
9346:A9 22         57 INTER3     LDA   #HKEY        display "h"
9348:22 A9         58            JSR   \STUFFIT.FF
934A:DF 3A         59            CLB   CURSORBIT,FLASHACT
934C:AF 31         60            SEB   5,TIMEFLAG
934E:20 70 F3      61            JSR   TIMEINPUT
9351:4C BC F1      62 INTER4     JMP   LEARN
9354:              63 *
9354:              64 *
9354:              65 *
9354:              66 * SET ALARM OR INTERVAL FROM KEY EXECUTION
9354:              67 * (changed from original ROM version
9354:              68 *
9354:3C 01 31      69 DOITAT.RAM LDM #1,TIMEFLAG    for "at"
9357:        9357  70 DOITATR1   equ   *            get time instructions
9357:20 97 80      71            JSR   GOSETPROG    put curr time in hr, etc.
935A:9F 33         72            CLB   ACTTIME
935C:D7 31 089367  73            BBC   6,TIMEFLAG,ADOITT1
935F:A9 00         74            LDA   #0           if interval, set all to zero just in case
9361:85 17         75            STA   HRL
9363:85 1A         76            STA   MINL
9365:85 1B         77            STA   MINH
9367:20 23 FA      78 ADOITT1    JSR   NEXTINST     repeat until "do"
936A:C9 22         79            CMP   #HKEY        check for "h"
936C:D0 04   9372  80            BNE   ADOITT3
936E:AF 31         81            SEB   5,TIMEFLAG
9370:80 F5   9367  82            BRA   ADOITT1
9372:C9 1E         83 ADOITT3    CMP   #DOKEY       exit to get program
9374:F0 07   937D  84            BEQ   ADOITT2
```

```
9376:85 22           85              STA    KEYNUM
9378:20 73 F3        86              JSR    XTIME       perform time operation
937B:80 EA    9367   87              BRA    ADOITT1     & get next inst
937D:8F 33           88  ADOITT2     SEB    ACTTIME
937F:                89  *
937F:4C 89 F9        90              JMP    DLRN        get program data & store in
  alarmq
9382:                91  *
9382:                92  * SET INTERVAL FROM KEY EXECUTIION
9382:                93  *
9382:         9382   94  DOITWAIT    EQU    *
9382:3C 41 31        95              LDM    #$41,TIMEFLAG for "wait"
9385:80 D0    9357   96              BRA    DOITATR1
9387:                97  *
9387:                99  *
9387:               100  * TAKE INTERVAL DATA AND ADD TO CURRENT TIME
9387:               101  * INPUT = MINH (sech),MINL (secl), HRL(minl)
9387:               102  *
9387:               103  * (replacement for ROM version)
9387:         9387  104  ADDINT.RAM EQU   *
9387:A5 17          105              LDA    HRL         from ddg
9389:48             106              PHA                save
938A:A6 1B          107              LDX    MINH
938C:A5 1A          108              LDA    MINL
938E:20 27 F7       109              JSR    ADD10X
9391:               110  *
9391:85 37          111              STA    INCR        = amt to add to time
9393:               112  *
9393:05 17          113              ORA    HRL         if time =0, then make it 1
  second!
9395:D0 04    939B  114              BNE    NONZERO
9397:E6 37          115              INC    INCR
9399:BF 31          116              CLB    5,TIMEFLAG  do 1 sec only
939B:               117  * [WILL THIS CREATE ANY PROBLEMS LATER?]
939B:         939B  118  NONZERO     EQU    *
939B:77 33 0593A3   119              BBC    XTFLAG,BADDINTX if execution, get previou
  s time
939E:20 9F 80       120              JSR    MOVEXTIME
93A1:80 06    93A9  121              BRA    BADDINTZ
93A3:               122  *
93A3:20 EB F4       123  BADDINTX    JSR    READTITIME  get day,hr,min
93A6:20 DF F4       124              JSR    READSECONLY get seconds
93A9:               125  *SEB XTFLAG have to do this a different way!
93A9:               126  *
93A9:A7 31 2993D5   127  BADDINTZ    BBS    5,TIMEFLAG,PLUSH
93AC:A6 19          128              LDX    SECH        sec/min
93AE:A5 18          129              LDA    SECL
93B0:20 A5 F5       130              JSR    ADDINCR     returns carry set if carry
93B3:86 19          131              STX    SECH
93B5:85 18          132              STA    SECL
93B7:               133  *
93B7:68             134              PLA                restore int minutes
93B8:69 00          135              ADC    #0
93BA:F0 08    93C4  136              BEQ    BADDINTQ
93BC:9F 33          137              CLB    ACTTIME     so calculations will carry
  over
93BE:20 37 94       138              JSR    INCMINC1Z
93C1:8F 33          139              SEB    ACTTIME
93C3:60             140              RTS
93C4:               141  *
93C4:               142  * if we get here, it's same minute
93C4:               143  * so we countdown without putting alarm in 4-bitter.
93C4:               144  * 1st check to see if there's a countdown in progress
93C4:67 33 0D93D4   145  BADDINTQ    BBS    XTFLAG,BADDINT1 if xtflag,don't alter sec
  time
93C7:A5 37          146              LDA    INCR
93C9:97 34 0493D0   147              BBC    COUNTDOWN,BADDINT0
93CC:C5 20          148              CMP    SECTIME     if countdown &
93CE:B0 04    93D4  149              BCS    BADDINT1    incr>=sectime, skip
93D0:85 20          150  BADDINT0    STA    SECTIME     else count new interval
93D2:8F 34          151              SEB    COUNTDOWN
```

```
93D4:                   152 *
93D4:                   153 * Here we have updated time data: get id & put in queue
93D4:60                 154 BADDINT1   RTS
93D5:                   155 *
93D5:                   156 * Plus-h execution (hr/min)
93D5:                   157 *
93D5:14F 33             158 PLUSH      CLB   ACTTIME
93D7:A5 37              159            LDA   INCR           minutes
93D9:F0 03     93DE     160            BEQ   PLUSH0
93DB:20 37 94           161            JSR   INCMINC1Z
93DE:68                 162 PLUSH0     PLA                  hours
93DF:F0 08     93E9     163            BEQ   PLUSH2
93E1:48                 164 PLUSH1     PHA
93E2:20 3E 94           165            JSR   INCHRCZ
93E5:68                 166            PLA
93E6:1A                 167            DEC
93E7:D0 F8     93E1     168            BNE   PLUSH1
93E9:8F 33              169 PLUSH2     SEB   ACTTIME
93EB:60                 170            RTS
93EC:                   171 *
93EC:                   172 ****************************
93EC:                   173 *
93EC:A5 22              174 XTIME.RAM  LDA   KEYNUM         check for 'rpt' in alarms
93EE:C9 20              175            CMP   #$20
93F0:F0 03     93F5     176            BEQ   XTRR1
93F2:4C 76 F3           177            JMP   XTIME+3
93F5:20 02 81           178 XTRR1      JSR   SETRPT
93F8:4C 90 F3           179            JMP   TIMEIN2
93FB:                   180 *
93FB:                   182 *
93FB:                   183 *
93FB:                   184 * These routines replace some of the ROM routines in 'tim
e' in
93FB:                   185 * order to correct 1 !@#$%^&*()- problem, i.e. MINDAY tre
ated
93FB:                   186 * as MF (0) in programmed alarm execution; this is not ko
sher
93FB:                   187 *
93FB:                   188 *
93FB:                   189 * RESPOND TO MIN-UP KEY
93FB:                   190 *
93FB:3C 01 37           191 INCMINZ    LDM   #1,INCR
93FE:97 33 3B9439       192            BBC   ACTTIME,INCMINCZ if under program executi
on
9401:4C 91 F5           193            JMP   MININCR
9404:                   194 * RESPOND TO MIN-DOWN KEY
9404:                   195 *
9404:3C 3B 37           196 DECMINZ    LDM   #59,INCR
9407:97 33 3D9447       197            BBC   ACTTIME,DECMINCZ if prog exec, check for
carry
940A:4C 91 F5           198            JMP   MININCR
940D:                   199 ****************************
940D:                   200 ****************************
940D:                   201 *
940D:                   202 * RESPOND TO DAY/UP KEY
940D:                   203 * ALTERS DAY  (preserves pm value)
940D:                   204 *
940D:20 54 94           205 INCDAYZ    JSR   GETMINDAYZ
9410:3A                 206            INC
9411:29 07              207            AND   #7
9413:D0 03     9418     208            BNE   UPDAY1Z
9415:0D 3F 7D           209            ORA   MINDAY
9418:80 0B     9425     210 UPDAY1Z    BRA   DOWNDAY2Z
941A:                   211 *
941A:                   212 *
941A:                   213 * RESPOND TO DAY/DOWN KEY
941A:                   214 * ALTERS DAY
941A:                   215 *
941A:20 54 94           216 DECDAYZ    JSR   GETMINDAYZ
941D:CD 3F 7D           217            CMP   MINDAY
```

```
9420:D0 02    9424  218            BNE   DOWNDAY1Z
9422:A9 08          219            LDA   #8
9424:1A             220 DOWNDAY1Z  DEC
9425:               221 *
9425:0A             222 DOWNDAY2Z  ASL
9426:05 36          223            ORA   VAR1        =1 if pmflag
9428:85 1D          224            STA   DAY
942A:60             225            RTS
942B:               226 *
942B:               227 *
942B:               228 * INCREMENT HR WITH WRAP (CHANGE AM/PM IF NEC)
942B:               229 * if pm switched, we will clear carry. acc contains day.
942B:               230 * if pm not switched, carry clear
942B:               231 *
942B:97 33 10943E   232 INCHRZ     BBC   ACTTIME,INCHRCZ if prog, allow carry
942E:4C DE F5       233            JMP   UPHR
9431:               234 *
9431:               235 * DECREMENT HR WITH WRAP (CHANGE AM/PM IF NEC)
9431:               236 *
9431:97 33 18944C   237 DECHRZ     BBC   ACTTIME,DECHRCZ if prog, allow carry
9434:4C F7 F5       238            JMP   DOWNHR
9437:               239 *
9437:               240 *
9437:               242 *
9437:               243 * ROUTINES TO INCREMENT, DECREMENT TIME AND
9437:               244 * ALLOW FOR CARRY TO NEXT TIME-ELEMENT
9437:               245 *
9437:85 37          246 INCMINC1Z  STA   INCR        entry for interval
9439:               247 *
9439:20 91 F5       248 INCMINCZ   JSR   MININCR     inc minute
943C:90 15    9453  249            BCC   RTS2Z       no carry: done
943E:               250 *
943E:20 DE F5       251 INCHRCZ    JSR   UPHR        inc hr
9441:B0 10    9453  252            BCS   RTS2Z       if switchpm, carry clear
9443:               253 *
9443:03 0E    9453  254            BBS   0,A,RTS2Z   bit 0=0: we switched to AM
9445:80 C6    940D  255            BRA   INCDAYZ
9447:               256 *
9447:               257 *
9447:20 91 F5       258 DECMINCZ   JSR   MININCR     dec minute
944A:B0 07    9453  259            BCS   RTS2Z       carry set= no change
944C:20 F7 F5       260 DECHRCZ    JSR   DOWNHR      dec hr
944F:B0 02    9453  261            BCS   RTS2Z       no switchpm
9451:03 C7    941A  262            BBS   0,A,DECDAYZ if PM=1, change day
9453:60             263 RTS2Z      RTS
9454:               264 *
9454:               266 *
9454:               267 * gets minimum day allowed: for alarms, =0 (mf);
9454:               268 * otherwise =1 (monday).
9454:               269 * returns value in minday; returns pmvalue in var1
9454:               270 *
9454:A9 00          271 GETMINDAYZ LDA   #0
9456:85 36          272            STA   VAR1
9458:97 33 04945F   273            BBC   ACTTIME,GMDOZ
945B:A5 31          274            LDA   TIMEFLAG
945D:29 01          275            AND   #1
945F:49 01          276 GMDOZ      EOR   #1
9461:8D 3F 7D       277            STA   MINDAY
9464:A5 1D          278            LDA   DAY
9466:4A             279            LSR
9467:26 36          280            ROL   VAR1
9469:60             281            RTS
946A:               282 *
946A:                35           include outmem
946A:                 2 * OUTMEM
946A:                 3 *
946A:                 4 * Some routines which check for various out-of-memory conditions
946A:                 5 *
946A:                 6 * Before stuffing in Progout, make sure progindex<63
946A:                 7 *
```

```
946A:37 32 0D947A    8 STUFFIT.RAM BBC KEYINPUT,STUFFRM0 if edit,don't delete
946D:A6 12           9              LDX    PROGINDEX
946F:30 09    947A  10              BMI    STUFFRM0    if $ff, forget
9471:E0 3F          11              CPX    #63
9473:90 05    947A  12              BCC    STUFFRM0
9475:20 7D 94       13              JSR    BLATT2
9478:4F 8E          14              SEB    CUTMEMFLAG  set flag to delete char
947A:4C 46 F3       15 STUFFRM0 JMP STUFFIT+3   back to ROM
947D:               16 *
947D:DF FE          17 BLATT2   CLB    INTIENBL    nec?
947F:20 D0 9C       18              JSR    BLATT       out of memory sound
9482:A9 02          19              LDA    #2
9484:20 26 91       20              JSR    WAITASEC1   delay
9487:20 D0 9C       21              JSR    BLATT
948A:CF FE          22              SEB    INT1ENBL
948C:60             23              RTS
948D:               24 *********************************
948D:               25 *
948D:               26 * Is there at least 1 page available between end of keydefs
948D:               27 * & top of stack? Returns carry clear if room, set if no room
948D:               28 *
948D:        948D   29 STACKPAGE EQU  *
948D:A5 2D          30              LDA    STAKPTR
948F:85 2B          31              STA    ZP1
9491:A5 2E          32              LDA    STAKPTR+1
9493:1A             33              DEC    A
9494:85 2C          34              STA    ZP1+1
9496:               35 *
9496:AD 08 7D       36              LDA    ENDDEFS
9499:C5 2B          37              CMP    ZP1
949B:AD 09 7D       38              LDA    ENDDEFS+1
949E:E5 2C          39              SBC    ZP1+1
94A0:60             40              RTS
94A1:               41 *
94A1:               42 *********************************
94A1:               44 *
94A1:               45 * when inserting an alarm, check to see if enough room before
94A1:               46 * keydefs. If not, move keydefs down 1 page.
94A1:               47 *
94A1:        94A1   48 INSERTQ.PATCH EQU *
94A1:20 16 85       49              JSR    ZP1ENDQ
94A4:20 2C 85       50              JSR    UPDATE.END  zp1=new end of alarmq
94A7:               51 *
94A7:20 1B 95       52              JSR    CMPZP1KEYS
94AA:90 28   94D4   53              BCC    ENUFROOM
94AC:               54 *
94AC:               55 * endq+10>=keydefs:
94AC:               56 *
94AC:20 8D 94       57              JSR    STACKPAGE   is there a page available
94AF:90 0A   94BB   58              BCC    MAKEROOM
94B1:20 7D 94       59              JSR    BLATT2      no
94B4:27 32 03 94BA  60              BBS    KEYINPUT,ENDMOVE direct alarm
94B7:4C 36 F9       61              JMP    DONEDONE    within execution
94BA:60             62 ENDMOVE  RTS
94BB:               63 *
94BB:        94BB   64 MAKEROOM EQU   *           move defs down
94BB:20 EE 94       65              JSR    DEFSIZE     compute # bytes in keydefs
94BE:78             66              SEI
94BF:20 D3 84       67              JSR    MOVEDOWN    move 128 bytes
94C2:20 00 85       68              JSR    ZP1ENDDEFS  recalc enddefs
94C5:20 2C 85       69              JSR    UPDATE.END
94C8:20 0B 85       70              JSR    ENDDEFSZP1
94CB:2F 8E          71              SEB    ADDFLAG     add 128 to keydefs
94CD:20 04 95       72              JSR    DEFS128
94D0:58             73              CLI
94D1:4C DB 87       74              JMP    INSERTQ     try again: will be ok this time
94D4:               75 *
```

```
94D4:20 16 85      76 ENUFROOM    JSR    ZP1ENDQ
94D7:20 41 85      77             JSR    CALCMBYTES
94DA:4C E7 87      78             JMP    OK2STORE        back to storealarm
94DD:              79 *
94DD:              80 ***************************
94DD:              81 *
94DD:              82 * when adding a def, check for enough room
94DD:              83 *
94DD:20 8D 94      84 DEFDOWN.PATCH JSR STACKPAGE
94E0:90 06 * 94E8  85             BCC    DDP1
94E2:20 7D 94      86             JSR    BLATT2          no room
94E5:4C 36 F9      87             JMP    DONEDONE
94E8:20 00 85      88 DDP1        JSR    ZP1ENDDEFS
94EB:4C 80 84      89             JMP    DEFDOWN2
94EE:              90 *
94EE:              91 * computes # of bytes to move when moving entire keydefs
94EE:              92 * up or down 128 bytes
94EE:              93 *
94EE:20 00 85      94 DEFSIZE     JSR    ZP1ENDDEFS
94F1:AD 06 7D      95             LDA    KEYDEFS
94F4:85 29         96             STA    DEFPTR
94F6:AD 07 7D      97             LDA    KEYDEFS+1
94F9:85 2A         98             STA    DEFPTR+1
94FB:3C 00 25      99             LDM    #0,FROM
94FE:3C 80 26     100             LDM    #128,TO
9501:4C 41 85     101             JMP    CALCMBYTES      computes zp1=defptr-from+1
9504:             102 ******************************
9504:             103 *
9504:             104 * Add or subtract 128 bytes to KEYDEFS depending
9504:             105 * on value of ADDFLAG
9504:             106 *
9504:      9504   107 DEFS128     EQU    *
9504:AD 06 7D    108             LDA    KEYDEFS
9507:49 80       109             EOR    #$80
9509:8D 06 7D    110             STA    KEYDEFS
950C:27 8E 069515 111            BBS    ADDFLAG,D1281
950F:10 03  9514 112             BPL    D1280
9511:CE 07 7D    113             DEC    KEYDEFS+1       subtracting
9514:60          114 D1280       RTS
9515:30 03  951A 115 D1281       BMI    D1282           adding
9517:EE 07 7D    116             INC    KEYDEFS+1
951A:60          117 D1282       RTS
951B:            118 *
951B:            119 *
951B:      951B  120 CMPZP1KEYS EQU *                   zp1=keydefs? if yes, cc
951B:A5 2B       121             LDA    ZP1
951D:CD 06 7D    122             CMP    KEYDEFS
9520:A5 2C       123             LDA    ZP1+1
9522:ED 07 7D    124             SBC    KEYDEFS+1
9525:60          125             RTS
9526:            126 **********************
9526:            127 *
9526:            128 * when deleting an alarm, see if we can move keydefs up
9526:            129 *
9526:20 2C 85    130 DELETE.CHECK JSR   UPDATE.END
9529:20 21 85    131             JSR    ENDQZP1
952C:58          132             CLI
952D:E6 2C       133             INC    ZP1+1           endq+$100
952F:20 1B 95    134             JSR    CMPZP1KEYS
9532:B0 24  9558 135             BCS    DEL.1           if there's a page between
endq & keydefs
9534:20 EE 94    136             JSR    DEFSIZE         set parameters for move
9537:EF 25       137             SEB    7,FROM          move keydefs up 128 bytes
9539:FF 26       138             CLB    7,TO            (swap from, to )
953B:A5 29       139             LDA    DEFPTR          compute defptr-128
953D:49 80       140             EOR    #$80
953F:85 29       141             STA    DEFPTR
9541:10 02  9545 142             BPL    DEL.0
9543:C6 2A       143             DEC    DEFPTR+1
9545:78         144 DEL.0        SEI
9546:20 C7 84   145             JSR    MOVEUP
```

```
9549:20 00 85      146           JSR     ZP1ENDDEFS    enddefs-=128
954C:20 2C 85      147           JSR     UPDATE.END
954F:20 0B 85      148           JSR     ENDDEFSZP1
9552:3F 8E         149           CLB     ADDFLAG
9554:20 04 95      150           JSR     DEFS128       keydefs-=128
9557:58            151           CLI
9558:60            152 DEL.1     RTS
9559:              153 *
9559:              154 * routines to compare times of alarm which just went off
(TEMPALARM),
9559:              155 * next alarm in queue (NEXTALARM) and current time (ALARM
BUF).
9559:              156 * Flags are set correctly on return.
9559:              157 *
9559:A0 00         158 CBUFNEXT  LDY     #0
955B:B9 40 7D      159 CBN1      LDA     ALARMBUF,Y
955E:D9 0F 7D      160           CMP     NEXTALARM,Y
9561:D0 07   956A  161           BNE     CBN2
9563:C8            162           INY
9564:C0 07         163           CPY     #7
9566:90 F3   955B  164           BCC     CBN1
9568:A9 00         165           LDA     #0
956A:60            166 CBN2      RTS
956B:              167 *
956B:A0 00         168 CNEXTTEMP LDY     #0
956D:B9 0F 7D      169 CNT1      LDA     NEXTALARM,Y
9570:D9 35 7D      170           CMP     TEMPALARM,Y
9573:D0 07   957C  171           BNE     CNT2
9575:C8            172           INY
9576:C0 07         173           CPY     #7
9578:90 F3   956D  174           BCC     CNT1
957A:A9 00         175           LDA     #0
957C:60            176 CNT2      RTS
957D:              177 *
957D:A0 00         178 CBUFTEMP  LDY     #0
957F:B9 40 7D      179 CBT1      LDA     ALARMBUF,Y
9582:D9 35 7D      180           CMP     TEMPALARM,Y
9585:D0 07   958E  181           BNE     CBT2
9587:C8            182           INY
9588:C0 07         183           CPY     #7
958A:90 F3   957F  184           BCC     CBT1
958C:A9 00         185           LDA     #0
958E:60            186 CBT2      RTS
958F:              187 *
958F:22 92         188 READD3.NEW JSR    \CLRINT       reads d3 while disabling in
ts!
9591:20 B7 FA      189           JSR     READD3
9594:D0 16   95AC  190           BNE     D3A
9596:A9 F6         191           LDA     #$F6          else read mins to sleep
9598:22 0E         192           JSR     \PEEK256
959A:A9 D3         193           LDA     #$D3          set peek address back to D3
959C:22 0E         194           JSR     \PEEK256      in case we need to poke on
return
959E:A5 EC         195           LDA     FROM4         get value from F6
95A0:29 0F         196           AND     #$F
95A2:C9 05         197           CMP     #5
95A4:90 04   95AA  198           BCC     D3B           if>=5, it's off
95A6:A9 01         199           LDA     #1
95A8:80 02   95AC  200           BRA     D3A
95AA:A9 00         201 D3B       LDA     #0
95AC:4C 97 FF      202 D3A       JMP     ENBINT
95AF:              203 *
95AF:              204 *
95AF:AD 94 7E      205 DEF.PATCH LDA     MOVEBYTES+1
95B2:F0 03   95B7  206           BEQ     DFP1
95B4:4C D9 84      207           JMP     MOVEIT
95B7:60            208 DFP1      RTS
95B8:               36           INCLUDE NEWEXEC
95B8:                2 * NEWEXEC
95B8:                3 *
```

```
95B8:                        4 * Replacements to ROM execution routines
95B8:            95B8        5 DOITQ.ram equ    *
95B8:7F 33                   6            CLB    XTFLAG      1st or new key:don't use ex
ectime
95BA:DF 8E                   7            CLB    PAGEFLAG
95BC:9F 8E                   8            CLB    LOOPFLAG
95BE:BF 8E                   9            CLB    LOOP2ND
95C0:7F 8E                  10            CLB    LOOPREPEAT
95C2:A2 00                  11            LDX    #0
95C4:8E 1C 7D               12            STX    PNEST       init Pnest
95C7:A5 10                  13            LDA    CURRMODE
95C9:9D 76 7E               14            STA    PCURR,X     init Pcurr
95CC:20 43 97               15            JSR    DEFONSTACK.RAM
95CF:F0 03       95D4       16            BEQ    DQ1         IF NOT PRESENT,RTS
95D1:4C 5C 96               17            JMP    DOITEND     .
95D4:                       18 *
95D4:                       19 * should we flag this as a repeater?
95D4:                       20 *
95D4:C7 34 0895DF           21 DQ1        BBS    ALARMFLAG,RDOIT1 if alarm, skip this
95D7:20 0A 98               22            JSR    ISREPEATER  minus if repeater
95DA:10 03       95DF       23            BPL    RDOIT1
95DC:20 2A 92               24            JSR    SETREPEAT   flag KB value
95DF:                       25 *
95DF:                       26 *
95DF:E6 23                  27 RDOIT1     INC    INDEX       GET NEXT ELEMENT
95E1:                       28 *
95E1:D7 32 0E95F2           29            BBC    STEPFLAG,PAUSE
95E4:AD 1C 7D               30            LDA    PNEST
95E7:C9 01                  31            CMP    #1
95E9:D0 07       95F2       32            BNE    PAUSE
95EB:20 31 98               33            JSR    STEPDISP    if in step mode, display pr
ogram
95EE:A5 15                  34            LDA    SCRNPOS     if =0, there's no more prog
ram
95F0:F0 34       9626       35            BEQ    RDOIT1X
95F2:                       36 *
95F2:                       37 * CHECK FOR 1 KEY ONLY (to do this, we assume index<>0 fo
r chkey)
95F2:                       38 * must preserve value of samekey!
95F2:A5 8E                  39 PAUSE      LDA    MOREBITS
95F4:48                     40            PHA
95F5:20 80 9A               41            JSR    CHKEYX
95F8:AA                     42 PAUSE1     TAX
95F9:68                     43            PLA
95FA:85 8E                  44            STA    MOREBITS
95FC:                       45 *
95FC:                       46 *
95FC:E0 17                  47            CPX    #CANCEL
95FE:F0 26       9626       48            BEQ    RDOIT1X     if cancel, we're outta here 9600:                       49 **************************
9600:D7 32 269629           50            BBC    STEPFLAG,RDOIT1Z if in step mode
9603:AD 1C 7D               51            LDA    PNEST
9606:C9 01                  52            CMP    #1
9608:D0 1F       9629       53            BNE    RDOIT1Z     and outer loop
960A:                       54 *
960A:E0 1B                  55            CPX    #SCRRIGHT
960C:D0 07       9615       56            BNE    STEP1       if -->
960E:BF 3A                  57            CLB    STEPBIT,FLASHACT solid right arrow
9610:20 EC 8C               58            JSR    RIGHTON
9613:80 14       9629       59            BRA    RDOIT1Z     & do next step
9615:                       60 *
9615:E0 18                  61 STEP1      CPX    #SCRLEFT
9617:D0 05       961E       62            BNE    STEP2       if <--
9619:20 27 98               63            JSR    CLRSTEP     turn off arrows
961C:80 0B       9629       64            BRA    RDOIT1Z     & do rest of program
961E:                       65 *
961E:            961E       66 STEP2      EQU    *           otherwise wait for a key
961E:A5 8E                  67            LDA    MOREBITS
9620:48                     68            PHA
9621:20 3C 9A               69            JSR    CHKWIT1     could STP if display off
```

```
9624:80 D2    95F8    70              BRA     PAUSE1
9626:                 71      *
9626:                 72      *
9626:4C 92 97         73  RDOIT1X     JMP     ROUTTAHERE+3   (skip platt2)
9629:A4 23            74  RDOIT1Z     LDY     INDEX
962B:CC AD 7E         75              CPY     PROGLEN        DONE W DEF?
962E:D0 2F    965F    76              BNE     DOITNEXT.ram
9630:                 77      *
9630:                 78      * FINISHED WITH CURRENT DEF-- GO BACK TO PREVIOUS
9630:                 79      *
9630:A5 2D            80              LDA     STAKPTR
9632:18               81              CLC
9633:6D AD 7E         82              ADC     PROGLEN
9636:85 2D            83              STA     STAKPTR
9638:90 02    963C    84              BCC     RDONEW1
963A:E6 2E            85              INC     STAKPTR+1
963C:A0 00            86  RDONEW1     LDY     #0             BACK TO PREV DEF
963E:B1 2D            87              LDA     (STAKPTR),Y    INDEX
9640:85 23            88              STA     INDEX
9642:                 89      *       IF INDEX=0, DONE
9642:F0 18    965C    90              BEQ     DOITEND
9644:                 91      *
9644:CE 1C 7D         92              DEC     PNEST          go back to previous
9647:AE 1C 7D         93              LDX     PNEST          value of Currmode
964A:BD 76 7E         94              LDA     PCURR,X
964D:85 10            95              STA     CURRMODE
964F:A0 01            96              ldy     #1
9651:B1 2D            97              lda     (stakptr),y
9653:18               98              clc
9654:69 02            99              adc     #2
9656:8D AD 7E         100             sta     proglen
9659:4C DF 95         101             JMP     RDOIT1
965C:4C 36 F9         102 doitend     jmp     donedone
965F:                 103 ****************************
965F:                 104 ****************************
965F:                 106     * [all new:]
965F:                 107     *
965F:                 108     * DECODE NEXT INSTRUCTION
965F:                 109     *
965F:DF 8E            110 DOITNEXT.RAM CLB   PAGEFLAG
9661:9F 8E            111             CLB     LOOPFLAG
9663:B1 2D            112             LDA     (STAKPTR),Y
9665:10 0A    9671    113             BPL     DNR1
9667:C9 84            114             CMP     #$84           direct page:illegal if not
84-86
9669:90 27    9692    115             BCC     WEIRDINST
966B:C9 87            116             cmp     #$87
966D:B0 23    9692    117             bcs     weirdinst
966F:80 46    96B7    118             BRA     RDOITEXMODE    HIBIT SET MEANS DIRECT MODE 9671:                 119     *
9671:C9 03            120 DNR1        CMP     #3             page
9673:F0 50    96C5    121             BEQ     RDOITMODE
9675:90 1B    9692    122             BCC     WEIRDINST
9677:C9 24            123             cmp     #$24
9679:B0 17    9692    124             bcs     weirdinst      nothing >23 allowed
967B:C9 14            125             CMP     #$14
967D:90 1F    969E    126             BCC     rDOITEXKEY     $4-13 EXECUTE KEY
967F:                 127     * (0-2 IMPOSSIBLE BECAUSE DIRECT MODE)
967F:                 128     *
967F:                 129     * OTHER KEYS:
967F:                 130     *
967F:48               131             PHA
9680:0A               132             ASL
9681:AA               133             TAX
9682:BD 1E 81         134             LDA     DOITJSR-$28,X  X=14+
9685:85 2F            135             STA     ZPJSR
9687:BD 1F 81         136             LDA     DOITJSR-$27,X
968A:85 30            137             STA     ZPJSR+1
968C:68               138             PLA
968D:02 2F            139             JSR     (ZPJSR)
```

```
968F:4C DF 95        140             JMP     RDOIT1
9692:                141 *
9692:20 D0 9C        142 WEIRDINST JSR      BLATT         impossible instruction!
9695:20 D0 9C        143             JSR     BLATT
9698:20 D0 9C        144             JSR     BLATT
969B:4C 0C F3        145             JMP     ENDLEARN
969E:                146 *
969E:                148 *
969E:22 62           149 RDOITEXKEY JSR     \CONVKEY      EXECUTABLE KEY (0 TO F)
96A0:                150 *
96A0:                151 *
96A0:20 43 97        152 RDOITXK1  JSR      DEFONSTACK.RAM GET NEW DEFINITION
96A3:D0 0D   96B2    153             BNE     RDXK2         no def
96A5:97 8E 0A96B2    154             BBC     LOOPFLAG,RDXK2 not in loop
96A8:20 0A 98        155             JSR     ISREPEATER    in loop: check for repeater
96AB:10 05   96B2    156             BPL     RDXK2
96AD:6F 8E           157             SEB     LOOPREPEAT    repeater
96AF:4C DF 95        158             JMP     RDOIT1
96B2:9F 8E           159 RDXK2     CLB     LOOPFLAG
96B4:4C DF 95        160             JMP     RDOIT1        (if not present, we simply
96B7:                161 *                   proceed to next instruction!)
96B7:                162 *
96B7:FB              163 RDOITEXMODE CLB 7,A              EXECUTABLE MODE (A- TO D-
)
96B8:22 5C           164             JSR     \CONVMODE
96BA:AE 1C 7D        165             LDX     PNEST
96BD:9D 76 7E        166             STA     PCURR,X
96C0:3C FF 11        167             LDM     #$FF,CURRKEY
96C3:80 DB   96A0    168             BRA     RDOITXK1
96C5:                169 *
96C5:20 23 FA        170 RDOITMODE JSR      NEXTINST      GET PAGE #
96C8:FB              171             CLB     7,A
96C9:22 5C           172             JSR     \CONVMODE
96CB:AE 1C 7D        173             LDX     PNEST
96CE:9D 76 7E        174             STA     PCURR,X
96D1:CF 8E           175             SEB     PAGEFLAG      this means last action was
page change
96D3:8D 1A 7D        176             STA     PAGEPAGE      save this one in case it's
last one
96D6:A9 FF           177             lda     #$ff
96D8:85 11           178             sta     currkey       in case of direct page
96DA:4C DF 95        179             JMP     RDOIT1
96DD:                180 *
96DD:20 23 FA        181 RDOITKEY  JSR      NEXTINST      GET KEY #
96E0:4C 62 FF        182             JMP     CONVKEY
96E3:                183 *
96E3:                184 ******************************
96E3:                186 *
96E3:                187 * EXECUTION OF 'REPEAT KEY' SYNTAX
96E3:                188 * on entry, y= index of BEGINLOOP symbol
96E3:                189 *
96E3:        96E3    190 DOITLOOP  EQU     *
96E3:D7 32 0496EA    191             BBC     STEPFLAG,DOLOOP4 if in single-step
96E6:CF 8A           192             SEB     STEPSTORE     save value
96E8:80 02   96EC    193             BRA     DOLOOP5
96EA:DF 8A           194 DOLOOP4   CLB     STEPSTORE
96EC:DF 32           195 DOLOOP5   CLB     STEPFLAG      and clear stepflag for dura
tion of loop
96EE:                196 * compute # of times:
96EE:C8              197             INY
96EF:B1 2D           198             LDA     (STAKPTR),Y   tens digit
96F1:22 9C           199             JSR     \CONVOF
96F3:                200 *
96F3:85 24           201             STA     DIGIT         save
96F5:AA              202             TAX
96F6:C8              203             INY
96F7:B1 2D           204             LDA     (STAKPTR),Y   next one
96F9:C9 03           205             CMP     #PAGEKEY
96FB:D0 04   9701    206             BNE     DOLOOP0
96FD:A9 00           207             LDA     #0            tens = 0
```

```
96FF:80 06    9707   208              BRA    COMPUTEIT
9701:22 9C           209 DOLOOP0      JSR    \CONVOF      2 digits
9703:AA              210              TAX
9704:A5 24           211              LDA    DIGIT
9706:C8              212              INY                 point to 'page'
9707:                213 *
9707:         9707   214 COMPUTEIT EQU *                  A=tens, x=ones, y points to
"Page"
9707:0A              215              ASL    A
9708:85 24           216              STA    DI
970A:0A              217              ASL    A            *2
970B:0A              218              ASL    A            *8
970C:65 24           219              ADC    DIGIT
970E:85 24           220              STA    DIGIT        tens value
9710:8A              221              TXA
9711:65 24           222              ADC    DIGIT        result
9713:                223 *
9713:1A              224 DOLOOP2      DEC
9714:10 11    9727   225              BPL    DOLOOP3      if minus, no more to do
9716:C8              226              INY                 update index: page#
9717:C8              227              INY                 key
9718:C8              228              INY                 endloop
9719:84 23           229              STY    INDEX
971B:9F 8E           230              CLB    LOOPFLAG
971D:7F 8E           231              CLB    LOOPREPEAT
971F:BF 8E           232              CLB    LOOP2ND
9721:D7 8A 029726    233              BBC    STEPSTORE,DOLOOP1
9724:CF 32           234              SEB    STEPFLAG     back to single step
9726:60              235 DOLOOP1      RTS
9727:                236 *
9727:91 2D           237 DOLOOP3      STA    (STAKPTR),Y  store new repeat value
9729:C8              238              INY
972A:B1 2D           239              LDA    (STAKPTR),Y  page#
972C:29 7F           240              AND    #$7F
972E:22 5C           241              JSR    \CONVMODE
9730:C8              242              INY
9731:84 23           243              STY    INDEX        update
9733:68              244              PLA
9734:68              245              PLA                 rectify stack
9735:B1 2D           246              LDA    (STAKPTR),Y
9737:8F 8E           247              SEB    LOOPFLAG
9739:                248 *
9739:4C 9E 96        249              JMP    RDOITEXKEY   execute this key
973C:                250 *
973C:                251 * WHAT TO DO WHEN 'ENDLOOP' SYMBOL REACHED
973C:                252 *
973C:         973C   253 DOITLOOPEND EQU *
973C:88              254              DEY
973D:88              255              DEY
973E:88              256              DEY                 backup to get count
973F:B1 2D           257              LDA    (STAKPTR),Y
9741:80 D0    9713   258              BRA    DOLOOP2
9743:                259 *
9743:                260 ****************************
9743:                262 *
9743:                263 * THE FOLLOWING ROUTINE GETS A KEY DEFINITION
9743:                264 * AND PUTS IT ON THE STACK
9743:                265 * INPUTS:CURRMODE,CURRKEY
9743:                266 * ZFLAG SET IF DEF PRESENT; CLEAR IF NOT PRESENT
9743:                267 *
9743:         9743   268 DEFONSTACK.RAM EQU *
9743:AE 1C 7D        269              LDX    PNEST
9746:A5 10           270              LDA    CURRMODE
9748:9D 77 7E        271              STA    PCURR+1,X    current page applies to nex
t higher level
974B:20 7E FA        272              JSR    CURRTOID
974E:20 9A 84        273              JSR    GETDEFAD
9751:D0 1D    9770   274              BNE    RDEFRTS      return if not present
9753:                275 *
9753:                276 * ADJUST INDICES BEFORE PUTTING NEW DEF ON
9753:                277 * ("INDEX" ALWAYS REFERS TO CURRENT INDEX)
```

```
9753:                    278 *
9753:EE 1C 7D            279           INC    PNEST
9756:AD 1C 7D            280           LDA    PNEST
9759:C9 14               281           CMP    #20
975B:B0 32     978F      282           BCS    ROUTTAHERE
975D:A0 00               283           LDY    #0              RESTORE INDEX OF OLD DEF
975F:A5 23               284           LDA    INDEX
9761:91 2D               285           STA    (STAKPTR),Y
9763:                    286 *
9763:E6 29               287           INC    DEFPTR
9765:D0 02     9769      288           BNE    RDEFON2
9767:E6 2A               289           INC    DEFPTR+1        ;INCREMENT TO ALIGN W STACK
PTR
9769:                    290 *
9769:A0 01               291 RDEFON2   LDY    #1
976B:B1 29               292           LDA    (DEFPTR),Y      LENGTH
976D:D0 02     9771      293           BNE    RDEFON2A        if length =0
976F:3A                  294           INC    A               clr zflag & return (pretend
def not present)
9770:60                  295 RDEFRTS   RTS
9771:18                  296 RDEFON2A  CLC
9772:69 02               297           ADC    #2
9774:8D AD 7E            298           STA    PROGLEN         LENGTH INCL LENGTH BYTE & I
NDEX
9777:                    299 *
9777:                    300 * DECR STAKPTR BY LENGTH OF NEW PROG
9777:                    301 *
9777:A5 2D               302           LDA    STAKPTR
9779:38                  303           SEC
977A:ED AD 7E            304           SBC    PROGLEN
977D:85 2D               305           STA    STAKPTR
977F:B0 02     9783      306           BCS    RDEFON3
9781:C6 2E               307           DEC    STAKPTR+1
9783:                    308 *
9783:          9783      309 RDEFON3   EQU    *
9783:                    310 * if stack reaches enddefs, abort processing
9783:                    311 *
9783:AD 08 7D            312           LDA    ENDDEFS
9786:C5 2D               313           CMP    STAKPTR
9788:AD 09 7D            314           LDA    ENDDEFS+1
978B:E5 2E               315           SBC    STAKPTR+1
978D:90 08     9797      316           BCC    RDEFON3A
978F:20 7D 94            317 ROUTTAHERE JSR   BLATT2
9792:DF 8E               318           CLB    PAGEFLAG        in case interrupted
9794:4C 36 F9            319           JMP    DONEDONE
9797:                    320 *
9797:                    321 *
9797:A0 00               322 RDEFON3A  LDY    #0
9799:3C 01 23            323           LDM    #1,INDEX        (WILL BE INCREMENTED TO 2 I
N DOIT1
979C:                    324 *                                TO PT TO 1ST BYTE OF PROGRAM)
979C:                    325 *
979C:                    326 * COPY 1 TO PROGLEN-1
979C:C8                  327 RDEFON4   INY
979D:CC AD 7E            328           CPY    PROGLEN
97A0:F0 CE     9770      329           BEQ    RDEFRTS         def present: return zflag s
et
97A2:B1 29               330           LDA    (DEFPTR),Y
97A4:91 2D               331           STA    (STAKPTR),Y
97A6:80 F4     979C      332           BRA    RDEFON4
97A8:                    333 *
97A8:                    334 *
97A8:                    335 ****************************************************
97A8:                    336 *
97A8:                    337 * HERE'S WHAT'S HAPPENING:
97A8:                    338 *
97A8:                    339 * DEFPTR: 0: MODE
97A8:                    340 *         1: KEY
97A8:                    341 *         2: LENGTH (L)
97A8:                    342 *      3-L+2: PROGRAM
97A8:                    343 *  (1ST BYTE IS NOT TRANSFERED)
```

```
97A8:                    344 *
97A8:                    345 *STAKPTR: 0: INDEX
97A8:                    346 *         1: LENGTH
97A8:                    347 *         2-L+1: PROGRAM
97A8:                    348 *
97A8:                    350 *
97A8:                    351 * change to donedone to avoid resetting if there might be a
97A8:                    352 * repeater down
97A8:          97A8      353 DONEDONE.RAM equ *
97A8:3C 00 23            354        LDM     #0,INDEX       in case we broke in the middle
97AB:20 29 F4            355        JSR     INITSTAK
97AE:                    356 *
97AE:EF 33               357        SEB     ACTTIME
97B0:D7 34 0C97BF        358        BBC     ALARMFLAG,DDONE2 if alarm, rts to morealarms
97B3:DF 34               359        CLB     ALARMFLAG
97B5:20 82 FF            360        JSR     RESTOREMK
97B8:AE 0E 7D            361        LDX     ALARMSTACK     restore stack so we can
97BB:9A                  362        TXS                    go back correctly
97BC:4C 86 8A            363        JMP     RETQ
97BF:                    364 * if there's no new key, it could be a repeater, so bypass GOUSER
97BF:                    365 * (there will always be a keyup when done)
97BF:                    366 *
97BF:          97BF      367 DDONE2   EQU    *              *BBS MITSMODE,DDONE0 no repeater if mits
97BF:A5 4F               368        LDA     KB.PTR         look at one BEFORE kb.ptr
97C1:1A                  369        DEC
97C2:29 0F               370        AND     #$F
97C4:AA                  371        TAX
97C5:B5 3D               372        lda     kb,x
97C7:29 40               373        and     #$40
97C9:F0 08     97D3      374        BEQ     DDONE0         if no repeater, don't bother
97CB:78                  375        sei
97CC:A5 4E               376        LDA     KB.END
97CE:C5 4F               377        CMP     KB.PTR
97D0:58                  378        cli
97D1:F0 15     97E8      379        BEQ     DDONE1
97D3:                    380 *
97D3:                    381 * READY TO QUIT:
97D3:D7 8E 0C97E2        382 DDONE0  BBC     PAGEFLAG,DDONE4
97D6:DF 8E               383        CLB     PAGEFLAG
97D8:AD 1A 7D            384        LDA     PAGEPAGE
97DB:85 10               385        STA     CURRMODE
97DD:3C FF 11            386        LDM     #$FF,CURRKEY   last thing was a page change!
97E0:80 03     97E5      387        BRA     DDONE5
97E2:20 82 FF            388 DDONE4  JSR     RESTOREMK      else restore old page/key
97E5:4C 0F F3            389 DDONE5  JMP     GOUSER
97E8:                    390 *
97E8:C5 4D               391 DDONE1  CMP     KB.BEG
97EA:F0 E7     97D3      392        BEQ     DDONE0         no keys still down
97EC:AE 98 7E            393        LDX     MAINSTAK
97EF:9A                  394        TXS                    there are some keys still down
97F0:4C 2B 8E            395        JMP     MAINLR         avoid resetting display, etc.
97F3:                    396 *
97F3:                    398 *
97F3:                    399 * New Xmode, Xkey routines
97F3:                    400 * to allow for NO DISPLAY if it's a repeater!!
97F3:                    401 *
97F3:22 62               402 XKEY.RAM JSR    \CONVKEY
97F5:80 05     97FC      403        BRA     XMODE1.RAM
97F7:                    404 *
97F7:22 5C               405 XMODE.RAM JSR   \CONVMODE
97F9:3C FF 11            406        LDM     #$FF,CURRKEY
97FC:07 8E 089807        407 XMODE1.RAM BBS  SAMEKEY,GODOIT
```

```
97FF:D7 32 029804  408           BBC   STEPFLAG,XMODE2.RAM if single step
9802:80 03   9807  409           BRA   GODOIT
9804:              410 *
9804:20 C4 F8      411 XMODE2.RAM JSR  DISPCURR     only if not samekey:
9807:              412 *
9807:4C 02 F9      413 GODOIT    JMP   DOIT         back to ROM
980A:              414 *
980A:              415 * FIGURE OUT IF THIS KEY IS A REPEATER
980A:              416 * Returns minus if repeater, plus if not.
980A:              417 *
980A:A0 02         418 ISREPEATER LDY #2            check 1st instruction
980C:B1 2D         419           LDA   (STAKPTR),Y
980E:C9 21         420           CMP   #IRSYMBOL    if IR
9810:D0 07   9819  421           BNE   NOTREP
9812:A0 04         422           LDY   #4           and rptonly set
9814:B1 2D         423           LDA   (STAKPTR),Y
9816:10 01   9819  424           BPL   NOTREP
9818:60            425           RTS
9819:A9 00         426 NOTREP    LDA   #0
981B:60            427           RTS
981C:              428 *
981C:              430 *
981C:              431 * SINGLE STEP ROUTINES
981C:              432 *
981C:              433 * initiate single step mode
981C:              434 *
981C:C7 32 089827  435 STEP.INIT BBS   STEPFLAG,CLRSTEP
981F:              436 *
981F:CF 32         437 STEPON    SEB   STEPFLAG     turn on step mode
9821:20 E4 8C      438           JSR   LEFTON
9824:4C EC 8C      439           JMP   RIGHTON
9827:              440 *
9827:              441 * terminate step mode & clear display elements
9827:              442 *
9827:5F 3A         443 CLRSTEP   CLB   STEPBIT,FLASHACT
9829:DF 32         444           CLB   STEPFLAG
982B:20 E0 8C      445           JSR   LEFTOFF
982E:4C E8 8C      446           JMP   RIGHTOFF
9831:              447 *
9831:              448 * Display next 8 (max) chars of program in edit line
9831:              449 * during single stepping
9831:              450 *
9831:20 92 F8      451 STEPDISP  JSR   CLRFILE0
9834:A9 00         452           LDA   #0
9836:85 15         453           STA   SCRNPOS
9838:20 E0 8C      454           JSR   LEFTOFF
983B:AF 3A         455           SEB   STEPBIT,FLASHACT flash right arrow
983D:A4 23         456           LDY   INDEX        start w current element
983F:CC AD 7E      457 STD0      CPY   PROGLEN
9842:B0 3C   9880  458           BCS   STD3
9844:              459 *
9844:BF 33         460 STD1      CLB   DASHFLAG
9846:B1 2D         461           LDA   (STAKPTR),Y
9848:10 03   984D  462           BPL   STD2
984A:AF 33         463           SEB   DASHFLAG
984C:FB            464           CLB   7,A
984D:85 22         465 STD2      STA   KEYNUM
984F:20 27 F8      466           JSR   GETCODE
9852:20 DD 92      467           JSR   PUTONE.PATCH
9855:              468 *
9855:E6 15         469           INC   SCRNPOS
9857:A5 15         470           LDA   SCRNPOS
9859:C9 08         471           CMP   #8
985B:F0 23   9880  472           BEQ   STD3
985D:C8            473           INY
985E:A5 22         474           LDA   KEYNUM       was previous one IR?
9860:C9 21         475           CMP   #IRSYMBOL
9862:D0 DB   983F  476           BNE   STD0
9864:98            477           TYA
9865:AA            478           TAX                save Y in X
9866:18            479           CLC
```

```
9867:71 2D            480            ADC    (STAKPTR),Y
9869:85 24            481            STA    DIGIT         new index
986B:8A               482            TXA
986C:3A               483            INC
986D:A8               484            TAY                  pt to byte after length
986E:B1 2D            485            LDA    (STAKPTR),Y
9870:29 02            486            AND    #2
9872:F0 08    987C    487            BEQ    STD4
9874:A4 24            488            LDY    DIGIT         keepalive
9876:98               489            TYA
9877:18               490            CLC
9878:71 2D            491            ADC    (STAKPTR),Y   add keepalive length
987A:85 24            492            STA    DIGIT
987C:                 493 *
987C:A4 24            494 STD4       LDY    DIGIT
987E:80 BF    983F    495            BRA    STD0
9880:                 496 *
9880:60               497 STD3       RTS
9881:                 498 *
9881:                 499 *
9881:                 500 *
9881:                 501 * display current version & checksum
9881:                 502 *
9881:20 D0 9C         503 VERSION    JSR    BLATT
9884:20 C2 82         504            JSR    GETKEY        if another -->,
9887:C9 1B            505            CMP    #SCRRIGHT
9889:F0 07    9892    506            BEQ    VERSION1      do checksum
988B:AE 98 7E         507            LDX    MAINSTAK
988E:9A               508            TXS                  else
988F:4C 30 8E         509            JMP    MAIN2         skip getkey
9892:3C 00 14         510 VERSION1   LDM    #0,CURRPOS
9895:20 8D F8         511            JSR    CLRDISP
9898:20 E0 99         512            jsr    calcsum
989B:                 513 *
989B:A5 38            514            LDA    INCR+1
989D:22 68            515            JSR    \LSR4
989F:20 C4 98         516            JSR    DISPIT
98A2:A5 38            517            LDA    INCR+1
98A4:29 0F            518            AND    #$F
98A6:20 C4 98         519            JSR    DISPIT
98A9:A5 37            520            LDA    INCR          compute nybbles
98AB:22 68            521            JSR    \LSR4
98AD:20 C4 98         522            JSR    DISPIT
98B0:A5 37            523            LDA    INCR
98B2:29 0F            524            AND    #$F
98B4:20 C4 98         525            JSR    DISPIT
98B7:                 526 *
98B7:E6 14            527            INC    CURRPOS
98B9:A9 02            528            LDA    #$2
98BB:20 C4 98         529            JSR    DISPIT
98BE:A9 09            530            LDA    #$9           2.9
98C0:20 C4 98         531            JSR    DISPIT
98C3:                 532 *
98C3:60               533            RTS
98C4:                 534 *
98C4:                 535 *
98C4:                 536 *
98C4:                 537 *
98C4:AA               538 DISPIT     TAX
98C5:BD CF F4         539            LDA    MODECODES,X
98C8:4C AC FF         540            JMP    PUTDISP.FF
98CB:                 541 *
98CB:                 543 *
98CB:                 544 * input following 'begin loop' in Learn Mode
98CB:                 545 *
98CB:3C 00 1E         546 LEARNLOOP  LDM    #0,TIMEDIG    for keeping track of 1st 2
                                                          digits
98CE:20 32 99         547 LLOOP      JSR    NEXTLEARN     get next input
98D1:C9 08            548 LLOOP1     CMP    #KEY1         is it 0-9?
98D3:90 04    98D9    549            BCC    LLOOP2
98D5:C9 12            550            CMP    #KEYE
```

```
98D7:90 05    98DE    551              BCC     LLOOP3
98D9:                 552     *
98D9:20 3A 99         553     LLOOP2   JSR     CHECKDEL        no:delete or blatt?
98DC:80 F0    98CE    554              BRA     LLOOP
98DE:                 555     *
98DE:22 A9            556     LLOOP3   JSR     \STUFFIT.FF     digit 0-9
98E0:E6 1E            557              INC     TIMEDIG
98E2:20 32 99         558     LLOOP4   JSR     NEXTLEARN       next one
98E5:C9 03            559              CMP     #PAGEKEY        page?
98E7:F0 0B    98F4    560              BEQ     LOOPPAGE
98E9:A6 1E            561              LDX     TIMEDIG         no: if 2nd digit, complain
98EB:E0 02            562              CPX     #2
98ED:D0 E2    98D1    563              BNE     LLOOP1          otherwise check for #
98EF:20 3A 99         564              JSR     CHECKDEL
98F2:80 EE    98E2    565              BRA     LLOOP4
98F4:                 566     *
98F4:22 A9            567     LOOPPAGE JSR     \STUFFIT.FF     page symbol
98F6:20 32 99         568     LOOPPAGE0 JSR    NEXTLEARN
98F9:20 69 92         569              JSR     CHECKPAGE       legal page?
98FC:D0 0E    990C    570              BNE     LOOPPAGE1
98FE:C9 1A            571              CMP     #DELETE         no
9900:D0 05    9907    572              BNE     LP0
9902:20 70 8E         573              JSR     DELETEIT.RAM    delete
9905:80 DB    98E2    574              BRA     LLOOP4
9907:20 42 99         575     LP0·     JSR     CHECKDEL1       other
990A:80 EA   .98F6    576              BRA     LOOPPAGE0
990C:                 577     *
990C:AF 33            578     LOOPPAGE1 SEB    DASHFLAG
990E:22 A9            579              JSR     \STUFFIT.FF     yes
9910:BF 33            580              CLB     DASHFLAG
9912:                 581     *
9912:20 32 99         582     LOOPPAGE2 JSR    NEXTLEARN
9915:20 5A F4         583              JSR     CHECKKEY        legal key?
9918:D0 05    991F    584              BNE     LOOPKEY1
991A:20 3A 99         585              JSR     CHECKDEL
991D:80 F3    9912    586              BRA     LOOPPAGE2       no
991F:                 587     *
991F:22 A9            588     LOOPKEY1 JSR     \STUFFIT.FF     yes
9921:20 32 99         589     LOOPDONE JSR     NEXTLEARN       wait for endloop
9924:C9 18            590              CMP     #ENDLOOP
9926:F0 05    992D    591              BEQ     LOOPDONE1
9928:20 3A 99         592              JSR     CHECKDEL
992B:80 F4    9921    593              BRA     LOOPDONE
992D:22 A9            594     LOOPDONE1 JSR    \STUFFIT.FF
992F:4C BC F1         595              JMP     LEARN
9932:                 596     *
9932:                 598     *
9932:                 599     * SOME GENERAL ROUTINES TO SAVE CODE
9932:                 600     *
9932:                 601     * get the next key; if cancel, go to endlearn; if
9932:                 602     * anything else, return
9932:                 603     *
9932:22 50            604     NEXTLEARN JSR    \NEXTCANCEL
9934:F0 01    9937    605              BEQ     NEXTL0
9936:60               606              RTS
9937:4C 0C F3         607     NEXTL0   JMP     ENDLEARN
993A:                 608     *
993A:                 609     ******************************************
993A:                 610     *
993A:                 611     * check for delete (direct key) or
993A:                 612     * enablekey (symbol for delete in syntax-checking);
993A:                 613     * if neither, blatt & return as appropriate
993A:                 614     *
993A:C9 1A            615     CHECKDEL CMP     #DELETE
993C:D0 04    9942    616              BNE     CHECKDEL1
993E:20 70 8E         617              JSR     DELETEIT.RAM
9941:60               618              RTS
9942:                 619     *
9942:C9 1C            620     CHECKDEL1 CMP    #ENABLEKEY
9944:D0 04    994A    621              BNE     NOGOOD
9946:20 CD F3         622              JSR     ILLSET
```

```
9949:60              623          RTS
994A:                624  *
994A:20 D0 9C        625  NOGOOD   JSR   BLATT
994D:27 32 049954    626           BBS   KEYINPUT,CDRTS
9950:68              627           PLA                  return to edit
9951:68              628           PLA
9952:A9 00           629           LDA   #0             indicates syntax error
9954:60              630  CDRTS    RTS
9955:                632  *
9955:                633  * patches to alarm
9955:                634  *
9955:C9 1F           635  REVKEY.PATCH CMP #OKKEY
9957:D0 03    995C   636           BNE   RKP1
9959:4C FD 88        637           JMP   ENDREVIEW
995C:C9 1C           638  RKP1     CMP   #ENABLEKEY
995E:F0 0B    996B   639           BEQ   RKP2
9960:57 34 059968    640           BBC   ALARM.WAITING,RKP4 if alarm pending,
9963:FF 8A           641           CLB   ENABLEFLAG   don't allow delete
9965:20 7B 99        642           JSR   ATE1         (change enable status)
9968:4C 21 89        643  RKP4     JMP   REVKEY9
996B:20 D6 92        644  RKP2     JSR   TOGENBL      enable
996E:20 74 99        645           JSR   ATENABLE
9971:                646  *
9971:4C 19 89        647  RKP3     JMP   REVKEY
9974:                648  *
9974:F7 8A 04997B    649  ATENABLE BBC   ENABLEFLAG,ATE1 if Enable on
9977:4F 3A           650           SEB   ATBIT,FLASHACT initiate flashing
9979:80 07    9982   651           BRA   ATE2
997B:5F 3A           652  ATE1     CLB   ATBIT,FLASHACT else no flash
997D:4F 89           653           SEB   ATBIT,BYTE1C & display solid AT
997F:20 D1 8C        654           JSR   FLASH1C
9982:60              655  ATE2     RTS
9983:                656  *
9983:                657  * patch for stuffirs: no stackpage avail
9983:A9 FF           658  STUFFGONE LDA  #$FF
9985:37 32 03998B    659           BBC   KEYINPUT,SGRTS
9988:4C 0C F3        660           JMP   ENDLEARN
998B:60              661  SGRTS    RTS
998C:                663  *
998C:                664  * END OF LEARNING SEQUENCE
998C:                665  *
998C:        998C    666  ENDDO.RAM EQU  *
998C:27 32 0B999A    667           BBS   KEYINPUT,ENDDOR2
998F:                668  *
998F:AE 4A 7D        669           LDX   PROGBUF
9992:E4 12           670           CPX   PROGINDEX    PROGBUF SHOULD BE <PROGINDEX
9994:90 03    9999   671           BCC   ENDDOR9      rts to edit w zflag clear (ok)
9996:4C DE 9C        672           JMP   ILLEGAL.R
9999:60              673  ENDDOR9  RTS
999A:                674  *
999A:A5 31           675  ENDDOR2  LDA   TIMEFLAG
999C:D3 05    99A3   676           BBC   6,A,ENDDOR3  direct interval or +n
999E:                677  *
999E:20 27 F6        678           JSR   ADDINTERVAL
99A1:80 13    99B6   679           BRA   ENDDOR4      to storealarm
99A3:                680  *
99A3:C9 01           681  ENDDOR3  CMP   #1           direct alarm
99A5:D0 15    99BC   682           BNE   ENDDOR1
99A7:                683  *
99A7:                684  * GET SECONDS FOR ALARM;
99A7:                685  * IF ANYDIRECT, SECONDS = 0
99A7:                686  *
99A7:67 33 0C99B6    687           BBS   XTFLAG,ENDDOR4 if already got exectime, skip
99AA:A9 00           688           LDA   #0           DDI6: CLEAR SECONDS
99AC:85 18           689           STA   SECL
99AE:85 19           690           STA   SECH
99B0:67 32 0399B6    691           BBS   ANYDIRECT,ENDDOR4
99B3:                692  *
```

```
99B3:                       693 * UP/DOWN ONLY: READ T1 SECONDS TO PUT IN ALARM
99B3:20 DF F4               694         JSR     READSECONLY
99B6:                       695 *
99B6:20 C8 87               696 ENDDOR4 JSR     STOREALARM
99B9:4C 0C F3               697         JMP     ENDLEARN
99BC:                       698 * STORE DEFINITION
99BC:20 89 81               699 ENDDOR1 JSR     STUFFIRS        insert IRs
99BF:20 C9 9C               700         JSR     GOODSOUND
99C2:20 3C 84               701         JSR     STOREPROG
99C5:20 3A 8C               702         JSR     SETTX.ALL       in case interrupted in OK
99C8:4C 0C F3               703         JMP     ENDLEARN
99CB:                       704 *
99CB:                       705 * display "C" before expand
99CB:                       706 *
99CB:3C 00 39               707 DISPC   LDM     #0,EDCODE       blank
99CE:A9 0C                  708         LDA     #$0C
99D0:20 E0 92               709         JSR     PP1
99D3:3C 8D 39               710         LDM     #$8D,EDCODE     'C'
99D6:A9 0E                  711         LDA     #$0E
99D8:20 E0 92               712         JSR     PP1
99DB:A9 BE                  713         LDA     #190            delay
99DD:4C 0F A8               714         JMP     MILLIWAIT
99E0:                       715 *
99E0:                       716 *
99E0:                       717 * compute checksum
99E0:                       718 *
99E0:A0 00                  719 calcsum LDY     #0
99E2:98                     720         TYA
99E3:3C 80 2C               721         LDM     #$80,ZP1+1
99E6:3C 00 2B               722         LDM     #0,ZP1
99E9:85 38                  723         STA     INCR+1
99EB:18                     724 CS0     CLC
99EC:71 2B                  725         ADC     (ZP1),Y
99EE:90 02     99F2         726         BCC     CS1
99F0:E6 38                  727         INC     INCR+1
99F2:C8                     728 CS1     INY
99F3:D0 F6     99EB         729         BNE     CS0
99F5:E6 2C                  730         INC     ZP1+1
99F7:A6 2C                  731         LDX     ZP1+1
99F9:E0 C0                  732         CPX     #$C0
99FB:D0 EE     99EB         733         BNE     CS0
99FD:85 37                  734         STA     INCR
99FF:60                     735         rts
9A00:                       37          INCLUDE NEWKEY
9A00:                       2 * NEWKEY
9A00:                       3 *
9A00:                       4 * if countdown, we come here to check seconds
9A00:A5 20                  5 CHECKSEC LDA     SECTIME
9A02:F0 02     9A06         6          BEQ     ALARMTIME       if sec <=0, time to do alarm
9A04:10 1A     9A20         7          BPL     CHECKFLASH
9A06:                       8 *
9A06:                       9 * we've counted down to alarm time:
9A06:                       10 *
9A06:          9A06         11 ALARMTIME equ   *               check for REAL alarm
9A06:9F 34                  12         clb     countdown
9A08:20 A3 FA               13         jsr     defqptr
9A0B:22 8D                  14         jsr     \defzero
9A0D:F0 11     9A20         15         beq     checkflash
9A0F:30 0F     9A20         16         bmi     checkflash      not real
9A11:37 34 059A19           17         bbc     alarm.enable,alarmwait
9A14:20 E0 89               18         jsr     process.alarm
9A17:80 07     9A20         19         bra     CHECKFLASH
9A19:                       20 *
9A19:4F 34                  21 ALARMWAIT SEB   ALARM.WAITING   hold for later
9A1B:A9 02                  22         LDA     #2              times to chime
9A1D:20 9A 9C               23         JSR     CHIME0          (means alarm pending)
9A20:                       24 *
9A20:                       25 * now see if it's time to flash (every 3/8 sec)
9A20:                       26 *
```

```
9A20:A5 1F         27 CheckFlash LDA  FLASHTIME    TX COUNTED DOWN TO ZERO?
9A22:F0 04   9A28  28            BEQ  GOFLASH
9A24:C9 04         29            CMP  #4
9A26:90 52   9A7A  30            BCC  CHKEY        IF >4 IT MEANS WE MISSED ONE
9A28:              31 *
9A28:3C 03 1F      32 GOFLASH    LDM  #3,FLASHTIME
9A2B:07 8B 039A31  33            Bbs  HitsMode,ChkWit
9A2E:20 6D F7      34            JSR  FLASHEM      FLASH WHATEVER NEEDS TO BE FLASHED
9A31:              35 *
9A31:              36 *
9A31:              38 *
9A31:              39 * DETERMINE WHETHER TO STP OR WIT WHILE WAITING FOR KEY
9A31:              40 *
9A31:              41 * if we're in execution mode OR CAPTURE,
9A31:              42 * we must automatically return rather than check Sd3
9A31:              43 *
9A31:        9A31  44 CHKWIT     EQU  *             new chkwit
9A31:22 97         45            JSR  \ENBINT
9A33:A9 00         46            LDA  #0
9A35:C5 23         47            CMP  INDEX        if index >0 we're in execution
9A37:D0 40   9A79  48            BNE  RRTS         so return
9A39:E7 34 3D9A79  49            BBS  CAPTUREFLAG,RRTS OR IF CAPTURE
9A3C:              50 * below is entry point from single-step
9A3C:87 34 079A46  51 CHKWIT1    BBS  COUNTDOWN,CHKR2 if countdown, can't STP
9A3F:              52 *
9A3F:              53 *
9A3F:        9A3F  54 CHKR1      EQU  *
9A3F:20 8F 95      55            JSR  READD3.NEW   DISPLAY ON? comes back here
9A42:D0 0E   9A52  56            BNE  CHKR9        if off, STP
9A44:1F 34         57            CLB  DISPOFF
9A46:              58 *
9A46:8F E8         59 CHKR2      SEB  SPKR         make sure sokr is off
9A48:20 D8 9C      60            JSR  USERWIT      no keys: wait for interrupt
9A4B:              61 *
9A4B:97 34 029A50  62            BBC  COUNTDOWN,GKP1
9A4E:80 B0   9A00  63            BRA  CHECKSEC     countdown: check seconds
9A50:80 CE   9A20  64 GKP1       BRA  CHECKFLASH   no countdown:flash
9A52:              65 ******************************
9A52:              66 *
9A52:              68 *
9A52:              69 *
9A52:              70 * display determined to be off
9A52:17 34 029A57  71 CHKR9      BBC  DISPOFF,CHKRA if display was on when alarm went
9A55:80 04   9A5B  72            BRA  STOPIT
9A57:              73 *
9A57:1F 3A         74 CHKRA      CLB  BELLBIT,FLASHACT disable flash
9A59:1F 3C         75            CLB  BELLBIT,BYTEID clear Bell before shutting off
9A5B:              76 *
9A5B:              77 * if cancel was last key, STP; else return Cancel &
9A5B:              78 * STP next time
9A5B:              79 * we're ready to STP (display off, no countdown): we must
9A5B:              80 * send cancel 1st to make sure everything is in neutral state
9A5B:              81 *
9A5B:        9A5B  82 STOPIT     EQU  *
9A5B:FF 6A         83            CLB  ENABLEFLAG
9A5D:CF FE         84            SEB  INTIENBL     allow keyboard
9A5F:E7 8E 079A69  85            BBS  STOPFLAG,STOPIT1
9A62:A9 17         86            LDA  #CANCEL      1st time: send cancel
9A64:85 22         87            STA  KEYNUM
9A66:EF 8E         88            SEB  STOPFLAG     & set flag for next time
9A68:60            89            RTS               return
9A69:              90 *
```

```
9A69:FF 8E         91 STOPIT1   CLB    STOPFLAG
9A6B:8F E8         92           SEB    SPKR
9A6D:20 DB 9C      93           JSR    USERSTP      stop processor
9A70:              94 * (falls thru when key comes)
9A70:              95 *
9A70:              96 *
9A70:              97 * New version of chkey routine.
9A70:              98 * Processes keys in kb array in order.
9A70:              99 * KB.PTR points to next one to be checked.
9A70:             100 * KB.END points to next available slot for a key to go into.
9A70:             101 * KB.BEG points to the 1st still-active key.
9A70:             102 *
9A70:             103 * Hibit set indicates keyup. Bit 6 set indicates a repeater.
9A70:             104 * If kb.ptr points to a keydown, value returned in keynum.
9A70:             105 * If keyup, we go back & set hibit of corresponding keydown;
9A70:             106 * kb.beg is adjusted. [IF KEYNUM NEGATIVE, WE DO NOT RETURN
9A70:             107 * VALUE BUT KEEP LOOKING FOR KEYS.  THE REASON I WAS RETURNING
9A70:             108 * WAS TO HANDLE KEYUP INTERRUPT IN CAPTURE; BUT INTERRUPT
9A70:             109 * CHECKS THE VALUE OF KB,X DIRECTLY SO THIS SHOULD NOT BE
9A70:             110 * NECESSARY. MUST CONFIRM THIS.]
9A70:             111 *
9A70:57 8E 079A7A 112 GETKEY.OUT BBC   OUTMEMFLAG,CHKEY
9A73:             113 *
9A73:A9 1A        114           LDA    #DELETE      delete offending char
9A75:85 22        115           STA    KEYNUM
9A77:5F 8E        116           CLB    OUTMEMFLAG
9A79:60           117 RRTS      RTS
9A7A:             118 *
9A7A:      9A7A   119 CHKEY     EQU    *
9A7A:             120 *
9A7A:             121 * addition to chkey: checks for serial in before getting
9A7A:             122 * another key
9A7A:             123 *
9A7A:20 41 9D     124           Jsr    MitsStart    ;Check if serial input.
9A7D:20 41 9D     125           Jsr    Mitsubishi   ;Service serial interrupt.
9A80:             126 *
9A80:8F E8        127 CHKEYX    SEB    SPKR
9A82:DF FE        128           CLB    INT1ENBL
9A84:1F 8E        129           CLB    SAMEKEY
9A86:20 9D 9B     130           JSR    KEYTRASH     see if kbq trashed by stack
9A89:A5 4E        131           LDA    KB.END
9A8B:C5 4D        132           CMP    KB.BEG
9A8D:D0 06  9A95  133           BNE    SOMEKEY
9A8F:             134 * kb.beg = kb.end: this either means there are no keys in the
9A8F:             135 * queue, or kb.end has wrapped all the way around, ie a
9A8F:             136 * screwup, therefore clear everything
9A8F:20 E5 92     137           JSR    CLEARKEYS
9A92:4C 31 9A     138           JMP    CHKWIT
9A95:C5 4F        139 SOMEKEY   cmp    kb.ptr
9A97:D0 2E  9AC7  140           bne    morekeys
9A99:             141 *
9A99:             142 * no new keys: if executing, exit
9A99:A6 23        143           ldx    index
9A9B:E0 00        144           cpx    #0
9A9D:F0 05  9AA4  145           beq    nonewkeys
9A9F:22 97        146           jsr    \enbint
9AA1:A9 00        147           lda    #0
9AA3:60           148           rts
9AA4:             149 *
9AA4:             150 *
9AA4:             151 * check for still-downs
```

```
9AA4:         9AA4   152 NONEWKEYS EQU   *
9AA4:                153 * some keys still down: go back & look for repeaters
9AA4:                154 *
9AA4:1A              155 look     dec
9AA5:29 OF           156          and    #$f
9AA7:AA              157          tax             x= kb.end-1 (incl wrap)
9AA8:B5 3D           158          lda    kb,x
9AAA:30 13    9ABF   159          bmi    lookrep   ignore keyup
9AAC:D3 11    9ABF   160          bbc    6,a,lookrep  ignore non-repeater
9AAE:                161 *
9AAE:29 3F           162          and    #$3f     got one!
9AB0:CD 0C 7D        163          CMP    LASTKEY   a change
9AB3:D0 02    9AB7   164          bne    look1    if = last key
9AB5:0F 8E           165          seb    samekey  set this flag
9AB7:85 22           166 look1    sta    keynum
9AB9:8D 0C 7D        167          STA    LASTKEY
9ABC:CF FE           168          seb    int1enbl
9ABE:60              169          rts
9ABF:                170 *
9ABF:8A              171 lookrep  txa
9AC0:C5 4D           172          cmp    kb.beg   done?
9AC2:D0 E0    9AA4   173          bne    look     no: keep searching
9AC4:4C 31 9A        174          jmp    chkwit   yes: wait for more keys
9AC7:                175 *
9AC7:                176 * more new keys to process now:
9AC7:                177 *
9AC7:DF FE           178 MOREKEYS CLB    INT1ENBL  this is an entry point from
 capture!
9AC9:A6 4F           179          ldx    kb.ptr
9ACB:B5 3D           180          lda    kb,x
9ACD:85 22           181          sta    keynum
9ACF:8D 0C 7D        182          STA    LASTKEY   includes hibit
9AD2:                183 *
9AD2:8A              184          txa              now inc kb.ptr
9AD3:3A              185          inc
9AD4:29 0F           186          and    #$f
9AD6:85 4F           187          sta    kb.ptr   with wrap
9AD8:                188 *
9AD8:A5 22           189          lda    keynum
9ADA:10 30    9B0C   190          bpl    checkdisp  real key
9ADC:C9 B0           191          cmp    #alarmval
9ADE:F0 48    9B28   192          beq    keyalarm
9AE0:                193 *
9AE0:                194 *
9AE0:         9AE0   195 itskeyup equ    *         keyup: look for corresp. keydown
9AE0:FB              196          clb    7,a       clear hibit for comparison
9AE1:85 22           197          sta    keynum
9AE3:A4 4F           198          ldy    kb.ptr   & change kb.beg if nec.
9AE5:                199 *
9AE5:8A              200 itskey1  txa              kb.ptr-1 w wrap
9AE6:1A              201          dec
9AE7:29 0F           202          and    #$f
9AE9:AA              203          tax
9AEA:B5 3D           204          lda    kb,x
9AEC:85 39           205          STA    EDCODE   temp (OK, I think)
9AEE:29 BF           206          and    #$bf     ignore repeater bit
9AF0:C5 22           207          cmp    keynum   same as key?
9AF2:D0 07    9AFB   208          bne    itsk1
9AF4:A5 39           209          LDA    EDCODE
9AF6:E3              210          seb    7,a      yes: set hibit
9AF7:95 3D           211          sta    kb,x
9AF9:80 04    9AFF   212          bra    keyuploop  & keep looking
9AFB:                213 * [WHAT IF THERE IS NO CORRESPONDING KEY DOWN?]
9AFB:                214 *
9AFB:E3 02    9AFF   215 itsk1    bbs    7,a,keyuploop positive?
9AFD:8A              216          txa
9AFE:A8              217          tay              y = lowest pos value so far.
9AFF:                218 *
9AFF:E4 4D           219 keyuploop cpx   kb.beg
```

```
9B01:D0 E2    9AE5   220           bne      itskey1
9B03:84 4D           221           sty      kb.beg         new value 9B05:E7 34 039B0B    222           bbs      captureflag,keyuprts if in capture, return immed!
9B08:4C 7A 9A        223           JMP      CHKEY          LOOK FOR MORE KEYS!
9B0B:60              224 keyuprts  rts                     return to gocapture
9B0C:                225 *
9B0C:         9B0C   226 CHECKDISP EQU      *
9B0C:20 6F 95        227           JSR      READD3.NEW     is display on?
9B0F:F0 0A    9B1B   228           beq      moretime1
9B11:22 92           229           JSR      \CLRINT
9B13:1B              230           clb      0,a            it was off
9B14:22 1C           231           jsr      \poke16        turn on
9B16:20 3A 8C        232           jsr      settx.all
9B19:                233 *
9B19:22 92           234 moretime  jsr      \clrint
9B1B:A9 F6           235 moretime1 lda      #$f6
9B1D:22 0E           236           jsr      \peek256
9B1F:A9 03           237           lda      #3             update minutes to sleep
9B21:22 1C           238           jsr      \poke16
9B23:A5 22           239           lda      keynum
9B25:22 97           240           jsr      \enbint
9B27:60              241           rts
9B28:                242 *
9B28:                243 *
9B28:         9B28   244 keyalarm  equ      *
9B28:A6 4F           245           ldx      kb.ptr         check prev kb.ptr
9B2A:8A              246           txa
9B2B:1A              247           dec
9B2C:29 0F           248           and      #$f
9B2E:C5 4D           249           cmp      kb.beg         if =kb.beg,
9B30:D0 02    9B34   250           bne      keyalarm0
9B32:86 4D           251           stx      kb.beg         update kb.beg
9B34:F7 34 069B3D    252 keyalarm0 bbc      captureflag,keyalarm3 if in capture
9B37:20 4E 91        253           jsr      captureout     reset alarm
9B3A:4C 0C F3        254           jmp      endlearn       don't bother chiming
9B3D:                255 *
9B3D:         9B3D   256 keyalarm3 equ      *
9B3D:20 49 F7        257           jsr      getsectime     get seconds from 1st alarm
9B40:D0 03    9B45   258           bne      keyalarm1
9B42:4C 06 9A        259           jmp      alarmtime      if zero, alarm is NOW
9B45:8F 34           260 keyalarm1 seb      countdown      else initiate countdown
9B47:20 3A 8C        261           jsr      settx.all      init tx,txpre
9B4A:4C 7A 9A        262           jmp      chkey          ??see if any more keys
9B4D:                263 *
9B4D:                264 *
9B4D:                265 * Move Alarmbuf data to Tempalarm ("last alarm"=current time)
9B4D:                266 *
9B4D:A0 09           267 BUFTOTEMP LDY      #9
9B4F:B9 40 7D        268 BTT1      LDA      ALARMBUF,Y
9B52:99 35 7D        269           STA      TEMPALARM,Y
9B55:88              270           DEY
9B56:10 F7    9B4F   271           BPL      BTT1
9B58:60              272           RTS
9B59:                273 *
9B59:                274 *
9B59:                275 *
9B59:                276 * display 'En'
9B59:                277 *
9B59:F7 8A 109B6C    278 ENABLECHECK BBC ENABLEFLAG,ENCLEAR
9B5C:3C 8F 39        279           LDM      #$8F,EDCODE    E
9B5F:A9 0C           280           LDA      #$0C           6th pos
9B61:20 E0 92        281           JSR      PP1
9B64:3C 46 39        282           LDM      #$46,EDCODE    n
9B67:A9 0E           283 PUTLAST   LDA      #$0E           7th pos
9B69:4C E0 92        284           JMP      PP1
9B6C:3C 00 39        285 ENCLEAR   LDM      #0,EDCODE
9B6F:A9 0C           286           LDA      #$0C
9B71:20 E0 92        287           JSR      PUTONE.PATCH+3
```

```
9B74:80 F1   9B67  288            BRA    FUTLAST
9B76:              289   *
9B76:              290   *
9B76:              291   * TEST FOR LEGAL EDITING TARGET
9B76:              292   * RETURNS + IF LEGAL, - IF ILLEGAL
9B76:              293   *
9B76:A5 11         294 TESTTARGET LDA   CURRKEY
9B78:10 0A   9B84  295            BPL    TTT1
9B7A:A5 10         296            LDA    CURRMODE
9B7C:C9 0A         297            CMP    #$A
9B7E:30 04   9B84  298            BMI    TTT1
9B80:A9 0D         299            LDA    #$D         (A-/C- only)
9B82:C5 10         300            CMP    CURRMODE
9B84:60            301 TTT1       RTS
9B85:              302   *
9B85:              303   *
9B85:              304   * WRITE VALUES INTO TIME2
9B85:              305   *
9B85:        9B85  306 FIXTIME2.RAM EQU *
9B85:E7 31 149B9C  307            BBS    7,TIMEFLAG,FR2A program mode: don't displ
ay time
9B88:97 33 119B9C  308            BBC    ACTTIME,FR2A doittime: skip
9B8B:20 0D F5      309            JSR    WRITET2TIME
9B8E:A9 64         310            LDA    #100
9B90:20 0F A8      311            JSR    MILLIWAIT   delay needed (on some machi
nes)
9B93:17 31 069B9C  312            BBC    0,TIMEFLAG,FR2A skip tog2nd if "set"

9B96:              313   *
9B96:20 16 81      314            JSR    TOG2ND      restore 2nd,rpt
9B99:20 08 81      315            JSR    TOGRPT
9B9C:60            316 FR2A       RTS
9B9D:              317   *
9B9D:              318   *
9B9D:A9 0F         319 KEYTRASH   LDA    #$0F        if one of kb ptrs >f
9B9F:C5 4F         320            CMP    KB.PTR
9BA1:90 09   9BAC  321            BCC    YESTRASH
9BA3:C5 4D         322            CMP    KB.BEG
9BA5:90 05   9BAC  323            BCC    YESTRASH
9BA7:C5 4E         324            CMP    KB.END
9BA9:90 01   9BAC  325            BCC    YESTRASH
9BAB:60            326            RTS
9BAC:4C 00 F1      327 YESTRASH   JMP    $F100       do a reset
9BAF:               38            INCLUDE NEWEDIT
9BAF:                2   * NEWEDIT
9BAF:                3   *
9BAF:                4   * Additions to Edit to account for changing numirs
9BAF:                5   *
9BAF:AD 0D 7D        6 EDITENABLE LDA   NUMIRS
9BB2:30 03   9BB7    7            BMI    EDEN1
9BB4:20 15 9C        8            JSR    NEWNUMIRS
9BB7:7F 3A           9 EDEN1      CLB    EDITBIT,FLASHACT in case we're toggling 0
FF
9BB9:4C D6 92       10            JMP    TOGENBL
9BBC:               11   *
9BBC:               12   * Edit keys when not enabled: allow c-, 1-8 only
9BBC:               13   *
9BBC:        9BBC   14 IRCHANGES  EQU    *
9BBC:C9 02          15            CMP    #CDASH
9BBE:D0 0D   9BCD   16            BNE    CHANGENUM
9BC0:B9 49 7D       17            LDA    PROGBUF-1,Y C-: check for capture to le
ft
9BC3:C9 21          18            CMP    #IRSYMBOL
9BC5:D0 26   9BED   19            BNE    ZBLATT
9BC7:20 F0 95       20            JSR    GETIRNUM
9BCA:4C 0C 86       21            JMP    EDDKEY
9BCD:C9 08          22 CHANGENUM  CMP    #KEY1
9BCF:90 1C   9BED   23            BCC    ZBLATT
9BD1:C9 10          24            CMP    #KEY9
9BD3:B0 18   9BED   25            BCS    ZBLATT
9BD5:AE 0D 7D       26            LDX    NUMIRS      1-8
```

```
9BD8:30 13    9BED    27          BMI      ZBLATT
9BDA:22 9C            28          JSR      \CONVOF
9BDC:1A               29          DEC                        ;0-7
9BDD:48               30          PHA
9BDE:AA               31          TAX
9BDF:20 07 9C         32          JSR      DISPIRNUM
9BE2:68               33          PLA
9BE3:0A               34          ASL
9BE4:0A               35          ASL
9BE5:0A               36          ASL
9BE6:0A               37          ASL
9BE7:8D 0D 7D         38          STA      NUMIRS
9BEA:4C 0C 86         39          JMP      EDDKEY
9BED:                 40 *
9BED:4C 56 86         41 ZBLATT   JMP      EDITBLATT
9BF0:                 42 *
9BF0:                 43 *
9BF0:                 44 * Look up # of repeats in IR code
9BF0:                 45 *
9BF0:C6 12            46 GETIRNUM DEC      PROGINDEX
9BF2:C6 12            47          DEC      PROGINDEX
9BF4:20 C5 82         48          JSR      GETIROFF         returns offset
9BF7:AA               49          TAX
9BF8:BD 8C 7D         50          LDA      IRDATA+1,X       one after length byte
9BFB:29 70            51          AND      #$70
9BFD:8D 0D 7D         52          STA      NUMIRS
9C00:E6 12            53          INC      PROGINDEX        back to normal
9C02:E6 12            54          INC      PROGINDEX
9C04:22 68            55          JSR      \LSR4
9C06:AA               56          TAX
9C07:                 57 *
9C07:BD 58 83         58 DISPIRNUM LDA     EDITCODES+8,X display 0-7 as numbers 1-8
9C0A:85 39            59          STA      EDCODE
9C0C:A5 14            60          LDA      CURRPOS
9C0E:1A               61          DEC
9C0F:85 15            62          STA      SCRNPOS
9C11:20 DD 92         63          JSR      PUTONE.PATCH
9C14:60               64          RTS
9C15:                 65 *
9C15:                 66 *
9C15:                 67 * Change # of repeats
9C15:                 68 *
9C15:        9C15     69 NEWNUMIRS EQU     *
9C15:AD 0D 7D         70          LDA      NUMIRS
9C18:30 17    9C31    71          BMI      NNUM1
9C1A:C6 12            72          DEC      PROGINDEX
9C1C:C6 12            73          DEC      PROGINDEX
9C1E:20 C5 82         74          JSR      GETIROFF
9C21:AA               75          TAX
9C22:BD 8C 7D         76          LDA      IRDATA+1,X
9C25:29 8F            77          AND      #$8F
9C27:0D 0D 7D         78          ORA      NUMIRS
9C2A:9D 8C 7D         79          STA      IRDATA+1,X
9C2D:E6 12            80          INC      PROGINDEX
9C2F:E6 12            81          INC      PROGINDEX
9C31:60               82 NNUM1    RTS
9C32:                 83 *
9C32:                 84 *
9C32:                 85 **************
9C32:                 86 * patch for edit
9C32:                 87 *
9C32:20 8D 94         88 EDIT.PATCH JSR   STACKPAGE         a page available?
9C35:90 06    9C3D    89          BCC      EDP1
9C37:20 7D 94         90          JSR      BLATT2           no
9C3A:4C 0C F3         91          JMP      ENDLEARN
9C3D:A0 00            92 EDP1     LDY      #0               move 7fs to zp1
9C3F:A9 7F            93          LDA      #$7F
9C41:91 2B            94 EDP2     STA      (ZP1),Y
9C43:C8               95          INY
9C44:D0 FB    9C41    96          BNE      EDP2
9C46:20 59 9C         97          JSR      CLRNUMIRS
```

```
9C49:              98 *
9C49:20 9A 84      99           JSR   GETDEFAD
9C4C:F0 08   9C56 100           BEQ   EDP3         zflag set if present
9C4E:A2 00        101           LDX   #0           not present
9C50:20 72 82     102           JSR   STRIPEND     7's to progout
9C53:4C F3 85     103           JMP   PUTECHARS
9C56:4C D5 85     104 EDP3      JMP   EDD1
9C59:             105 *
9C59:A9 FF        106 CLRNUMIRS LDA   #$FF
9C5B:8D 0D 7D     107           STA   NUMIRS
9C5E:60           108           RTS
9C5F:              39           INCLUDE ROMNEW
9C5F:              -2 * ROMNEW
9C5F:              3 ; subs that were in ROM but had to be modified for the R/
W problem.
9C5F:              4 ;
9C5F:              5 ; by Tim Schmidt, 6/12/87.
9C5F:              6 ;
9C5F:              7 ; 19200 input IRQ routine.
9C5F:              8 ;
9C5F:48            9 In19200   PHA
9C60:8A           10            TXA
9C61:48           11            PHA
9C62:A2 1B        12            Ldx   #27
9C64:A9 80        13            Lda   #$80
9C66:CA           14 BitDly    Dex
9C67:D0 FD  9C66  15            Bne   BitDly
9C69:A6 03        16            Ldx   Const15
9C6B:4A           17            Lsr   A
9C6C:57 E8 019C70 18            Bbc   Serin,GotBit
9C6F:E8           19            Seb   MSB,A
9C70:90 F4  9C66  20 GotBit    Bcc   BitDly
9C72:85 00        21            Sta   Indata
9C74:E8           22            Seb   MSB,A
9C75:85 02        23            Sta   InData7
9C77:8F FE        24            Clb   Int2Req
9C79:68           25            Pla
9C7A:AA           26            TAX
9C7B:68           27            PLA                ;Through away saved TCR.
9C7C:68           28            PLA                ;Restore A.
9C7D:40           29            RTI
9C7E:             30 ;
9C7E:48           31 InWait    PHA
9C7F:A9 FF        32            Lda   #$FF
9C81:85 FC        33            Sta   TxPre
9C83:85 FD        34            Sta   Tx
9C85:CF FF        35            Seb   TxEnbl
9C87:E7 02 089C92 36 InTest    Bbs   InFlag,InGot
9C8A:58           37            CLI
9C8B:C2           38            WIT
9C8C:1A           39            Dec   A
9C8D:D0 F8  9C87  40            Bne   InTest
9C8F:4C 00 F0     41            Jmp   $F000
9C92:DF FF        42 InGot     Clb   TxEnbl
9C94:FF 02        43            Clb   InFlag
9C96:68           44            Pla
9C97:60           45            RTS
9C98:             46 ;
9C98:             47 * SOUND EFFECTS
9C98:             48 *
9C98:             49 * CHIME = HIGH-PITCHED, REPEATED 3 TIMES
9C98:             50 * \BLATT = LOW-PITCHED, REPEATED ONCE
9C98:             51 *
9C98:A9 03        52 CHIME     LDA   #3            # times to repeat
9C9A:48           53 CHIME0    PHA
9C9B:3C 02 36     54            LDM   #$2,VAR1     wavelength
9C9E:A9 28        55            LDA   #40          try longer duration
9CA0:20 AE 9C     56            JSR   SOUND
9CA3:3C 00 36     57            LDM   #0,VAR1      max possible delay
9CA6:20 BE 9C     58            JSR   SPKRWAIT
9CA9:68           59            PLA
9CAA:1A           60            DEC
```

```
9CAB:D0 ED    9C9A      61              BNE     CHIME0
9CAD:60                 62              RTS
9CAE:                   63 *
9CAE:                   .
9CAE:48                 64 SOUND        PHA                     basic sound routine
9CAF:9F E3              65              CLB     SPKR            on
9CB1:20 BE 9C           66              JSR     SPKRWAIT        wait
9CB4:8F E3              67              SEB     SPKR            off
9CB6:20 BE 9C           68              JSR     SPKRWAIT        wait
9CB9:68                 69              PLA
9CBA:1A                 70              DEC
9CBB:D0 F1    9CAE      71              BNE     SOUND           zflag set here: correct for edit!
9CBD:                   72 *
9CBD:60                 73              RTS
9CBE:                   74 *
9CBE:A6 36              75 SpkrWait     LDX     VAR1            replace by some JSR PEEKB 1 cop?
9CC0:A0 00              76              LDY     #0
9CC2:C8                 77 SPKR1        INY
9CC3:D0 FD    9CC2      78              BNE     SPKR1
9CC5:CA                 79              DEX
9CC6:D0 FA    9CC2      80              BNE     SPKR1
9CC8:60                 81              RTS
9CC9:                   82 *
9CC9:A9 50              83 GOODSOUND    LDA     #80             for ir ok; 2 X length; do o nce
9CCB:3C 02 36           84              LDM     #2,VAR1
9CCE:80 DE    9CAE      85              BRA     SOUND
9CD0:                   86 *
9CD0:3C 08 36           87 Blatt        Ldm     #8,VAR1
9CD3:A9 0A              88              Lda     #10
9CD5:4C AE 9C           89              Jmp     Sound
9CD8:                   90 *
9CD8:58                 91 UserWIT      CLI
9CD9:C2                 92              WIT
9CDA:60                 93              RTS
9CDB:                   94 *
9CDB:58                 95 UserSTP      CLI
9CDC:42                 96              STP
9CDD:60                 97              RTS
9CDE:                   98 *
9CDE:                  100 *
9CDE:                  101 * ILLEGAL ENTRY IN LEARNING SEQUENCE
9CDE:                  102 *   (or after deleting a key)
9CDE:                  103 *
9CDE:B7 34 0B9CEC      104 ILLEGAL.R    BBC     DELETEFLAG,RILLEGAL1
9CE1:                  105 *
              9CE1:C6 14     106              DEC     CURRPOS         previous action was delete
9CE3:C6 12             107              DEC     PROGINDEX
9CE5:2F 32             108              SEB     KEYINPUT        continue inputting by hand
9CE7:BF 34             109              CLB     DELETEFLAG
9CE9:4C BC F1          110              JMP     LEARN
9CEC:20 D0 9C          111 RILLEGAL1    JSR     BLATT           returns w zflag set
9CEF:27 32 019CF3      112              BBS     KEYINPUT,RILL3
9CF2:60                113              RTS                     return to edit
9CF3:4C BC F1          114 RILL3        JMP     LEARN
9CF6:                  115 *
9CF6:                  116 ****************************
9CF6:                  118 *
9CF6:                  119 * HANDLE "DO" INPUT
9CF6:                  120 *
9CF6:A5 10             121 MAINDO.RAM   LDA     CURRMODE
9CF8:8D 20 7D          122              STA     TARGMODE
9CFB:A5 11             123              LDA     CURRKEY
9CFD:8D 2A 7D          124              STA     TARGKEY
9D00:20 01 F4          125              JSR     CHECKTARG
9D03:                  126 *
9D03:D0 03    9D08     127              BNE     MAINDO1.RAM
9D05:4C D0 9C          128              JMP     BLATT
9D08:2F 32             129 MAINDO1.RAM  SEB     KEYINPUT        ;LEGAL TARGET
9D0A:20 99 F7          130              JSR     DISPTARGET      MODE/KEY IN TIME
```

```
9D0D:20 8D F5      131            JSR    CLRDISP
9D10:3C FF 12      132            LDM    #$FF,PROGINDEX
9D13:              133 *
9D13:              134 *
9D13:20 3C F3      135            JSR    SETLEARN
9D16:              136 * (fails thru)
9D16:              137 *
9D16:4C BC F1      138            JMP    LEARN
9D19:              140 *
9D19:              141 *
9D19:              142 * HANDLE "DO" WITHIN TIMEINPUT (ALARMS OR INTERVALS ONLY)
9D19:              143 *
9D19:17 31 0C9D28  144 SETDO.RAM  BBC    0,TIMEFLAG,ILLSET.RAM  ;DO: only allowed in "at"
9D1C:68            145            PLA                          convert from jsr to jmp
9D1D:68            146            PLA                          [this may not be nec]
9D1E:              147 *
9D1E:20 3C F3      148            JSR    SETLEARN
9D21:              149 *
9D21:F7 31 019D25  150            BBC    7,TIMEFLAG,SETDO3.RAM
9D24:60            151            RTS                          DO/AT: RETURN FROM TIMEINPUT
9D25:              152 *
9D25:4C BC F1      153 SETDO3.RAM JMP    LEARN
9D28:              154 *  GET ALARM ID AT END OF PROGRAM!
9D28:              155 *
9D28:              157 *
9D28:              158 * ILLEGAL ENTRY DURING TIMESET
9D28:              159 * (or after deleting a key)
9D28:              160 *
9D28:B7 34 099D34  161 ILLSET.RAM BBC    DELETEFLAG,ILLSET0.RAM
9D2B:C6 14         162            DEC    CURRPOS
9D2D:C6 12         163            DEC    PROGINDEX
9D2F:BF 34         164            CLB    DELETEFLAG
9D31:2F 32         165            SEB    KEYINPUT
9D33:60            166            RTS
9D34:20 D0 9C      167 ILLSET0.RAM JSR   BLATT
9D37:27 32 069D40  168            BBS    KEYINPUT,ILLSET1.RAM
9D3A:68            169            PLA                          if syntax error, bypass return
9D3B:68            170            PLA
9D3C:68            171            PLA
9D3D:68            172            PLA                          twice
9D3E:A9 00         173            LDA    #0                    set zflag to indicate syntax error
9D40:60            174 ILLSET1.RAM RTS
9D41:              175 *
9D41:              176 *
9D41:              40             INCLUDE Mits
9D41:       9D41   1  Mitsubishi EQU    *
9D41:1F 8B         2  MitsStart  CLB    MitsMode
9D43:60            3             RTS
9D44:       02BC   41             DS    $A000-*,$FF
A000:              42 *

A000:              43             1st    on    for symbols
```

| | | | |
|---|---|---|---|
| 8EE9 A.KEY | 91B5 ABORT.CAPTURE | 04EC ACK4 | 0433 ACTTIME |
| 00 ADASH | F727 ADD10X | 018E ADDFLAG | F5B0 ADDINCR1 |
| F5A5 ADDINCR | F5B3 ADDINCR2 | 9387 ADDINT.RAM | 8023 ADDINTERVAL.V |
| F627 ADDINTERVAL | 8984 ADJ1 | 8B9F ADJUST.MORE | 897D ADJUST |
| 9367 ADDITT1 | 937D ADDITT2 | 9372 ADDITT3 | 8863 AID0 |
| 0134 ALARM.ENABLE | 0234 ALARM.WAITING | 7D40 ALARMBUF | 0634 ALARMFLAG |
| 8877 ALARMID1 | 885F ALARMID | 8898 ALARMID3 | 88CF ALARMID4 |
| 0532 ALARMMODE | 881D ALARMOFF | 8810 ALARMON | 7D00 ALARMQ |
| 7D0E ALARMSTACK | 9A06 ALARMTIME | 8800 ALARMTO4 | B0 ALARMVAL |
| 9A19 ALARMWAIT | ? 41 ALLHIGH.4 | 881C ALRTS | ? 00 AMKEY |
| 0332 ANYDIRECT | 89F2 APRTS | 7D34 AQKEY | FA94 AQPLUS10 |
| 89CB AQT1 | 89D3 AQT2 | 89DB AQT8 | 89DD AQT9 |
| 8D01 ARROW1 | 8D04 ARROW3 | 8D14 ARROW4 | ?8CF3 ARROWS |
| 02 ATBIT | 997B ATE1 | 9982 ATE2 | 9974 ATENABLE |
| 8CCB ATFLASH | 15 ATKEY | 8EDA B.KEY | 93D0 BADDINT0 |
| 93D4 BADDINT1 | 93C4 BADDINTQ | 93A3 BADDINTX | 93A9 BADDINTZ |
| 8BB7 BADIR | 8F6C BADSUM | 8E05 BADUPDOWN | ?06E8 BATT |
| ? 90 BCC | 01 BDASH | 1B BEGINLOOP | 00 BELLBIT |
| 8CBF BELLFLASH | 00 BIT0 | 01 BIT1 | 04 BIT2ND |
| 02 BIT2 | 03 BIT3 | 04 BIT4 | 05 BIT5 |
| 06 BIT6 | 07 BIT7 | ? 04 BITCTR | 9C66 BITDLY |
| F82F BLANKRIGHT | 947D BLATT2 | FF00 BLAT | 9CD0 BLATT |
| 8141 BLATTSET | 8CA5 BREAK | ? 04 BRKBIT | DA BRKVECT |
| 9B4F BTT1 | 88CD BUFTOID | ?7F00 BUF | 9B4D BUFTOTEMP |
| 89 BYTE1C | 3C BYTE1D | 8EC0 C.KEY | 8541 CALCMBYTES |
| 99E0 CALCSUM | 17 CANCEL | 915A CAPTOUT1 | 0734 CAPTUREFLAG |
| A800 CAPTURE | 914E CAPTUREOUT | 7A49 CAPTURESTACK | 955B CBN1 |
| 956A CBN2 | 957F CBT1 | 958E CBT2 | 9559 CBUFNEXT |
| 957D CBUFTEMP | 02 CDASH | 9954 CDRTS | 9BCD CHANGENUM |
| 8F5B CHECKCHECK | 993A CHECKDEL | 9942 CHECKDEL1 | 9B0C CHECKDISP |
| F440 CHECKFLAG2 | F436 CHECKFLAG | F444 CHECKFLAG1 | 9A20 CHECKFLASH |
| F45A CHECKKEY | F457 CHECKMODE1 | F456 CHECKMODE2 | ?F445 CHECKMODE |
| 927D CHECKPAGE1 | 9269 CHECKPAGE | 927C CHECKPAGE2 | 9A00 CHECKSEC |
| 7D28 CHECKSUM | F401 CHECKTARG | 9C9A CHIME0 | 9C98 CHIME |
| 9A80 CHKEYX | 9A7A CHKEY | ?9A3F CHKR1 | 9A46 CHKR2 |
| 9A52 CHKR9 | 9A57 CHKRA | 9A31 CHKWIT | 9A3C CHKWIT1 |

| | | | |
|---|---|---|---|
| 92E5 CLEARKEYS | 8F2A CLEARQ | F88D CLRDISP | ?F890 CLRDISP0 |
| F892 CLRFILE0 | F896 CLRFILE1 | F898 CLRFILE | F89E CLRF |
| FF92 CLRINT | 9C59 CLRNUMIRS | F539 CLRSEC | 9827 CLRSTEP |
| F419 CLRTARG | 8551 CMB1 | FACF CMPD1 | FAC3 CMPDEFQ |
| 88AA CMPTIME | 88B8 CMPTIME2 | 88BE CMPTIME3 | 951B CMPZP1KEYS |
| 956B CNEXTTEMP | 956D CNT1 | 957C CNT2 | ?8002 CODENTRY |
| ?CODE CODE | ? 06 COL.FILE.4 | A803 COMPRESS | 9707 COMPUTEIT |
| ?8000 CONFIRM1 | ?8001 CONFIRM2 | 03 CONST15 | 05 CONST5 |
| FF9C CONVOF | FF62 CONVKEY | FF5C CONVMODE | F83D CONVTAB |
| 0434 COUNTDOWN | 8F45 CQ1 | 8342 CRASH | 8301 CRASHTEST |
| 91BE CREATE.KB | 99EB CS0 | 99F2 CS1 | 830D CT0 |
| 8320 CT1 | 8338 CT2 | 8AD5 CTIME0 | 8AD9 CTIME1 |
| 11 CURRKEY | 10 CURRMODE | 14 CURRPOS | FA7E CURRTOID |
| 83DC CURSOFF1 | 7EA4 CURSORADDR | 06 CURSORBIT | 83C9 CURSORFLASH |
| 83DA CURSOROFF | ?83D2 CURSORON | 9514 D1280 | 9515 D1281 |
| 951A D1282 | 95AC D3A | 95AA D3B | 0533 DASHFLAG |
| 7D19 DAYSAVE | 1D DAY | ? 13 DAYDOWN | ? 12 DAYUP |
| D0 DBITFILE.4 | 8D7C DDG.RAM | 8D90 DDIG.0A | 8D9C DDIG.1 |
| 8DAB DDIG.2 | 8DAE DDIG.2A | 8DC6 DDIG.3 | 8DF0 DDIG.N0 |
| 97D3 DDONE0 | 97E8 DDONE1 | 97BF DDONE2 | 97E2 DDONE4 |
| 97E5 DDONE5 | 94E8 DDP1 | E1 DDRP0 | E3 DDRP1 |
| E5 DDRP2 | E9 DDRP3 | EB DDRP4 | ? EB DDTD4 |
| 941A DECDAYZ | F5CA DECDAY | F61F DECHRC | 944C DECHRCZ |
| 9431 DECHRZ | 9447 DECMINCZ | F61A DECMINC | 9404 DECMINZ |
| 95AF DEF.PATCH | FAA2 DEF10XX | 8B41 DEF2BUFTEMP | 847B DEFDOWN |
| 94DD DEFDOWN.PATCH | 8480 DEFDOWN2 | 9743 DEFONSTACK.RAM | ?802F DEFONSTACK.V |
| FA97 DEFPLUS10 | 29 DEFPTR | FA89 DEFPTRALARMQ | FAA3 DEFQPTR |
| ?FA29 DEFRTS | 9504 DEFS128 | 94EE DEFSIZE | FF8D DEFZERO |
| 9545 DEL.0 | 9558 DEL.1 | 8985 DELETE.ALARM | 8E94 DELETE.PATCH |
| 0534 DELETEFLAG | 8E70 DELETEIT.RAM | 1A DELETE | 9526 DELETE.CHECK |
| 9236 DELETEIR | 801B DELETEIT.V | 8E6A DELETETIME.RAM | 924C DELIR1 |
| 8E9A DELOK | 95B7 DFP1 | 25 DIFF | 24 DIGIT |
| F8C4 DISPCURR | F6DC DISPCURR1 | F8BB DISPCURX | F8C7 DISPCURZ |
| 99CB DISPC | F7A9 DISPINT0 | F7A5 DISPINT | 8025 DISPINT1.V |
| F7B0 DISPINT1 | 9C07 DISPIRNUM | 98C4 DISPIT | F7C7 DISPMK1 |
| F7E4 DISPMK1A | F7D8 DISPMK3 | F7DB DISPMK4 | F79C DISPMK |

| | | | |
|---|---|---|---|
| F7ED DISPMK2 | 34 DISPOFF | F799 DISPTARGET | F680 DISPTIME |
| 27 DISPVAL | ? D3 DLCD.4 | F287 DLEARN1 | F26E DLEARNMODE |
| F991 DLRN0 | F98F DLRN01 | F9AD DLRN2 | F9C2 DLRN3 |
| F9C6 DLRN4 | F989 DLRN | 9671 DNR1 | 92F3 DOALARM.RAM |
| 92FD DOAR1 | 9309 DOAR2 | 83E0 DOCURSOR | 8BBD DOIR2 |
| ?F9F3 DOITAT | 9354 DOITAT.RAM | 965C DOITEND | 8BB0 DOITIR.RAM |
| 8C38 DOITIRDONE | 8BF8 DOITIREXP | 8BF0 DOITIRZ | 8146 DOITJSR |
| F902 DOIT | 9357 DOITATR1 | 8BF3 DOITIROUT | ?F9D1 DOITIR |
| F986 DOITLEARN | 973C DOITLOOPEND | 96E3 DOITLOOP | 965F DOITNEXT.RAM |
| 802D DOITNEXT.V | ?F94B DOITNEXT | 95B8 DOITQ.RAM | 8029 DOITQ.V |
| F905 DOITQ | F9FB DOITSET | FA06 DOITT1 | FA20 DOITT2 |
| FA11 DOITT3 | FA01 DOITTIME | 9382 DOITWAIT | 1E DOKEY |
| 9701 DOLOOP0 | 9726 DOLOOP1 | 9713 DOLOOP2 | 9727 DOLOOP3 |
| 96EA DOLOOP4 | 96EC DOLOOP5 | 0732 DONEALARM | 802B DONEDONE.V |
| F936 DONEDONE | 97A8 DONEDONE.RAM | 8BAD DONT.ADJUST | 8AFA DONT |
| F4A4 DOSET1B | F48E DOSET | F498 DOSET1A | ?F493 DOSET1 |
| F4AB DOSET2 | ?F4AE DOSET3 | F5D4 DOWNDAY1 | 9424 DOWNDAY1Z |
| 9425 DOWNDAY2Z | F5D5 DOWNDAY2 | F600 DOWNHR1 | F607 DOWNHR2 |
| F5F7 DOWNHR | ?F000 DOWNLOAD | 95D4 DQ1 | ?0705 DUMMYBIT |
| 39 EDCODE | 85D5 EDD1 | 85E2 EDD2 | 8668 EDD3A |
| 8666 EDD3X | 8662 EDD3Z | 865B EDD3 | 866A EDD4 |
| 8676 EDD4A | 86A1 EDD5A | ?8691 EDD5B | ?868F EDD5D |
| 8683 EDD5 | 8639 EDD7A | 8626 EDD7 | 8646 EDD7B |
| 864E EDD7C | 8602 EDDENBL | 860C EDDKEY | 8680 EDDQ |
| 9BB7 EDEN1 | 86BA EDFIN | 86D4 EDFIN0 | 86ED EDFIN1 |
| 86FC EDFIN2 | 9C32 EDIT.PATCH | ?856E EDIT1 | 03 EDITBIT |
| 855E EDIT | 8575 EDIT1A | 8656 EDITBLATT | 8350 EDITCODES |
| 85D2 EDITDEF | 9BAF EDITENABLE | 8CB3 EDITFLASH | 16 EDITKEY |
| 8707 EDITORCANCEL | 8702 EDITOUT | 8710 EDITTARGET | 8721 EDK0A |
| 8715 EDK0 | ?8728 EDK1 | 8736 EDK2 | 873F EDK5 |
| 8744 EDM1 | 874E EDM2 | ?8751 EDM3 | ?8755 EDM4 |
| 8761 EDM5 | 8765 EDM6 | 9C3D EDP1 | 9C41 EDP2 |
| 9C56 EDP3 | 21 EIGHTHS | 0334 EKBIT | 9B59 ENABLECHECK |
| 078A ENABLEFLAG | 92D0 ENABLEIT | 1C ENABLEKEY | FF97 ENBINT |
| 9B6C ENCLEAR | 850B ENDDEFSZP1 | 7D08 ENDDEFS | 998C ENDDO.RAM |
| F2CF ENDDO | 8011 ENDDO.V | 99BC ENDDOR1 | 999A ENDDOR2 |

| | | | |
|---|---|---|---|
| 9943 ENDDOR3 | 99B6 ENDDOR4 | 9999 ENDDOR9 | F30C ENDLEARN |
| 18 ENDLOOP | 94BA ENDMOVE | 7D04 ENDQ | 8521 ENDQZP1 |
| 88FD ENDREVIEW | 7D0A ENDSTACK | 94D4 ENUFROOM | ? 90 ERLINGVARS |
| 0133 EXECFL | 7EA7 EXECTIME | A806 EXPAND | 8C06 EXPRPT |
| 04EE F0 | 05EE F1 | F570 FD2A | 8CF0 FILL.ARROWS |
| 8772 FILLD0 | 8784 FILLD1 | 8791 FILLD2 | 8799 FILLD3 |
| 879E FILLD4 | 87AC FILLD5 | 87B2 FILLD6 | 876A FILLDISP |
| 7D1B FIRSTFLAG | F8E2 FIXKEY1 | ?F8E6 FIXKEY2 | F8DD FIXKEY |
| 92B1 FIXPAGE2 | 9299 FIXPAGE | 92A3 FIXPAGE1 | 92AB FIXPAGE2A |
| ?F567 FIXT2A | 9B85 FIXTIME2.RAM | 8021 FIXTIME2.V | F558 FIXTIME2 |
| 043B FLAG2ND | 32 FLAGS1 | 33 FLAGS2 | 34 FLAGS3 |
| 8CD1 FLASH1C | 8CC5 FLASH1D | 8CD5 FLASH1X | 8110 FLASH2ND |
| 3A FLASHACT | 83BC FLASHBOTH | 3C FLASHBYTE | 8031 FLASHEM.V |
| F77D FLASHEM1 | F793 FLASHEM2 | F76D FLASHEM | 7E95 FLASHIND |
| 839C FLASHJSR | ?0733 FLASHKEY | ?0633 FLASHMODE | 3B FLASHON |
| 1F FLASHTIME | 8181 FOLLOWDONE | 8166 FOLLOWUP | 9B9C FR2A |
| 25 FROM | EC FROM4 | ?8183 FRTS | $03D GCN1 |
| 9052 GCN2 | 882A GETALARMAD | 89BF GETAQFLAGS | 899E GETAQTIME |
| F827 GETCODE | 9195 GETDATA | 84A4 GETDEF1 | 84B5 GETDEF2 |
| 849A GETDEFAD | F7F9 GETDV | 9BF0 GETIRNUM | 82C5 GETIROFF |
| 9A70 GETKEY.OUT | 82C2 GETKEY | 9454 GETMINDAYZ | F665 GETMINDAY |
| 8281 GETNEXT | 82DD GETOFF1 | 82D0 GETOFF2A | 82CA GETOFF2 |
| 82E7 GETOFF3 | 82E0 GETOFF4 | 8300 GETOFFIT | 82DB GETOFFONE |
| 8854 GETQP1 | 8845 GETQPTR | 8B4F GETQP | F749 GETSECTIME |
| 8578 GETTARGET | 889F GETTODAY | ?F7F8 GETTV1 | F7F3 GETTV |
| 9A50 GKP1 | 945F GMDOZ | ?F671 GMD1 | 8295 GNXT1 |
| 82A9 GNXT2 | 8CC3 GO1D | 8F75 GOAHEAD | 903A GOCAPTURE.NOCO |
| 9067 GOCAPTURE0 | ?9064 GOCAPTURE1 | ?9081 GOCAPTURE2 | 9146 GOCAPTURE3 |
| 9807 GODOIT | 9A28 GOFLASH | 8E08 GOILLSET | 9055 GONO |
| 9CC9 GOODSOUND | ?8D35 GORAM1 | 8091 GOSET | 8097 GOSETPROG |
| 9C70 GOTBIT | 84C6 GOTDEFAD | 90B8 GOTIR1 | 90D8 GOTIR1B |
| ?9091 GOTIR | 90D4 GOTIR1A | 90B3 GOTIR2 | 9097 GOTIR3 |
| 91E7 GOTKEY1 | 9214 GOTKEY2 | 91FB GOTKEY3 | 91CD GOTKEY |
| 8644 GOTLOC | 0432 GOTMODE | 8D17 GOUSER.RAM | 8013 GOUSER.V |
| F321 GOUSER1 | F30F GOUSER | 80AA GSP1 | 858E GT0 |
| 859B GT1A | 8594 GT1 | 85A5 GT2 | 85C5 GT3 |

| | | | |
|---|---|---|---|
| 85CD GT4 | 8589 GT5 | 85B2 GT7 | 85B5 GT8 |
| 85C9 GT9 | 882D GTLM1 | 882F GTLM2 | 8838 GTLM3 |
| 883D GTLM4 | 8598 GTOUT | 8CAB HIPITCH | 22 HKEY |
| ? 05 HOURDOWN | ? 04 HOURUP | 8B71 HR1TO2.REV | F703 HR1TO2 |
| 8B7F HR2TO1.REV | 16 HRH | 17 HRL | F724 HRT1A |
| 1C HR | F718 HR2TO1 | 8B7C HRR1 | 8B89 HRR2 |
| F713 HRT2A | FE ICR | 7E8A IDBYTES | 8889 IDDAY1 |
| ?887F IDDAY | ?888C IDFLAGS | 8893 IDFLAGS1 | 7EBB IDKEY |
| 7E8A IDMODE | 88C3 IDTOBUF | 8C88 III | 9CDE ILLEGAL.R |
| 800F ILLEGAL.V | 8FE4 ILLEGALR | 9D28 ILLSET.RAM | 9D34 ILLSETO.RAM |
| F3E4 ILLSET1 | 9D40 ILLSET1.RAM | F3CD ILLSET | F3D9 ILLSETO |
| 9C5F IN19200 | 940D INCDAYZ | F5BD INCDAY | 943E INCHRCZ |
| F611 INCHRC | 942B INCHRZ | 8B3D INCMF1 | ?8B40 INCMF2 |
| 8B33 INCMF | ?F60A INCMINC1 | 9437 INCMINC1Z | 9439 INCMINCZ |
| F60C INCMINC | 93FB INCMINZ | 37 INCR | 62 INDATA7 |
| 00 INDATA | 23 INDEX | 0702 INFLAG | 9C92 INGOT |
| 8C69 INIT.CONT | 8EFB INIT.PTRS | F13A INIT1 | 8C47 INIT1.RAM |
| 8005 INIT1.V | 8C7A INIT2.RAM | 8007 INIT2.V | F15E INIT2A |
| F157 INIT2 | 8009 INIT3.V | F164 INIT3 | 8C81 INIT3.RAM |
| F32B INITEM | 8F19 INITP1 | 8039 INITR1 | 8074 INITR2 |
| 8F51 INITRAM | 8043 INITRTS | F428 INITSTAK | ?8449 INSERTDEF |
| 8218 INSERTIR | 862C INSERTKEY | 87DB INSERTQ | 94A1 INSERTQ.PATCH |
| ?821B INSIR2 | 915D INT1.MULT | 06FE INT1ENBL | 91AA INT1END |
| ?07FE INT1REQ | D8 INT1VECT | ? FE INT2ENBL | 01FE INT2REQ |
| D0 INT2VECT | 9131 INTCAPTURE | ? 01 INTEMP | 9332 INTER2 |
| 9346 INTER3 | 9351 INTER4 | F4B1 INTERVALS | 9322 INTERVALS.RAM |
| 9C87 INTEST | ?FFF4 INTS | D0 INTVECTS | ?9C7E INWAIT |
| 9BBC IRCHANGES | 7EA6 IRCOUNT | 7D8B IRDATA | 00 IRISVARS |
| FF IRLEN | 8C33 IRLOOPCHECK | 2F IRPTR | ? 20 IRSIZE |
| 21 IRSYMBOL | 980A ISREPEATER | 9AFB ITSK1 | 9AE5 ITSKEY1 |
| ?9AE0 ITSKEYUP | ?845C ITSTHERE | ?FF00 JSRPAGE | 4D KB.BEG |
| 4E KB.END | 4F KB.PTR | 7A41 KBD.CURR | 3D KB |
| ? 3D KBDVARS | F7 KBUF4 | 8BDA KEEPIT | 94 KEY.PTR.H |
| 93 KEY.PTR.L | ? 11 KEY0 | 08 KEY1 | ? 09 KEY2 |
| ? 02 KEY2ND | ? 0A KEY3 | ? 0B KEY4 | ? 0C KEY5 |
| ? 0D KEY6 | ? 0E KEY7 | ? 0F KEY8 | 10 KEY9 |

| | | | |
|---|---|---|---|
| 04 KEYA | 9B34 KEYALARM0 | 9B3D KEYALARM3 | 9B28 KEYALARM |
| 9B45 KEYALARM1 | 05 KEYB | 06 KEYC | FF56 KEYCANCEL |
| 7D06 KEYDEFS | 07 KEYD | 12 KEYE | 921A KEYEND |
| 13 KEYF | 0132 KEYINPUT | 1D KEYKEY | 22 KEYNUM |
| 7E97 KEYSAVE | ?7EA3 KEYTEMP | 9B9D KEYTRASH | 9AFF KEYUPLOOP |
| 9B0B KEYUPRTS | 8D KEYUP | 03 LABIT | 7E99 LASTALARM |
| 7D0C LASTKEY | 8F76 LEARN.RAM | 800D LEARN.V | ?8F9B LEARN01R |
| ?8F97 LEARN0R | 9027 LEARN10R | 9030 LEARN11R | 8FB6 LEARN1AR |
| 8FAA LEARN1CR | ?8FEA LEARN2R | F232 LEARN3A | 8FFE LEARN3RA |
| 8FF6 LEARN3R | 8FCB LEARN4CR | 8FE7 LEARN5BR | 8FD8 LEARN5R |
| 9003 LEARN6R | F1BC LEARN | 8FBE LEARN1BR | 8FA0 LEARN1R |
| 8FD2 LEARN4BR | ?8FC1 LEARN4R | 900C LEARN7R | 9013 LEARN8R |
| 901A LEARN9R | F202 LEARNCHAR | 9294 LEARNKEY2 | 9280 LEARNKEY |
| 98CB LEARNLOOP | F275 LEARNMODE1 | 8F82 LEARNON | 9259 LEARNPAGE |
| 9264 LEARNPAGE2 | 8F94 LEARNR | 8CE0 LEFTOFF | 8CE4 LEFTON |
| ?8FB3 LEND | 98D1 LLOOP1 | 98D9 LLOOP2 | 98DE LLOOP3 |
| 98E2 LLOOP4 | 98CE LLOOP | 9ABF LOOKREP | 9AA4 LOOK |
| 9AB7 LOOK1 | 058E LOOP2ND | 9921 LOOPDONE | 992D LOOPDONE1 |
| 048E LOOPFLAG | 91C0 LOOPKEY | 991F LOOPKEY1 | 98F6 LOOPPAGE0 |
| 990C LOOPPAGE1 | 9912 LOOPPAGE2 | 98F4 LOOPPAGE | 038E LOOPREPEAT |
| 9907 LP0 | ? 00 LSB | ?FF69 LSR3 | FF68 LSR4 |
| 8E30 MAIN2 | F1AE MAIND01 | 9D08 MAIND01.RAM | ?F19C MAIND0 |
| 9CF6 MAIND0.RAM | F1B9 MAIND02 | 32 MAINFLAG | ?8E1D MAINLA |
| 8E41 MAINLB | F170 MAINLOOP | 8E1A MAINLOOP.RAM | 800B MAINLOOP.V |
| 8E2B MAINLR | ?F128 MAIN | 8E4B MAINLR1 | 8E25 MAINLX |
| 8075 MAINRTNS | 7E98 MAINSTAK | 94BB MAKEROOM | 9223 MASK |
| 24 MAXDEF | 8B3B MFEQ1 | 0335 MFQ | A80F MILLIWAIT |
| 7D3F MINDAY | ? 07 MINDOWN | 1B MINH | F591 MININCR |
| 1A MINL | ? 06 MINUP | 8B MITSFLAG | ? 50 MITSKEY |
| 8B MITSMODE | 9D41 MITSSTART | 9D41 MITSUBISHI | F4CF MODECODES |
| 7E96 MODESAVE | 8A97 MORE1 | 8AB8 MORE2 | 8ABD MORE3 |
| 8AB3 MORE4 | 8A8D MOREALARMS | 8E MOREBITS | 9AC7 MOREKEYS |
| 7A4B MOREPTR | ? 88 MORERON | 9B19 MORETIME | 9B1B MORETIME1 |
| 7E93 MOVEBYTES | 84D3 MOVEDOWN | 84D9 MOVEIT | 84C7 MOVEUP |
| 809F MOVEXTIME | 07 MSB | 84F6 MVD3 | 855A MVT1 |
| 80A1 MVXTM | 8E5D MYTX.RAM | 8E68 MYTX.RAM2 | 13 NEST |
| 7D48 NEWDEF | 8A3F NEWFLAGS | 9C15 NEWNUMIRS | 8C NEWVAL |

| | | | |
|---|---|---|---|
| 7D0F NEXTALARM | FF50 NEXTCANCEL | FA23 NEXTINST | 9937 NEXTLO |
| 9932 NEXTLEARN | 9C31 NNUM1 | 994A NOGOOD | 90E9 NOKEEP |
| F8F0 NOKEY | 9AA4 NONEWKEYS | 939B NONZERO | 92C1 NOPAGE |
| 90FC NOT1 | 9112 NOT2 | 9114 NOT3 | F413 NOTARG |
| 90FA NOTMUCH | 9819 NOTREP | 8479 NOTTHERE | 7D0D NUMIRS |
| ?F748 OFFRTS | F744 OFFTIME1 | F73C OFFTIME | 8B8A OK.PATCH |
| 87E7 OK2STORE | 87F4 OK4 | 1F OKKEY | 23 ONESHOT |
| ?F512 ONTIME2 | F732 ONTIME | 0232 ONTOG | F514 OTHER4 |
| ?F51C OTHRTS | ?FE00 OUT19200 | 028E OUTMEMFLAG | A809 OUTPUT |
| 066E PAGEFLAG | 03 PAGEKEY | 7D1A PAGEPAGE | 95F2 PAUSE |
| 95F8 PAUSE1 | 7E76 PCURR | FF1A PEEK16 | FF0E PEEK256 |
| FF6D PEEK8 | 9198 PEEKDATA | 8EA0 PEEKIT | 9188 PEEKROW1 |
| 9181 PEEKROW | 93DE PLUSH0 | 93E1 PLUSH1 | 93E9 PLUSH2 |
| 93D5 PLUSH | ? 33 PMFLAG | ? 01 PMKEY | 7D1C PNEST |
| FF1C POKE16 | ? E0 PORT0 | ? E2 PORT1 | ? E4 PORT2 |
| E8 PORT3 | EA PORT4 | EC PORT5 | EE PORT6 |
| 92E0 PP1 | 8B43 PP99 | 83BA PREFLASH | 89F3 PROC0 |
| 8A15 PROC1 | 8A23 PROC4 | 8A2F PROC5 | 8A31 PROC6 |
| 8A45 PROC9A | 8A34 PROC9 | 8A4C PROC9B | 8AF7 PROCAG1 |
| 89E0 PROCESS.ALARM | 7D4A PROGBUF | 12 PROGINDEX | 7EAD PROGLEN |
| ? 06 PTR | 8DB2 PUT.DIGIT | 85F3 PUT8CHARS | 8DC2 PUTDIG.2 |
| 8DC5 PUTDIG.4 | FFAC PUTDISP.FF | F801 PUTDISP | 8D59 PUTDISP.RAM |
| 8027 PUTDISP.V | 8D6C PUTDISPX | 9B67 PUTLAST | 92DD PUTONE.PATCH |
| ?8370 PUTONE | 8375 PUTONE0 | 8377 PUTONE1 | 8386 PUTONE2 |
| 35 Q2ND | 0135 Q2R | 35 QFLAGS | 7D02 QFTR |
| 7D1E QFTRSAVE | 8AB2 QSRTS | 8ECB R.OUT | 8ED4 R.OUT0 |
| 8ED7 R.OUT1 | 01 RABIT | 80EA RAMPTRS | 7D00 RAMVARS |
| ? 01 RBATT.4 | 9771 RDEFON2A | 9769 RDEFON2 | 9783 RDEFON3 |
| 9797 RDEFON3A | 979C RDEFON4 | 9770 RDEFRTS | 8E78 RDELETE0 |
| 8E81 RDELETE1 | 8E7E RDELETE2 | 95DF RDOIT1 | 9626 RDOIT1X |
| 9629 RDOIT1Z | 969E RDOITEXKEY | 96B7 RDOITEXMODE | 96DD RDOITKEY |
| 96C5 RDOITMODE | 96A0 RDOITXK1 | 963C RDONEW1 | 96B2 RDXK2 |
| FAB7 READD3 | 958F READD3.NEW | F4F7 READMORE | ?F4E2 READSEC1 |
| F4DF READSECONLY | F4E8 READT1TIME | 801D READTIME.V | F4EF READTIME |
| ? 0E REG.FILE.4 | E0 REGFILE.4 | 8A REPEATBITS | 8A REPEATER |
| 018A REPEATER1 | 8AE3 REPROC | 06EE REQ4 | 8EAA RESET.KEYS |
| FFB2 RESTOREMK | 92E6 RESTOREQ | 8A86 RETQ | 8971 REVDEL |

| | | | |
|---|---|---|---|
| 8977 REVDEL1 | 88EF REVIEW0 | 88F3 REVIEW1 | ?88F6 REVIEW2 |
| 86D9 REVIEW | ?88E4 REVIEWX | 896C REVKEY3 | 8919 REVKEY |
| 9955 REVKEY.PATCH | 8968 REVKEY2 | 8921 REVKEY9 | 892D REVL0 |
| ?8928 REVL1 | 8938 REVL2 | 8925 REVLEFT | ?8954 REVR1 |
| 895E REVR2 | 894D REVRIGHT | 8CE8 RIGHTOFF | 8CEC RIGHTON |
| 9CF3 RILL3 | 9CEC RILLEGAL1 | 995C RKP1 | 996B RKP2 |
| ?9971 RKP3 | 9968 RKP4 | 10 RONVARS | 978F ROUTTAHERE |
| 7A30 ROW.DATA | 7A20 ROW.NUM | 7A40 ROW.PTR | ? 07 ROWNUM.FILE.4 |
| 0233 RPTFLAG | ? 03 RPTKEY | 0235 RPTQ | 9A79 RRTS |
| ? E3 RT08.4 | 9453 RTS2Z | F626 RTS2 | F551 RTSAM |
| ?F548 S.ETAM | ?F54C S.ETPM | 8E SAMEKEY | 8B06 SAMEMIN |
| 8B64 SAP1 | FF77 SAVEMK | 18 SCRLEFT | 15 SCRNPOS |
| 1B SCRRIGHT | 19 SECH | 18 SECL | 20 SECTIME |
| ?FE00 SER19200 | E9 SERDIR | 02E8 SERIN | ? F7 SERIO |
| F6 SERMODE | ?07E9 SEROUTDD | ?07E8 SEROUT | E8 SERPORT |
| 8110 SET2ND | 8D3E SETAL11 | 8D38 SETALARM.RAM | ?8D53 SETALXX |
| 8E05 SETAM.RAM | F54E SETAMPM | F555 SETAMPM1 | 9D19 SETDO.RAM |
| 9D25 SETDO3.RAM | FF18 SETFILE | 9205 SETKEYNUM | 14 SETKEY |
| F33C SETLEARN | 8B37 SETMF | F3E5 SETOK | F3F9 SETOK2 |
| 8E0F SETPM.RAM | 922A SETREPEAT | 8102 SETRPT | 80DA SETRPT.PATCH |
| 8104 SETRPT1 | F3F3 SETRTN | 002A SETRTNLEN | 80AD SETRTNS |
| F366 SETTIME | 80D7 SETTX | 8C3A SETTX.ALL | ?F100 SETUP |
| 998B SGRTS | 85FB SHOW8 | 8902 SHOWALARM | F677 SHOWTIME |
| 8B2E SMIN1 | 9A95 SOMEKEY | 9CAE SOUND | ? 1C SPARE.SEGS.4 |
| 04E8 SPKR | 9CC2 SPKR1 | 9CBE SPKRWAIT | 8E11 SRAM1 |
| 8E17 SRAM2 | 8B32 SRTS | 9227 STACKCRASH | 948D STACKPAGE |
| 2D STAKPTR | 87CF STAL1 | 87D8 STAL2 | 80E4 STARTDEFS |
| 983F STD0 | ?9844 STD1 | 984D STD2 | 9880 STD3 |
| 987C STD4 | 981C STEP.INIT | 9615 STEP1 | 961E STEP2 |
| 05 STEPBIT | 9831 STEPDISP | 0632 STEPFLAG | 8CB9 STEPFLASH |
| ?981F STEPON | 068A STEPSTORE | 8194 STIR0 | 81C9 STIR1A |
| 81CD STIR1B | 81A1 STIR1 | 81DB STIR2 | 8203 STIR3 |
| 8215 STIR4 | 81B2 STIRC | 81EA STIRD | 81FB STIREND |
| 81BE STIRZ | 078E STOPFLAG | 9A69 STOPIT1 | 9A5B STOPIT |
| 87C8 STOREALARM | 8B5B STOREALARM.PAT | 843C STOREPROG | 843E STPR1 |
| 822F STRIP1 | 8243 STRIP2 | 824F STRIP3 | 8277 STRIP4 |
| 8272 STRIPEND | 8229 STRIPIRS | F34F STUFF1 | 835A STUFF2 |

| | | | |
|---|---|---|---|
| F356 STUFF3 | 9983 STUFF6ONE | 8189 STUFFIRS | FFA9 STUFFIT.FF |
| 946A STUFFIT.RAM | 8015 STUFFIT.V | F343 STUFFIT | F351 STUFFONE |
| 8017 STUFFONE.V | 818E STUFFOUT | 947A STUFFRAMO | F365 STUFFRTS |
| F5EC SWITCHPM | ?86EA SYNERR1 | 86E4 SYNERR | 92C6 SYNTAX.PATCH |
| 87B9 SYNTAXCHECK | 87BF SYNTBACK | ?04FE T1ENBL | ? FA T1 |
| ? F9 T12PRE | ?05FE T1REQ | ? D4 T1VECT | ? FB T2 |
| ?02FE T2ENBL | ?03FE T2REQ | ? D2 T2VECT | 01 TARGBIT |
| 83F1 TARGFLASH | 7D2A TARGKEY | 7D20 TARGMODE | 83FC TARGOFF |
| F416 TARGOK | ?83F4 TARGON | FF TCR | 7E92 TEMPACT |
| 7D35 TEMPALARM | 8A4E TEMPLAST | F72C TENVALS | 9B76 TESTTARGET |
| 1E TIMEDIG | 31 TIMEFLAG | ?83F0 TIMEFLASH | F378 TIMEIN1 |
| F390 TIMEIN2 | F370 TIMEINPUT | 95 TIMEOUT | 838B TIMEVALS |
| 8A6F TL1 | EA TO4 | 8116 TOG2ND | 8139 TOGEND |
| 811C TOGGLE1 | 8122 TOGGLEIT | 8140 TOGRTS | 26 TO |
| 92D6 TOGENBL | 8120 TOGGLE2 | 8138 TOGGLE3 | 8108 TOGRPT |
| 90F4 TOOMUCH | 9B84 TTT1 | 8C26 TWOPLUS | 8C29 TWOPLUS1 |
| 06FF TXENBL | D6 TXVECT | FD TX | FC TXPRE |
| ?F571 U.PDOWN | ? 0D U80FF.4 | 852C UPDATE.END | F5C8 UPDAY1 |
| 9418 UPDAY1Z | 8DF3 UPDOWN.RAM | 80F6 UPDOWNJSRS | F578 UPDOWNX |
| F5E4 UPHR1 | F5F3 UPHR2 | F5DE UPHR | 9CDB USERSTP |
| 9CD8 USERWIT | 36 VAR1 | 9892 VERSION1 | 9881 VERSION |
| 9315 WAIT9 | 9126 WAITASEC1 | 19 WAITKEY | 930F WAIT |
| 9124 WAITASEC | 9116 WAITSOME | 9692 WEIRDINST | 8489 WRD1 |
| 8536 WRD8 | 853E WRD9 | F509 WRITEAQTIME | 8487 WRITEDEF |
| 8400 WRITEDEF.PATCH | F51D WRITET1TIME | F50D WRITET2TIME | 801F WRITETIME.V |
| F51F WRITETIME | 87F6 WRTA1 | ?F526 WRTTM1 | ?83AA XDITFLASH |
| ?83B6 XELLFLASH | 97F3 XKEY.RAM | ?F8F4 XKEY | 97F7 XMODE.RAM |
| 97FC XMODE1.RAM | F8FF XMODE1 | 9804 XMODE2.RAM | ?F8F9 XMODE |
| 0333 XTFLAG | ?83B0 XTFLASH | 93EC XTIME.RAM | F373 XTIME |
| 8019 XTIME.V | 93F5 XTRR1 | 9BAC YESTRASH | 9BED ZBLATT |
| ?F5F4 ZDECHR | ?F59D ZDECMIN | ?F397 ZDELETEIT | ?F394 ZDELETETIME |
| F25A ZILLEGAL1 | ?F24D ZILLEGAL | ?F5DB ZINCHR | ?F58B ZINCMIN |
| FAAE ZP1DEFPTR | 2B ZP1 | 8500 ZP1ENDDEFS | 8516 ZP1ENDQ |
| 51 ZPEND | 2F ZPJSR | 41 ZPLEN | 10 ZPSTART |

?F3BE ZSETDO    F3CA ZSETDO3
** SUCCESSFUL ASSEMBLY := NO ERRORS
** ASSEMBLER CREATED ON 23-OCT-85 16:20
** TOTAL LINES ASSEMBLED  7283
** FREE SPACE PAGE COUNT    29

SOURCE  FILE #01 =>SIGNAL2

```
0000:                    1             1st    on
0000:                    2             osect
0000:                    3 ;
0000:                    4 ;
0000:                    5 ;     variable references
0000:                    6 ;
0000:                    7 ;
0000:         0012       8 EPSILON    EQU   $12         ; delta time bin size
0000:                    9 ;
0000:         00FC      10 TX.PRESCALE EQU $FC          ; timer_x prescaler
0000:         00FD      11 TX          EQU  $FD         ; timer_x
0000:         00F9      12 T1.PRESCALE EQU $F9          ; timer_1 prescaler
0000:         00FA      13 T1          EQU  $FA         ; timer_1
0000:         00FF      14 TCR         EQU  $FF         ; timer control register
0000:                   15 ;
0000:                   16 ;
0000:         0015      17 BIN1        EQU  21
0000:         0018      18 BIN2        EQU  24
0000:         001B      19 BIN3        EQU  27
0000:         001E      20 BIN4        EQU  30
0000:         0021      21 BIN5        EQU  33
0000:         0024      22 BIN6        EQU  36
0000:         0027      23 BIN7        EQU  39
0000:                   24 ;
0000:                   25 ;
0000:         0001      26 DELTA.ONE EQU   1
0000:                   27 ;
0000:                   28 ;
0090:         0090      29             ORG  $0090
0090:                   30 ;
0090:                   31 ;
0090:                   32 ;
0090:         0001      33 TEMP.H      DS   1
0091:         0001      34 TEMP.L      DS   1
0092:         0001      35 TEMP        DS   1
0093:         0001      36 KEY.PTR.L   DS   1
0094:         0001      37 KEY.PTR.H   DS   1
0095:         0001      38 TIME.OUT    DS   1
0096:         0001      39 I           DS   1
0097:         0001      40 ODD.BIT     DS   1          ; indicates if signal has o
od # of bits
0098:                   41 ;
0098:                   42 ;
0098:                   43 ;
7B00:         7B00      44             ORG  $7B00
7B00:                   45 ;
7B00:                   46 ;
7B00:                   47 ;
7B00:         008E      48 CBUFF.H     DS   142        ; buffer which holds the hi
gh bytes of the timer readings
7B8E:         0070      49 PLS.TIM.H   DS   112        ; high byte of the start pu
lse
7BFE:         0070      50 PLS.TIM.L   DS   112        ; low    "   "   "    "   "
7C6E:         008E      51 CBUFF.L     DS   142        ; buffer which holds the hi
gh bytes of the timer readings
7CFC:                   52 ;
7CFC:                   53 ;
7CFC:                   54 ;
7EAE:         7EAE      55             ORG  $7EAE
7EAE:                   56 ;
7EAE:                   57 ;
7EAE:                   58 ;CBUFF.L DS 96
7EAE:         0001      59 IF          DS   1          ; intermediate frequency
7EAF:         0024      60 CBUFF.L.OFFSET EQU $24      ; constant which is combine
d with x reg. for addrs.
7EAF:         0001      61 LOOP.CTR    DS   1          ; loop counter used by vari
ous subroutines
7EB0:         0001      62 LOOP.RESET  DS   1          ;
7EB1:         0060      63 ARRAY1      DS   96         ; array holding compressed
times
7F11:         0070      64 I.D.I       DS   112        ; array holding compressed
inter-digit intervals
```

```
7F81:     0001     65 FLS.WID.H   DS    1       ; high byte of the start bu
rst in pulses
7F82:     0001     66 FLS.WID.L   DS    1       ; low byte of the start bur
st in pulses
7F83:     0001     67 CF          DS    1       ; carrier frequency
7F84:     0001     68 EDGE.NUM    DS    1       ; total # of edges in messa
ge
7F85:     0001     69 EDGE.NUM.1  DS    1
7F86:     0001     70 EDGE.NUM.2  DS    1
7F87:     0001     71 ETH         DS    1       ; high byte of the time bet
ween two edges
7F88:     0001     72 ETL         DS    1
7F89:     0008     73 ARRAY.H     DS    8       ; array containing the high
 byte of the delta times
7F91:     0008     74 ARRAY.L     DS    8
7F99:     0001     75 TEMP1.H     DS    1
7F9A:     0001     76 TEMP1.L     DS    1
7F9B:     0001     77 TEMP2.H     DS    1
7F9C:     0001     78 TEMP2.L     DS    1
7F9D:     0001     79 NUM.TIMES   DS    1       ; the number of discrete du
rations in a message
7F9E:     0001     80 IFGH        DS    1       ; high byte of the inter-me
ssage gap duration
7F9F:     0001     81 IFGL        DS    1
7FA0:     0001     82 KEY.NUM     DS    1       ; passed parameter containi
ng the number of a record
7FA1:     0001     83 KEY.TBL.H   DS    1       ; high byte of the address
of the key file
7FA2:     0001     84 KEY.H.TEMP  DS    1
7FA3:     0001     85 KEY.L.TEMP  DS    1
7FA4:     0001     86 FORMAT      DS    1
7FA5:     0001     87 KEY.TBL.L   DS    1
7FA6:     0001     88 HIGH.TIME   DS    1       ; the number of pulses whic
h constitute a high for ppm
7FA7:     0001     89 PLS.CNT     DS    1
7FA8:     0001     90 ZEROS.FACTOR  DS  1
7FA9:     0001     91 ONES.FACTOR   DS  1
7FAA:     0001     92 TWOS.FACTOR   DS  1
7FAB:     0001     93 THREES.FACTOR DS  1
7FAC:     0001     94 FOURS.FACTOR  DS  1
7FAD:     00EE     95 IR.OUTPUT   EQU   $EE     ; address of the infra-red
output
7FAE:     0001     96 IR.OUT.CNT  DS    1       ; number of pulses to send
7FAE:     0001     97 BURST.PULSES DS   1       ; number of pulses in the s
tart burst
7FAF:     0001     98 CYCLE.TIM.H DS    1       ; high byte of
7FB0:     0001     99 CYCLE.TIM.L DS    1
7FB1:     0001    100 COMP.PASS   DS    1
7FB2:     0002    101 IFGH.17     DS    2
7FB4:             102 ;
7FB4:     00EE    103 PORT6       EQU   $EE
7FB4:     00EE    104 IR.CONTROL.PORT EQU $EE
7FB4:             105 ;
7FB4:             106 ;
7FB4:             107 ;
7FB4:             108 ;
7FB4:             109 ;
7FB4:             110 ;
7FB4:             111 ;   external equates (constants)
7FB4:             112 ;
7FB4:             113 ;
7FB4:     0000    114 EVENT.CNT   EQU   0
7FB4:     00E8    115 PORT3       EQU   $E8
7FB4:     0007    116 M3.7        EQU   7
7FB4:     0078    117 FM2.CTR     EQU   120
7FB4:     0046    118 MSM.CTR     EQU   70
7FB4:     00AF    119 SAF.CTR     EQU   175
7FB4:     00E1    120 SL490.CTR   EQU   225
7FB4:     0001    121 HZ625       EQU   1
7FB4:     0002    122 HZ50        EQU   2
7FB4:     0003    123 HZ416       EQU   3
7FB4:     0004    124 HZ3865      EQU   4
7FB4:     0007    125 HZ28        EQU   7
7FB4:     00E8    126 IR.IN       ZQUB  3,PORT3
```

```
7FB4:        0005    127 m2357       EQU     5
7FB4:        000c    128 m23125      EQU     c
7FB4:        0000    129 LSB         EQU     0
7FB4:        0000    130 IR.SENSE.ON EQU     0
7FB4:                131 ;
7FB4:                132 ;
7FB4:                133 ;
0000:                134         cend
0000:                135 ;
0000:                136 ;
0000:        0000    137         DO      0
     S                138         ORG     $9000
     S                139 ;
     S                140 ;
     S                141 ;
     S                142 CODE    DS      2
     S                143 ;
     S                144 ;
     S                145 VECTOR  EQU     *
     S                146 ;
     S                147 ;
     S                148         LDA     #$8I
     S                149         STA     $3F
     S                150         LDA     #0
     S                151         STA     $3E
     S                152         RTS
0000:                153         Fin
0000:                154 ;
0000:                155 ;
0000:                156 ;
0000:                157 ;
----- NEXT OBJECT FILE NAME IS SIGNAL1.O
A800:        A800    158         ORG     $A800
A800:                159 ;
A800:                160 ;
A800:4C 12 A8        161         JMP     capture
A803:4C A5 AA        162         JMP     compress
A806:4C F9 AF        163         JMP     expand
A809:4C F8 B2        164         JMP     out.put
A80C:4C 63 B3        165         JMP     micro.wait
A80F:4C 68 B3        166         JMP     milli.wait
A812:                167 ;
A812:                168 ;
A812:                169 ; main signal capture routine
A812:                170 ;
A812:        A812    171 CAPTURE EQU     *
A812:EA             172         NOP
A813:6F FF          173         SEB     3,TCR
A815:5F FF          174         CLB     2,TCR
A817:A5 EE          175         LDA     IR.CONTROL.PORT
A819:29 F0          176         AND     #$F0
A81B:85 EE          177         STA     IR.CONTROL.PORT
A81D:A9 02          178         LDA     #2
A81F:85 95          179         STA     TIME.OUT
A821:A9 00          180         LDA     #0
A823:                181 ;
A823:85 70          182         STA     I
A825:8D 84 7F       183         STA     EDGE.NUM        ; clear the edge counter
A828:A2 00          184         LDX     #0              ; set X to buffer pointer
A82A:A9 FF          185         LDA     #$FF
A82C:85 F9          186         STA     T1.PRESCALE     ; initialize timer 1
A82E:85 FA          187         STA     T1
A830:                188 ;
A830:85 FC          189         STA     $FC             ; initialize timer x
A832:85 FD          190         STA     $FD
A834:                191 ;
A834:A9 08          192         LDA     #8              ; set bit 3 mask
A836:                193 ;   SET : set index mode flag
A836:                194 ;
A836:                195 ;
A836:                196 ; look for the first sign of a signal
A836:                197 ;
A836:        A836    198 CL1     EQU     *
A836:07 FC FDA836   199         BBS     LSB,TX.PRESCALE,CL1 ; loop until somethin
g happens
```

```
A839:              200 ;
A839:              201 ;
A839:       A839   202 CLI.EXIT  EQU   *
A839:              203 ;
A839:              204 ; we found a signal
A839:              205 ;
A839:A4 F9         206            LDY    $F9
A83B:A5 FA         207            LDA    $FA
A83D:9D 00 7B      208            STA    CBUFF.H,X
A840:88           209            DEY
A841:98           210            TYA
A842:9D 6E 7C     211            STA    CBUFF.L,X
A845:E8           212            INX
A846:C6 F5        213            DEC    TIME.OUT
A848:              214 ;
A848:              215 ; find the end of the start pulse
A848:              216 ;
A848:       A848   217 CL2   EQU   *
A848:07 E8 FDA848  218            BBS    3,PORT3,CL2
A84D:A4 FC        219            LDY    $FC              ; signal low
A84D:C4 FC        220            CPY    $FC
A84F:D0 F7  A848  221            BNE    CL2              ; 5 micro sec.
A851:C4 FC        222            CPY    $FC
A853:D0 F3  A848  223            BNE    CL2
A855:C4 FC        224            CPY    $FC
A857:D0 EF  A848  225            BNE    CL2              ; 10 micro sec.
A859:C4 FC        226            CPY    $FC
A85B:D0 EB  A848  227            BNE    CL2
A85D:C4 FC        228            CPY    $FC
A85F:D0 E7  A848  229            BNE    CL2              ; 15 micro sec.
A861:C4 FC        230            CPY    $FC
A863:D0 E3  A848  231            BNE    CL2
A865:C4 FC        232            CPY    $FC
A867:D0 DF  A848  233            BNE    CL2              ; 20 micro sec.
A869:C4 FC        234            CPY    $FC
A86B:D0 DB  A848  235            BNE    CL2
A86D:C4 FC        236            CPY    $FC
A86F:D0 D7  A848  237            BNE    CL2              ; 25 micro sec.
A871:C4 FC        238            CPY    $FC
A873:D0 D3  A848  239            BNE    CL2
A875:C4 FC        240            CPY    $FC
A877:D0 CF  A848  241            BNE    CL2              ; 30 micro seconds
A879:C4 FC        242            CPY    $FC
A87B:D0 CB  A848  243            BNE    CL2
A87D:C4 FC        244            CPY    $FC
A87F:D0 C7  A848  245            BNE    CL2              ; 35 micro seconds
A881:C4 FC        246            CPY    $FC
A883:D0 C3  A848  247            BNE    CL2
A885:C4 FC        248            CPY    $FC
A887:D0 BF  A848  249            BNE    CL2              ; 40 micro seconds
A889:              250 ;
A889:              251 ; 40 mico second space allows for carrier frequencies
A889:              252 ; that are > or = 25 K Hz.
A889:              253 ;
A889:E8           254            INX
A88A:A5 F9        255            LDA    $F9              ; save timer readings
A88C:A4 FA        256            LDY    $FA
A88E:18           257            CLC
A88F:69 17        258            ADC    #23
A891:9D 6E 7C     259            STA    CBUFF.L,X
A894:98           260            TYA
A895:69 00        261            ADC    #0
A897:9D 00 7B     262            STA    CBUFF.H,X
A89A:CA           263            DEX
A89B:              264 ;
A89B:A4 FC        265            LDY    $FC              ; save counter readings
A89D:A5 FD        266            LDA    $FD
A89F:9D 00 7B     267            STA    CBUFF.H,X
A8A2:98           268            TYA
A8A3:9D 6E 7C     269            STA    CBUFF.L,X
A8A6:E8           270            INX
A8A7:E8           271            INX
A8A8:              272 ;
A8A8:07 FD 03A8AE 273            BBS    0,$FD,CL3
A8AE:4C 34 A9    274            JMP    $AF1039.MODE
```

```
A8AE:            A8AE  275 CL3      EQU    *
A8AE:84 90             276          STY    TEMP.H
A8B0:44 90             277          COM    TEMP.H
A8B2:A4 90             278          LDY    TEMP.H
A8B4:C0 02             279          CPY    #2
A8B6:B0 03  A8BB 280                BCS    CL4
A8B8:4C 3B A9          281          JMP    SL490.MODE
A8BB:            A8BB  282 CL4      EQU    *
A8BB:C0 09             283          CPY    #9
A8BD:B0 03  A8C2 284                BCS    CL4A
A8BF:4C 34 A9          285          JMP    SAF1039.MODE
A8C2:            A8C2  286 CL4A     EQU    *
A8C2:C0 16             287          CPY    #22
A8C4:B0 03  A8C9 288                BCS    CL5
A8C6:4C 2D A9          289          JMP    MS0115.MODE
A8C9:            A8C9  290 CL5      EQU    *
A8C9:C0 1C             291          CPY    #28
A8CB:B0 03  A8D0 292                BCS    CL6
A8CD:4C 34 A9          293          JMP    SAF1039.MODE
A8D0:            A8D0  294 CL6      EQU    *
A8D0:C0 32             295          CPY    #50
A8D2:B0 03  A8D7 296                BCS    CL7
A8D4:4C 3B A9          297          JMP    SL490.MODE
A8D7:            A8D7  298 CL7      EQU    *
A8D7:C0 50             299          CPY    #80
A8D9:B0 03  A8DE 300                BCS    CL8
A8DB:4C 3B A9          301          JMP    SL490.MODE
A8DE:            A8DE  302 CL8      EQU    *
A8DE:C0 63             303          CPY    #99
A8E0:B0 03  A8E5 304                BCS    CL9
A8E2:4C 34 A9          305          JMP    SAF1039.MODE
A8E5:            A8E5  306 CL9      EQU    *
A8E5:C0 85             307          CPY    #133
A8E7:B0 03  A8EC 308                BCS    CL10
A8E9:4C 3B A9          309          JMP    SL490.MODE
A8EC:            A8EC  310 CL10     EQU    *
A8EC:4C 95 A9          311          JMP    S2604.MODE
A8EF:                  312 ;
A8EF:                  313 ; Pulse mode edge capture routine
A8EF:                  314 ; terminates with an interpulse gap > or = 7 ms.
A8EF:                  315 ;
A8EF:            A8EF  316 PULSE.MODE   EQU    *
A8EF:A0 07             317          LDY    #MS.7      ; = 7
A8F1:            A8F1  318 PM1      EQU    *
A8F1:8C AF 7E          319          STY    LOOP.CTR
A8F4:A0 78             320          LDY    #PM2.CTR   ; = 120
A8F6:            A8F6  321 PM2      EQU    *
A8F6:24 EE             322          BIT    $EE
A8F8:24 EE             323          BIT    $EE
A8FA:D0 1F  A91B 324                BNE    PM3
A8FC:88                325          DEY
A8FD:D0 F7  A8F6 326                BNE    PM2
A8FF:                  327 ;
A8FF:AC AF 7E          328          LDY    LOOP.CTR
A902:AC AF 7E          329          LDY    LOOP.CTR
A905:88                330          DEY
A906:D0 E9  A8F1 331                BNE    PM1
A908:                  332 ;
A908:                  333 ; found inter-pulse gap
A908:                  334 ;
A908:4C D3 A9          335          JMP    CAPTURE.EXIT
A90B:                  336 ;
A90B:                  337 ; found rising edge
A90B:                  338 ;
A90B:            A90B  339 PM3      EQU    *
A90B:A4 F9             340          LDY    $F9
A90D:A5 FA             341          LDA    $FA        ; save timer readings
A90F:9D 00 7E          342          STA    CBUFF.H,X
A912:88                343          DEY
A913:98                344          TYA
A914:9D 8E 7E          345          STA    CBUFF.L,X
A917:E8                346          INX
A918:EE 84 7F          347          INC    EDGE.NUM
A91B:                  348 ;
```

```
A91B:              349  ; find the falling edge
A91B:              350  ;
A91B:        A91B  351 PM4         EQU    *
A91B:27 E5 FDA9.B  352              BBS    3.PORT3.PM4
A91E:              353  ;
A91E:              354  ; found falling edge
A91E:              355  ;
A91E:A4 F9         356              LDY    $F9
A920:A5 FA         357              LDA    $FA              ; save timer readings
A922:9D 00 7E      358              STA    CBUFF.H,X
A925:88            359              DEY
A926:98            360              TYA
A927:9D 6E 7C      361              STA    CBUFF.L,X
A92A:E8            362              INX
A92B:              363  ;
A92B:10 C1   A6EF  364              BPL    PULSE.MODE       ; loop back to start
A92D:              365  ;
A92D:              366  ;
A92D:              367  ;
A92D:              368
A92D:              369  ;
A92D:              370  ;
A92D:              371  ; M50119F mode edge capture routine (A1-3-8470)
A92D:              372  ;    termainates with an inter-pulse gap >= 6 m.s.
A92D:              373  ;
A92D:        A92D  374 M50119.MODE EQU  *
A92D:A0 46         375              LDY    #MSM.CTR         ; = 28
A92F:8C B0 7E      376              STY    LOOP.RESET
A932:80 0C   A940  377              BRA    LOOP.START
A934:              378  ;
A934:              379  ;
A934:              380  ;
A934:              381  ; SAF1039F mode edge capture routine (TC9132F)
A934:              382  ;    terminates with an inter-pulse gap >= 11 m.s.
A934:              383  ;
A934:        A934  384 SAF1039.MODE EQU *
A934:A0 AF         385              LDY    #SAF.CTR         ; = 100
A936:8C B0 7E      386              STY    LOOP.RESET
A939:80 05   A940  387              BRA    LOOP.START
A93B:              388  ;
A93B:              389  ;
A93B:              390  ;
A93B:              391  ; SL490 mode edge capture routine
A93B:              392  ;    terminates with an inter-pulse gap >= 27 m.s.
A93B:              393  ;
A93B:        A93B  394 SL490.MODE EQU  *
A93B:A0 E1         395              LDY    #SL490.CTR       ; = 245
A93D:8C B0 7E      396              STY    LOOP.RESET
A940:              397  ;
A940:              398  ;
A940:              399  ; Loop.Start is used by several of the data capture routines...
A940:              400  ; it can be used for chips with inter-bit gaps as large as 26 ms.
A940:              401  ; and has a resolution of 0.112 m.s., requires a carrier
A940:              402  ; frequency > 25 K Hz.
A940:              403  ;
A940:        A940  404 LOOP.START EQU  *
A940:AC B0 7E      405              LDY    LOOP.RESET
A943:8C AF 7E      406              STY    LOOP.CTR
A946:A4 FC         407              LDY    $FC
A948:              408  ; CLT
A948:        A948  409 LS1          EQU    *
A948:A9 10         410              LDA    #$10
A94A:        A94A  411 LS1A         EQU    *
A94A:C4 FC         412              CPY    $FC
A94C:D0 0D   A95B  413              BNE    LS2
A94E:1A            414              DEC    A
A94F:D0 F9   A94A  415              BNE    LS1A
A951:              416  ;
A951:1B            417              CLT
A952:CE AF 7E      418              DEC    LOOP.CTR
A955:1B            419              CLT
```

```
A956:D0 F0   A948  420           BNE    LS1
A958:              421  ;
A958:              422  ; found end of message
A958:              423  ;
A958:4C 28 A9      424           JMP    CAPTURE.EXIT
A95B:              425  ;
A95B:              426  ; found start of data bit
A95B:              427  ;
A95B:        A95B  428  LS2      EQU    *
A95B:              429  ; SET
A95B:A4 F9         430           LDY    $F9
A95D:A5 FA         431           LDA    $FA                ; save timer readings
A95F:9D 00 7B      432           STA    CBUFF.H,X
A962:88            433           DEY
A963:98            434           TYA
A964:9D 6E 7C      435           STA    CBUFF.L,X
A967:E8            436           INX
A968:EE 84 7F      437           INC    EDGE.NUM
A96B:              438  ;
A96B:              439  ; find end of data bit
A96B:              440  ;
A96B:              441  ; CLT
A96B:        A96B  442  LS3      EQU    *
A96B:A9 07         443           LDA    #7
A96D:A4 FC         444           LDY    $FC
A96F:        A96F  445  LS4      EQU    *
A96F:C4 FC         446           CPY    $FC
A971:D0 F8   A96B  447           BNE    LS3
A973:1A            448           DEC    A
A974:D0 F9   A96F  449           BNE    LS4
A976:              450  ;
A976:              451  ; found end of data bit
A976:              452  ;
A976:              453  ; SET
A976:A5 F9         454           LDA    $F9                ; save timer readings
A978:A4 FA         455           LDY    $FA
A97A:18            456           CLC
A97B:69 15         457           ADC    #21                ; (adjust for time spent in loop)
A97D:9D 6E 7C      458           STA    CBUFF.L,X
A980:98            459           TYA
A981:69 00         460           ADC    #0
A983:9D 00 7B      461           STA    CBUFF.H,X
A986:E8            462           INX
A987:EE 84 7F      463           INC    EDGE.NUM
A98A:              464  ;
A98A:E0 8D         465           CPX    #141
A98C:90 B2   A940  466           BCC    LOOP.START
A98E:              467  ;
A98E:              468  ;
A98E:A9 02         469           LDA    #2
A990:85 95         470           STA    TIME.OUT
A992:4C 48 AA      471           JMP    CAPTURE.BAIL.OUT
A995:              472  ;
A995:              473  ;
A995:              474  ;
A995:              475  ;
A995:              476  ;
A995:              477  ;
A995:              478  ;
A995:              479  ;
A995:              480  ;
A995:              481  ;
A995:              482  ; S2604 mode signal capture routine
A995:              483  ;    terminates after reading 10 bits
A995:              484  ;
A995:        A995  485  S26.MODE EQU    *
A995:A9 09         486           LDA    #9
A997:8D AF 7E      487           STA    LOOP.CTR
A99A:        A99A  488  S2M1     EQU    *
A99A:A4 FC         489           LDY    $FC
A99C:        A99C  490  S2M2     EQU    *
A99C:C4 FC         491           CPY    $FC
A99E:F0 FC   A99C  492           BEQ    S2M2
```

```
A9A0:                   493 ;
A9A0:                   494 ; found start of bit
A9A0:                   495 ;
A9A0:A4 F9              496             LDY     $F9             ; save timer readings
A9A2:A5 FA              497             LDA     T1              ; save timer readings
A9A4:9D 00 7B           498             STA     CBUFF.H,X
A9A7:88                 499             DEY
A9A8:98                 500             TYA
A9A9:9D 6E 7C           501             STA     CBUFF.L,X
A9AC:E8                 502             INX
A9AD:EE 84 7F           503             INC     EDGE.NUM
A9B0:                   504 ;
A9B0:                   505 ; find end of data bit
A9B0:                   506 ;
A9B0:                   507 ; CLT
A9B0:         A9B0      508 S2M3        EQU     *
A9B0:A9 10              509             LDA     #$10
A9B2:A4 FC              510             LDY     $FC
A9B4:         A9B4      511 S2M4        EQU     *
A9B4:C4 FC              512             CPY     $FC
A9B6:D0 F8    A9B0      513             BNE     S2M3
A9B8:1A                 514             DEC     A
A9B9:D0 F9    A9B4      515             BNE     S2M4
A9BB:                   516 ;
A9BB:                   517 ; found end of bit
A9BB:                   518 ;
A9BB:                   519 ; SET
A9BB:A4 F9              520             LDY     $F9             ; save timer readings
A9BD:A5 FA              521             LDA     T1
A9BF:9D 00 7B           522             STA     CBUFF.H,X
A9C2:88                 523             DEY
A9C3:98                 524             TYA
A9C4:9D 6E 7C           525             STA     CBUFF.L,X
A9C7:E8                 526             INX
A9C8:EE 84 7F           527             INC     EDGE.NUM
A9CB:                   528 ;
A9CB:CE AF 7E           529             DEC     LOOP.CTR
A9CE:D0 CA    A99A      530             BNE     S2M1
A9D0:                   531 ;
A9D0:4C D3 A9           532             JMP     CAPTURE.EXIT
A9D3:                   533 ;
A9D3:                   534 ;
A9D3:                   535 ;
A9D3:                   536 ;
A9D3:                   537 ; CAPTURE_EXIT - clean up stack and return
A9D3:                   538 ;
A9D3:         A9D3      539 CAPTURE.EXIT EQU *
A9D3:A9 FF              540             LDA     #$FF
A9D5:                   541 ; SET
A9D5:85 FC              542             STA     $FC
A9D7:85 FD              543             STA     $FD
A9D9:BF FE              544             CLB     5,$FE
A9DB:         A9DB      545 C.E.1       EQU     *
A9DB:07 FC FDA9DB       546             BBS     LSB,TX.PRESCALE,C.E.1
A9DE:                   547 ;
A9DE:A4 F9              548             LDY     $F9
A9E0:A5 FA              549             LDA     T1
A9E2:9D 00 7B           550             STA     CBUFF.H,X
A9E5:88                 551             DEY
A9E6:98                 552             TYA
A9E7:9D 6E 7C           553             STA     CBUFF.L,X
A9EA:E8                 554             INX
A9EB:A5 FE              555             LDA     $FE
A9ED:A4 96              556             LDY     I
A9EF:99 82 7F           557             STA     IFGH.17,I
A9F2:EE 84 7F           558             INC     EDGE.NUM
A9F5:                   559 ; CLT
A9F5:AD 84 7F           560             LDA     EDGE.NUM
A9F8:04 96              561             TST     I
A9FA:D0 0D    AA09      562             BNE     C.E.2
A9FC:8D 85 7F           563             STA     EDGE.NUM.1
A9FF:A9 00              564             LDA     #0
AA01:8D 84 7F           565             STA     EDGE.NUM
AA04:E6 96              566             INC     I
```

```
AA06:4C 48 A6      567            JMP   CL2
AA09:         AA09 568 C.E.2      EQU   *
AA09:18            569            CLC
AA0A:6D 85 7F      570            ADC   EDGE.NUM.1
AA0D:69 02         571            ADC   #2
AA0F:8D 86 7F      572            STA   EDGE.NUM.2
AA12:C6 95         573            DEC   TIME.OUT
AA14:              574 ;
AA14:A2 00         575            LDX   #0
AA16:         AA16 576 C.E.3      EQU   *
AA16:BD B2 7F      577            LDA   IPGH.17,X
AA19:B3 17    AA32 578            BBC   5,A,C.E.4
AA1B:BD 85 7F      579            LDA   EDGE.NUM.1,X
AA1E:A8            580            TAY
AA1F:38            581            SEC
AA20:B9 6F 7C      582            LDA   CBUFF.L+1,Y
AA23:F9 70 7C      583            SBC   CBUFF.L+2,Y
AA26:B9 01 7B      584            LDA   CBUFF.H+1,Y
AA29:F9 02 7B      585            SBC   CBUFF.H+2,Y
AA2C:90 04    AA32 586            BCC   C.E.4
AA2E:A9 01         587            LDA   #1
AA30:80 02    AA34 588            BRA   C.E.5
AA32:         AA32 589 C.E.4      EQU   *
AA32:A9 00         590            LDA   #0
AA34:         AA34 591 C.E.5      EQU   *
AA34:9D B2 7F      592            STA   IPGH.17,X
AA37:E8            593            INX
AA38:E0 01         594            CPX   #1
AA3A:F0 DA   AA16  595            BEQ   C.E.3
AA3C:              596 ;
AA3C:AD 86 7F      597            LDA   EDGE.NUM.2
AA3F:38            598            SEC
AA40:ED 85 7F      599            SBC   EDGE.NUM.1
AA43:E9 02         600            SBC   #2
AA45:8D 86 7F      601            STA   EDGE.NUM.2
AA48:              602 ;
AA48:         AA48 603 CAPTURE.BAIL.OUT EQU *
AA48:60            604            RTS
AA49:              605 ;
AA49:              606 ;
AA49:              607 ;
AA49:              608 ;DS $9680-*,$FF
AA49:              609 ;
AA49:              610 ;
AA49:              611 ;
AA49:              612 ; ORG $9680
AA49:              613 ;
AA49:              614 ;
AA49:              615 ;
AA49:         AA49 616 COMPRESS   EQU   *
AA49:A9 00         617            LDA   #0
AA4B:8D B1 7F      618            STA   COMP.PASS
AA4E:AD 85 7F      619            LDA   EDGE.NUM.1
AA51:8D 84 7F      620            STA   EDGE.NUM
AA54:38            621            SEC
AA55:ED 86 7F      622            SBC   EDGE.NUM.2
AA58:E9 01         623            SBC   #1
AA5A:B0 07    AA63 624            BRA   COMPRESS1C
AA5C:A9 00         625            LDA   #0
AA5E:8D A4 7F      626            STA   FORMAT
AA61:80 05    AA68 627            BRA   COMPRESS1B
AA63:         AA63 628 COMPRESS1C EQU   *
AA63:A9 02         629            LDA   #2
AA65:8D A4 7F      630            STA   FORMAT
AA68:         AA68 631 COMPRESS1B EQU   *
AA68:20 9F AA      632            JSR   DO.COMPRESS
AA6B:EE B1 7F      633            INC   COMP.PASS
AA6E:AD A4 7F      634            LDA   FORMAT
AA71:C9 02         635            CMP   #2
AA73:30 29   AA9E  636            BMI   COMPRESS3A
AA75:20 3B AF      637            JSR   BLOCK.MOVE
AA78:A5 94         638            LDA   KEY.PTR.H
AA7A:8D A2 7F      639            STA   KEY.H.TEMP
AA7D:A5 93         640            LDA   KEY.PTR.L
```

```
AA7F:8D A3 7F      641            STA    KEY.L.TEMP
AA82:A0 00         642            LDY    #0
AA84:B1 93         643            LDA    (KEY.PTR.L),Y
AA86:18            644            CLC
AA87:65 93         645            ADC    KEY.PTR.L
AA89:85 93         646            STA    KEY.PTR.L
AA8B:A5 94         647            LDA    KEY.PTR.H
AA8D:69 00         648            ADC    #0
AA8F:85 94         649            STA    KEY.PTR.H
AA91:20 9F AA      650            JSR    DO.COMPRESS
AA94:AD A2 7F      651            LDA    KEY.H.TEMP
AA97:85 94         652            STA    KEY.PTR.H
AA99:AD A3 7F      653            LDA    KEY.L.TEMP
AA9C:85 93         654            STA    KEY.PTR.L
AA9E:         AA9E 655 COMPRESS3A EQU *
AA9E:60            656            RTS
AA9F:              657 ;
AA9F:              658 ;
AA9F:              659 ;
AA9F:              660 ;
AA9F:              661 ;
AA9F:              662 ; CMP #8
AA9F:              663 ; BMI COMPRESS1
AA9F:              664 ; BRA COMPRESS2
AA9F:              665 ;COMPRESS1 EQU *
AA9F:              666 ; JMP TIME.CODE
AA9F:              667 ;COMPRESS2 EQU *
AA9F:              668 ;;
AA9F:              669 ; CMP #18
AA9F:              670 ; BMI BI.PHASE.A
AA9F:              671 ;;
AA9F:              672 ; CMP #28
AA9F:              673 ; BMI COMPRESS3
AA9F:              674 ; BRA COMPRESS4
AA9F:              675 ;COMPRESS3 EQU *
AA9F:              676 ; JMP TIME.CODE
AA9F:              677 ;COMPRESS4 EQU *
AA9F:              678 ;;
AA9F:              679 ; CMP #50
AA9F:              680 ; BMI BI.PHASE.A
AA9F:              681 ;;
AA9F:              682 ; CMP #70
AA9F:              683 ; BPL COMPRESS5
AA9F:              684 ; JMP TIME.CODE
AA9F:              685 ;;
AA9F:              686 ;COMPRESS5 EQU *
AA9F:              687 ; CMP #79
AA9F:              688 ; BMI BI.PHASE.A
AA9F:              689 ;;
AA9F:              690 ; JMP TIME.CODE
AA9F:              691 ;
AA9F:              692 ;
AA9F:         AA9F 693 DO.COMPRESS EQU *
AA9F:A9 00         694            LDA    #0
AAA1:8D 9D 7F      695            STA    NUM.TIMES
AAA4:AD 6F 7C      696            LDA    CBUFF.L+1
AAA7:85 92         697            STA    TEMP
AAA9:44 92         698            COM    TEMP
AAAB:A5 92         699            LDA    TEMP
AAAD:8D 6F 7C      700            STA    CBUFF.L+1
AAB0:29 01         701            AND    #1
AAB2:0D A4 7F      702            ORA    FORMAT
AAB5:8D A4 7F      703            STA    FORMAT
AAB8:AD 01 7B      704            LDA    CBUFF.H+1
AABB:85 92         705            STA    TEMP
AABD:44 92         706            COM    TEMP
AABF:A5 92         707            LDA    TEMP
AAC1:8D 01 7B      708            STA    CBUFF.H+1
AAC4:04 92         709            TST    TEMP
AAC6:F0 05    AACD 710            BEQ    COMPRESS1A
AAC8:20 F1 AA      711            JSR    BI.PHASE.A
AACB:80 0A    AAD7 712            BRA    COMPRESS2A
AACD:              713 ;
AACD:         AACD 714 COMPRESS1A EQU *
```

```
AACD:AD 6F 7C      715              LDA   CBUFF.L+1
AAD0:C9 03         716              CMP   #3
AAD2:30 04   AAD8  717              BMI   SINGLE.PULSE
AAD4:              718  ;
AAD4:20 F1 AA      719              JSR   BI.PHASE.A
AAD7:        AAD7  720  COMPRESS2A EQU  *
AAD7:60            721              RTS
AAD8:              722  ;
AAD8:              723  ;
AAD8:              724  ;
AAD8:              725  ;
AAD8:              726  ;
AAD8:        AAD8  727  SINGLE.PULSE EQU *
AAD8:20 07 AB      728              JSR   COMP.PULSE.M
AADB:A5 95         729              LDA   TIME.OUT
AADD:C9 10         730              CMP   #$10
AADF:D0 01   AAE2  731              BNE   SF1
AAE1:60            732              RTS
AAE2:              733  ;
AAE2:        AAE2  734  SF1          EQU  *
AAE2:              735  ;
AAE2:A9 00         736              LDA   #0          ; no carrier frequency
AAE4:8D 83 7F      737              STA   CF
AAE7:              738  ;
AAE7:20 5B AD      739              JSR   SQUEEZE
AAEA:20 99 AD      740              JSR   FIND.KEY
AAED:20 9A AD      741              JSR   STORE.KEY
AAF0:              742  ;
AAF0:60            743              RTS
AAF1:              744  ;
AAF1:              745  ;
AAF1:              746  ;
AAF1:              747  ; BI_PHASE_A is used to compress data for the
AAF1:              748  ; MC14497, HT-3-8470 AND SDA2006SDA2008 chips
AAF1:              749  ;
AAF1:              750  ;
AAF1:        AAF1  751  BI.PHASE.A   EQU  *
AAF1:20 07 AB      752              JSR   COMP.PULSE.M
AAF4:              753  ;
AAF4:A5 95         754              LDA   TIME.OUT
AAF6:C9 10         755              CMP   #$10
AAF8:D0 01   AAFB  756              BNE   BPA1
AAFA:60            757              RTS
AAFB:              758  ;
AAFB:        AAFB  759  BPA1         EQU  *
AAFB:              760  ;
AAFB:20 37 AB      761              JSR   CALC.CF
AAFE:              762  ;
AAFE:20 5B AD      763              JSR   SQUEEZE
AB01:              764  ;
AB01:20 99 AD      765              JSR   FIND.KEY
AB04:              766  ;
AB04:4C 9A AD      767              JMP   STORE.KEY
AB07:              768  ;
AB07:              769  ;
AB07:              770  ;
AB07:              771  ;
AB07:              772  ;
AB07:        AB07  773  COMP.PULSE.M EQU  *
AB07:20 06 AC      774              JSR   TIME.LOOP
AB0A:              775  ;
AB0A:A4 95         776              LDY   TIME.OUT
AB0C:C0 10         777              CPY   #$10
AB0E:D0 01   AB11  778              BNE   CPM9
AB10:60            779              RTS
AB11:              780  ;
AB11:        AB11  781  CPM9         EQU  *
AB11:              782  ;
AB11:3C 00 96      783              LDM   #0,I
AB14:A2 00         784              LDX   #0
AB16:A0 01         785              LDY   #1
AB18:        AB18  786  CPM10        EQU  *
AB18:A9 00         787              LDA   #0
AB1A:3C 04 AF      788              LDM   #4,LOOP.CTR
```

```
AB1D:          AB1D  789 CFM11    EQU    *
AB1D:19 B1 7E       790           ORA    ARRAY1,Y
AB20:E8             791           INX
AB21:CE AF 7E       792           DEC    LOOP.CTR
AB24:F0 04   AB2A   793           BEQ    CFM12
AB26:0A             794           ASL    A
AB27:0A             795           ASL    A
AB28:80 F3   AB1D   796           BRA    CFM11
AB2A:          AB2A 797 CFM12    EQU    *
AB2A:A4 96          798           LDY    I
AB2C:99 11 7F       799           STA    I.D.I,Y
AB2F:C8             800           INY
AB30:84 96          801           STY    I
AB32:C0 08          802           CPY    #8
AB34:D0 E2   AB18   803           BNE    CFM10
AB36:               804 ;
AB36:               805 ;
AB36:60             806           RTS
AB37:               807 ;
AB37:               808 ;
AB37:               809 ;
AB37:               810 ;
AB37:               811 ;
AB37:               812 ;
AB37:               813 ;
AB37:               814 ;
AB37:          AB37 815 CALC.CF   EQU    *
AB37:38             816           SEC
AB38:AD 6E 7C       817           LDA    CBUFF.L         ; start.pulse_in_ms =
AB3B:ED 70 7C       818           SBC    CBUFF.L+2       ; (time 2 - time 1) / 512
AB3E:8D FE 7B       819           STA    PLS.TIM.L
AB41:AD 00 7B       820           LDA    CBUFF.H
AB44:ED 02 7B       821           SBC    CBUFF.H+2
AB47:8D 8E 7B       822           STA    PLS.TIM.H
AB4A:18             823           CLC
AB4B:2E FE 7B       824           ROL    PLS.TIM.L
AB4E:2E 8E 7B       825           ROL    PLS.TIM.H
AB51:               826
AB51:AD 6F 7C       827           LDA    CBUFF.L+1       ; get pulse width in cycles
AB54:8D 82 7F       828           STA    PLS.WID.L
AB57:AD 01 7B       829           LDA    CBUFF.H+1
AB5A:8D 81 7F       830           STA    PLS.WID.H
AB5D:A2 00          831           LDX    #0
AB5F:          AB5F 832 CC1       EQU    *
AB5F:38             833           SEC                    ; CF = pulse.width/pulse_time
AB60:AD FE 7B       834           LDA    PLS.TIM.L
AB63:ED 82 7F       835           SBC    PLS.WID.L
AB66:8D FE 7B       836           STA    PLS.TIM.L
AB69:AD 8E 7B       837           LDA    PLS.TIM.H
AB6C:ED 81 7F       838           SBC    PLS.WID.H
AB6F:8D 8E 7B       839           STA    PLS.TIM.H
AB72:30 03   AB77   840           BMI    CC2
AB74:               841 ;
AB74:E8             842           INX
AB75:80 E8   AB5F   843           BRA    CC1
AB77:               844 ;
AB77:          AB77 845 CC2       EQU    *
AB77:8A             846           TXA
AB78:               847 ;
AB78:               848 ; convert carrier frequency to 3 bit coded value
AB78:               849 ;
AB78:E0 15          850           CPX    #BIN1
AB7A:10 0F   AB8B   851           BPL    CC3
AB7C:               852 ;
AB7C:18             853           CLC
AB7D:69 01          854           ADC    #DELTA.ONE
AB7F:38             855           SEC
AB80:E9 15          856           SBC    #BIN1
AB82:10 03   AB87   857           BPL    CC2A
AB84:20 FB AB       858           JSR    CF.OFFSET
AB87:          AB87 859 CC2A      EQU    *
AB87:A2 01          860           LDX    #1
```

```
AB67:80 8C  ABF7  861         BRA  CC.EXIT
AB6A:             862 ;
AB6A:       AB6A  863 CC3     EQU  *
AB6A:E0 1B        864         CPX  #BIN2
AB6C:10 0F  AB7B  865         BPL  CC4
AB6E:             866 ;
AB6E:38           867         SEC
AB6F:E9 1B        868         SBC  #BIN2
AB71:18           869         CLC
AB72:69 01        870         ADC  #DELTA.ONE
AB74:10 03  AB79  871         BPL  CC3A
AB76:20 FB AB     872         JSR  CF.OFFSET
AB79:       AB79  873 CC3A    EQU  *
AB79:A2 02        874         LDX  #2
AB7B:80 5B  ABF7  875         BRA  CC.EXIT
AB7D:             876 ;
AB7D:       AB7D  877 CC4     EQU  *
AB7D:E0 1B        878         CPX  #BIN3
AB7F:10 0F  AB8E  879         BPL  CC5
AB81:             880 ;
AB81:38           881         SEC
AB82:E9 1B        882         SBC  #BIN3
AB84:18           883         CLC
AB85:69 01        884         ADC  #DELTA.ONE
AB87:10 03  AB8C  885         BPL  CC4A
AB89:20 FB AB     886         JSR  CF.OFFSET
AB8C:       AB8C  887 CC4A    EQU  *
AB8C:A2 03        888         LDX  #3
AB8E:80 46  ABF7  889         BRA  CC.EXIT
AB90:             890 ;
AB90:       AB90  891 CC5     EQU  *
AB90:E0 1E        892         CPX  #BIN4
AB92:10 0F  ABA1  893         BPL  CC6
AB94:             894 ;
AB94:38           895         SEC
AB95:E9 1E        896         SBC  #BIN4
AB97:18           897         CLC
AB98:69 01        898         ADC  #DELTA.ONE
AB9A:10 03  AB9F  899         BPL  CC5A
AB9C:20 FB AB     900         JSR  CF.OFFSET
AB9F:       AB9F  901 CC5A    EQU  *
AB9F:A2 04        902         LDX  #4
ABA1:80 33  ABF7  903         BRA  CC.EXIT
ABA3:             904 ;
ABA3:       ABA3  905 CC6     EQU  *
ABA3:E0 21        906         CPX  #BIN5
ABA5:10 0F  ABB6  907         BPL  CC7
ABA7:             908 ;
ABA7:18           909         CLC
ABA8:69 01        910         ADC  #DELTA.ONE
ABAA:38           911         SEC
ABAB:E9 21        912         SBC  #BIN5
ABAD:10 03  ABB2  913         BPL  CC6A
ABAF:20 FB AB     914         JSR  CF.OFFSET
ABB2:       ABB2  915 CC6A    EQU  *
ABB2:A2 05        916         LDX  #5
ABB4:80 20  ABF7  917         BRA  CC.EXIT
ABB6:             918 ;
ABB6:       ABB6  919 CC7     EQU  *
ABB6:E0 24        920         CPX  #BIN6
ABB8:10 0F  ABC9  921         BPL  CC8
ABBA:             922 ;
ABBA:38           923         SEC
ABBB:E9 24        924         SBC  #BIN6
ABBD:18           925         CLC
ABBE:69 01        926         ADC  #DELTA.ONE
ABC0:10 03  ABC5  927         BPL  CC7A
ABC2:20 FB AB     928         JSR  CF.OFFSET
ABC5:       ABC5  929 CC7A    EQU  *
ABC5:A2 06        930         LDX  #6
ABC7:80 0D  ABF7  931         BRA  CC.EXIT
ABC9:             932 ;
ABC9:       ABC9  933 CC8     EQU  *
ABC9:             934 ;
```

```
ABEA:38           935         SEC
ABEB:E9 27        936         SBC     #BIN7
ABED:18           937         CLC
ABEE:69 01        938         ADC     #DELTA.ONE
ABF0:10 03  ABF5  939         BPL     CC8A
ABF2:20 FB AB     940         JSR     CF.OFFSET
ABF5:       ABF5  941 CC8A    EQU     *
ABF5:A2 07        942         LDX     #7
ABF7:             943 ;
ABF7:       ABF7  944 CC.EXIT EQU     *
ABF7:8E 83 7F     945         STX     CF
ABFA:60           946         RTS
ABFB:             947 ;
ABFB:             948 ;
ABFB:       ABFB  949 CF.OFFSET EQU   *
ABFB:AD A4 7F     950         LDA     FORMAT
ABFE:29 F3        951         AND     #$F3
AC00:09 04        952         ORA     #4
AC02:8D A4 7F     953         STA     FORMAT
AC05:60           954         RTS
AC06:             955 ;
AC06:       AC06  956 TI.LOOP EQU     *
AC06:A9 00        957         LDA     #0
AC08:8D A7 7F     958         STA     PLS.CNT
AC0B:A2 05        959         LDX     #5
AC0D:       AC0D  960 TL1     EQU     *
AC0D:9D 91 7F     961         STA     ARRAY.L,X
AC10:9D 89 7F     962         STA     ARRAY.H,X
AC13:CA           963         DEX                     ; clear the arrays
AC14:10 F7  AC0D  964         BPL     TL1
AC16:F0 F5  AC0D  965         BEQ     TL1
AC18:AC 84 7F     966         LDY     EDGE.NUM
AC1B:8D A7 7F     967         STA     PLS.CNT
AC1E:A2 20        968         LDX     #32
AC20:       AC20  969 TL1A    EQU     *
AC20:9D FE 7B     970         STA     PLS.TIM.L,X
AC23:9D 8E 7B     971         STA     PLS.TIM.H,X
AC26:9D B1 7E     972         STA     ARRAY1,X
AC29:CA           973         DEX
AC2A:10 F4  AC20  974         BPL     TL1A
AC2C:F0 F2  AC20  975         BEQ     TL1A
AC2E:             976 ;
AC2E:             977 ; convert running times to elapsed times, and ...
AC2E:             978 ; since only a few different ET's exist for any given
AC2E:             979 ; signal, put each different one into a small array.
AC2E:             980 ;
AC2E:EE A7 7F     981         INC     PLS.CNT
AC31:88           982         DEY
AC32:84 96        983         STY     I               ; for I = 1 to edge_num - 1
AC34:       AC34  984 TL2     EQU     *
AC34:E8           985         INX
AC35:38           986         SEC
AC36:BD 70 7C     987         LDA     CBUFF.L+2,X
AC39:FD 71 7C     988         SBC     CBUFF.L+3,X
AC3C:8D 88 7F     989         STA     ETL             ; ET = Ti+1 - Ti
AC3F:BD 02 7B     990         LDA     CBUFF.H+2,X
AC42:FD 03 7B     991         SBC     CBUFF.H+3,X
AC45:8D 87 7F     992         STA     ETH
AC48:D0 07  AC51  993         BNE     TL2A
AC4A:AD 88 7F     994         LDA     ETL
AC4D:C9 0A        995         CMP     #10
AC4F:90 06  AC57  996         BCC     TL6             ; if (ET > 20 mic.sec.) then
AC51:       AC51  997 TL2A    EQU     *
AC51:AD 88 7F     998         LDA     ETL
AC54:AC A7 7F     999         LDY     PLS.CNT
AC57:99 FE 7B     1000        STA     PLS.TIM.L,Y
AC5A:AD 87 7F     1001        LDA     ETH
AC5D:99 8E 7B     1002        STA     PLS.TIM.H,Y
AC60:EE A7 7F     1003        INC     PLS.CNT
AC63:A0 01        1004        LDY     #1              ; for J = 1 to 5
AC65:       AC65  1005 TL3    EQU     *
```

```
AC65:38           1006             SEC
AC66:AD 88 7F     1007             LDA    ETL
AC69:F9 91 7F     1008             SBC    ARRAY.L,Y
AC6C:85 91        1009             STA    TEMP.L
AC6E:AD 87 7F     1010             LDA    ETH
AC71:F9 89 7F     1011             SBC    ARRAY.H,Y
AC74:85 90        1012             STA    TEMP.H
AC76:10 11  AC89  1013             BPL    TL4
AC78:44 90        1014             COM    TEMP.H
AC7A:44 91        1015             COM    TEMP.L
AC7C:18           1016             CLC
AC7D:A5 91        1017             LDA    TEMP.L
AC7F:69 01        1018             ADC    #1
AC81:85 91        1019             STA    TEMP.L
AC83:A5 90        1020             LDA    TEMP.H
AC85:69 00        1021             ADC    #0
AC87:85 90        1022             STA    TEMP.H
AC89:       AC89 1023 TL4          EQU    *
AC89:64 90        1024             TST    TEMP.H
AC8B:D0 06  AC93 1025              BNE    TL4B
AC8D:A5 91        1026             LDA    TEMP.L    ; if (abs(ET-array(j))<10)
then
AC8F:C9 12        1027             CMP    #EPSILON
AC91:90 24  ACB7 1028              BCC    TL6
AC93:             1029 ;
AC93:       AC93 1030 TL4B         EQU    *
AC93:B9 89 7F     1031             LDA    ARRAY.H,Y
AC96:D0 05  AC9D 1032              BNE    TL4A
AC98:B9 91 7F     1033             LDA    ARRAY.L,Y ;    if (array(j)=0) then
AC9B:F0 07  ACA4 1034              BEQ    TL5       ;        goto TL5
AC9D:       AC9D 1035 TL4A         EQU    *
AC9D:C8           1036             INY              ; else
AC9E:C0 06        1037             CPY    #6
ACA0:D0 C3  AC65 1038              BNE    TL3       ; next j
ACA2:80 13  ACB7 1039              BRA    TL6       ; else next i
ACA4:       ACA4 1040 TL5          EQU    *
ACA4:AD 88 7F     1041             LDA    ETL
ACA7:99 91 7F     1042             STA    ARRAY.L,Y ; array(j) = ET
ACAA:AD 87 7F     1043             LDA    ETH
ACAD:99 89 7F     1044             STA    ARRAY.H,Y
ACB0:8C 9D 7F     1045             STY    NUM.TIMES ; num_times = j
ACB3:C0 05        1046             CPY    #5        ; maximum of 4 times
ACB5:B0 07  ACBE 1047              BCS    TL6A      ; else take error exit
ACB7:       ACB7 1048 TL6          EQU    *
ACB7:C6 96        1049             DEC    I
ACB9:F0 08  ACC3 1050              BEQ    TL6B
ACBB:4C 34 AC    1051              JMP    TL2
ACBE:       ACBE 1052 TL6A         EQU    *
ACBE:A9 10        1053             LDA    #$10
ACC0:85 95        1054             STA    TIME.OUT
ACC2:60           1055             RTS
ACC3:             1056 ;
ACC3:       ACC3 1057 TL6B         EQU    *
ACC3:             1058 ;
ACC3:             1059 ;  sort the times into ascending order
ACC3:             1060 ;
ACC3:A0 01        1061             LDY    #1        ; for i = 1 to num_times -1

ACC5:       ACC5 1062 TL7          EQU    *
ACC5:98           1063             TYA
ACC6:AA           1064             TAX
ACC7:E8           1065             INX              ; for j=i + 1 to num_times ACC8:       ACC8 1066 TL8          EQU    *
ACC8:B9 91 7F     1067             LDA    ARRAY.L,Y
ACCB:85 91        1068             STA    TEMP.L
ACCD:38           1069             SEC
ACCE:FD 91 7F     1070             SBC    ARRAY.L,X
ACD1:B9 89 7F     1071             LDA    ARRAY.H,Y
ACD4:85 90        1072             STA    TEMP.H
ACD6:FD 89 7F     1073             SBC    ARRAY.H,X
ACD9:30 1C  ACF7 1074              BMI    TL9       ; if(array(i)>array(j))then

ACDB:             1075 ;
```

```
ACDB:BD 91 7F    1076          LDA    ARRAY.L,X        ;    temp=array(j)
ACDE:99 91 7F    1077          STA    ARRAY.L,Y        ;    array(i)=array(j)
ACE1:BD 87 7F    1078          LDA    ARRAY.H,X        ;    array(j)=temp
ACE4:99 87 7F    1079          STA    ARRAY.H,Y
ACE7:A5 90       1080          LDA    TEMP.H
ACE9:9D 87 7F    1081          STA    ARRAY.H,X
ACEC:A5 91       1082          LDA    TEMP.L
ACEE:9D 91 7F    1083          STA    ARRAY.L,X
ACF1:      ACF1  1084  TL9     EQU    *
ACF1:E8          1085          INX
ACF2:EC 9D 7F    1086          CPX    NUM.TIMES
ACF5:30 D1  ACC8 1087          BMI    TL8
ACF7:F0 CF  ACC8 1088          BEQ    TL8              ; next j
ACF9:            1089 ;
ACF9:C8          1090          INY
ACFA:CC 9D 7F    1091          CPY    NUM.TIMES
ACFD:90 C6  ACC5 1092          BCC    TL7              ; next i
ACFF:            1093 ;
ACFF:            1094 ;   convert times to array positions (for compression)
ACFF:            1095 ;
ACFF:AC A7 7F    1096          LDY    PLS.CNT          ; for i = 1 to Pulse_count
AD02:88          1097          DEY
AD03:      AD03  1098  TL10    EQU    *
AD03:AE 9D 7F    1099          LDX    NUM.TIMES        ; for j=1 to Number_of_times AD06:      AD06  1100  TL11    EQU    *
AD06:38          1101          SEC
AD07:B9 FE 7B    1102          LDA    PLS.TIM.L,Y
AD0A:FD 91 7F    1103          SBC    ARRAY.L,X
AD0D:85 91       1104          STA    TEMP.L
AD0F:B9 8E 7B    1105          LDA    PLS.TIM.H,Y
AD12:FD 87 7F    1106          SBC    ARRAY.H,X
AD15:10 13  AD2A 1107          BPL    TL11A
AD17:85 90       1108          STA    TEMP.H
AD19:44 90       1109          COM    TEMP.H
AD1B:44 91       1110          COM    TEMP.L
AD1D:18          1111          CLC
AD1E:A5 91       1112          LDA    TEMP.L
AD20:69 01       1113          ADC    #1
AD22:85 91       1114          STA    TEMP.L
AD24:A5 90       1115          LDA    TEMP.H
AD26:69 00       1116          ADC    #0
AD28:85 90       1117          STA    TEMP.H
AD2A:      AD2A  1118  TL11A   EQU    *
AD2A:D0 06  AD32 1119          BNE    TL11B
AD2C:A5 91       1120          LDA    TEMP.L
AD2E:C9 12       1121          CMP    #EPSILON         ; if(abs(ET(i)-array(j))<10
) goto TL12
AD30:90 03  AD35 1122          BCC    TL12
AD32:      AD32  1123  TL11B   EQU    *
AD32:CA          1124          DEX
AD33:D0 D1  AD06 1125          BNE    TL11             ; next j
AD35:      AD35  1126  TL12    EQU    *
AD35:8A          1127          TXA
AD36:1A          1128          DEC
AD37:99 B1 7E    1129          STA    ARRAY1,Y         ;    array1(i) = j
AD3A:88          1130          DEY
AD3B:D0 C6  AD03 1131          BNE    TL10             ; next i
AD3D:            1132 ;
AD3D:AD 91 7F    1133          LDA    ARRAY.L
AD40:8D AE 7E    1134          STA    IF               ; IF = array (1)
AD43:            1135 ;
AD43:AE 84 7F    1136          LDX    EDGE.NUM
AD46:E8          1137          INX
AD47:BD 6E 7C    1138          LDA    CBUFF.L,X
AD4A:38          1139          SEC
AD4B:FD 6F 7C    1140          SBC    CBUFF.L+1,X
AD4E:8D 9F 7F    1141          STA    IPGL
AD51:BD 00 7E    1142          LDA    CBUFF.H,X
AD54:FD 01 7E    1143          SBC    CBUFF.H+1,X
AD57:8D 9E 7F    1144          STA    IPGH             ; IPG = inter_pulse_gap
AD5A:            1145 ;
AD5A:            1146 ;
AD5A:60          1147          RTS
```

```
AD5B:              1148 ;
AD5B:              1149 ;
AD5B:         AD5B 1150 SQUEEZE  EQU   *
AD5B:A2 01         1151          LDX   #1           ; j = 1
AD5D:A0 00         1152          LDY   #0           ; k = 0
AD5F:84 97         1153          STY   ODD.BIT      ; clear odd bits indicator
AD61:         AD61 1154 BD5      EQU   *
AD61:A9 04         1155          LDA   #4
AD63:85 96         1156          STA   I            ; i = 4
AD65:A9 00         1157          LDA   #0           ; a = 0
AD67:         AD67 1158 BD6      EQU   *
AD67:1D 81 7E      1159          ORA   ARRAY1,X     ; a = a | array1 (j)
AD6A:E8            1160          INX                ; j = j + 1
AD6B:C6 96         1161          DEC   I            ; i = i - 1
AD6D:F0 09 AD78    1162          BEQ   BD7          ; if (i = 0) go to BD7
AD6F:EC A7 7F      1163          CPX   PLS.CNT
AD72:F0 0F AD83    1164          BEQ   BD8          ; if(j = pls_cnt) go to BD8

AD74:0A            1165          ASL
AD75:0A            1166          ASL                ; a = a * 4
AD76:80 EF AD67    1167          BRA   BD6          ; go to BD6
AD78:         AD78 1168 BD7      EQU   *
AD78:99 11 7F      1169          STA   I.D.I,Y      ; i_d_i(k) = a
AD7B:C8            1170          INY                ; k = k + 1
AD7C:EC A7 7F      1171          CPX   PLS.CNT
AD7F:F0 02 AD83    1172          BEQ   BD8          ; if (j = pls_cnt) go to BD8
AD81:80 DE AD61    1173          BRA   BD5          ; go to BD5
AD83:         AD83 1174 BD8      EQU   *
AD83:04 96         1175          TST   I
AD85:F0 0D AD94    1176          BEQ   BD9          ; if (i > <0) then
AD87:              1177 ;
AD87:         AD87 1178 BD8A     EQU   *
AD87:0A            1179          ASL
AD88:0A            1180          ASL
AD89:C6 96         1181          DEC   I            ; left justify a and
AD8B:D0 FA AD87    1182          BNE   BD8A
AD8D:99 11 7F      1183          STA   I.D.I,Y      ; i_d_i(k) = a
AD90:C8            1184          INY                ; k = k + 1
AD91:3C 01 97      1185          LDM   #1,ODD.BIT   ; flag odd # of bits
AD94:              1186 ;
AD94:         AD94 1187 BD9      EQU   *
AD94:              1188 ;
AD94:88            1189          DEY
AD95:8C 84 7F      1190          STY   EDGE.NUM
AD98:              1191 ;
AD98:60            1192          RTS
AD99:              1193 ;
AD99:              1194 ;
AD99:              1195 ;
AD99:         AD99 1196 FIND.KEY EQU   *
AD99:              1197 ;
AD99:60            1198          RTS
AD9A:              1199 ;
AD9A:              1200 ;
AD9A:              1201 ;
AD9A:         AD9A 1202 STORE.KEY EQU  *
AD9A:18            1203          CLC
AD9B:6E 01 7B      1204          ROR   CBUFF.H+1
AD9E:6E 6F 7C      1205          ROR   CBUFF.L+1
ADA1:A0 01         1206          LDY   #1
ADA3:AD A4 7F      1207          LDA   FORMAT
ADA6:91 93         1208          STA   (KEY.PTR.L),Y
ADA8:C8            1209          INY
ADA9:AD 6F 7C      1210          LDA   CBUFF.L+1
ADAC:91 93         1211          STA   (KEY.PTR.L),Y ; save # of cycles in burst ADAE:C8            1212          INY
ADAF:              1213 ;
ADAF:AD 83 7F      1214          LDA   CF
ADB2:0A            1215          ASL
ADB3:05 95         1216          ORA   TIME.OUT
ADB5:0A            1217          ASL
ADB6:05 97         1218          ORA   ODD.BIT      ; or in odd bit indicator
```

```
ADB8:0A        1219              ASL
ADB9:0A        1220              ASL
ADBA:0A        1221              ASL
ADBB:0D 9D 7F  1222              ORA    NUM.TIMES
ADBE:91 93     1223              STA    (KEY.PTR.L),Y  ; save CF
ADC0:C8        1224              INY
ADC1:          1225 ;
ADC1:A2 01     1226              LDX    #1
ADC3:     ADC3 1227 SK1A         EQU    *
ADC3:18        1228              CLC
ADC4:BD 91 7F  1229              LDA    ARRAY.L,X      ; round off & save time/4

ADC7:          1230 ; ADC #2 ;
ADC7:          1231 ; STA ARRAY.L,X ;
ADC7:          1232 ; LDA ARRAY.H,X ;
ADC7:          1233 ; ADC #0 ;
ADC7:          1234 ; STA ARRAY.H,X ;
ADC7:          1235 ; CLC ;
ADC7:          1236 ; ROR ARRAY.H,X ;
ADC7:          1237 ; ROR ARRAY.L,X ;
ADC7:          1238 ; CLC ;
ADC7:          1239 ; ROR ARRAY.H,X ;
ADC7:          1240 ; ROR ARRAY.L,X ;
ADC7:          1241 ; LDA ARRAY.L,X ;
ADC7:          1242 ; INX
ADC7:91 93     1243              STA    (KEY.PTR.L),Y  ; save TIME(x)
ADC9:C8        1244              INY
ADCA:BD 89 7F  1245              LDA    ARRAY.H,X
ADCD:91 93     1246              STA    (KEY.PTR.L),Y
ADCF:C8        1247              INY
ADD0:E8        1248              INX
ADD1:EC 9D 7F  1249              CPX    NUM.TIMES
ADD4:30 ED ADC3 1250             BMI    SK1A
ADD6:F0 EB ADC3 1251             BEQ    SK1A
ADD8:          1252 ;
ADD8:A2 00     1253              LDX    #0
ADDA:AD 84 7F  1254              LDA    EDGE.NUM
ADDD:8D AF 7E  1255              STA    LOOP.CTR
ADE0:     ADE0 1256 SK1          EQU    *
ADE0:BD 11 7F  1257              LDA    I.D.I,X        ; save the inter-digit
ADE3:91 93     1258              STA    (KEY.PTR.L),Y  ; internal array
ADE5:C8        1259              INY
ADE6:E8        1260              INX
ADE7:CE AF 7E  1261              DEC    LOOP.CTR
ADEA:10 F4 ADE0 1262             BPL    SK1
ADEC:          1263 ;
ADEC:AE B1 7F  1264              LDX    COMP.PASS
ADEF:18        1265              CLC
ADF0:7E B2 7F  1266              ROR    IPGH.17,X
ADF3:6E 9E 7F  1267              ROR    IPGH
ADF6:6E 9F 7F  1268              ROR    IPGL
ADF9:          1269 ;
ADF9:AD 9E 7F  1270              LDA    IPGH           ; save the inter-pulse gap
ADFC:91 93     1271              STA    (KEY.PTR.L),Y
ADFE:C8        1272              INY
ADFF:AD 9F 7F  1273              LDA    IPGL
AE02:91 93     1274              STA    (KEY.PTR.L),Y
AE04:          1275 ;
AE04:C8        1276              INY
AE05:98        1277              TYA
AE06:A0 00     1278              LDY    #0
AE08:91 93     1279              STA    (KEY.PTR.L),Y
AE0A:          1280 ;
AE0A:60        1281              RTS
AE0B:          1282 ;
AE0B:          1283 ;
AE0B:          1284 ; TIME_CODE is used for the chips that use a time spacing
AE0B:          1285 ; technique to distinguish between ones and zeros such as
AE0B:          1286 ; the MM53226, M709A, M710A, M50119F, M58460, M58464
AE0B:          1287 ; and SL490 chips.
AE0B:          1288 ;
```

```
AE0B:           AE0B 1289 TIME.CODE  EQU    *
AE0B:20 06 AC        1290            JSR    TIME.LOOP
AE0E:                1291 ;
AE0E:AD 9D 7F        1292            LDA    NUM.TIMES
AE11:C9 02           1293            CMP    #2
AE13:D0 19   AE2E    1294            BNE    TC1
AE15:                1295 ;
AE15:                1296 ; M50119P mode ... times are divided by 2
AE15:                1297 ;
AE15:AD 8A 7F        1298            LDA    ARRAY.H+1
AE18:18              1299            CLC
AE19:6A              1300            ROR
AE1A:AD 92 7F        1301            LDA    ARRAY.L+1
AE1D:6A              1302            ROR
AE1E:8D A6 7F        1303            STA    HIGH.TIME
AE21:A9 01           1304            LDA    #1
AE23:8D A8 7F        1305            STA    ZEROS.FACTOR
AE26:A9 03           1306            LDA    #3
AE28:8D A9 7F        1307            STA    ONES.FACTOR
AE2B:4C AD AE        1308            JMP    BUILD.DATA
AE2E:                1309 ;
AE2E:           AE2E 1310 TC1        EQU    *
AE2E:C9 03           1311            CMP    #3
AE30:D0 61   AE93    1312            BNE    SGS
AE32:AD 8A 7F        1313            LDA    ARRAY.H+1
AE35:85 90           1314            STA    TEMP.H
AE37:AD 92 7F        1315            LDA    ARRAY.L+1
AE3A:06 91           1316            ASL    TEMP.L
AE3C:26 90           1317            ROL    TEMP.H
AE3E:06 91           1318            ASL    TEMP.L
AE40:26 90           1319            ROL    TEMP.H
AE42:AD 8B 7F        1320            LDA    ARRAY.H+2
AE45:C5 90           1321            CMP    TEMP.H
AE47:30 0B   AE54    1322            BMI    MITSU
AE49:10 22   AE6D    1323            BPL    FLESS
AE4B:AD 93 7F        1324            LDA    ARRAY.L+2
AE4E:C5 91           1325            CMP    TEMP.L
AE50:30 02   AE54    1326            BMI    MITSU
AE52:10 19   AE6D    1327            BPL    FLESS
AE54:                1328 ;
AE54:                1329 ; M58480P, M58484P mode ... times are divided by 2
AE54:                1330 ;
AE54:           AE54 1331 MITSU      EQU    *
AE54:AD 8A 7F        1332            LDA    ARRAY.H+1
AE57:18              1333            CLC
AE58:6A              1334            ROR
AE59:AD 92 7F        1335            LDA    ARRAY.L+1
AE5C:6A              1336            ROR
AE5D:8D A6 7F        1337            STA    HIGH.TIME
AE60:A9 03           1338            LDA    #3
AE62:8D A8 7F        1339            STA    ZEROS.FACTOR
AE65:A9 07           1340            LDA    #7
AE67:8D A9 7F        1341            STA    ONES.FACTOR
AE6A:4C AD AE        1342            JMP    BUILD.DATA
AE6D:                1343 ;
AE6D:                1344 ; SL490 mode ... times are divided by 8
AE6D:                1345 ;
AE6D:           AE6D 1346 FLESS      EQU    *
AE6D:AD 8A 7F        1347            LDA    ARRAY.H+1
AE70:85 90           1348            STA    TEMP.H
AE72:AD 92 7F        1349            LDA    ARRAY.L+1
AE75:85 91           1350            STA    TEMP.L
AE77:A9 03           1351            LDA    #3
AE79:           AE79 1352 FLESS1     EQU    *
AE79:18              1353            CLC
AE7A:66 90           1354            ROR    TEMP.H
AE7C:66 91           1355            ROR    TEMP.L
AE7E:1A              1356            DEC
AE7F:D0 F8   AE79    1357            BNE    FLESS1
AE81:                1358 ;
AE81:A5 91           1359            LDA    TEMP.L
AE83:8D A6 7F        1360            STA    HIGH.TIME
AE86:A9 06           1361            LDA    #6
```

```
AE88:8D A8 7F       1362            STA     ZEROS.FACTOR
AE8B:A9 0B          1363            LDA     #8
AE8D:8D A9 7F       1364            STA     ONES.FACTOR
AE90:4C AD AE       1365            JMP     BUILD.DATA
AE93:               1366    ;
AE93:               1367    ; M7091A, M710/A mode ... times are divided by 1
AE93:               1368    ;
AE93:         AE93  1369 S65        EQU     *
AE93:AD 92 7F       1370            LDA     ARRAY.L+1
AE96:8D A6 7F       1371            STA     HIGH.TIME
AE99:A9 0B          1372            LDA     #11
AE9B:8D A8 7F       1373            STA     ZEROS.FACTOR
AE9E:A9 16          1374            LDA     #22
AEA0:8D A9 7F       1375            STA     ONES.FACTOR
AEA3:A9 21          1376            LDA     #33
AEA5:8D AA 7F       1377            STA     TWOS.FACTOR
AEA8:A9 2C          1378            LDA     #44
AEAA:8D AB 7F       1379            STA     THREES.FACTOR
AEAD:               1380    ;
AEAD:               1381    ;
AEAD:         AEAD  1382 BUILD.DATA EQU     *
AEAD:AD A7 7F       1383            LDA     PLS.CNT
AEB0:1A             1384            DEC
AEB1:1A             1385            DEC
AEB2:A9 00          1386            LDA     #0
AEB4:AA             1387            TAX                      ; for i = 0 to pulse_count
  -2 step 2
AEB5:         AEB5  1388 BD1        EQU     *
AEB5:AC 9D 7F       1389            LDY     NUM.TIMES        ; for j = 1 to num_times AEB8:         AEB8  1390 BD2        EQU     *
AEB8:18             1391            CLC
AEB9:BD FE 7B       1392            LDA     PLS.TIM.L,X
AEBC:F9 91 7F       1393            SBC     ARRAY.L,Y
AEBF:85 91          1394            STA     TEMP.L
AEC1:BD 8E 7B       1395            LDA     PLS.TIM.H,X      ; if (abs(pulse_time(i) - a
  rray(j)) > 20)
AEC4:F9 89 7F       1396            SBC     ARRAY.H,Y
AEC7:30 02   AECB   1397            BMI     BD3              ; then next j
AEC9:80 11   AEDC   1398            BRA     BD3A
AECB:         AECB  1399 BD3        EQU     *
AECB:85 90          1400            STA     TEMP.H           ; else
AECD:44 90          1401            COM     TEMP.H
AECF:44 91          1402            COM     TEMP.L           ; pulse.time (i) = j - 1
AED1:A5 91          1403            LDA     TEMP.L
AED3:18             1404            CLC                      ; next i
AED4:E9 01          1405            SBC     #1
AED6:85 91          1406            STA     TEMP.L
AED8:A5 90          1407            LDA     TEMP.H
AEDA:E9 00          1408            SBC     #0
AEDC:         AEDC  1409 BD3A       EQU     *
AEDC:D0 DA   AEB8   1410            BNE     BD2
AEDE:A5 91          1411            LDA     TEMP.L
AEE0:C9 0A          1412            CMP     #10
AEE2:30 03   AEE7   1413            BMI     BD4
AEE4:88             1414            DEY
AEE5:D0 D1   AEB8   1415            BNE     BD2
AEE7:         AEE7  1416 BD4        EQU     *
AEE7:88             1417            DEY
AEE8:98             1418            TYA
AEE9:9D FE 7B       1419            STA     PLS.TIM.L,X
AEEC:E8             1420            INX
AEED:E8             1421            INX
AEEE:E4 96          1422            CPX     I
AEF0:D0 C3   AEB5   1423            BNE     BD1
AEF2:               1424    ;
AEF2:               1425    ;
AEF2:20 5B AD       1426            JSR     SQUEEZE
AEF5:               1427    ;
AEF5:               1428    ;
AEF5:20 37 AB       1429            JSR     CALC.CF
AEF8:               1430    ;
AEF8:20 99 AD       1431            JSR     FIND.KEY
```

```
AEFB:              1432 ;
AEFB:AD 6E 7C      1433           LDA    CBUFF.L
AEFE:A0 00         1434           LDY    #0
AF00:91 93         1435           STA    (KEY.PTR.L),Y ; save # of cycles in burst
AF02:C8            1436           INY
AF03:              1437 ;
AF03:AD 83 7F      1438           LDA    CF
AF06:91 93         1439           STA    (KEY.PTR.L),Y ; save CF
AF08:C8            1440           INY
AF09:              1441 ;
AF09:AD 9D 7F      1442           LDA    NUM.TIMES
AF0C:91 93         1443           STA    (KEY.PTR.L),Y
AF0E:C8            1444           INY
AF0F:              1445 ;
AF0F:AD A6 7F      1446           LDA    HIGH.TIME
AF12:91 93         1447           STA    (KEY.PTR.L),Y
AF14:C8            1448           INY
AF15:              1449 ;
AF15:AD A8 7F      1450           LDA    ZEROS.FACTOR
AF18:91 93         1451           STA    (KEY.PTR.L),Y
AF1A:C8            1452           INY
AF1B:              1453 ;
AF1B:AD A9 7F      1454           LDA    ONES.FACTOR
AF1E:91 93         1455           STA    (KEY.PTR.L),Y
AF20:C8            1456           INY
AF21:              1457 ;
AF21:AD AA 7F      1458           LDA    TWOS.FACTOR
AF24:91 93         1459           STA    (KEY.PTR.L),Y
AF26:C8            1460           INY
AF27:              1461 ;
AF27:AD AB 7F      1462           LDA    THREES.FACTOR
AF2A:91 93         1463           STA    (KEY.PTR.L),Y
AF2C:C8            1464           INY
AF2D:              1465 ;
AF2D:AD AC 7F      1466           LDA    FOURS.FACTOR
AF30:91 93         1467           STA    (KEY.PTR.L),Y
AF32:C8            1468           INY
AF33:              1469 ;
AF33:A2 00         1470           LDX    #0
AF35:CC 05 AF      1471           LDM    #5,LOOP.CTR
AF38:              1472 ;
AF38:4C E0 A2      1473           JMP    SK1
AF3B:              1474 ;
AF3B:              1475 ;
AF3B:              1476 ;
AF3B:       AF3B   1477 BLOCK.MOVE EQU  *
AF3B:AD 86 7F      1478           LDA    EDGE.NUM.2
AF3E:8D 84 7F      1479           STA    EDGE.NUM
AF41:18            1480           CLC
AF42:69 02         1481           ADC    #2
AF44:85 96         1482           STA    I
AF46:A2 00         1483           LDX    #0
AF48:AD 85 7F      1484           LDA    EDGE.NUM.1
AF4B:18            1485           CLC
AF4C:69 02         1486           ADC    #2
AF4E:A8            1487           TAY
AF4F:       AF4F   1488 BL.MV.1   EQU    *
AF4F:B9 6E 7C      1489           LDA    CBUFF.L,Y
AF52:9D 6E 7C      1490           STA    CBUFF.L,X
AF55:B9 00 7B      1491           LDA    CBUFF.H,Y
AF58:9D 00 7B      1492           STA    CBUFF.H,X
AF5B:E8            1493           INX
AF5C:C8            1494           INY
AF5D:C6 96         1495           DEC    I
AF5F:10 EE  AF4F   1496           BPL    BL.MV.1
AF61:60            1497           RTS
AF62:              1498 ;
AF62:              1499 ;
AF62:              1500 ;
AF62:       AF62   1501 KHZ.62.5  EQU    *
AF62:FF EE         1502           CLB    7,IR.OUTPUT
AF64:EA            1503           NOP
```

```
AF65:EA         1504            NOP
AF66:EA         1505            NOP             ; 8.5 micro.sec. on
AF67:EA         1506            NOP
AF68:EA         1507            NOP
AF69:EF EE      1508            SEB     7,IR.OUTPUT
AF6B:CE AD 7F   1509            DEC     IR.OUT.CNT      ; 7.5 micro.sec. off
AF6E:EA         1510            NOP
AF6F:D0 F1 AF62 1511            BNE     KHZ.62.5
AF71:           1512 ;
AF71:60         1513            RTS
AF72:           1514 ;
AF72:           1515 ;
AF72:           1516 ;
AF72:      AF72 1517 KHZ.50.31 EQU *
AF72:FF EE      1518            CLB     7,IR.OUTPUT
AF74:EA         1519            NOP
AF75:EA         1520            NOP             ; 8.5 micro.sec. on
AF76:EA         1521            NOP
AF77:EA         1522            NOP
AF78:EA         1523            NOP
AF79:EA         1524            NOP
AF7A:EF EE      1525            SEB     7,IR.OUTPUT
AF7C:8A         1526            TXA             ; load X register with
AF7D:      AF7D 1527 KHZ.50.31.1 EQU *
AF7D:1A         1528            DEC             ; 1 for 11.5micro.sec..30kHz
AF7E:D0 FD AF7D 1529            BNE     KHZ.50.31.1     ; 3for15.5micro.sec.,41.6kHz
AF80:           1530 ;
AF80:EA         1531            NOP             ; 4 for 17.5 micro.sec., 3
8.65 kHz
AF81:EA         1532            NOP
AF82:EA         1533            NOP
AF83:EA         1534            NOP
AF84:EA         1535            NOP
AF85:EA         1536            NOP
AF86:EA         1537            NOP
AF87:FF EE      1538            CLB     7,IR.OUTPUT
AF89:EA         1539            NOP
AF8A:EA         1540            NOP
AF8B:EA         1541            NOP
AF8C:EA         1542            NOP
AF8D:EA         1543            NOP
AF8E:EA         1544            NOP
AF8F:EF EE      1545            SEB     7,IR.OUTPUT
AF91:8A         1546            TXA
AF92:      AF92 1547 KHZ.50.31.2 EQU *
AF92:1A         1548            DEC
AF93:D0 FD AF92 1549            BNE     KHZ.50.31.2
AF95:EA         1550            NOP
AF96:EA         1551            NOP
AF97:CE AD 7F   1552            DEC     IR.OUT.CNT      ; 5for19.5micro.sec.,35.7kHz
AF9A:D0 D6 AF72 1553            BNE     KHZ.50.31       ; 7for23.5micro.sec.,31.25kHz
AF9C:           1554 ;
AF9C:A9 01      1555            LDA     #1
AF9E:2D A4 7F   1556            AND     FORMAT
AFA1:F0 13 AFB6 1557            BEQ     KHZ.50.31.3
AFA3:           1558 ;
AFA3:FF EE      1559            CLB     7,IR.OUTPUT
AFA5:EA         1560            NOP
AFA6:EA         1561            NOP
AFA7:EA         1562            NOP
AFA8:EA         1563            NOP
AFA9:EA         1564            NOP
AFAA:EA         1565            NOP
AFAB:EF EE      1566            SEB     7,IR.OUTPUT
AFAD:8A         1567            TXA
AFAE:      AFAE 1568 KHZ.50.31.2A EQU *
AFAE:1A         1569            DEC
AFAF:D0 FD AFAE 1570            BNE     KHZ.50.31.2A
AFB1:EA         1571            NOP
AFB2:EA         1572            NOP
```

```
AFB3:EA            1573            NOP
AFB4:EA            1574            NOP
AFB5:EA            1575            NOP
AFB6:              1576   ;
AFB6:       AFB6   1577 KHZ.50.31.3 EQU   *
AFB6:              1578   ;
AFB6:60            1579            RTS
AFB7:              1580   ;
AFB7:              1581   ;
AFB7:       AFB7   1582 KHZ.45.28 EQU     *
AFB7:FF EE         1583            CLB    7,IR.OUTPUT
AFB9:EA            1584            NOP
AFBA:EA            1585            NOP
AFBB:EA            1586            NOP
AFBC:EA            1587            NOP
AFBD:EA            1588            NOP
AFBE:EF EE         1589            SEB    7,IR.OUTPUT
AFC0:8A            1590            TXA
AFC1:       AFC1   1591 KHZ.45.28.1 EQU   *
AFC1:1A            1592            DEC
AFC2:D0 FD  AFC1   1593            BNE    KHZ.45.28.1
AFC4:EA            1594            NOP
AFC5:EA            1595            NOP
AFC6:EA            1596            NOP
AFC7:EA            1597            NOP
AFC8:EA            1598            NOP
AFC9:EA            1599            NOP
AFCA:EA            1600            NOP
AFCB:FF EE         1601            CLB    7,IR.OUTPUT
AFCD:EA            1602            NOP
AFCE:EA            1603            NOP
AFCF:EA            1604            NOP
AFD0:EA            1605            NOP
AFD1:EA            1606            NOP
AFD2:EF EE         1607            SEB    7,IR.OUTPUT
AFD4:8A            1608            TXA
AFD5:       AFD5   1609 KHZ.45.28.2 EQU   *
AFD5:1A            1610            DEC
AFD6:D0 FD  AFD5   1611            BNE    KHZ.45.28.2
AFD8:EA            1612            NOP
AFD9:EA            1613            NOP
AFDA:CE AD 7F      1614            DEC    IR.OUT.CNT
AFDD:D0 D8  AFB7   1615            BNE    KHZ.45.28
AFDF:              1616   ;
AFDF:A9 01         1617            LDA    #1
AFE1:2D A4 7F      1618            AND    FORMAT
AFE4:F0 12  AFF8   1619            BEQ    KHZ.45.28.3
AFE6:              1620   ;
AFE6:FF EE         1621            CLB    7,IR.OUTPUT
AFE8:EA            1622            NOP
AFE9:EA            1623            NOP
AFEA:EA            1624            NOP
AFEB:EA            1625            NOP
AFEC:EA            1626            NOP
AFED:EF EE         1627            SEB    7,IR.OUTPUT
AFEF:8A            1628            TXA
AFF0:       AFF0   1629 KHZ.45.28.2A EQU  *
AFF0:1A            1630            DEC
AFF1:D0 FD  AFF0   1631            BNE    KHZ.45.28.2A
AFF3:EA            1632            NOP
AFF4:EA            1633            NOP
AFF5:EA            1634            NOP
AFF6:EA            1635            NOP
AFF7:EA            1636            NOP
AFF8:       AFF8   1637 KHZ.45.28.3 EQU   *
AFF8:60            1638            RTS
AFF9:              1639   ;
AFF9:              1640   ;DS $9C00-*,$FF
AFF9:              1641   ;
AFF9:              1642   ;
AFF9:              1643   ;
AFF9:              1644   ; ORG $9C00
AFF9:              1645   ;
AFF9:              1646   ;
```

```
AFF9:              1647 ;
AFF9:              1648 ; EXPAND is used to generate a list of pulse counts
AFF9:              1649 ; and wait times based on the contents of the key
AFF9:              1650 ; file record for a particular key.
AFF9:              1651 ;
AFF9:              1652 ;
AFF9:         AFF9 1653 EXPAND    EQU   *
AFF9:20 77 AD      1654           JSR   FIND.KEY
AFFC:              1655 ;
AFFC:A0 01         1656           LDY   #1
AFFE:B1 93         1657           LDA   (KEY.PTR.L),Y
B000:48            1658           PHA
B001:20 55 B0      1659           JSR   EX0
B004:68            1660           PLA
B005:24 95         1661           TST   TIME.OUT
B007:F0 2F    B038 1662           BEQ   EXP2
B009:29 02         1663           AND   #2
B00B:F0 28    B035 1664           BEQ   EXP1
B00D:A5 93         1665           LDA   KEY.PTR.L
B00F:8D A3 7F      1666           STA   KEY.L.TEMP
B012:A5 94         1667           LDA   KEY.PTR.H
B014:8D A2 7F      1668           STA   KEY.H.TEMP
B017:A0 00         1669           LDY   #0
B019:B1 93         1670           LDA   (KEY.PTR.L),Y
B01B:18            1671           CLC
B01C:65 93         1672           ADC   KEY.PTR.L
B01E:85 93         1673           STA   KEY.PTR.L
B020:A5 94         1674           LDA   KEY.PTR.H
B022:69 00         1675           ADC   #0
B024:85 94         1676           STA   KEY.PTR.H
B026:20 55 B0      1677           JSR   EX0
B029:AD A3 7F      1678           LDA   KEY.L.TEMP
B02C:85 93         1679           STA   KEY.PTR.L
B02E:AD A2 7F      1680           LDA   KEY.H.TEMP
B031:85 94         1681           STA   KEY.PTR.H
B033:80 03    B038 1682           BRA   EXP2
B035:         B035 1683 EXP1      EQU   *
B035:20 F8 B2      1684           JSR   OUT.PUT
B038:         B038 1685 EXP2      EQU   *
B038:              1686 ; JSR OUT.PUT
B038:EA            1687           NOP
B039:EA            1688           NOP
B03A:EA            1689           NOP
B03B:80 06    B043 1690           BRA   EXP5
B03D:              1691 ;
B03D:              1692 ;
B03D:         B03D 1693 EXP3      EQU   *
B03D:20 AB B1      1694           JSR   PO.4
B040:              1695 ;
B040:         B040 1696 EXP4      EQU   *
B040:              1697 ; JSR PO.4
B040:EA            1698           NOP
B041:EA            1699           NOP
B042:EA            1700           NOP
B043:              1701 ;
B043:              1702 ;
B043:         B043 1703 EXP5      EQU   *
B043:AD 9F 7F      1704           LDA   IFGL
B046:38            1705           SEC
B047:E9 E1         1706           SBC   #225
B049:8D 9F 7F      1707           STA   IFGL
B04C:AD 9E 7F      1708           LDA   IFGH
B04F:E9 00         1709           SBC   #0
B051:8D 9E 7F      1710           STA   IFGH
B054:              1711 ;
B054:         B054 1712 EXP6      EQU   *
B054:              1713 ; STA IFGH
B054:60            1714           RTS
B055:              1715 ;
B055:              1716 ;
B055:              1717 ;
B055:              1718 ;
B055:         B055 1719 EX0       EQU   *
```

```
B055:A0 01           1720                LDY    #1
B057:B1 93           1721                LDA    (KEY.PTR.L),Y
B059:8D A4 7F        1722                STA    FORMAT
B05C:C8              1723                INY
B05D:B1 93           1724                LDA    (KEY.PTR.L),Y
B05F:8D AE 7F        1725                STA    BURST.PULSES
B062:C8              1726                INY
B063:B1 93           1727                LDA    (KEY.PTR.L),Y
B065:C8              1728                INY
B066:AA              1729                TAX
B067:29 07           1730                AND    #7
B069:8D 5C 7F        1731                STA    NUM.TIMES
B06C:8A              1732                TXA
B06D:29 F8           1733                AND    #$F8
B06F:18              1734                CLC
B070:6A              1735                ROR
B071:6A              1736                ROR
B072:6A              1737                ROR
B073:3C 01 97        1738                LDM    #1,ODD.BIT    ;determine if odd bit count B076:6A              1739                ROR
B077:B0 02   B07B    1740                BCS    EX1C
B079:C6 97           1741                DEC    ODD.BIT
B07B:        B07B    1742 EX1C           EQU    *
B07B:3C 01 95        1743                LDM    #1,TIME.OUT
B07E:18              1744                CLC
B07F:6A              1745                ROR
B080:B0 02   B084    1746                BCS    EX1B
B082:E6 95           1747                INC    TIME.OUT
B084:        B084    1748 EX1B           EQU    *
B084:8D 83 7F        1749                STA    CF
B087:C9 00           1750                CMP    #0
B089:D0 03   B08E    1751                BNE    EX1A
B08B:4C 2A B1        1752                JMP    PULSE.OUT
B08E:        B08E    1753 EX1A           EQU    *
B08E:                1754 ;
B08E:C9 01           1755                CMP    #1
B090:D0 04   B096    1756                BNE    EX1
B092:A9 01           1757                LDA    #HZ625
B094:80 2A   B0C0    1758                BRA    EX6
B096:        B096 1759 EX1              EQU    *
B096:C9 02           1760                CMP    #2
B098:D0 04   B09E    1761                BNE    EX2
B09A:A9 02           1762                LDA    #HZ50
B09C:80 22   B0C0    1763                BRA    EX6
B09E:        B09E 1764 EX2              EQU    *
B09E:C9 03           1765                CMP    #3
B0A0:D0 04   B0A6    1766                BNE    EX3
B0A2:A9 03           1767                LDA    #HZ416
B0A4:80 1A   B0C0    1768                BRA    EX6
B0A6:        B0A6 1769 EX3              EQU    *
B0A6:C9 04           1770                CMP    #4
B0A8:D0 04   B0AE    1771                BNE    EX4
B0AA:A9 04           1772                LDA    #HZ3605
B0AC:80 12   B0C0    1773                BRA    EX6
B0AE:        B0AE 1774 EX4              EQU    *
B0AE:C9 05           1775                CMP    #5
B0B0:D0 04   B0B6    1776                BNE    EX5
B0B2:A9 05           1777                LDA    #HZ357
B0B4:80 0A   B0C0    1778                BRA    EX6
B0B6:        B0B6 1779 EX5              EQU    *
B0B6:C9 06           1780                CMP    #6
B0B8:D0 04   B0BE    1781                BNE    EX5A
B0BA:A9 06           1782                LDA    #HZ3125
B0BC:80 02   B0C0    1783                BRA    EX6
B0BE:        B0BE 1784 EX5A             EQU    *
B0BE:A9 07           1785                LDA    #HZ28
B0C0:                1786 ;
B0C0:                1787 ;
B0C0:                1788 ;
B0C0:        B0C0 1789 EX6              EQU    *
B0C0:8D B0 7F        1790                STA    CYCLE.TIM.L
B0C3:A9 00           1791                LDA    #0
B0C5:8D AF 7F        1792                STA    CYCLE.TIM.H
```

```
B0C8:              1793 ;
B0C8:4C DE B1      1794           JMP    BI.PHASE.A.OUT
B0CB:              1795 ;
B0CB:              1796 ; LDA BURST.PULSES
B0CB:              1797 ; CMP #8
B0CB:              1798 ; BMI FLS.POS.MOD
B0CB:              1799 ;
B0CB:              1800 ; CMP #16
B0CB:              1801 ; BPL EX7
B0CB:              1802 ; BEQ EX7
B0CB:              1803 ; JMP BI.PHASE.A.OUT
B0CB:       B0CB   1804 EX7       EQU    *
B0CB:              1805 ;
B0CB:              1806 ; CMP #26
B0CB:              1807 ; BMI FLS.POS.MOD
B0CB:              1808 ;;
B0CB:              1809 ; CMP #50
B0CB:              1810 ; BPL EX8
B0CB:              1811 ; BEQ EX8
B0CB:              1812 ; JMP BI.PHASE.A.OUT
B0CB:       B0CB   1813 EX8       EQU    *
B0CB:              1814 ;
B0CB:              1815 ; CMP #82
B0CB:              1816 ; BMI FLS.POS.MOD
B0CB:              1817 ;
B0CB:              1818 ; JMP BI.PHASE.A.OUT
B0CB:       B0CB   1819 EX9       EQU    *
B0CB:              1820 ;
B0CB:60            1821           RTS
B0CC:              1822 ;
B0CC:              1823 ;
B0CC:              1824 ;
B0CC:              1825 ; FLS_POS_MOD formats the data for a pulse position
B0CC:              1826 ; modulated signal.
B0CC:              1827 ;
B0CC:              1828 ;
B0CC:       B0CC   1829 FLS.POS.MOD EQU *
B0CC:A0 02         1830           LDY    #2
B0CE:       B0CE   1831 PPM1      EQU    *
B0CE:B1 93         1832           LDA    (KEY.PTR.L),Y ; parse the header
B0D0:99 9B 7F      1833           STA    NUM.TIMES-2,Y
B0D3:C8            1834           INY
B0D4:C0 07         1835           CPY    #7
B0D6:D0 F6    B0CE 1836           BNE    PPM1
B0D8:              1837 ;
B0D8:              1838 ;
B0D8:A2 00         1839           LDX    #0            ; expand the bit data
B0DA:       B0DA   1840 PPM2      EQU    *
B0DA:A9 04         1841           LDA    #4
B0DC:8D AF 7E      1842           STA    LOOP.CTR
B0DF:B1 93         1843           LDA    (KEY.PTR.L),Y
B0E1:       B0E1   1844 PPM3      EQU    *
B0E1:48            1845           PHA
B0E2:29 03         1846           AND    #3
B0E4:9D 8E 7C      1847           STA    CBUFF.L,X
B0E7:A9 00         1848           LDA    #0
B0E9:9D 00 7B      1849           STA    CBUFF.H,X
B0EC:68            1850           PLA
B0ED:18            1851           CLC
B0EE:6A            1852           ROR
B0EF:18            1853           CLC
B0F0:6A            1854           ROR
B0F1:E8            1855           INX
B0F2:CE AF 7E      1856           DEC    LOOP.CTR
B0F5:D0 EA    B0E1 1857           BNE    PPM3
B0F7:              1858 ;
B0F7:C8            1859           INY
B0F8:C0 0C         1860           CPY    #12
B0FA:D0 DE    B0DA 1861           BNE    PPM2
B0FC:              1862 ;
B0FC:              1863 ;
B0FC:B1 93         1864           LDA    (KEY.PTR.L),Y
```

```
B0FE:8D 9E 7F      1865             STA   IPGH
B101:C8            1866             INY
B102:B1 93         1867             LDA   (KEY.PTR.L),Y
B104:8D 9F 7F      1868             STA   IPGL
B107:              1869 ;
B107:              1870 ;
B107:A2 00         1871             LDX   #0
B109:        B109  1872 PPM4        EQU   *
B109:BD 6E 7C      1873             LDY   CBUFF.L,X
B10C:AD A6 7F      1874             LDA   HIGH.TIME
B10F:9D 6E 7C      1875             STA   CBUFF.L,X
B112:B9 A8 7F      1876             LDA   ZEROS.FACTOR,Y
B115:20 A6 B2      1877             JSR   PPM.MULT
B118:E8            1878             INX
B119:AD A6 7F      1879             LDA   HIGH.TIME
B11C:9D 6E 7C      1880             STA   CBUFF.L,X
B11F:E8            1881             INX
B120:EC 9D 7F      1882             CPX   NUM.TIMES
B123:10 02   B127  1883             BPL   PPM5
B125:80 E2   B109  1884             BRA   PPM4
B127:              1885 ;
B127:              1886 ;
B127:        B127  1887 PPM5        EQU   *
B127:4C F8 B2      1888             JMP   OUT.PUT    ; send the message
B12A:              1889 ;
B12A:              1890 ;
B12A:              1891 ;
B12A:              1892 ;
B12A:              1893 ;
B12A:              1894 ;
B12A:              1895 ; PULSE_OUT expands and retransmitts data from flash mode
B12A:              1896 ; type chips.
B12A:              1897 ;
B12A:              1898 ;
B12A:        B12A  1899 PULSE.OUT   EQU   *
B12A:A2 00         1900             LDX   #0         ; expand the bit data
B12C:        B12C  1901 FO.1A       EQU   *
B12C:B1 93         1902             LDA   (KEY.PTR.L),Y
B12E:9D 91 7F      1903             STA   ARRAY.L,X
B131:C8            1904             INY
B132:B1 93         1905             LDA   (KEY.PTR.L),Y
B134:9D 89 7F      1906             STA   ARRAY.H,X
B137:18            1907             CLC
B138:7E 89 7F      1908             ROR   ARRAY.H,X
B13B:7E 91 7F      1909             ROR   ARRAY.L,X
B13E:C8            1910             INY
B13F:E8            1911             INX
B140:EC 9D 7F      1912             CPX   NUM.TIMES
B143:D0 E7   B12C  1913             BNE   FO.1A
B145:              1914 ;
B145:A2 00         1915             LDX   #0
B147:84 92         1916             STY   TEMP
B149:A0 00         1917             LDY   #0
B14B:B1 93         1918             LDA   (KEY.PTR.L),Y
B14D:A4 92         1919             LDY   TEMP
B14F:38            1920             SEC
B150:E9 02         1921             SBC   #2
B152:8D 84 7F      1922             STA   EDGE.NUM
B155:        B155  1923 PO.1        EQU   *
B155:A9 04         1924             LDA   #4
B157:8D AF 7E      1925             STA   LOOP.CTR
B15A:B1 93         1926             LDA   (KEY.PTR.L),Y
B15C:        B15C  1927 PO.2        EQU   *
B15C:48            1928             PHA
B15D:29 C0         1929             AND   #$C0
B15F:18            1930             CLC
B160:2A            1931             ROL
B161:2A            1932             ROL
B162:2A            1933             ROL
B163:9D 6E 7C      1934             STA   CBUFF.L,X
B166:A9 00         1935             LDA   #0
B168:9D 00 7B      1936             STA   CBUFF.H,X
```

```
B16B:68              1937            PLA
B16C:18              1938            CLC
B16D:2A              1939            ROL
B16E:18              1940            CLC
B16F:2A              1941            ROL
B170:E8              1942            INX
B171:CE AF 7E        1943            DEC   LOOP.CTR
B174:D0 E6    B15C   1944            BNE   P0.2
B176:                1945  ;
B176:C8              1946            INY
B177:CC 84 7F        1947            CPY   EDGE.NUM
B17A:D0 D9    B155   1948            BNE   P0.1
B17C:                1949  ;
B17C:                1950  ;
B17C:B1 93           1951            LDA   (KEY.PTR.L),Y  ; save the inter-message
B17E:8D 9E 7F        1952            STA   IFGH           ; interval
B181:C8              1953            INY
B182:B1 93           1954            LDA   (KEY.PTR.L),Y
B184:8D 9F 7F        1955            STA   IFGL
B187:                1956  ; CLC
B187:                1957  ; ROR IFGH
B187:                1958  ; ROR IFGL
B187:                1959  ;
B187:64 97           1960            TST   ODD.BIT
B189:F0 02    B18D   1961            BEQ   P0.2A
B18B:CA              1962            DEX
B18C:CA              1963            DEX
B18D:         B18D   1964  P0.2A     EQU   *
B18D:                1965  ;
B18D:8E AF 7E        1966            STX   LOOP.CTR
B190:A2 00           1967            LDX   #0
B192:         B192   1968  P0.2B     EQU   *
B192:BC 6E 7C        1969            LDY   CBUFF.L,X      ; convert array positions
B195:B9 91 7F        1970            LDA   ARRAY.L,Y
B198:9D 6E 7C        1971            STA   CBUFF.L,X      ; back to times
B19B:B9 69 7F        1972            LDA   ARRAY.H,Y
B19E:9D 00 7B        1973            STA   CBUFF.H,X
B1A1:E8              1974            INX
B1A2:EC AF 7E        1975            CPX   LOOP.CTR
B1A5:10 02    B1A9   1976            BPL   P0.2C
B1A7:80 E9    B192   1977            BRA   P0.2B
B1A9:                1978  ;
B1A9:         B1A9   1979  P0.2C     EQU   *
B1A9:                1980  ;
B1A9:A2 00           1981            LDX   #0
B1AB:         B1AB   1982  P0.3      EQU   *
B1AB:                1983  ; LDA IF
B1AB:                1984  ; JSR FPM.MULT
B1AB:                1985    ** 5 INX
B1AB:                1986  ; CPX EDGE.NUM
B1AB:                1987  ; BPL P0.4
B1AB:                1988  ; BRA P0.3
B1AB:                1989  ;
B1AB:                1990  ;
B1AB:         B1AB   1991  P0.4      EQU   *
B1AB:A2 00           1992            LDX   #0
B1AD:         B1AD   1993  P0.5      EQU   *
B1AD:FF EE           1994            CLB   7,IR.OUTPUT
B1AF:A9 05           1995            LDA   #5
B1B1:         B1B1   1996  P0.6      EQU   *
B1B1:1A              1997            DEC   A
B1B2:D0 FD    B1B1   1998            BNE   P0.6
B1B4:                1999  ;
B1B4:EF EE           2000            SEB   7,IR.OUTPUT
B1B6:BD 00 7B        2001            LDA   CBUFF.H,X
B1B9:F0 03    B1BE   2002            BEQ   P0.7
B1BB:                2003  ;
B1BB:20 68 B3        2004            JSR   MILLI.WAIT
B1BE:                2005  ;
B1BE:         B1BE   2006  P0.7      EQU   *
B1BE:18              2007            CLC
B1BF:BD 6E 7C        2008            LDA   CBUFF.L,X
B1C2:E9 00           2009            SBC   #0
B1C4:F0 03    B1C9   2010            BEQ   P0.8
```

```
B1C6:              2011 ;
B1C6:20 60 B3      2012           JSR    MICRO.WAIT
B1C9:              2013 ;
B1C9:        B1C9  2014 P0.8      EQU    *
B1C9:E8            2015           INX
B1CA:EC AF 7E      2016           CPX    LOOP.CTR
B1CD:D0 DE   B1AD  2017           BNE    P0.5
B1CF:              2018 ;
B1CF:AD 9E 7F      2019           LDA    IPGH
B1D2:F0 03   B1D7  2020           BEQ    P0.9           ; wait the inter-pulse gap B1D4:20 68 B3      2021           JSR    MILLI.WAIT
B1D7:        B1D7  2022 P0.9      EQU    *
B1D7:AD 9F 7F      2023           LDA    IPGL
B1DA:20 60 B3      2024           JSR    MICRO.WAIT
B1DD:              2025 ;
B1DD:              2026 ;
B1DD:60            2027           RTS
B1DE:              2028 ;
B1DE:              2029 ;
B1DE:              2030 ;
B1DE:              2031 ;
B1DE:              2032 ;
B1DE:              2033 ;
B1DE:              2034 ;
B1DE:              2035 ;
B1DE:              2036 ;
B1DE:              2037 ;
B1DE:              2038 ; BI_PHASE_A_OUT expands & retransmitts data aquired from
B1DE:              2039 ; chips that use a bi-phase encoding technique.
B1DE:              2040 ;
B1DE:              2041 ;
B1DE:        B1DE  2042 BI.PHASE.A.OUT: EQU *
B1DE:A2 00         2043           LDX    #0             ; expand the data
B1E0:        B1E0  2044 BP0.1A    EQU    *
B1E0:              2045 ; LDA #0
B1E0:              2046 ; STA ARRAY.H,X
B1E0:B1 93         2047           LDA    (KEY.PTR.L),Y
B1E2:9D 91 7F      2048           STA    ARRAY.L,X
B1E5:              2049 ; ASL ARRAY.L,X
B1E5:              2050 ; ROL ARRAY.H,X
B1E5:              2051 ; ASL ARRAY.L,X
B1E5:              2052 ; ROL ARRAY.H,X
B1E5:C8            2053           INY
B1E6:B1 93         2054           LDA    (KEY.PTR.L),Y
B1E8:9D 89 7F      2055           STA    ARRAY.H,X
B1EB:C8            2056           INY
B1EC:E8            2057           INX
B1ED:EC 9D 7F      2058           CPX    NUM.TIMES
B1F0:D0 EE   B1E0  2059           BNE    BP0.1A
B1F2:              2060 ;
B1F2:A2 00         2061           LDX    #0
B1F4:84 92         2062           STY    TEMP
B1F6:A0 00         2063           LDY    #0
B1F8:B1 93         2064           LDA    (KEY.PTR.L),Y
B1FA:A4 92         2065           LDY    TEMP
B1FC:38            2066           SEC
B1FD:E9 02         2067           SBC    #2
B1FF:8D 84 7F      2068           STA    EDGE.NUM
B202:        B202  2069 BP0.1     EQU    *
B202:A9 04         2070           LDA    #4
B204:8D AF 7E      2071           STA    LOOP.CTR
B207:B1 93         2072           LDA    (KEY.PTR.L),Y
B209:        B209  2073 BP0.2     EQU    *
B209:48            2074           PHA
B20A:29 C0         2075           AND    #$C0
B20C:18            2076           CLC
B20D:2A            2077           ROL
B20E:2A            2078           ROL
B20F:2A            2079           ROL
B210:9D 6E 7C      2080           STA    CBUFF.L,X
B213:A9 00         2081           LDA    #0
```

```
B215:9D 00 7B    2082           STA    CBUFF.H,X
B218:68          2083           PLA
B219:18          2084           CLC
B21A:2A          2085           ROL
B21B:18          2086           CLC
B21C:2A          2087           ROL
B21D:E8          2088           INX
B21E:CE AF 7E    2089           DEC    LOOP.CTR
B221:D0 E6  B209 2090           BNE    BPO.2
B223:            2091 ;
B223:C8          2092           INY
B224:CC 84 7F    2093           CPY    EDGE.NUM
B227:D0 D9  B202 2094           BNE    BPO.1
B229:            2095 ;
B229:            2096 ;
B229:B1 93       2097           LDA    (KEY.PTR.L),Y ; save the inter-message interval
B22B:8D 9E 7F    2098           STA    IPGH
B22E:C8          2099           INY
B22F:B1 93       2100           LDA    (KEY.PTR.L),Y
B231:8D 9F 7F    2101           STA    IPGL
B234:            2102 ; CLC
B234:            2103 ; ROR IPGH
B234:            2104 ; ROR IPGL
B234:            2105 ;
B234:24 97       2106           TST    ODD.BIT
B236:F0 02  B23A 2107           BEQ    BPO.2C
B238:CA          2108           DEX
B239:CA          2109           DEX
B23A:       B23A 2110 BPO.2C    EQU    *
B23A:            2111 ;
B23A:8E AF 7E    2112           STA    LOOP.CTR
B23D:A2 00       2113           LDX    #0
B23F:       B23F 2114 BPO.2A    EQU    *
B23F:BC 6E 7C    2115           LDY    CBUFF.L,X    ; convert array positions
B242:B9 91 7F    2116           LDA    ARRAY.L,Y    ; back to times
B245:9D 6E 7C    2117           STA    CBUFF.L,X    ;
B248:B9 89 7F    2118           LDA    ARRAY.H,Y    ;
B24B:9D 00 7B    2119           STA    CBUFF.H,X    ;
B24E:E8          2120           INX                 ;
B24F:EC AF 7E    2121           CPX    LOOP.CTR     ;
B252:10 02  B256 2122           BPL    BPO.2B       ;
B254:80 E9  B23F 2123           BRA    BPO.2A
B256:            2124 ;
B256:       B256 2125 BPO.2B    EQU    *
B256:            2126 ;
B256:AE 83 7F    2127           LDX    CF           ; convert high times
B259:BD 82 B3    2128           LDA    CF.BASE,X    ; to pulse counts
B25C:85 92       2129           STA    TEMP
B25E:A2 01       2130           LDX    #1
B260:18          2131           CLC
B261:6E 00 7B    2132           ROR    CBUFF.H
B264:6E 6E 7C    2133           ROR    CBUFF.L
B267:       B267 2134 BPO.3     EQU    *
B267:A0 00       2135           LDY    #0
B269:       B269 2136 BPO.3A    EQU    *
B269:C8          2137           INY
B26A:38          2138           SEC
B26B:BD 6E 7C    2139           LDA    CBUFF.L,X
B26E:E5 92       2140           SBC    TEMP
B270:9D 6E 7C    2141           STA    CBUFF.L,X
B273:BD 00 7B    2142           LDA    CBUFF.H,X
B276:E9 00       2143           SBC    #0
B278:9D 00 7B    2144           STA    CBUFF.H,X
B27B:10 EC  B269 2145           BPL    BPO.3A
B27D:            2146 ;
B27D:A9 00       2147           LDA    #0
B27F:9D 00 7B    2148           STA    CBUFF.H,X
B282:EA          2149           NOP
B283:98          2150           TYA
B284:C9 06       2151           CMP    #06
B286:D0 08  B290 2152           BNE    BPO.3B
B288:AD AE 7F    2153           LDA    BURST.PULSES
```

```
B28B:C9 05        2154              CMP     #05
B28D:F0 01  B290  2155              BEQ     BF0.3B
B28F:98           2156              TYA
B290:       B290  2157  BF0.3B      EQU     *
B290:9D 6E 7C     2158              STA     CBUFF.L,X
B293:             2159  ; ASL CBUFF.L,X
B293:             2160  ; ROL CBUFF.H,X
B293:E8           2161              INX
B294:18           2162              CLC
B295:7E 00 7B     2163              ROR     CBUFF.H,X
B298:7E 6E 7C     2164              ROR     CBUFF.L,X
B29B:E8           2165              INX
B29C:EC AF 7E     2166              CPX     LOOP.CTR
B29F:10 02  B2A3  2167              BPL     BF0.4
B2A1:80 C4  B267  2168              BRA     BF0.3
B2A3:             2169  ;
B2A3:             2170  ;
B2A3:       B2A3  2171  BF0.4       EQU     *
B2A3:4C F8 B2     2172              JMP     OUT.PUT
B2A6:             2173  ;
B2A6:             2174  ;
B2A6:             2175  ;
B2A6:             2176  ;
B2A6:             2177  ;
B2A6:             2178  ;
B2A6:             2179  ; PPM
B2A6:             2180  ; _MULT calculates the number of clocks of delay for
B2A6:             2181  ; a single bit in pulse position modulated mode.
B2A6:             2182  ;
B2A6:             2183  ;
B2A6:       B2A6  2184  PPM.MULT    EQU     *
B2A6:3A          2185              INC
B2A7:8D 9A 7F    2186              STA     TEMP1.L     ; set up the multiplication variables
B2AA:A9 00       2187              LDA     #0
B2AC:8D 99 7F    2188              STA     TEMP1.H
B2AF:8D 9B 7F    2189              STA     TEMP2.H
B2B2:BD 6E 7C    2190              LDA     CBUFF.L,X
B2B5:            2191  ;
B2B5:20 C3 B2    2192              JSR     MULT.8X8
B2B8:            2193  ;
B2B8:A5 91       2194              LDA     TEMP.L      ; put the result back into the array
B2BA:9D 6E 7C    2195              STA     CBUFF.L,X
B2BD:A5 90       2196              LDA     TEMP.H
B2BF:9D 00 7B    2197              STA     CBUFF.H,X
B2C2:            2198  ;
B2C2:60          2199              RTS
B2C3:            2200  ;
B2C3:            2201  ;
B2C3:            2202  ;
B2C3:            2203  ;
B2C3:            2204  ; MULTI_8X8 performs an 8 bit by 8 bit multiply
B2C3:            2205  ; result is returned in TEMP2.
B2C3:            2206  ;
B2C3:       B2C3 2207  MULT.8X8    EQU     *
B2C3:A9 00       2208              LDA     #0
B2C5:85 91       2209              STA     TEMP.L
B2C7:85 90       2210              STA     TEMP.H
B2C9:A2 08       2211              LDX     #8
B2CB:            2212  ;
B2CB:       B2CB 2213  M8X8.1      EQU     *
B2CB:18          2214              CLC
B2CC:6E 99 7F    2215              ROR     TEMP1.H
B2CF:6E 9A 7F    2216              ROR     TEMP1.L
B2D2:90 0F  B2E3 2217              BCC     M8X8.2
B2D4:            2218  ;
B2D4:18          2219              CLC
B2D5:A5 91       2220              LDA     TEMP.L
B2D7:6D 9C 7F    2221              ADC     TEMP2.L
B2DA:85 91       2222              STA     TEMP.L
B2DC:A5 90       2223              LDA     TEMP.H
B2DE:6D 9B 7F    2224              ADC     TEMP2.H
```

```
B2E1:85 90        2225              STA    TEMP.H
B2E3:        B2E3 2226 M8X8.2       EQU    *
B2E3:AD 9C 7F     2227              LDA    TEMP2.L
B2E6:0A           2228              ASL
B2E7:8D 9C 7F     2229              STA    TEMP2.L
B2EA:AD 9B 7F     2230              LDA    TEMP2.H
B2ED:2A           2231              ROL
B2EE:8D 9B 7F     2232              STA    TEMP2.H
B2F1:CA           2233              DEX
B2F2:D0 D7   B2CB 2234              BNE    M8X8.1
B2F4:60           2235              RTS
B2F5:             2236 ;
B2F5:             2237 ;
B2F5:             2238 ;
B2F5:             2239 ; XMIT is the routine called to repeat an I.R.
B2F5:             2240 ;
B2F5:             2241 ;
B2F5:        B2F5 2242 XMIT         EQU    *
B2F5:3C 01 95     2243              LDM    #1,TIME.OUT
B2F8:             2244 ;
B2F8:             2245 ;
B2F8:             2246 ;
B2F8:             2247 ;DS $9F00-*,$FF
B2F8:             2248 ;
B2F8:             2249 ; ORG $9F00
B2F8:             2250 ;
B2F8:             2251 ;
B2F8:             2252 ;
B2F8:             2253 ;
B2F8:             2254 ; OUTPUT transmits the message formatted by EXPAND
B2F8:             2255 ;
B2F8:             2256 ;
B2F8:        B2F8 2257 OUT.PUT      EQU    *
B2F8:             2258 ;
B2F8:AD 83 7F     2259              LDA    CF
B2FB:D0 03   B300 2260              BNE    OUT.PUT.1
B2FD:4C AB B1     2261              JMP    PO.4
B300:             2262 ;
B300:        B300 2263 OUT.PUT.1    EQU    *
B300:AE B0 7F     2264              LDX    CYCLE.TIM.L      ; set the carrier frequency
B303:A0 00        2265              LDY    #0               ; initialize the loop counter
B305:AD AE 7F     2266              LDA    BURST.PULSES
B308:8D AD 7F     2267              STA    IR.OUT.CNT       ; set the pulse length
B30B:             2268 ;
B30B:A9 04        2269              LDA    #4
B30D:2D A4 7F     2270              AND    FORMAT
B310:D0 05   B317 2271              BNE    OUT.PUT.1A
B312:20 72 AF     2272              JSR    KHZ.50.31        ; send the start pulse
B315:80 03   B31A 2273              BRA    OUT.PUT.1B
B317:        B317 2274 OUT.PUT.1A   EQU    *
B317:20 B7 AF     2275              JSR    KHZ.45.28
B31A:        B31A 2276 OUT.PUT.1B   EQU    *
B31A:             2277 ;
B31A:        B31A 2278 DATA.LOOP    EQU    *
B31A:CC AF 7E     2279              CPY    LOOP.CTR ; if ( last byte
B31D:             2280 ; BNE DL1A ; and
B31D:             2281 ; TST ODD.BIT ; odd bit count)
B31D:             2282 ; BNE DL4 ; then EXIT
B31D:        B31D 2283 DL1A         EQU    *
B31D:B9 00 7B     2284              LDA    CBUFF.H,Y        ;
B320:F0 03   B325 2285              BEQ    DL1              ;
B322:             2286 ;
B322:20 68 B3     2287              JSR    MILLI.WAIT       ; wait the specified period
B325:        B325 2288 DL1          EQU    *
B325:18           2289              CLC                     ;
B326:B9 6E 7C     2290              LDA    CBUFF.L,Y        ;
B329:E9 00        2291              SBC    #0               ;
B32B:F0 03   B330 2292              BEQ    DL2              ;
B32D:20 60 B3     2293              JSR    MICRO.WAIT       ;
B330:        B330 2294 DL2          EQU    *
```

```
B330:C8            2295            INY          ;
B331:B9 6E 7C      2296            LDA    CBUFF.L,Y    ; send the next carrier pul
se
B334:8D AD 7F      2297            STA    IR.OUT.CNT    ;
B337:A9 04         2298            LDA    #4
B339:2D A4 7F      2299            AND    FORMAT
B33C:D0 05  B343   2300            BNE    DL2A
B33E:20 72 AF      2301            JSR    KHZ.50.31     ;
B341:80 03  B346   2302            BRA    DL2B
B343:       B343   2303 DL2A       EQU    *
B343:20 B7 AF      2304            JSR    KHZ.45.28
                                DL2B
B346:       B346   2305 DL2B       EQU    *
B346:              2306      ;
B346:C8            2307            INY
B347:CC AF 7E      2308            CPY    LOOP.CTR
B34A:30 CE  B31A   2309            BMI    DATA.LOOP
B34C:              2310 ;
B34C:       B34C   2311 DL4        EQU    *
B34C:              2312 ;
B34C:AD 9E 7F      2313            LDA    IPGH
B34F:F0 03  B354   2314            BEQ    DL3
B351:20 68 B3      2315            JSR    MILLI.WAIT
B354:       B354   2316 DL3        EQU    *
B354:18            2317            CLC
B355:AD 9F 7F      2318            LDA    IPGL
B358:E9 00         2319            SBC    #0            ;
B35A:20 60 B3      2320            JSR    MICRO.WAIT
B35D:              2321 ;
B35D:C6 95         2322            DEC    TIME.OUT
B35F:              2323 ; BEQ DL5
B35F:              2324 ; BPL OUT.PUT
B35F:       B35F   2325 DL5        EQU    *
B35F:60            2326            RTS
B360:              2327 ;
B360:              2328 ;
B360:              2329 ;
B360:              2330 ;
B360:              2331 ;DS $9F80-*,$FF
B360:              2332 ;
B360:              2333 ;
B360:              2334 ; ORG $9F80
B360:              2335 ;
B360:              2336 ;
B360:              2337 ;
B360:              2338 ;    MICRO_WAIT is a delay loop that will generate wait
B360:              2339 ; times up to one millisecond in length with a four
B360:              2340 ; microsecond resolution. The routine takes jump and
B360:              2341 ; return times into consideration. Pass wait time
B360:              2342 ; in the accumulator.
B360:              2343 ;
B360:       B360   2344 MICRO.WAIT EQU *
B360:38            2345            SEC
B361:E9 02         2346            SBC    #2
B363:       B363   2347 MICRO.WAIT.1 EQU *
B363:EA            2348            NOP
B364:1A            2349            DEC
B365:D0 FC  B363   2350            BNE    MICRO.WAIT.1
B367:              2351 ;
B367:60            2352            RTS
B368:              2353 ;
B368:              2354 ;
B368:              2355 ;
B368:              2356 ;    MILLI_WAIT is a delay loop that will generate wait
B368:              2357 ; times up to 256 milliseconds in length with a one
B368:              2358 ; millisecond resolution. The routine takes jump and
```

```
B368:              2359 ; return times into consideration  Pass wait time in
B368:              2360 ; accumulator (0 = 256).
B368:              2361 ;
B368:         B368 2362 MILLI.WAIT    EQU  *
B368:1A            2363               DEC
B369:         B369 2364 MILLI.WAIT.1  EQU  *
B369:F0 0E   B379 2365               BEQ  MILLI.WAIT.2
B36B:48           2366               PHA
B36C:09 FF        2367               ORA  #$FF
B36E:EA           2368               NOP
B36F:EA           2369               NOP
B370:A9 FA        2370               LDA  #250
B372:20 60 B3     2371               JSR  MICRO.WAIT
B375:68           2372               PLA
B376:1A           2373               DEC
B377:80 F0   B369 2374               BRA  MILLI.WAIT.1
B379:         B379 2375 MILLI.WAIT.2  EQU  *
B379:A9 FA        2376               LDA  #250
B37B:20 60 B3     2377               JSR  MICRO.WAIT
B37E:             2378 ;
B37E:EA           2379               NOP
B37F:EA           2380               NOP
B380:EA           2381               NOP
B381:             2382 ;
B381:60           2383               RTS
B382:             2384 ;
B382:             2385 ;
B382:             2386 ;
B382:             2387 ;
B382:             2388 ;
B382:             2389 ;
B382:             2390 ;
B382:             2391 ;
B382:00           2392 CF.BASE       DB   0
B383:10           2393               DB   16
B384:14           2394               DB   20
B385:18           2395               DB   24
B386:1A           2396               DB   26
B387:1C           2397               DB   28
B388:20           2398               DB   32
B389:24           2399               DB   36
B38A:28           2400               DB   40
B38B:             2401 ;
B38B:             2402 ;
B38B:             2403 ;
B38B:             2404 ;
B38B:             2405 ;
```

| | | | |
|---|---|---|---|
| 7F89 ARRAY.H | 7F91 ARRAY.L | 7EB1 ARRAY1 | AEB5 BD1 |
| AEBB BD2 | AECB BD3 | AEDC BD3A | AEE7 BD4 |
| AD61 BD5 | AD67 BD6 | AD78 BD7 | AD83 BD8 |
| AD87 BD8A | AD94 BD9 | AAF1 BI.PHASE.A | B1DE BI.PHASE.A.OUT |
| 15 BIN1 | 18 BIN2 | 1B BIN3 | 1E BIN4 |
| 21 BIN5 | 24 BIN6 | 27 BIN7 | AF4F BL.MV.1 |
| AF3B BLOCK.MOVE | AAFB BFA1 | B202 BF0.1 | B1E0 BF0.1A |
| B236 BF0.1B | B209 BF0.2 | B23F BF0.2A | B23A BF0.2C |
| B267 BF0.3 | B269 BF0.3A | B290 BF0.3B | B2A3 BF0.4 |
| AEAD BUILD.DATA | 7FAE BURST.PULSES | A9DB C.E.1 | AA09 C.E.2 |
| AA16 C.E.3 | AA32 C.E.4 | AA34 C.E.5 | AB37 CALC.CF |
| AA46 CAPTURE.BAIL.0 | AB12 CAPTURE | A9D3 CAPTURE.EXIT | 7B00 CBUFF.H |

| | | | |
|---|---|---|---|
| 7C6E CBUFF.L | 24 CBUFF.L.OFFSET | ABF7 CC.EXIT | AB5F CC1 |
| AB6F CC1A | AB77 CC2 | AB9A CC3A | AB6B CC3 |
| AB9E CC4 | ABAD CC4A | ABC0 CC5A | ABE1 CC5 |
| ABC4 CC6 | ABD3 CC6A | ABE6 CC7A | ABD7 CC7 |
| ABF5 CC8A | ABEA CC8 | 7F83 CF | B3B2 CF.BASE |
| AEFB CF.OFFSET | ABEC CL10 | A836 CL1 | A848 CL2 |
| A8AE CL3 | A8C2 CL4A | A8BB CL4 | A8C9 CL5 |
| A8D0 CL6 | A8D7 CL7 | A83E CL8 | A8E5 CL9 |
| AB37 CL1.EXIT | 7FB1 COMP.PASS | AB07 COMP.PULSE.M | AACB COMPRESS1A |
| AAC6 COMPRESS1B | AAC3 COMPRESS1C | AAD7 COMPRESS2A | AA49 COMPRESS |
| AA9E COMPRESS3A | AB1B CFM10 | AB1D CFM11 | AB2A CFM12 |
| AE11 CFM9 | 7FAF CYCLE.TIM.H | 7FB0 CYCLE.TIM.L | B31A DATA.LOOP |
| 01 DELTA.ONE | B325 DL1 | 7B31D DL1A | B343 DL2A |
| B34B DL2B | B330 DL2 | B354 DL3 | 7B34C DL4 |
| 7B35F DL5 | AA9F DC.COMPRESS | 7F84 EDGE.NUM | 7F85 EDGE.NUM.1 |
| 7F86 EDGE.NUM.2 | 11 EPSILON | 7F87 ETH | 7F88 ETL |
| 00 EVENT.CNT | B055 EX0 | B096 EX1 | B06E EX1A |
| B064 EX1B | B076 EX1C | B09E EX2 | B0A6 EX3 |
| B0AE EX4 | B0B6 EX5 | B0BE EX5A | B0C0 EX6 |
| 7B0CB EX7 | 7B0CB EX8 | 7B0CB EX9 | B035 EXP1 |
| B03B EXP2 | 7B031 EXP3 | 7B040 EXP4 | B043 EXP5 |
| 7B054 EXP6 | AFF9 EXPAND | AD99 FIND.KEY | 7FA4 FORMAT |
| 7FAC FOURS.FACTOR | 7FA6 HIGH.TIME | 07 HZ25 | 06 HZ3125 |
| 05 HZ357 | 04 HZ3B5 | 03 HZ416 | 02 HZ50 |
| 01 HZ625 | 96 I | 7F11 I.D.1 | 7EAE IF |
| 7F9E IFGH | 7FB2 IFGH.17 | 7F9F IFGL | EE IR.CONTROL.POR |
| 7C3E5 IR.IN | 7FAD IR.OUT.CNT | EE IR.OUTPUT | 00 IR.SENSE.ON |
| 7FA2 KEY.H.TEMP | 7FA3 KEY.L.TEMP | 77FA0 KEY.NUM | 94 KEY.PTR.H |
| 93 KEY.PTR.L | 77FA1 KEY.TBL.H | 77FA5 KEY.TBL.L | AFC1 KHZ.45.28.1 |
| AFF0 KHZ.45.28.2A | AFD5 KHZ.45.28.2 | AFF8 KHZ.45.28.3 | AFB7 KHZ.45.28 |
| AFAE KHZ.50.31.2A | AF92 KHZ.50.31.2 | AF72 KHZ.50.31 | AF7D KHZ.50.31.1 |
| AFB6 KHZ.50.31.3 | AF62 KHZ.62.5 | 7EAF LOOP.CTR | 7EB0 LOOP.RESET |
| A940 LOOP.START | A948 LS1 | A94A LS1A | A95B LS2 |
| A96B LS3 | A96F LS4 | 00 LSB | A92D M50119.MODE |
| 46 MEM.CTR | B2CB M8X8.1 | B2E3 M8X8.2 | B363 MICRO.WAIT.1 |
| B360 MICRO.WAIT | B369 MILLI.WAIT.1 | B366 MILLI.WAIT | B379 MILLI.WAIT.2 |
| AE54 MITSU | 07 MS.7 | B2C3 MULT.8X8 | 7F9D NUM.TIMES |

| | | | |
|---|---|---|---|
| 97 ODD.BIT | 7FA9 ONES.FACTOR | B317 OUT.PUT.1A | B300 OUT.PUT.1 |
| B31A OUT.PUT.1B | B2FB OUT.PUT | AE79 PLESS1 | AE6D PLESS |
| 7FA7 PLS.CNT | 7B0C PLS.POS.MOD | 7BBE PLS.TIM.H | 7BFE PLS.TIM.L |
| 7F81 PLS.WID.H | 7F82 PLS.WID.L | A8F1 PM1 | 78 PM2.CTR |
| A8F6 PM2 | A90B PM3 | A91B PM4 | B155 PO.1 |
| B12C PO.1A | B18D PO.2A | B192 PO.2B | B15C PO.2 |
| B1A9 PO.2C | 7B1AB PO.3 | B1AB PO.4 | B1AD PO.5 |
| B1B1 PO.6 | B1BE PO.7 | B1C9 PO.8 | B1D7 PO.9 |
| E5 PORT3 | ? EE PORT6 | B2A6 PPM.MULT | B0CE PPM1 |
| B0DA PPM2 | B0E1 PPM3 | B109 PPM4 | B127 PPM5 |
| A8EF PULSE.MODE | B12A PULSE.OUT | A995 S2604.MODE | A99A SZM1 |
| A99D SZM2 | A9B0 SZM3 | A9B4 SZM4 | AF SAF.CTR |
| A9C4 SAF1C9.MODE | AE93 SBS | AAD8 SINGLE.PULSE | ADE0 SK1 |
| ADC3 SK1A | E1 SL490.CTR | A93B SL490.MODE | AAE2 SF1 |
| AD5E SQUEEZE | AC9A STORE.KEY | FA T1 | F9 T1.PRESCALE |
| AE2E TC1 | FF TCR | 90 TEMF.H | 91 TEMF.L |
| 7F99 TEMP1.H | TEMP1.L | 7F9E TEMP2.H | 7F9C TEMP2.L |
| 92 TEMF | 7FA8 THREES.FACTOR | 7AE0E TIME.CODE | AC06 TIME.LOOP |
| 95 TIME.OUT | AD03 TL10 | AC0D TL1 | AD2A TL11A |
| AD06 TL11 | AD32 TL11B | AD35 TL12 | AC20 TL1A |
| AC34 TL2 | AC51 TL2A | AC65 TL3 | AC93 TL4B |
| AC89 TL4 | AC9D TL4A | ACA4 TL5 | ACB7 TL6 |
| ACBE TL6A | ACC3 TL6B | ACC5 TL7 | ACC8 TL8 |
| ACF1 TL9 | 7FAA TWOS.FACTOR | ? FD TX | FC TX.PRESCALE |
| 7B2F5 XMIT | 7FA6 ZEROS.FACTOR | | |

```
** SUCCESSFUL ASSEMBLY := NO ERRORS
** ASSEMBLER CREATED ON 23-OCT-85 16:20
** TOTAL LINES ASSEMBLED  2405
** FREE SPACE PAGE COUNT  77
```

```
SOURCE   FILE #01 =>ASM
 INCLUDE FILE #02 =>EQUATES
 INCLUDE FILE #03 =>RONVARS
 INCLUDE FILE #04 =>MAIN
 INCLUDE FILE #05 =>TIME
 INCLUDE FILE #06 =>DISPLAY
 INCLUDE FILE #07 =>EXECUTE
 INCLUDE FILE #08 =>SUBS
 INCLUDE FILE #09 =>FFPAGE
 INCLUDE FILE #10 =>RAM.SWITCHES
 INCLUDE FILE #11 =>RAMCODE
```

APPENDIX B
© 1987 CL9, Inc.

```
INCLUDE FILE #12 =>IRCODE
INCLUDE FILE #13 =>KEYBOARD
INCLUDE FILE #14 =>DEFS
INCLUDE FILE #15 =>EDIT
INCLUDE FILE #16 =>ALARM
INCLUDE FILE #17 =>NEWCODE
INCLUDE FILE #18 =>NOCOPY
INCLUDE FILE #19 =>WAITKEY
INCLUDE FILE #20 =>OUTMEM
INCLUDE FILE #21 =>NEWEXEC
INCLUDE FILE #22 =>NEWKEY
INCLUDE FILE #23 =>NEWEDIT
INCLUDE FILE #24 =>ROMNEW
INCLUDE FILE #25 =>MITS
```

```
0000:                    1 *
0000:                    2 * ASM
0000:                    3 *
0000:                    4 * ROM routines:
0000:                    5           INCLUDE EQUATES
0000:                    2 * EQUATES
0000:                    3 ******************************
0000:       F000         4 download  equ  $f000         processor rom start
0000:       FE00         5 ser19200  equ  $fe00         page for serial I/O code
0000:       FE00         6 out19200  equ  $fe00
0000:                    7 ;in19200  equ  $fe92 serial in routine
0000:       FF00         8 jsrpage   equ  $ff00         special subr page
0000:       FFF4         9 ints      equ  $fff4         processor int ptrs
0000:                   10 ******************************
0000:       CODE        11 code      equ  $c0de
0000:       8000        12 confirm1  equ  $8000         Signature byte locations
0000:       8001        13 confirm2  equ  $8001
0000:       8002        14 codentry  equ  $8002         RAM entry if "CO DE" signature
0000:       A800        15 CAPTURE   EQU  $A800
0000:       A803        16 COMPRESS  EQU  $A803
0000:       A806        17 EXPAND    EQU  $A806
0000:       A809        18 OUTPUT    EQU  $A809
0000:       A80F        19 MILLIWAIT EQU  $A80F         from erling
0000:                   20 ******************************
0000:       7F00        21 buf       equ  $7f00         download buffer (1 page)
0000:                   22 ******************************
0000:       0000        23 irisvars  equ  $00           single chip vars for shell
0000:       0010        24 RONVARS   EQU  $10           (-4F; RON+KBD)
0000:       003D        25 KBDVARS   EQU  $3D
0000:                   26 * ($50-7F: STACK)
0000:                   27 ******************************
0000:                   28 * MEMXPND ONLY ZERO-PAGE
0000:       0090        29 ERLINGVARS EQU $90           (-$97) moved because mon input buffer at $80
0000:       0093        30 KEY.PTR.L EQU  $93
0000:       0094        31 KEY.PTR.H EQU  $94
0000:       0095        32 TIMEOUT   EQU  $95           zp now!!
0000:       0088        33 MORERON   EQU  $88           (-$AF) MORE FOR RON
0000:                   34 * MORE MONITOR VARS $B0-CF
0000:       00D0        35 intvects  equ  $d0           interrupt vectors
0000:                   36 ******************************
0000:       7D00        37 RAMVARS   EQU  $7D00
0000:                   38 ******************************
0000:       0000        39 bit0      equ  0
0000:       0001        40 bit1      equ  1
0000:       0002        41 bit2      equ  2
0000:       0003        42 bit3      equ  3
0000:       0004        43 bit4      equ  4              bit position symbols
0000:       0005        44 bit5      equ  5
0000:       0006        45 bit6      equ  6
0000:       0007        46 bit7      equ  7
```

```
0000:      0000   47 lsb       equ    bit0
0000:      0007   48 msb       equ    bit7
0000:      0004   49 brkbit    equ    bit4
0000:             50 ****************************
0000:      00E0   51 port0     equ    $e0
0000:      00E1   52 ddrp0     equ    $e1
0000:      00E2   53 port1     equ    $e2
0000:      00E3   54 ddrp1     equ    $e3
0000:      00E4   55 port2     equ    $e4
0000:      00E5   56 ddrp2     equ    $e5
0000:      00E8   57 port3     equ    $e8           5074x port symbols
0000:      00E9   58 ddrp3     equ    $e9
0000:      00EA   59 port4     equ    $ea
0000:      00EB   60 ddrp4     equ    $eb
0000:      00EC   61 port5     equ    $ec
0000:      00EE   62 port6     equ    $ee
0000:             63 ****************************
0000:      00F6   64 sermode   equ    $f6           5074x serial mode register
0000:      00F7   65 serio     equ    $f7           5074x serial I/O register
0000:      00F9   66 t12pre    equ    $f9           5074x Timer 1,2 prescaler r
eg
0000:      00FA   67 t1        equ    $fa           5074x Timer 1 register
0000:      00FB   68 t2        equ    $fb           5074x Timer 2 register
0000:      00FC   69 txpre     equ    $fc           5074x Timer X prescaler reg
0000:      00FD   70 tx        equ    $fd           5074x Timer X
0000:      00FE   71 icr       equ    $fe           5074x Interrupt Control Reg
0000:      00FF   72 tcr       equ    $ff           5074x Timer Control Reg
0000:             73 ****************************
0000:      00E8   74 serport   equ    port3         async serial port
0000:      00E9   75 serdir    equ    ddrp3         serial port direction reg
0000:      00EA   76 to4       equ    port4         data to u4
0000:      00EB   77 ddto4     equ    ddrp4         data direction to u4
0000:      00EC   78 from4     equ    port5         data from u4
0000:      00E8   79 serin     zqub   bit2,serport  async serial input bit
0000:      00E8   80 serout    zqub   msb,serport   async serial output bit
0000:      00E9   81 seroutdd  zqub   msb,serdir    serout direction bit
0000:             82 ****************************
0000:      00E8   83 spkr      zqub   bit4,port3    spkr output bit
0000:      00E8   84 batt      zqub   bit6,port3    batt-in sense
0000:             85 ****************************
0000:      00FE   86 int2enbl  zqub   bit0,icr      int 2 enable
0000:      00FE   87 int2req   zqub   bit1,icr      int 2 request
0000:      00FE   88 t2enbl    zqub   bit2,icr      timer 2 enable
0000:      00FE   89 t2req     zqub   bit3,icr      timer 2 request
0000:      00FE   90 t1enbl    zqub   bit4,icr      timer 1 enable
0000:      00FE   91 t1req     zqub   bit5,icr      timer 1 request
0000:      00FE   92 int1enbl  zqub   bit6,icr      int 1 enable
0000:      00FE   93 int1req   zqub   bit7,icr      int 1 request
0000:      00FF   94 txenbl    zqub   bit6,tcr      tx enable
0000:             95 ;memxpnd  zqub   bit0,tcr extrn mem mode bit
0000:             96 ****************************
0000:      00EE   97 f0        zqub   bit4,port6
0000:      00EE   98 f1        zqub   bit5,port6    u4 comm lines
0000:      00EE   99 req4      zqub   bit6,port6
0000:      00EC  100 ack4      zqub   bit4,port5
0000:            101 ****************************
0000:      0090  102 bcc       equ    $90           bcc op code for dummy skip
0000:            103 ****************************
0000:            104           dsect
0000:      0000  105           org    irisvars
0000:      0001  106 indata    ds     1             char buffer after serial in
```

```
0001:       0001    107 intemp     ds      1           temp char-in during out1920
 0
0002:       0001    108 indata7    ds      1           in19200 status byte
0003:       0002    109 inflag     zqub    msb,indata7 set after char recieved
0003:       0001    110 const15    ds      1           const for in19200 timed cod
e
0004:       0001    111 bitctr     ds      1           out19200 bit counter
0005:       0001    112 const5     ds      1           const for out19200 timed co
de
0006:       0005    113 dummybit   zqub    msb,const5  used for out19200 timed cod
e
0006:       0002    114 ptr        ds      2           temp for download
0008:               115 ******************************
00D0:       00D0    116            org     intvects
00D0:       0002    117 int2vect   ds      2
00D2:       0002    118 t2vect     ds      2
00D4:       0002    119 t1vect     ds      2           u8 interrupt vectors
00D6:       0002    120 txvect     ds      2               (2 bytes each)
00D8:       0002    121 int1vect   ds      2
00DA:       0002    122 brkvect    ds      2
0000:               123            dend
0000:               124 ******************************
0000:               125 ******************************
0000:       00D0    126 dbitfile.4 equ     $d0         u4 data bit file
0000:       00E0    127 regfile.4  equ     $e0         u4 I/O reg file
0000:               128 ******************************
0000:       00D3    129 dlcd.4     equ     dbitfile.4+3  u4 D.LCD
0000:       00E3    130 rto8.4     equ     regfile.4+3   u4 R.to.8
0000:       0001    131 rbatt.4    equ     1           u4 R.batt
0000:       000D    132 u8off.4    equ     $d          R.batt code for u8 off
0000:               133 ******************************
0000:       001C    134 spare.segs.4 equ   $1c         spare segs nibl to clr on r
eset
0000:               135 ******************************
0000:       0041    136 allhigh.4  equ     $41         dummy u4 ram loc must be $x
1
0000:               137 ******************************
0000:       00F7    138 kbuf4      equ     $f7         u4 key buffer pointer
0000:       0006    139 col.file.4 equ     6           u4 kbd col data file
0000:       0007    140 rownum.file.4 equ  7           u4 kbd row num file
0000:       000E    141 reg.file.4 equ     $E          u4 Reg file
0000:               142 ******************************

0000:               6               1st     on
0000:               7               INCLUDE RONVARS
0000:               2 * RONVARS
0000:               3 *
0000:               4 *
0000:               5           DSECT
0000:               6 *
0000:               7 ***** ZERO-PAGE VARIABLES ****
0010:       0010    8           ORG     RONVARS     ($10)
0010:               9 *
0010:       0010    10 ZPSTART  EQU     *
0010:               11 *
0010:               12 * THESE 3 MUST BE IN ORDER:
0010:       0001    13 CURRMODE  DS      1           current mode
0011:       0001    14 CURRKEY   DS      1           current key
0012:       0001    15 PROGINDEX DS      1           index to current program
0013:               16 *
0013:       0001    17 NEST      DS      1           levels of learning
0014:       0001    18 CURRPOS   DS      1           position in edit line (0-7)

0015:       0001    19 SCRNPOS   DS      1           temp value of above ******
```

```
0016:    0001    20 HRH      DS   1           hr tens digit
0017:    0001    21 HRL      DS   1           hr ones digit
0018:            22 *
0018:            23 * THESE SHOULD BE IN SAME ORDER AS 4-BITTER
0018:            24 *
0018:    0001    25 SECL     DS   1
0019:    0001    26 SECH     DS   1
001A:    0001    27 MINL     DS   1
001B:    0001    28 MINH     DS   1
001C:    0001    29 HR       DS   1
001D:    0001    30 DAY      DS   1
001E:            31 *
001E:    0001    32 TIMEDIG  DS   1           order of direct entry (0-3)
001F:    0001    33 FLASHTIME DS  1           USED IN TX INTERRUPT
0020:    0001    34 SECTIME  DS   1           = seconds remaining before
interval/alarm
0021:    0001    35 EIGHTHS  DS   1           1/8 of second countdown va
lue
0022:    0001    36 KEYNUM   DS   1           INDEX OF KEY (0-31)
0023:    0001    37 INDEX    DS   1           used in EXEC & to check for
keypress
0024:    0024    38 MAXDEF   EQU  *           used in newdefs (share spac
e w "digit")
0024:    0001    39 DIGIT    DS   1           value of time input (0-9)
0025:    0025    40 DIFF     EQU  *           used in ircode (share space
w "from")
0025:    0001    41 FROM     DS   1
0026:    0001    42 TO       DS   1
0027:    0002    43 DISPVAL  DS   2           value under cursor
0029:            44 *
0029:            45 *************************
0029:            46 *
0029:            47 * POINTERS
0029:            48 *
0029:    0002    49 DEFPTR   DS   2           ptr for defs, alarms
002B:    0002    50 ZP1      DS   2
002D:    0002    51 STAKPTR  DS   2           for execution stack
002F:    002F    52 irptr    equ  *           use for compress
002F:    0002    53 ZPJSR    DS   2           for indirect JSRs
0031:            54 ***************
0031:            55 *
0031:    0001    56 TIMEFLAG DS   1           used to distinguish various
cases in
0032:            57 * timeinput & program input:
0032:            58 *           00= time setting (default)
0032:            59 *           01= alarm setting
0032:            60 *          $80= time setting within a program
0032:            61 *          $81= alarm setting within a program
0032:            62 *
0032:            63 * bunches of bits:
0032:    0001    64 FLAGS1   DS   1           initialized to $07
0033:    0001    65 FLAGS2   DS   1              "         $10
0034:    0001    66 FLAGS3   DS   1              "         $00
0035:            67 *
0035:            68 *
0035:    0032    69 MainFlag  ZQUB 0,FLAGS1   =1 IF Main loop.
0035:    0032    70 KEYINPUT  ZQUB 1,FLAGS1   =0 IF PROGRAM MODE
0035:    0032    71 ONTOG     ZQUB 2,FLAGS1   USED IN SET2ND,SETRPT
0035:    0032    72 ANYDIRECT ZQUB 3,FLAGS1   =1 IF DIRECT TIME KEYS PRE
SSED
0035:    0032    73 GOTMODE   ZQUB 4,FLAGS1   =1 IF ???
0035:    0032    74 ALARMMODE ZQUB 5,FLAGS1   = 1 IF MODE SET IN ALARM
0035:    0032    75 STEPFLAG  ZQUB 6,FLAGS1   =1 if single step on
0035:    0032    76 DONEALARM ZQUB 7,FLAGS1   = 1 IF WHOLE ALARM ENTERED
0035:            77 *
0035:    0033    78 PMFLAG    ZQUB 0,FLAGS2   = 1 IF PM
0035:    0033    79 EXECFL    ZQUB 1,FLAGS2   USED IN ALARM ROUTINE:
0035:            80 *                         =1 IF TO BE EXECUTED
```

```
0035:      0033    81 RPTFLAG    ZQUB  2,FLAGS2    = 1 IF "RPT" ON
0035:      0033    82 XTFLAG     ZQUB  3,FLAGS2    = 1 IF >=1 AT'S IN AN EXECU
TING PROG
0035:      0033    83 ACTTIME    ZQUB  4,FLAGS2    = 1 IF TIME TO BE DISPLAYED

0035:      0033    84 DASHFLAG   ZQUB  5,FLAGS2    = 1 IF DASH TO BE ADDED TO
CHAR
0035:      0033    85 FLASHMODE  ZQUB  6,FLAGS2    =1 IF MODE FLASHED IN EDITI
NG
0035:      0033    86 FLASHKEY   ZQUB  7,FLAGS2    = 1 IF KEY FLASHED IN EDITI
NG
0035:              87 *
0035:      0034    88 DISPOFF    ZQUB  0,FLAGS3    =1 if display off when alar
m happened
0035:      0034    89 ALARM.ENABLE ZQUB 1,FLAGS3   =1 IF ALARM ALLOWED TO HAPP
EN
0035:      0034    90 ALARM.WAITING ZQUB 2,FLAGS3  =1 IF ALARM WENT OFF WHIL
E DISABLED
0035:      0034    91 EKBIT      ZQUB  3,FLAGS3    =1 if target key flashing
0035:      0034    92 COUNTDOWN  ZQUB  4,FLAGS3    =1 if counting down sectime
 for intervals
0035:      0034    93 DELETEFLAG ZQUB  5,FLAGS3    =1 if deleting char from pr
ogram
0035:      0034    94 ALARMFLAG  ZQUB  6,FLAGS3    =1 if executing alarm, not
program
0035:      0034    95 CAPTUREFLAG ZQUB 7,flags3    =1 when capture routine cal
led
0035:              96 *
0035:      0001    97 QFLAGS     DS    1           USED FOR FLAGS BYTE OF ALAR
M ID
0036:      0035    98 Q2ND       ZQUB  0,QFLAGS
0036:      0035    99 Q2R        ZQUB  1,QFLAGS
0036:      0035   100 RPTQ       ZQUB  2,QFLAGS
0036:      0035   101 MFQ        ZQUB  3,QFLAGS
0036:      0001   102 VAR1       DS    1           *******
0037:      0002   103 INCR       DS    2           intervals; MOVEMENT
0039:             104 * [need to save in RAM for block movements]
0039:      0001   105 EDCODE     DS    1           for displays; also in chkey 003A:             106 *
003A:             107 * used for flashing routines:
003A:             108 *
003A:      0001   109 FLASHACT   DS    1           BIT ON: FLASH ACTIVATED
003B:      0001   110 FLASHON    DS    1           used for cursor,TIME
003C:             111 *
003C:      003C   112 FLASHBYTE  EQU   *           just for dangling reference
s
003C:      0001   113 BYTEID     DS    1           used to be flashbyte
003D:             114 * THE BITS OF THE ABOVE REGISTERS ARE AS FOLLOWS
003D:      0000   115 BELLBIT    EQU   0
003D:      0001   116 TARGBIT    EQU   1           mode/key in edit
003D:      0002   117 ATBIT      EQU   2
003D:      0003   118 EDITBIT    EQU   3
003D:      0004   119 BIT2ND     EQU   4
003D:      0005   120 STEPBIT    EQU   5
003D:      0006   121 CURSORBIT  EQU   6
003D:      0003   122 LABIT      EQU   3           IN $1C
003D:      0001   123 RABIT      EQU   1           IN $1D
003D:             124 *
003D:      003B   125 FLAG2ND    ZQUB  BIT2ND,FLASHON
003D:             126 *
003D:             127 * KEYBOARD DATA STRUCTURES:
003D:             128 *
003D:      0010   129 KB         DS    16          circular keycode queue: hib
it set if up
004D:      0001   130 KB.BEG     DS    1           ptr to beginning of active
keycodes in KB
004E:      0001   131 KB.END     DS    1           ptr to end of active keycod
es in KB
004F:      0001   132 KB.PTR     DS    1           ptr to curr key being looke
d at by GETKEY
```

```
0050:                   133 *
0050:         0001      134 MITSKEY    DS      1               current mits char
0051:                   135 *
0051:         0051      136 ZPEND      EQU     *               end of zero page
0051:         0041      137 ZPLEN      EQU     ZPEND-ZPSTART
0000:                   138            DEND
0000:                   139 *
0000:                   140 * more keyboard vars, in main ram below stack
0000:         7A20      141 ROW.NUM    EQU     $7A20           temp for row #s from $71-7f
0000:         7A30      142 ROW.DATA   EQU     $7A30           temp for row data from $61-6f
0000:         7A40      143 ROW.PTR    EQU     $7A40           index to # of keys to read (1-f)
0000:         7A41      144 KBD.CURR   EQU     $7A41           current value for rows 4-b (values = 0-f)
0000:         7A49      145 CAPTURESTACK EQU $7A49
0000:                   146 *
0000:         7A4B      147 MOREPTR    EQU     $7A4B           2 bytes: stores next alarm ptr during alarm exec
0000:                   148            dsect
0089:         0089      149            org     $89
0089:                   150 * more zero page
0089:                   151 *
0089:         0001      152 BYTE1C     ds      1
008A:         0001      153 REPEATBITS DS      1               some bits to determine repeater status
008B:         008A      154 REPEATER   ZQUB    0,REPEATBITS    =1 if keydef is repeater
008B:         008A      155 REPEATER1  ZQUB    1,REPEATBITS    =1 if >=1 repeater IR encountered
008B:         008A      156 STEPSTORE  ZQUB    6,REPEATBITS    saves value of stepflag during loops
008B:         008A      157 ENABLEFLAG ZQUB    7,REPEATBITS    =1 if learning enabled
008B:         0001      158 MITSFLAG   ds      1               mitsubishi stuff
008C:         008B      159 mitsmode   zqub    0,mitsflag
008C:         0001      160 newval     ds      1               used in kb interrupt
008D:         0001      161 keyup      ds      1               = $80 if keyup, 0 otherwise
008E:         0001      162 morebits   ds      1
008F:         008E      163 samekey    zqub    0,morebits      =1 if stilldown key same as keynum
008F:         008E      164 ADDFLAG    ZQUB    1,MOREBITS      used in defs128
008F:         008E      165 OUTMEMFLAG ZQUB    2,MOREBITS      =1 if too many in Progbuf
008F:         008E      166 LOOPREPEAT ZQUB    3,MOREBITS      =1 if repeater in repeat loop
008F:         008E      167 LOOPFLAG   ZQUB    4,MOREBITS      =1 if in repeatloop
008F:         008E      168 LOOP2ND    ZQUB    5,MOREBITS      =1 if 2nd+ thru loop
008F:         008E      169 PAGEFLAG   ZQUB    6,MOREBITS      =1 if page change last thing in program
008F:         008E      170 STOPFLAG   ZQUB    7,MOREBITS      =1 if ready to STP
008F:                   171 *
0000:                   172            dend
0000:                   173 *
0000:                   174 ******************************
0000:                   175 *
0000:                   177 *
0000:                   178 * RON'S RAM VARIABLES
0000:                   179 *
0000:                   180 * MOST PERMANENT:
0000:                   181 *
0000:                   182            DSECT
7D00:         7D00      183            ORG     RAMVARS
7D00:                   184 ******************************
7D00:                   185 * these should NEVER EVER be trashed
7D00:                   186 *
7D00:         0002      187 ALARMQ     DS      2               virtually permanent
7D02:         0002      188 QPTR       DS      2               varies w alarms
7D04:         0002      189 ENDQ       DS      2                       "
7D06:         0002      190 KEYDEFS    DS      2               changes if alarmq gets too big
```

```
7D08:       0002  191 ENDDEFS   DS   2              varies w programs
7D0A:       0002  192 ENDSTACK  DS   2              virtually permanent
7D0C:             193 *
7D0C:             194 ******************************
7D0C:       0001  195 LASTKEY   DS   1              value of last key that went
 into queue
7D0D:       0001  196 NUMIRS    DS   1              used to change repeat value 7D0E:       0001  197 ALARMSTACK DS  1              stack value to return to mo
realarms
7D0F:       000A  198 NEXTALARM DS   10             for next alarm in Morealarm
s
7D19:       0001  199 DAYSAVE   DS   1              to check for rpt alarms
7D1A:       0001  200 PAGEPAGE  DS   1              saved value from page chang
e
7D1B:       0001  201 FIRSTFLAG DS   1              =AB if 1st time thru
7D1C:       0001  202 PNEST     DS   1              page nesting in execution
7D1D:       0001  203           DS   1              available
7D1E:       0002  204 qptrsave  ds   2              saves current alarm during
capture
7D20:             205 *
7D20:       000A  206 TARGMODE  DS   10             MODE FOR CURRENT NEST LEVEL 7D2A:       7D28  207 checksum  equ  targmode+8     temp 2 bytes for checksum
7D2A:       000A  208 TARGKEY   DS   10             KEY FOR CURRENT NEST LEVEL
7D34:       0001  209 AQKEY     DS   1              *
7D35:       000A  210 TEMPALARM DS   10             temp loc for lastalarm
7D3F:       0001  211 MINDAY    DS   1              INCDAY,DECDAY
7D40:             212 *
7D40:             213 *
7D40:       0008  214 ALARMBUF  DS   8              1ST 8 ALARM ID
7D48:       0001  215 NEWDEF    DS   1              CURRMODE/ALARM+8
7D49:       0001  216           DS   1              CURRKEY/ ALARM+9
7D4A:             217 * LENGTH WILL GO HERE IN ENDDO
7D4A:       0001  218 PROGBUF   DS   1              "DO" SYMBOL/LENGTH
7D4B:       0040  219           DS   64             rest of program: combined w
ith irdata area at end of learning
7D8B:       00FF  220 IRLEN     EQU  255            allow for 7 irs (32*7=240)
7D8B:       0020  221 IRSIZE    EQU  32             MAX LENGTH OF IR??
7D8B:       00FF  222 IRDATA    DS   255            for storage of irs
7E8A:             223 *
7E8A:       7E76  224 PCURR     EQU  IRDATA+235     allow 20 bytes for current
page/execution
7E8A:             225 *
7E8A:             226 *
7E8A:       7E8A  227 IDBYTES   EQU  *              ID FOR KEYDEFS & ALARMQ
7E8A:       0001  228 IDMODE    DS   1
7E8B:       0001  229 IDKEY     DS   1
7E8C:       0006  230           DS   6              REMAINDER OF ALARM ID
7E92:             231 *
7E92:             232 *
7E92:       0001  233 TEMPACT   DS   1              HOLDS CURRENT VALUE OF FLAS
HACT
7E93:       0002  234 MOVEBYTES DS   2              for length of block moves
7E95:             235 *
7E95:       0001  236 FLASHIND  DS   1              INDEX TO WHICH ITEM WE'RE W
ORKING ON
7E96:             237 *
7E96:             238 ******************************
7E96:             239 *
7E96:             240 * these should not be trashed by Erling, but
7E96:             241 * if they are it won't prevent operation
7E96:             242 *
7E96:       0001  243 MODESAVE  DS   1
7E97:       0001  244 KEYSAVE   DS   1
7E98:       0001  245 MAINSTAK  DS   1              HOLDS STACK PTR
7E99:       000A  246 LASTALARM DS   10             id of last alarm executed
7EA3:       0001  247 KEYTEMP   DS   1
7EA4:       0002  248 CURSORADDR DS  2              WHERE CURSOR IS FLASHING
7EA6:       0001  249 IRCOUNT   DS   1              # of irs in program
```

```
7EA7:     0006  250 EXECTIME  DS    6           for keeping track of cumula
tive alarms
7EAD:           251 * secl,sech,minl,minh,hr,day
7EAD:           252 *
7EAD:     0001  253 PROGLEN   DS    1
7EAE:           254 *************************
7EAE:           255 *
0000:           256           DEND
0000:           257 *
0000:           259 *
0000:           260 * KEY CONSTANTS
0000:           261 *
0000:     0000  262 ADASH     EQU   $00
0000:     0001  263 BDASH     EQU   $01
0000:     0002  264 CDASH     EQU   $02
0000:           265 *
0000:     0003  266 PAGEKEY   EQU   $03         formerly ddash
0000:           267 *
0000:     0004  268 KEYA      EQU   $04
0000:     0005  269 KEYB      EQU   $05
0000:     0006  270 KEYC      EQU   $06
0000:     0007  271 KEYD      EQU   $07
0000:           272 *
0000:     0008  273 KEY1      EQU   $08
0000:     0009  274 KEY2      EQU   $09
0000:     000A  275 KEY3      EQU   $0A
0000:     000B  276 KEY4      EQU   $0B
0000:     000C  277 KEY5      EQU   $0C
0000:     000D  278 KEY6      EQU   $0D
0000:     000E  279 KEY7      EQU   $0E
0000:     000F  280 KEY8      EQU   $0F
0000:     0010  281 KEY9      EQU   $10
0000:     0011  282 KEY0      EQU   $11
0000:           283 *
0000:     0012  284 KEYE      EQU   $12
0000:     0013  285 KEYF      EQU   $13
0000:           286 *
0000:     0014  287 SETKEY    EQU   $14
0000:     0015  288 ATKEY     EQU   $15
0000:     0016  289 EDITKEY   EQU   $16
0000:     0017  290 CANCEL    EQU   $17
0000:           291 *
0000:     0018  292 SCRLEFT   EQU   $18
0000:     0018  293 ENDLOOP   EQU   SCRLEFT
0000:     0019  294 WAITKEY   EQU   $19         replaces Capture
0000:           295 *
0000:     001A  296 DELETE    EQU   $1A
0000:           297 *
0000:     001B  298 SCRRIGHT  EQU   $1B
0000:     001B  299 BEGINLOOP EQU   SCRRIGHT
0000:     001C  300 ENABLEKEY EQU   $1C         formerly page
0000:     001D  301 KEYKEY    EQU   $1D
0000:     001E  302 DOKEY     EQU   $1E
0000:     001F  303 OKKEY     EQU   $1F
0000:           304 *
0000:     0021  305 IRSYMBOL  EQU   $21         new value for Capture symbo
l;
0000:     0022  306 HKEY      EQU   $22         value for "h" in "+h"
0000:     0023  307 ONESHOT   EQU   $23         one-shot capture symbol
0000:           308 *
0000:     0004  309 HOURUP    EQU   KEYA
0000:     0005  310 HOURDOWN  EQU   KEYB
0000:     0006  311 MINUP     EQU   KEYC
0000:     0007  312 MINDOWN   EQU   KEYD
0000:     0012  313 DAYUP     EQU   KEYE
0000:     0013  314 DAYDOWN   EQU   KEYF
0000:           315 *
0000:     0000  316 AMKEY     EQU   ADASH
0000:     0001  317 PMKEY     EQU   BDASH
0000:     0002  318 KEY2ND    EQU   CDASH
0000:     0003  319 RPTKEY    EQU   PAGEKEY
0000:           320 *
```

```
0000:         00B0   321 ALARMVAL   EQU    $B0           value of alarm
0000:                8              INCLUDE MAIN 0000:                2 *     MAIN
0000:                3 *
0000:         FF00   4 Blat         EQU    $FF00
0000:                5              dsect
0000:                6 * this is in ROM, so we don't actually need to assemble it
0000:                7 *
0000:                8 *     THE PROGRAM
0000:                9 *
F100:         F100  10              ORG    $F100
F100:               11 *
F100:         F100  12 SETUP        EQU    *
F100:78             13              sei                  disable u8 ints
F101:12             14              clt                  clear T mode
F102:D8             15              cld                  clear Decimal mode
F103:A9 01          16              lda    #01
F105:85 FE          17              sta    icr           enable int2
F107:85 FF          18              sta    tcr           mem expand mode
F109:1A             19              dec    a             (to $00)
F10A:85 E1          20              sta    ddrp0         port 0 as input saves power
F10C:85 E3          21              sta    ddrp1         port 1 as input saves power
F10E:85 E5          22              sta    ddrp2         port 2 as input saves power
F110:85 F6          23              sta    sermode       insure no serial I/O
F112:1A             24              dec    a             (to $ff)
F113:85 EB          25              sta    ddrp4         port 4 as output
F115:85 EE          26              sta    port6         port 6 as output
F117:A2 7F          27              ldx    #$7f
F119:9A             28              txs                  stack to $7f in case 50742,3
F11A:8E 98 7E       29              STX    MAINSTAK
F11D:86 E8          30              stx    port3         serout low for 'mark'
F11F:3C 90 E9       31              lda    #$90,ddrp3    port3 output bits: serout, spkr
F122:3C 15 03       32              lda    #$15,const15
F125:3C 05 05       33              lda    #5,const5
F128:               34 ********************************
F128:20 3A F1       35 MAIN         JSR    INIT1
F12B:20 57 F1       36              JSR    INIT2
F12E:20 39 80       37              JSR    INITR1        from RAM
F131:20 64 F1       38              JSR    INIT3
F134:20 74 80       39              JSR    INITR2        does nothing
F137:4C 70 F1       40              JMP    MAINLOOP      that's it!!
F13A:               41 *
F13A:               42 ********************************
F13A:               43 *
F13A:6C 05 80       44 INIT1        JMP    (INIT1.V)     --> init1.ram
F13D:               45 *
F13D:         001A  46              ds     $f157-*,$ff
F157:               47 ********************************
F157:               48 *
F157:               49 * INITIALIZE ZERO PAGE
F157:               50 *
F157:6C 07 80       51 INIT2        JMP    (INIT2.V)
F15A:A9 00          52              LDA    #0
F15C:A2 40          53              LDX    #ZPLEN-1
F15E:95 10          54 INIT2A       STA    ZPSTART,X     clear zero page
F160:CA             55              DEX
F161:10 FB    F15E  56              BPL    INIT2A
F163:60             57              RTS
F164:               58 *
F164:               59 *
F164:               60 ********************************
F164:6C 09 80       61 INIT3        JMP    (INIT3.V)     --> init3.ram
F167:         0009  62              ds     $f170-*,$ff
F170:               63 ********************************
```

```
F170:              65 ********************************************
F170:              66 *
F170:              67 * MAIN KEYBOARD LOOP
F170:              68 *
F170:6C 0B 80      69 MAINLOOP  JMP    (MAINLOOP.V)   -->mainloop.ram
F173:      0029    70           ds     $f19c-*,$ff
F19C:              71 ********************************
F19C:              73 *
F19C:              74 * HANDLE "DO" INPUT
F19C:              75 *
F19C:A5 10         76 MAINDO    LDA    CURRMODE
F19E:8D 20 7D      77           STA    TARGMODE
F1A1:A5 11         78           LDA    CURRKEY
F1A3:8D 2A 7D      79           STA    TARGKEY
F1A6:20 01 F4      80           JSR    CHECKTARG
F1A9:              81 *
F1A9:D0 03  F1AE   82           BNE    MAINDO1
F1AB:4C 00 FF      83           JMP    BLAT
F1AE:2F 32         84 MAINDO1   SEB    KEYINPUT      ;LEGAL TARGET
F1B0:20 99 F7      85           JSR    DISPTARGET    MODE/KEY IN TIME
F1B3:20 8D F8      86           JSR    CLRDISP
F1B6:3C FF 12      87           LDM    #$FF,PROGINDEX
F1B9:              88 *
F1B9:              89 *
F1B9:20 3C F3      90 MAINDO2   JSR    SETLEARN
F1BC:              91 * (falls thru)
F1BC:              92 *
F1BC:              94 *
F1BC:              95 *
F1BC:              96 * LEARN: CHECK PROGRAM SYNTAX.
F1BC:              97 * THIS CAN BE USED IN KEYINPUT
F1BC:              98 * MODE OR EDIT MODE.
F1BC:              99 *
F1BC:              100 * GET INPUT
F1BC:              101 *
F1BC:6C 0D 80      102 LEARN    JMP    (LEARN.V)     -->learn.ram
F1BF:              103 *
F1BF:      0043    104          ds     $f202-*,$ff
F202:              105 * (intervening code replaced in RAM)
F202:              106 *
F202:48            107 LEARNCHAR PHA
F203:22 A9         108          JSR    \STUFFIT.FF
F205:68            109          PLA                  restore key
F206:22 9C         110          JSR    \CONVOF       this is only relevant
F208:8D 34 7D      111          STA    AQKEY         in indirect alarm-programmi
ng
F20B:80 AF  F1BC   112          BRA    LEARN
F20D:              113 *
F20D:      0025    114          ds     $f232-*,$ff
F232:              115 *
F232:              116 *
F232:80 88  F1BC   117 LEARN3A  BRA    LEARN
F234:              118 *
F234:      0016    119          ds     $f24a-*,$ff
F24A:              120 *
F24A:              121 *
F24A:              123 *
F24A:              124 * ILLEGAL ENTRY IN LEARNING SEQUENCE
F24A:              125 *  (or after deleting a key)
F24A:              126 *
F24A:6C 0F 80      127          JMP    (ILLEGAL.V)   <--label in wrong place )(*
&*!!
F24D:B7 34 0AF25A  128 ZILLEGAL BBC    DELETEFLAG,ZILLEGAL1
F250:              129 *
F250:C6 14         130          DEC    CURRPOS       previous action was delete
F252:C6 12         131          DEC    PROGINDEX
F254:2F 32         132          SEB    KEYINPUT      continue inputting by hand
F256:BF 34         133          CLB    DELETEFLAG
F258:80 D8  F232   134          BRA    LEARN3A
F25A:22 00         135 ZILLEGAL1 JSR   \BLAT         returns w zflag set
```

```
F25C:27 32 D3F232  136            BBS    KEYINPUT,LEARN3A
F25F:60            137            RTS                    return to edit
F260:              138 *
F260:              140 *
F260:              141 * GET INPUT AFTER "PAGE" IN A
F260:              142 * LEARNING SEQUENCE
F260:              143 *
F260:              144 *LEARNMODE replaced by Learnpage in Nocopy
F260:         000E 145            ds     $f26e-*,$ff
F26E:              146 *
F26E:              147 * LEGAL MODE
F26E:              148 * ENTRY POINT FOR DIRECT MODE
F26E:              149 *
F26E:09 04         150 DLEARNMODE ORA    #4             CONVERTS A-/D- TO A/D
F270:A2 FF         151            LDX    #$FF
F272:8E 34 7D      152            STX    AQKEY          for alarm-program
F275:48            153 LEARNMODE1 PHA                   SAVE VALUE
F276:22 9C         154            JSR    \CONVOF
F278:A6 13         155            LDX    NEST
F27A:9D 20 7D      156            STA    TARGMODE,X
F27D:AF 33         157            SEB    DASHFLAG
F27F:68            158            PLA
F280:22 A9         159            JSR    \STUFFIT.FF
F282:17 31 02F287  160            BBC    0,TIMEFLAG,DLEARN1 IN ALARM-PROGRAMMING
F285:              161 *
F285:AF 32         162            SEB    ALARMMODE      MEANS ONLY ALLOW 0-F NOW
F287:4C BC F1      163 DLEARN1    JMP    LEARN
F28A:              164 *
F28A:              165 *
F28A:              166 *LEARNMODE2,etc. (illegal mode) replaced in RAM
F28A:         0018 167            ds     $f2a2-*,$ff
F2A2:              168 *
F2A2:              169 * GET INPUT AFTER "KEY" IN
F2A2:              170 * LEARNING SEQUENCE
F2A2:              171 *
F2A2:              172 *
F2A2:              173 * LEARNKEY JSR \NEXTCANCEL
F2A2:         002D 174            DS     $F2CF-*,$FF
F2CF:              175 *
F2CF:              176 ***********************************
F2CF:              178 *
F2CF:              179 *   END OF LEARNING SEQUENCE
F2CF:              180 *
F2CF:6C 11 80      181 ENDDO      JMP    (ENDDO.V)
F2D2:              182 * [REPLACED IN RAM]
F2D2:              183 *
F2D2:         003A 184            DS     $F30C-*,$FF
F30C:              185 *
F30C:20 77 F6      186 ENDLEARN   JSR    SHOWTIME
F30F:              187 *
F30F:              188 *
F30F:6C 13 80      189 GOUSER     JMP    (GOUSER.V)     -->gouser.ram
F312:         000F 190            ds     $f321-*,$ff
F321:20 C4 F8      191 GOUSER1    JSR    DISPCURR
F324:AE 98 7E      192            LDX    MAINSTAK       in case of nesting
F327:9A            193            TXS
F328:4C 70 F1      194            JMP    MAINLOOP
F32B:              195 *
F32B:              196 *
F32B:              197 * this one is STILL HERE
F32B:A9 00         198 INITEM     LDA    #0             this routine called by synt
axcheck too
F32D:85 13         199            STA    NEST
F32F:85 31         200            STA    TIMEFLAG
F331:85 3B         201            STA    FLASHON
F333:85 3C         202            STA    byteid         (formerly FLASHBYTE)
F335:3C 06 32      203            LDM    #6,FLAGS1
F338:3C 10 33      204            LDM    #$10,FLAGS2
F33B:60            205            RTS
F33C:              206 *
```

```
F33C:                  208 *
F33C:                  209 * SET UP FOR LEARN
F33C:                  210 *
F33C:                  211 *
F33C:E6 13             212 SETLEARN  INC   NEST
F33E:20 19 F4          213           JSR   CLRTARG
F341:A9 1E             214           LDA   #DOKEY
F343:                  215 *
F343:                  216 * STUFFIT: USED WHEN CHECKING
F343:                  217 * LEARNING SYNTAX. PUTS CHAR
F343:                  218 * IN DISPLAY AND PROGRAM BUFFER.
F343:                  219 * ACCUM CONTAINS ASCII OF KEY
F343:                  220 * WHEN CALLED.
F343:                  221 *
F343:6C 15 80          222 STUFFIT   JMP   (STUFFIT.V)
F346:                  223 * (checks progindex in RAM, then if OK, returns here)
F346:27 32 06F34F      224           BBS   KEYINPUT,STUFF1
F349:A6 12             225           LDX   PROGINDEX    if edit
F34B:F0 18    F365     226           BEQ   STUFFRTS     don't stuff 1st one for edit
F34D:80 07    F356     227           BRA   STUFF3
F34F:                  228 *
F34F:E6 12             229 STUFF1    INC   PROGINDEX
F351:                  230 *
F351:6C 17 80          231 STUFFONE  JMP   (STUFFONE.V)
F354:A6 12             232           LDX   PROGINDEX    entry for edit: check dashflag
F356:B7 33 01F35A      233 STUFF3    BBC   DASHFLAG,STUFF2
F359:EB                234           SEB   7,A          DASH:SET HIBIT
F35A:9D 4A 7D          235 STUFF2    STA   PROGBUF,X    STUFF
F35D:                  236 *
F35D:37 32 05F365      237           BBC   KEYINPUT,STUFFRTS don't display if edit
F360:FB                238           CLB   7,A
F361:22 AC             239           JSR   \PUTDISP.FF  DISPLAY
F363:CF 3A             240           SEB   CURSORBIT,FLASHACT enable flashing cursor F365:60                241 STUFFRTS  RTS
F366:                  242 *
F366:                  243 *
F366:                  244 *
F366:                  245 ****************************************************
F366:                  247 *
F366:                  248 * SET TIME
F366:20 91 80          249 SETTIME   JSR   GOSET
F369:3C 00 31          250           LDM   #0,TIMEFLAG
F36C:A9 14             251           LDA   #SETKEY
F36E:22 AC             252           JSR   \PUTDISP.FF
F370:                  253 * (FALLS THRU)
F370:                  254 *
F370:                  255 *
F370:                  256 * GET INPUT FOR TIME-SETTING.
F370:                  257 *  THIS CAN BE CALLED BY SETALARM TOO.
F370:                  258 *
F370:                  259 *
F370:                  260 * GET ADDR OF ROUTINE TO JSR TO  DEPENDING ON KEY
F370:20 81 82          261 TIMEINPUT JSR   GETNEXT
F373:                  262 *
F373:6C 19 80          263 XTIME     JMP   (XTIME.V)    entry pt from execution
F376:A2 2A             264           LDX   #SETRTNLEN   length of table
F378:CA                265 TIMEIN1   DEX
F379:CA                266           DEX
F37A:CA                267           DEX                previous entry
F37B:A5 22             268           LDA   KEYNUM       key value for this routine
F37D:DD AD 80          269           CMP   SETRTNS,X    = current key?
F380:90 F6    F378     270           BCC   TIMEIN1      no: continue
F382:                  271 *
F382:BD AE 80          272           LDA   SETRTNS+1,X  get addr of routine
F385:85 2F             273           STA   ZPJSR
F387:BD AF 80          274           LDA   SETRTNS+2,X
F38A:85 30             275           STA   ZPJSR+1
F38C:                  276 *
```

```
F38C:A5 22       277             LDA     KEYNUM        needed when calling routines
F38E:02 2F       278             JSR     (ZPJSR)
F390:87 33 DDF370 279 TIMEIN2    BBS     ACTTIME,TIMEINPUT
F393:            280 * if acttime clear, we're in execution mode & we do
F393:            281 * one instruction at a time.
F393:60          282             RTS
F394:            283 *
F394:            285 *
F394:            286 * "DELETE" KEY ROUTINES
F394:            287 *
F394:            288 *
F394:F7 31 36F3CD 289 ZDELETETIME BBC   7,TIMEFLAG,ILLSET don't allow unless program
F397:            290 *
F397:            291 *
F397:6C 1B 80    292 ZDELETEIT  JMP     (DELETEIT.V)  delete previous key
F39A:      0024  293             ds      $f3be-*,$ff
F3BE:            294 *
F3BE:            295 *
F3BE:            296 * HANDLE "DO" WITHIN TIMEINPUT (ALARMS OR INTERVALS ONLY)
F3BE:            297 *
F3BE:17 31 0CF3CD 298 ZSETDO    BBC     0,TIMEFLAG,ILLSET   ;DO: only allowed in "at"
F3C1:68          299             PLA                   convert from jsr to jmp
F3C2:68          300             PLA                   [this may not be nec]
F3C3:            301 *
F3C3:20 3C F3    302             JSR     SETLEARN
F3C6:            303 *
F3C6:F7 31 01F3CA 304            BBC     7,TIMEFLAG,zSETDO3
F3C9:60          305             RTS                   DO/AT: RETURN FROM TIMEINPUT
F3CA:            306 *
F3CA:4C BC F1    307 ZSETDO3    JMP     LEARN
F3CD:            308 * GET ALARM ID AT END OF PROGRAM'
F3CD:            309 *
F3CD:            311 *
F3CD:            312 * ILLEGAL ENTRY DURING TIMESET
F3CD:            313 * (or after deleting a key)
F3CD:            314 *
F3CD:B7 34 09F3D9 315 ILLSET    BBC     DELETEFLAG,ILLSET0
F3D0:C6 14       316             DEC     CURRPOS
F3D2:C6 12       317             DEC     PROGINDEX
F3D4:BF 34       318             CLB     DELETEFLAG
F3D6:2F 32       319             SEB     KEYINPUT
F3D8:60          320             RTS
F3D9:22 00       321 ILLSET0    JSR     \BLAT
F3DB:27 32 06F3E4 322            BBS     KEYINPUT,ILLSET1
F3DE:68          323             PLA                   if syntax error, bypass return
F3DF:68          324             PLA
F3E0:68          325             PLA
F3E1:68          326             PLA                   twice
F3E2:A9 00       327             LDA     #0            set zflag to indicate syntax error
F3E4:60          328 ILLSET1    RTS
F3E5:            329 *
F3E5:            330 *
F3E5:            332 *
F3E5:            333 * HANDLE "OK" FROM TIMEINPUT
F3E5:            334 *
F3E5:            335 *
F3E5:07 31 E5F3CD 336 SETOK     BBS     0,TIMEFLAG,ILLSET
F3E8:            337 *;NO OK IN 'AT': RETURN TO TIMEINPUT
F3E8:            338 *
F3E8:68          339             PLA
F3E9:68          340             PLA                   CONVERTS TO JMP
F3EA:            341 *
F3EA:            342 * WE'RE GOING TO RETURN TO "LEARN" OR USER STATE
F3EA:E7 31 0CF3F9 343            BBS     7,TIMEFLAG,SETOK2
```

```
F3ED:                   344 * NORMAL 'SET'
F3ED:77 32 03F3F3       345         BBC     ANYDIRECT,SETRTN
F3F0:                   346 *
F3F0:20 39 F5           347         JSR     CLRSEC          clear seconds
F3F3:                   348 *
F3F3:                   349 *
F3F3:20 80 F6           350 SETRTN  JSR     DISPTIME
F3F6:                   351 *JSR ALARMTO4 in case 1st alarm got changed
F3F6:4C 0F F3           352         JMP     GOUSER
F3F9:                   353 *       'SET' WITHIN 'DO'
F3F9:A9 1F              354 SETOK2  LDA     #OKKEY
F3FB:22 A9              355         JSR     \STUFFIT.FF
F3FD:3C 00 31           356         LDM     #0,TIMEFLAG     done with do-set
F400:60                 357         RTS
F401:                   358 *
F401:                   359 *
F401:                   360 * DETERMINE WHETHER THERE IS A
F401:                   361 * LEGAL TARGET FOR LEARNING: I.E.
F401:                   362 * KEY = 0-F OR MODE = A-D
F401:                   363 * RETURNS 0 IF ILLEGAL, 1 IF LEGAL.
F401:                   364 *
F401:           F401    365 CHECKTARG EQU   *
F401:A6 13              366         LDX     NEST            LEVEL
F403:BD 2A 7D           367         LDA     TARGKEY,X
F406:10 0E      F416    368         BPL     TARGOK
F408:BD 20 7D           369         LDA     TARGMODE,X
F40B:C9 0A              370         CMP     #$A
F40D:90 04      F413    371         BCC     NOTARG
F40F:C9 0E              372         CMP     #$E
F411:90 03      F416    373         BCC     TARGOK
F413:A9 00              374 NOTARG  LDA     #0
F415:60                 375         RTS
F416:A9 01              376 TARGOK  LDA     #1
F418:60                 377         RTS
F419:                   378 *
F419:                   379 *
F419:                   380 *
F419:                   381 * CLEAR TARGET FOR CURRENT NEST
F419:                   382 *
F419:A6 13              383 CLRTARG LDX     NEST
F41B:A9 FF              384         LDA     #$FF
F41D:9D 20 7D           385         STA     TARGMODE,X
F420:9D 2A 7D           386         STA     TARGKEY,X
F423:FF 32              387         CLB     DONEALARM
F425:BF 32              388         CLB     ALARMMODE
F427:60                 389         RTS
F428:                   390 *
F428:                   391 *
F428:3C 00 23           392 INITSTAK LDM    #0,INDEX        ** INITIALIZE STACK
F42B:AD 0A 7D           393         LDA     ENDSTACK        set ptr to end of stack
F42E:85 2D              394         STA     STAKPTR
F430:AD 0B 7D           395         LDA     ENDSTACK+1
F433:85 2E              396         STA     STAKPTR+1
F435:60                 397         RTS
F436:                   398 *
F436:                   399 *
F436:                   400 * CHECK "TIMEFLAG" TO SEE WHETHER
F436:                   401 * WE ARE IN PROGRAM MODE.  IF SO,
F436:                   402 * STORE KEY IN PROGRAM LINE.
F436:                   403 *
F436:                   404 *
F436:A5 31              405 CHECKFLAG LDA   TIMEFLAG
F438:10 0A      F444    406         BPL     CHECKFLAG1
F43A:                   407 *
F43A:                   408 * PROGRAM MODE: DISPLAY IN PROGRAM LINE
F43A:                   409 *
F43A:A5 22              410         LDA     KEYNUM
F43C:B7 33 01F440       411         BBC     DASHFLAG,CHECKFLAG2
F43F:EB                 412         SEB     7,A
F440:22 A9              413 CHECKFLAG2 JSR  \STUFFIT.FF
F442:A9 FF              414         LDA     #$FF            SET MINUS FOR RETURN
```

```
F444:                  415 *
F444:60                416 CHECKFLAG1 RTS
F445:                  417 *
F445:                  419 *
F445:                  420 * IF VALUE IN ACCUM (KEYNUM) IS LEGAL MODE,
F445:                  421 * RETURN X=2 FOR DIRECT (A- TO D-);
F445:                  422 * X=1 FOR 0-F; X=0 FOR ILLEGAL
F445:                  423 * (ALSO ZERO FLAG SET IF ILLEGAL)
F445:                  424 *  ACCUM CONTAINS KEYNUM ON EXIT
F445:                  425 *
F445:                  426 * (checkmode replaced in RAM)
F445:A5 22             427 CHECKMODE LDA    KEYNUM      ASSUMES ASSIGNKEY HAS BEEN CALLED
F447:A2 00             428           LDX    #0
F449:C9 14             429           CMP    #$14
F44B:B0 0A    F457     430           BCS    CHECKMODE1
F44D:C9 04             431           CMP    #4
F44F:B0 05    F456     432           BCS    CHECKMODE2
F451:                  433 *
F451:69 04             434           ADC    #4          IF 0-3,CONVERT TO 4-7 (A-D)
F453:85 22             435           STA    KEYNUM
F455:                  436 *
F455:E8                437           INX                A- TO D-
F456:E8                438 CHECKMODE2 INX               LEGAL
F457:E0 00             439 CHECKMODE1 CPX   #0          TO SET ZERO FLAG
F459:60                440           RTS
F45A:                  441 *
F45A:                  442 * CHECK FOR LEGAL KEY KEY
F45A:                  443 * ON EXIT, ACC = KEY; X= 0 IF ILLEGAL, 1 IF LEGAL
F45A:                  444 *
F45A:A5 22             445 CHECKKEY  LDA    KEYNUM
F45C:A2 00             446           LDX    #0
F45E:C9 04             447           CMP    #4
F460:90 F5    F457     448           BCC    CHECKMODE1
F462:C9 14             449           CMP    #$14
F464:B0 F1    F457     450           BCS    CHECKMODE1
F466:80 EE    F456     451           BRA    CHECKMODE2
F468:                  452 *
F468:                  454 *(we're now using a ram routine because of 1c-1d problem)
F468:                  455 *SETALARM JSR GOSET
F468:         0026     456           ds     $f48E-*,$ff
F48E:                  457 *
F48E:                  458 *
F48E:                  459 * HANDLE INPUT & DISPLAY OF
F48E:                  460 * TIME SET DATA
F48E:                  461 * WITHIN A LEARNING SEQUENCE
F48E:                  462 * (ONLY FOR "SET" NOW)
F48E:                  463 *
F48E:3C 80 31          464 DOSET     LDM    #$80,TIMEFLAG
F491:                  465 *
F491:A9 14             466           LDA    #SETKEY
F493:22 A9             467 DOSET1    JSR    \STUFFIT.FF
F495:3C 00 1E          468           LDM    #0,TIMEDIG
F498:                  469 *
F498:20 81 82          470 DOSET1A   JSR    GETNEXT
F49B:C9 18             471           CMP    #SCRLEFT     a char was deleted
F49D:D0 05    F4A4     472           BNE    DOSET1B
F49F:20 CD F3          473           JSR    ILLSET       reset to keyinput
F4A2:80 F4    F498     474           BRA    DOSET1A
F4A4:                  475 *
F4A4:C9 15             476 DOSET1B   CMP    #ATKEY       interval
F4A6:D0 03    F4AB     477           BNE    DOSET2
F4A8:07 31 06F4B1·     478           BBS    0,TIMEFLAG,INTERVALS if it follows 'at'
F4AB:20 73 F3          479 DOSET2    JSR    XTIME             for At, includes following Do
F4AE:                  480 *
F4AE:4C BC F1          481 DOSET3    JMP    LEARN
F4B1:                  482 *
F4B1:                  483 ********************************
```

```
F4B1:          F4B1    484 INTERVALS EQU   *
F4B1:          001E    485         ds      $f4cf-*,$ff
F4CF:                  486 * skip intervals
F4CF:                  487 *
F4CF:                  488 *
F4CF:                  489 * CONVERT CURRMODE, CURRKEY TO KEYNUM
F4CF:11 08 09 0A       490 MODECODES DFB   $11,$8,$9,$A,$B,$C,$D,$E 0-7
F4D7:0F 10 04 05       491         DFB     $F,$10,$4,$5,$6,$7,$12,$13 8-F
F4DF:                  492 *
F4DF:                    9         INCLUDE TIME
F4DF:                    2 * TIME
F4DF:                    3 *
F4DF:                    4 *
F4DF:                    5 * ROUTINES TO READ TIME1 VALUES.
F4DF:                    6 * READSECONLY READS SECONDS
F4DF:                    7 * READT1TIME READS EVERYTHING EXCEPT SECL,SECH
F4DF:                    8 **
F4DF:                    9 *
F4DF:3C 02 36           10 READSECONLY LDM #2,VAR1      read seconds only
F4E2:A9 FA              11 READSEC1    LDA #$FA         addr of secl
F4E4:A2 00              12             LDX #0
F4E6:80 07     F4EF     13             BRA READTIME
F4E8:                   14 *
F4E8:A9 FC              15 READT1TIME LDA #$FC          addr of minl
F4EA:A2 02              16             LDX #2
F4EC:3C 06 36           17             LDM #6,VAR1      last byte to read
F4EF:                   18 *
F4EF:6C 1D 80           19 READTIME   JMP  (READTIME.V)
F4F2:A8                 20             TAY
F4F3:22 92              21             JSR  \CLRINT
F4F5:22 0E              22             JSR  \PEEK256    read 1st nybble
F4F7:                   23 *
F4F7:C8                 24 READMORE   INY              gets value from previous read
F4F8:98                 25             TYA             address of to peek next
F4F9:22 1A              26             JSR  \PEEK16
F4FB:A5 EC              27             LDA  FROM4      read previous
F4FD:29 0F              28             AND  #$F        mask hi nybble
F4FF:95 18              29             STA  SECL,X
F501:                   30 *
F501:E8                 31             INX
F502:E4 36              32             CPX  VAR1
F504:D0 F1     F4F7     33             BNE  READMORE
F506:22 97              34             JSR  \ENBINT
F508:60                 35             RTS
F509:                   36 *
F509:                   38 *
F509:                   39 * ROUTINES TO WRITE VALUES INTO TIME1, TIME2, ALARM
F509:                   40 * WRITE 4 VALUES: MINL,MINH,HR,DAY
F509:                   41 *
F509:A9 8C              42 WRITEAQTIME LDA #$8C
F50B:80 12     F51F     43             BRA  WRITETIME
F50D:                   44 *
F50D:A9 88              45 WRITET2TIME LDA #$88
F50F:20 1F F5           46             JSR  WRITETIME
F512:                   47 *
F512:A9 04              48 ONTIME2    LDA  #4          turn on time2 display
F514:22 92              49 OTHER4     JSR  \CLRINT
F516:BF EE              50             CLB  F1
F518:22 1C              51             JSR  \POKE16
F51A:22 97              52             JSR  \ENBINT
F51C:60                 53 OTHRTS     RTS
F51D:                   54 *
F51D:                   55 *
F51D:                   56 * [may want to try indexing for these routines to cut code]
F51D:A9 FC              57 WRITET1TIME LDA #$FC
F51F:6C 1F 80           58 WRITETIME  JMP  (WRITETIME.V)
F522:22 92              59             JSR  \CLRINT
F524:22 0E              60             JSR  \PEEK256
```

```
F526:A5 1A          61 WRTTM1    LDA    MINL         done this way to speed up
F528:22 1C          62           JSR    \POKE16
F52A:A5 1B          63           LDA    MINH
F52C:22 1C          64           JSR    \POKE16
F52E:A5 1C          65           LDA    HR
F530:22 1C          66           JSR    \POKE16
F532:A5 1D          67           LDA    DAY
F534:22 1C          68           JSR    \POKE16
F536:22 97          69           JSR    \ENBINT
F538:60             70           RTS
F539:               71 ***********************
F539:22 92          72 CLRSEC    JSR    \CLRINT
F53B:A9 FA          73           LDA    #$FA         clears seconds to zero
F53D:22 0E          74           JSR    \PEEK256
F53F:A9 00          75           LDA    #0
F541:22 1C          76           JSR    \POKE16
F543:               77 * acc preserved
F543:22 1C          78           JSR    \POKE16
F545:22 97          79           JSR    \ENBINT
F547:60             80           RTS
F548:               81 *
F548:               83 *
F548:               84 ************ the following replaced in RAM
F548:1F 1D          85 S.ETAM    CLB    0,DAY        RESPOND TO "AM" KEY
F54A:80 02    F54E  86           BRA    SETAMPM
F54C:               87 *
F54C:0F 1D          88 S.ETPM    SEB    0,DAY        RESPOND TO "PM" KEY
F54E:               89 *
F54E:D7 31 04F555   90 SETAMPM   BBC    6,TIMEFLAG,SETAMPM1
F551:20 CD F3       91 RTSAM     JSR    ILLSET       don't allow for intervals
F554:60             92           RTS
F555:               93 ************
F555:20 36 F4       94 SETAMPM1  JSR    CHECKFLAG
F558:               95 *
F558:               96 * WRITE VALUES INTO TIME2
F558:               97 *
F558:6C 21 80       98 FIXTIME2  JMP    (FIXTIME2.V)
F55B:               99 * This routine replaced in Ram
F55B:E7 31 12F570  100           BBS    7,TIMEFLAG,FD2A program mode: don't display time
F55E:97 33 0FF570  101           BBC    ACTTIME,FD2A doittime: skip
F561:20 0D F5      102           JSR    WRITET2TIME
F564:              103 *
F564:17 31 09F570  104           BBC    0,TIMEFLAG,FD2A skip tog2nd if "set"
F567:              105 *
F567:20 BE 9C      106 FIXT2A    JSR    SPKRWAIT     delay needed
F56A:20 16 81      107           JSR    TOG2ND       restore 2nd,rpt
F56D:20 08 81      108           JSR    TOGRPT
F570:60            109 FD2A      RTS
F571:              110 *
F571:              112 *
F571:              113 * TIME ALTERATION ROUTINES: "UPDOWN" IS GENERAL ROUTINE WHICH
F571:              114 * DISTINGUISHES BETWEEN DIRECT-DIG & NON DIRECT
F571:              115 *
F571:              116 ******the following replaced in RAM
F571:C7 31 DDF551  117 U.PDOWN   BBS    6,TIMEFLAG,RTSAM don't allow in intervals
F574:              118 ******
F574:              119 *
F574:              120 *
F574:              121 * ASSIGN ADDRESS OF SPECIFIC ROUTINE BASED ON KEYNUM
F574:              122 *
F574:A5 22         123           LDA    KEYNUM
F576:29 0F         124           AND    #$F
F578:0A            125 UPDOWNX   ASL    A            re-entry from RAM
F579:AA            126           TAX
F57A:BD F2 80      127           LDA    UPDOWNJSRS-4,X
F57D:85 2F         128           STA    ZPJSR
```

```
F57F:BD F3 80      129           LDA    UPDOWNJSRS-3,X
F582:85 30         130           STA    ZPJSR+1
F584:              131 *
F584:              132 *
F584:02 2F         133           JSR    (ZPJSR)
F586:20 36 F4      134           JSR    CHECKFLAG
F589:80 CD   F558  135           BRA    FIXTIME2    Don't display if timeflag m
inus
F58B:              136 *                            or acttime clear
F58B:              137 *
F58B:              138 *******************************
F58B:              139 *
F58B:              140 * RESPOND TO MIN-UP KEY
F58B:              141 *
F58B:3C 01 37      142 zINCMIN   LDM    #1,INCR
F58E:97 33 7BF60C  143           BBC    ACTTIME,INCMINC if under program executio
n
F591:              144 *
F591:              145 ***************************
F591:              146 *
F591:        F591  147 MININCR   EQU    *           add incr to minh,minl with
carry
F591:A6 1B         148           LDX    MINH
F593:A5 1A         149           LDA    MINL
F595:20 A5 F5      150           JSR    ADDINCR
F598:86 1B         151           STX    MINH
F59A:85 1A         152           STA    MINL
F59C:60            153           RTS                used in interval, too
F59D:              154 *
F59D:              155 * RESPOND TO MIN-DOWN KEY
F59D:              156 *
F59D:3C 3B 37      157 zDECMIN   LDM    #59,INCR
F5A0:97 33 77F61A  158           BBC    ACTTIME,DECMINC if prog exec, check for c
arry
F5A3:80 EC   F591  159           BRA    MININCR
F5A5:              160 ***************************
F5A5:              161 *
F5A5:              162 * ADDINCR: ADDS INCR TO A NUMBER BETWEEN 0 & 59
F5A5:              163 * INPUT: X= TENS DIGIT; A = UNITS DIGIT
F5A5:              164 * OUTPUT: SAME; CARRY SET IF VALUE >=60
F5A5:              165 *
F5A5:20 27 F7      166 ADDINCR   JSR    ADD10X      get value 0-59
F5A8:              167 *
F5A8:              168 *
F5A8:65 37         169           ADC    INCR
F5AA:C9 3C         170           CMP    #60
F5AC:90 02   F5B0  171           BCC    ADDINCR1    cclear if <60, set if >=60

F5AE:E9 3C         172           SBC    #60
F5B0:              173 *
F5B0:08            174 ADDINCR1  PHP                preserve carry
F5B1:A2 FF         175           LDX    #$FF        convert back to hi,low
F5B3:E8            176 ADDINCR2  INX
F5B4:38            177           SEC
F5B5:E9 0A         178           SBC    #10
F5B7:B0 FA   F5B3  179           BCS    ADDINCR2
F5B9:69 0A         180           ADC    #10
F5BB:28            181           PLP
F5BC:60            182           RTS
F5BD:              183 *
F5BD:              184 ***************************
F5BD:              185 *
F5BD:              186 * RESPOND TO DAY/UP KEY
F5BD:              187 * ALTERS DAY   (preserves pm value)
F5BD:              188 *
F5BD:20 65 F6      189 INCDAY    JSR    GETMINDAY
F5C0:3A            190           INC
F5C1:29 07         191           AND    #7
F5C3:D0 03   F5C8  192           BNE    UPDAY1
F5C5:0D 3F 7D      193           ORA    MINDAY
F5C8:80 0B   F5D5  194 UPDAY1    BRA    DOWNDAY2
```

```
F5CA:                   195 *
F5CA:                   196 *
F5CA:                   197 * RESPOND TO DAY/DOWN KEY
F5CA:                   198 * ALTERS DAY
F5CA:                   199 *
F5CA:20 65 F6           200 DECDAY    JSR     GETMINDAY
F5CD:CD 3F 7D           201           CMP     MINDAY
F5D0:D0 02     F5D4     202           BNE     DOWNDAY1
F5D2:A9 08              203           LDA     #8
F5D4:1A                 204 DOWNDAY1  DEC
F5D5:                   205 *
F5D5:0A                 206 DOWNDAY2  ASL
F5D6:05 36              207           ORA     VAR1            =1 if pmflag
F5D8:85 1D              208           STA     DAY
F5DA:60                 209           RTS
F5DB:                   210 *
F5DB:                   211 *
F5DB:                   212 * INCREMENT HR WITH WRAP (CHANGE AM/PM IF NEC)
F5DB:                   213 * if pm switched, we will clear carry. acc contains day.
F5DB:                   214 * if pm not switched, carry clear
F5DB:                   215 *
F5DB:97 33 33F611       216 zINCHR    BBC     ACTTIME,INCHRC if prog, allow carry
F5DE:A5 1C              217 UPHR      LDA     HR
F5E0:D0 02     F5E4     218           BNE     UPHR1
F5E2:A9 04              219           LDA     #4
F5E4:3A                 220 UPHR1     INC     A
F5E5:29 0F              221           AND     #$F
F5E7:85 1C              222           STA     HR
F5E9:38                 223           SEC                     to indicate no pm change
F5EA:D0 07     F5F3     224           BNE     UPHR2
F5EC:A5 1D              225 SWITCHPM  LDA     DAY             CHANGE AM/PM
F5EE:49 01              226           EOR     #1
F5F0:85 1D              227           STA     DAY
F5F2:18                 228           CLC
F5F3:60                 229 UPHR2     RTS
F5F4:                   230 *
F5F4:                   231 * DECREMENT HR WITH WRAP (CHANGE AM/PM IF NEC)
F5F4:                   232 *
F5F4:97 33 28F61F       233 zDECHR    BBC     ACTTIME,DECHRC if prog, allow carry
F5F7:A5 1C              234 DOWNHR    LDA     HR
F5F9:D0 05     F600     235           BNE     DOWNHR1
F5FB:20 EC F5           236           JSR     SWITCHPM
F5FE:A9 10              237           LDA     #$10
F600:1A                 238 DOWNHR1   DEC     A
F601:C9 04              239           CMP     #4
F603:D0 02     F607     240           BNE     DOWNHR2
F605:A9 00              241           LDA     #0
F607:85 1C              242 DOWNHR2   STA     HR
F609:60                 243           RTS
F60A:                   244 *
F60A:                   245 *
F60A:                   247 *
F60A:                   248 * ROUTINES TO INCREMENT, DECREMENT TIME AND
F60A:                   249 * ALLOW FOR CARRY TO NEXT TIME-ELEMENT
F60A:                   250 *
F60A:85 37              251 INCMINC1  STA     INCR            entry for interval
F60C:                   252 *
F60C:20 91 F5           253 INCMINC   JSR     MININCR         inc minute
F60F:90 15     F626     254           BCC     RTS2            no carry: done
F611:                   255 *
F611:20 DE F5           256 INCHRC    JSR     UPHR            inc hr
F614:B0 10     F626     257           BCS     RTS2            if switchpm, carry clear
F616:                   258 *
F616:03 0E     F626     259           BBS     0,A,RTS2        bit 0=0: we switched to AM
F618:80 A3     F5BD     260           BRA     INCDAY
F61A:                   261 *
F61A:                   262 *
F61A:20 91 F5           263 DECMINC   JSR     MININCR         dec minute
F61D:B0 07     F626     264           BCS     RTS2            carry set= no change
F61F:20 F7 F5           265 DECHRC    JSR     DOWNHR          dec hr
F622:B0 02     F626     266           BCS     RTS2            no switchpm
```

```
F624:03 A4   F5CA  267            BBS   0,A,DECDAY    if PM=1, change day
F626:60            268 RTS2       RTS
F627:              269 *
F627:              271 *
F627:              272 * TAKE INTERVAL DATA AND ADD TO CURRENT TIME
F627:              273 * INPUT = MINH (sech),MINL (secl), HRL(minl)
F627:              274 *
F627:              275 * (changed to RAM)
F627:6C 23 80      276 ADDINTERVAL JMP  (ADDINTERVAL.V)  -->addint.ram
F62A:        003B  277            ds    $f665-*,$ff
F665:              278 *
F665:              279 * gets minimum day allowed: for alarms, =0 (mf);
F665:              280 * otherwise =1 (monday).
F665:              281 * returns value in minday; returns pmvalue in var1
F665:              282 *
F665:3C 00 36      283 GETMINDAY  LDM   #0,VAR1
F668:A5 31         284            LDA   TIMEFLAG
F66A:29 01         285            AND   #1
F66C:49 01         286            EOR   #1
F66E:8D 3F 7D      287            STA   MINDAY
F671:A5 1D         288 GMD1       LDA   DAY
F673:4A            289            LSR
F674:26 36         290            ROL   VAR1
F676:60            291            RTS
F677:              292 *
F677:              293 *
F677:              294 *
F677:              296 *
F677:              297 * DISPLAY CURR TIME AFTER SOMETHING ELSE HAS BEEN
F677:              298 * IN TIME DISPLAY
F677:              299 *
F677:20 32 F7      300 SHOWTIME   JSR   ONTIME
F67A:20 E8 F4      301            JSR   READT1TIME
F67D:4C 0D F5      302            JMP   WRITET2TIME
F680:              303 *
F680:              304 *
F680:              305 * STORE TIME VALUES IN T1 & T2 & DISPLAY
F680:              306 *
F680:20 0D F5      307 DISPTIME   JSR   WRITET2TIME
F683:20 1D F5      308            JSR   WRITET1TIME
F686:              309 *
F686:20 32 F7      310            JSR   ONTIME
F689:4C 00 88      311            JMP   ALARMT04     in case there's a change to 1st alarm
F68C:              312 *
F68C:              313 *
F68C:              315 ****** DDG replaced in RAM
F68C:        0077  316            ds    $f703-*,$ff
F703:              317 *
F703:        F703  318 HR1TO2     EQU   *
F703:A2 00         319            LDX   #0
F705:A5 1C         320            LDA   HR
F707:38            321            SEC
F708:E9 04         322            SBC   #4
F70A:29 0F         323            AND   #$F
F70C:C9 0A         324            CMP   #10
F70E:90 03   F713  325            BCC   HRT2A
F710:E9 0A         326            SBC   #10
F712:E8            327            INX
F713:85 17         328 HRT2A      STA   HRL
F715:86 16         329            STX   HRH
F717:60            330            RTS
F718:              331 *
F718:              332 * CONVERT H,L TO HR
F718:              333 *
F718:A5 17         334 HR2TO1     LDA   HRL
F71A:18            335            CLC
F71B:69 04         336            ADC   #4
F71D:17 16 04F724  337            BBC   0,HRH,HRT1A
F720:69 0A         338            ADC   #10
F722:29 0F         339            AND   #$F
```

```
F724:85 1C         340 HRT1A     STA   HR
F726:60            341           RTS
F727:              342 *
F727:              343 *
F727:18            344 ADD10X    CLC                    add acc to 10*x
F728:7D 2C F7      345           ADC   TENVALS,X
F72B:60            346           RTS
F72C:              347 *
F72C:00 0A 14 1E   348 TENVALS   DFB   0,10,20,30,40,50
F732:              349 *
F732:              351 *
F732:              352 * ONTIME: CAUSE CURRENT TIME TO BE DISPLAYED
F732:22 92         353 ONTIME    JSR   \CLRINT
F734:A9 F4         354           LDA   #$F4             ADDRESS OF CLOCKMODE
F736:22 0E         355           JSR   \PEEK256
F738:A9 01         356           LDA   #1               TIME ON; AM/PM MODE
F73A:80 08   F744  357           BRA   OFFTIME1
F73C:              358 *
F73C:22 92         359 OFFTIME   JSR   \CLRINT          DON'T DISPLAY CURRENT TIME
F73E:A9 F4         360           LDA   #$F4
F740:22 0E         361           JSR   \PEEK256
F742:A9 09         362           LDA   #9
F744:22 1C         363 OFFTIME1  JSR   \POKE16
F746:22 97         364           JSR   \ENBINT
F748:60            365 OFFRTS    RTS
F749:              366 *
F749:              367 *
F749:              369 *
F749:              370 * GET SECONDS FROM TOP ALARM IN QUEUE IN ORDER TO COUNTDO
WN
F749:              371 *
F749:20 A3 FA      372 GETSECTIME JSR  DEFQPTR
F74C:A0 05         373           LDY   #5
F74E:B1 29         374           LDA   (DEFPTR),Y       sec hi
F750:AA            375           TAX
F751:BD 2C F7      376           LDA   TENVALS,X        times 10
F754:18            377           CLC
F755:C8            378           INY
F756:71 29         379           ADC   (DEFPTR),Y       plus sec low
F758:85 20         380           STA   SECTIME
F75A:60            381           RTS
F75B:              382 *
F75B:              383 *
F75B:              385 *
F75B:              386 * MYTX replaced in RAM
F75B:       0012   387           ds    $f76d-*,$ff
F76D:              388 *
F76D:              389 * TIME TO FLASH: 4/8 SEC
F76D:              390 * THIS ROUTINE GETS CALLED DURING GETKEY WHENEVER FLASHTI
ME
F76D:              391 * IS ZERO.
F76D:              392 *
F76D:6C 31 80      393 FLASHEM   JMP   (FLASHEM.V)
F770:3C 03 1F      394           LDM   #3,FLASHTIME     RE-INIT
F773:A9 07         395           LDA   #7
F775:8D 95 7E      396           STA   FLASHIND
F778:A5 3A         397           LDA   FLASHACT
F77A:8D 92 7E      398           STA   TEMPACT
F77D:              399 *
F77D:              400 * FOR EACH ITEM:
F77D:2E 92 7E      401 FLASHEM1  ROL   TEMPACT          CHECK BIT
F780:90 11   F793  402           BCC   FLASHEM2
F782:              403 *
F782:AD 95 7E      404           LDA   FLASHIND
F785:0A            405           ASL   A                ACTIVATED
F786:AA            406           TAX
F787:BD 9C 83      407           LDA   FLASHJSR,X       GET ADDR OF ROUTINE
F78A:85 2F         408           STA   ZPJSR
F78C:BD 9D 83      409           LDA   FLASHJSR+1,X
F78F:85 30         410           STA   ZPJSR+1
F791:              411 *
```

```
F791:02 2F       412          JSR    (ZPJSR)      CALL ROUTINE
F793:            413 *
F793:CE 95 7E    414 FLASHEM2 DEC    FLASHIND
F796:10 E5  F77D 415          BPL    FLASHEM1
F798:60          416          RTS
F799:            417 *********
F799:            418 *
F799:            419 * NOTE: WHEN WE CALL THE ROUTINE, THE VALUE OF FLASHON HASN'T
F799:            420 * CHANGED YET. THE ROUTINE ITSELF TOGGLES THIS VALUE.
F799:            421 * THE ROUTINE ALSO CALLS TIMEOFF OR TIMEON WHICH RESETS THE
F799:            422 * APPROPRIATE VALUE OF FLASHTIME FOR THIS ITEM.
F799:            423 *
F799:            10           INCLUDE DISPLAY
F799:             2 * DISPLAY
F799:             3 *
F799:             4 * DISPLAY TARGET (MODE-KEY)
F799:             5 *   IN TIME AREA
F799:20 8D F8     6 DISPTARGET JSR  CLRDISP       NEC?
F79C:20 96 F8     7 DISPMK    JSR    CLRFILE1
F79F:A6 10        8          LDX    CURRMODE
F7A1:A4 11        9          LDY    CURRKEY
F7A3:80 0B  F7B0 10          BRA    DISPINT1
F7A5:            11 *
F7A5:87 33 01F7A9 12 DISPINT  BBS    ACTTIME,DISPINT0   display interval time
F7A8:60          13          RTS
F7A9:20 96 F8    14 DISPINT0  JSR    CLRFILE1
F7AC:A6 17       15          LDX    HRL
F7AE:A4 1A       16          LDY    MINL
F7B0:            17 *
F7B0:            18 *
F7B0:            19 * at this point, x= value to be displayed in hrh; y = value
F7B0:            20 * to be displayed in minl.
F7B0:            21 *
F7B0:6C 25 80    22 DISPINT1  JMP   (DISPINT1.V)
F7B3:20 3C F7    23          JSR    OFFTIME
F7B6:22 92       24          JSR    \CLRINT
F7B8:A9 16       25          LDA    #$16         addr of 1st hrl
F7BA:22 0E       26          JSR    \PEEK256
F7BC:22 97       27          JSR    \ENBINT
F7BE:20 F3 F7    28          JSR    GETTV        get codes for time digit
F7C1:67 34 03F7C7 29         BBS    EKBIT,DISPMK1
F7C4:20 F9 F7    30          JSR    GETDV
F7C7:20 77 83    31 DISPMK1  JSR    PUTONE1      display hrl
F7CA:            32 *
F7CA:D7 31 0BF7D8 33         BBC    6,TIMEFLAG,DISPMK3 if not interval, display dash
F7CD:A6 1B       34          LDX    MINH         if interval, display this
F7CF:20 F3 F7    35          JSR    GETTV
F7D2:09 80       36          ORA    #$80         set colon
F7D4:85 39       37          STA    EDCODE
F7D6:80 03  F7DB 38          BRA    DISPMK4
F7D8:            39 *
F7D8:3C 20 39    40 DISPMK3  LDM    #$20,EDCODE  DASH
F7DB:20 77 83    41 DISPMK4  JSR    PUTONE1      MINHI
F7DE:98          42          TYA                 get minl value
F7DF:AA          43          TAX                 into x
F7E0:10 02  F7E4 44          BPL    DISPMK1A     if neg it's blank
F7E2:A2 10       45          LDX    #$10         hence ptr to blank code
F7E4:20 F3 F7    46 DISPMK1A JSR    GETTV
F7E7:77 34 03F7ED 47         BBC    EKBIT,DISPMK2
F7EA:20 F9 F7    48          JSR    GETDV
F7ED:20 77 83    49 DISPMK2  JSR    PUTONE1
F7F0:4C BC 83    50          JMP    FLASHBOTH    to restore EDIT if nec.
F7F3:            51 *
F7F3:BD 8B 83    52 GETTV    LDA    TIMEVALS,X   get timevalue to poke
F7F6:85 39       53          STA    EDCODE
F7F8:60          54 GETTV1   RTS
F7F9:            55 *
```

```
F7F9:85 27         56 GETDV     STA    DISPVAL       get dispvals (FOR EDIT ONLY)
F7FB:20 68 FF      57           JSR    LSR4
F7FE:85 28         58           STA    DISPVAL+1
F800:60            59           RTS
F801:              60 **
F801:              62 * display char at current display position (currpos)
F801:6C 27 80      63 PUTDISP   JMP    (PUTDISP.V)   -->putdisp.ram
F804:              64 *
F804:      0023    65           ds     $f827-*,$ff
F827:              66 *
F827:              67 * GETCODE: CONVERT KEYNUM TO EDCODE
F827:              68 * LO NYBBLE = 1ST 4 SEGMENTS, HI = NEXT 4
F827:              69 *
F827:A6 22         70 GETCODE   LDX    KEYNUM
F829:BD 50 83      71           LDA    EDITCODES,X
F82C:85 39         72           STA    EDCODE
F82E:60            73           RTS
F82F:              74 *
F82F:              75 *
F82F:              76 * SCROLL BLANK CHAR IN FROM RIGHT OR LEFT
F82F:              77 *
F82F:A9 01         78 BLANKRIGHT LDA   #1
F831:22 92         79           JSR    \CLRINT
F833:20 14 F5      80           JSR    OTHER4
F836:A9 0F         81           LDA    #$F
F838:22 1C         82           JSR    \POKE16
F83A:22 97         83           JSR    \ENBINT
F83C:60            84           RTS
F83D:              85 *
F83D:              86 *
F83D:              87 ****************************************************
F83D:              88 *
F83D:              90 *
F83D:0A 0B 0C 0D   91 CONVTAB   DFB    $A,$B,$C,$D,$A,$B,$C,$D
F845:01 02 03 04   92           DFB    1,2,3,4,5,6,7,8,9,0,$E,$F
F851:              93 *
F851:              95 *
F851:      003C    96           DS     $F88D-*,$FF
F88D:      0000    97           Do     0
S                  98 *         SOUND EFFECTS
S                  99 *
S                 100 *         CHIME =          HIGH-PITCHED, REPEATED 3 TIMES
S                 101 *         \BLATT =         LOW-PITCHED, REPEATED ONCE
S                 102 *
S                 103 CHIME    LDA    #3           # times to repeat
S                 104 CHIME0   PHA
S                 105          LDM    #$2,VAR1     wavelength
S                 106          LDA    #40          try longer duration
S                 107          JSR    SOUND
S                 108          LDM    #0,VAR1      max possible delay
S                 109          JSR    SPKRWAIT
S                 110          PLA
S                 111          DEC
S                 112          BNE    CHIME0
S                 113          RTS
S                 114 *
S                 115 *        \BLATT moved      to ffpage
S                 116 *
S                 117 SOUND    PHA               basic sound routine
S                 118          SEB    SPKR       on
S                 119          JSR    SPKRWAIT   wait
S                 120          CLB    SPKR       off
S                 121          JSR    SPKRWAIT   wait
S                 122          PLA
S                 123          DEC
S                 124          BNE    SOUND      zflag set here: correct for edit!
S                 125 *
S                 126          RTS
```

```
S              127 *
S              128 SPKRWAIT  CLB    MEMXPND      save power while waiting
S              129           LDX    VAR1         replace by some JSR PEEK8 l
oop?
S              130           LDY    #0
S              131 SPKR1     INY
S              132           BNE    SPKR1
S              133           DEX
S              134           BNE    SPKR1
S              135           SEB    MEMXPND
S              136           RTS
S              137 *
S              138 GOODSOUND LDA    #80          for ir ok; 2 X length; do o
nce
S              139           LDM    #2,VAR1
S              140           BRA    SOUND
F88D:          141           Fin
F88D:          142 *
F88D:          144 *
F88D:          145 * CLEAR EDIT DISPLAY
F88D:          146 *
F88D:3C 00 14  147 CLRDISP   LDM    #0,CURRPOS
F890:BF 33     148 CLRDISP0  CLB    DASHFLAG
F892:          149 *
F892:          150 * (falls through)
F892:          151 *
F892:          152 * CLEAR FILE 1; FILE 2
F892:          153 *
F892:          154 *
F892:A9 00     155 CLRFILE0  LDA    #0
F894:80 02 F898 156          BRA    CLRFILE
F896:A9 10     157 CLRFILE1  LDA    #$10
F898:22 92     158 CLRFILE   JSR    \CLRINT
F89A:22 0E     159           JSR    \PEEK256
F89C:A2 10     160           LDX    #16
F89E:          161 *
F89E:22 1C     162 CLRF      JSR    \POKE16      (A reg was preserved)
F8A0:CA        163           DEX
F8A1:D0 FB F89E 164          BNE    CLRF
F8A3:22 97     165           JSR    \ENBINT
F8A5:60        166           RTS
F8A6:          167 *
F8A6:     0000 169           Do     0
S              170 *
S              171 *         FIXMODE: ENTERED   WITH "MODE" KEY
S              172 *         (replaced in       RAM)
S              173 *
S              174 FIXMODE   JSR    CLRDISP
S              175           LDA    KEYNUM       DISPLAY 'MODE'
S              176           JSR    \PUTDISP.FF
S              177 FIXMODE1  JSR    \KEYCANCEL
S              178           BEQ    DISPCURR
S              179 *
S              180 *
S              181           JSR    CHECKMODE
S              182           BEQ    NOMODE
S              183 *
S              184           JSR    \CONVMODE
S              185 *
S              186           SET    CURRKEY      TO FF (NONE) TEMPORARILY
S              187 *
S              188 *
S              189           LDM    #$FF,CURRKEY
F8A6:          190           FIN
F8A6:     0015 191           DS     $F8BB-*,$FF
F8BB:3C 00 14  192 DISPCURX  LDM    #0,CURRPOS   this entry pt still valid
F8BE:80 07 F8C7 193          BRA    DISPCURZ
F8C0:          194 *
F8C0:     0000 195           DO     0
S              196 *
S              197 *         ILLEGAL   MODE
S              198 *
```

```
S                        199 NOMODE    JSR    \BLAT
S                        200           BRA    FIXMODE1
F8C0:                    201           Fin
F8C0:                    202 *
F8C0:                    203 ****************************************************
F8C0:          0004      204           DS     $F8C4-*,$FF
F8C4:                    205 *
F8C4:                    206 * DISPLAY CURRENT MODE, KEY
F8C4:                    207 *
F8C4:                    208 *
F8C4:20 8D F8            209 DISPCURR  JSR    CLRDISP
F8C7:A6 10               210 DISPCURZ  LDX    CURRMODE       ENTRY FOR NO CLEAR SCREEN
F8C9:BD CF F4            211           LDA    MODECODES,X
F8CC:AF 33               212           SEB    DASHFLAG
F8CE:22 AC               213           JSR    \PUTDISP.FF
F8D0:                    214 *
F8D0:BF 33               215           CLB    DASHFLAG
F8D2:A6 11               216           LDX    CURRKEY
F8D4:30 06    F8DC       217           BMI    DISPCURR1      NO KEY
F8D6:BD CF F4            218           LDA    MODECODES,X
F8D9:4C 01 F8            219           JMP    PUTDISP
F8DC:60                  220 DISPCURR1 RTS
F8DD:                    221 *
F8DD:                    222 *
F8DD:                    223 * FIXKEY: ENTERED WITH "KEY"
F8DD:                    224 * [SIMILAR TO MODE: MAKE MORE GENERAL??]
F8DD:3C 01 14            225 FIXKEY    LDM    #1,CURRPOS
F8E0:22 AC               226           JSR    \PUTDISP.FF
F8E2:                    227 *
F8E2:22 56               228 FIXKEY1   JSR    \KEYCANCEL
F8E4:                    229 *
F8E4:F0 DE    F8C4       230           BEQ    DISPCURR       CANCEL
F8E6:                    231 *
F8E6:20 5A F4            232 FIXKEY2   JSR    CHECKKEY
F8E9:F0 05    F8F0       233           BEQ    NOKEY
F8EB:                    234 *
F8EB:                    235 * LEGAL KEY  KEY
F8EB:                    236 *
F8EB:20 62 FF            237           JSR    CONVKEY
F8EE:80 CB    F8BB       238           BRA    DISPCURX
F8F0:                    239 *
F8F0:                    240 * ILLEGAL MODE
F8F0:                    241 *
F8F0:22 00               242 NOKEY     JSR    \BLAT
F8F2:80 EE    F8E2       243           BRA    FIXKEY1
F8F4:                    244 *
F8F4:                     11           INCLUDE EXECUTE
F8F4:                      2 * EXECUTE
F8F4:                      3 *
F8F4:                      4 *
F8F4:                      5 * KEY EXECUTION ROUTINES
F8F4:                      6 *
F8F4:                      7 ****************************************************
F8F4:                      8 *
F8F4:                      9 * EXECUTE KEY
F8F4:                     10 *
F8F4:20 62 FF             11 XKEY      JSR    CONVKEY
F8F7:80 06    F8FF        12           BRA    XMODE1
F8F9:                     13 *
F8F9:                     14 *
F8F9:                     15 * EXECUTE DIRECT MODE
F8F9:                     16 *
F8F9:20 5C FF             17 XMODE     JSR    CONVMODE
F8FC:3C FF 11             18           LDM    #$FF,CURRKEY
F8FF:20 C4 F8             19 XMODE1    JSR    DISPCURR
F902:                     20 *
F902:                     21 *
F902:                     22 * THIS IS THE MAIN LOOP FOR KEY EXECUTION
F902:                     23 *
F902:20 77 FF             24 DOIT      JSR    SAVEMK
F905:                     25 * (entry for alarm queue execution)
```

```
F905:               26 *********************************
F905:               27 * [this whole routine has been replaced in RAM]
F905:6C 29 80       28 DOITQ    JMP    (DOITQ.V)     -->doitq.ram
F908:       002E    29          ds     $f936-*,$ff
F936:               30 *********************************
F936:               31 * this one TOO
F936:6C 2B 80       32 DONEDONE JMP    (DONEDONE.V)  --> DONEDONE.RAM
F939:       0012    33          DS     $F94B-*,$FF
F94B:               34 *********************************
F94B:6C 2D 80       35 DOITNEXT JMP    (DOITNEXT.V)  -->doitnext.ram
F94E:       0038    36          ds     $f986-*,$ff
F986:               37 *********************************
F986:               39 *
F986:3C 00 31       40 DOITLEARN LDM   #0,TIMEFLAG   KEY, NOT ALARM
F989:               41 *
F989:3C 00 12       42 DLRN     LDM    #0,PROGINDEX  entry for alarm
F98C:               43 *
F98C:               44 * (HERE WE DON'T BOTHER PUTTING THE "DO" IN PROGBUF(0) SINCE
F98C:               45 * WE'RE OVERWRITING IT ANYWAY)
F98C:               46 *
F98C:3C 00 13       47          LDM    #0,NEST
F98F:E6 13          48 DLRN01   INC    NEST
F991:20 23 FA       49 DLRN0    JSR    NEXTINST
F994:E6 12          50          INC    PROGINDEX
F996:A6 12          51          LDX    PROGINDEX
F998:9D 4A 7D       52          STA    PROGBUF,X     STORE NEXT ELEMENT
F99B:C9 1E          53          CMP    #DOKEY
F99D:F0 F0   F98F   54          BEQ    DLRN01        "DO"
F99F:               55 *
F99F:               56 *
F99F:C9 1F          57          CMP    #OKKEY        "OK"
F9A1:D0 EE   F991   58          BNE    DLRN0
F9A3:C6 13          59          DEC    NEST          LAST "OK"?
F9A5:D0 EA   F991   60          BNE    DLRN0
F9A7:07 31 03F9AD   61          BBS    0,TIMEFLAG,DLRN2
F9AA:               62 *
F9AA:4C 3C 84       63          JMP    STOREPROG     YES:STORE IN KEYDEFS
F9AD:               64 *
F9AD:CA             65 DLRN2    DEX                  progindex   ALARMS
F9AE:8E 4A 7D       66          STX    PROGBUF
F9B1:3F 32          67          CLB    KEYINPUT      run through learn again
F9B3:3C 00 12       68          LDM    #0,PROGINDEX  to get aqmode,aqkey
F9B6:               69 *        nest is already zero here
F9B6:20 3C F3       70          JSR    SETLEARN
F9B9:20 BC F1       71          JSR    LEARN
F9BC:D7 31 03F9C2   72          BBC    6,TIMEFLAG,DLRN3 interval?
F9BF:20 27 F6       73          JSR    ADDINTERVAL   yes
F9C2:               74 *
F9C2:6F 33          75 DLRN3    SEB    XTFLAG
F9C4:               76 * move time to xtime:
F9C4:A2 05          77          LDX    #5
F9C6:B5 18          78 DLRN4    LDA    SECL,X
F9C8:9D A7 7E       79          STA    EXECTIME,X
F9CB:CA             80          DEX
F9CC:10 F8   F9C6   81          BPL    DLRN4
F9CE:               82 *
F9CE:4C C8 87       83          JMP    STOREALARM    STORE IN ALARM Q
F9D1:               84 *
F9D1:               85 * the following has been replaced by doitir.ram
F9D1:        F9D1   86 DOITIR   EQU    *             "IR" SYMBOL
F9D1:       0022    87          ds     $f9f3-*,$ff
F9F3:               88 *
F9F3:               90 *
F9F3:               91 * SET ALARM FROM KEY EXECUTION
F9F3:               92 *
F9F3:               93 * GET TIME DATA
F9F3:3C 01 31       94 DOITAT   LDM    #1,TIMEFLAG   for "at" [REPLACED IN RAM]
F9F6:20 01 FA       95          JSR    DOITTIME
F9F9:80 8E   F989   96          BRA    DLRN          get program data & store in alarmq
F9FB:               97 *
F9FB:               98 *
```

```
F9FB:                99  * SET TIME FROM KEY EXECUTION
F9FB:                100 *
F9FB:20 01 FA        101 DOITSET    JSR      DOITTIME
F9FE:4C 80 F6        102            JMP      DISPTIME
FA01:                103 *
FA01:                104 *
FA01:                105 * GET TIME INSTRUCTIONS FOR SET OR AT
FA01:                106 *
FA01:20 97 80        107 DOITTIME   JSR      GOSETFROG         put curr time in hr, etc.
FA04:9F 33           108            CLB      ACTTIME
FA06:20 23 FA        109 DOITT1     JSR      NEXTINST
FA09:                110 **************************
FA09:C9 15           111            CMP      #ATKEY            this ain't possible now
FA0B:D0 04    FA11   112            BNE      DOITT3
FA0D:CF 31           113            SEB      6,TIMEFLAG        interval
FA0F:80 F5    FA06   114            BRA      DOITT1            get next key
FA11:                115 ************************
FA11:C9 1E           116 DOITT3     CMP      #DOKEY            exit for "AT" (AT)
FA13:F0 0B    FA20   117            BEQ      DOITT2
FA15:C9 1F           118            CMP      #OKKEY            exit for "SET"
FA17:F0 07    FA20   119            BEQ      DOITT2
FA19:85 22           120            STA      KEYNUM
FA1B:20 73 F3        121            JSR      XTIME             perform time operation
FA1E:80 E6    FA06   122            BRA      DOITT1            & get next inst
FA20:8F 33           123 DOITT2     SEB      ACTTIME
FA22:60              124            RTS
FA23:                125 *
FA23:                126 *
FA23:                128 *
FA23:                129 * GET NEXT ELEMENT FROM CURRENTLY EXECUTING INSTRUCTION
FA23:E6 23           130 NEXTINST   INC      INDEX
FA25:A4 23           131            LDY      INDEX
FA27:B1 2D           132            LDA      (STAKPTR),Y
FA29:60              133 DEFRTS     RTS
FA2A:                134 *
FA2A:                135 *
FA2A:                136 * (DEFONSTACK REPLACED IN RAM)
FA2A:                137 *
FA2A:         0054   138            DS       $FA7E-*,$FF
FA7E:                139 *
FA7E:                12          INCLUDE SUBS
FA7E:                2  * SUBS
FA7E:                3  *
FA7E:A5 10           4  CURRTOID   LDA      CURRMODE
FA80:8D 8A 7E        5             STA      IDMODE
FA83:A5 11           6             LDA      CURRKEY
FA85:8D 8B 7E        7             STA      IDKEY
FA88:60              8             RTS
FA89:                9  *
FA89:                10 *
FA89:AD 00 7D        11 DEFPTRALARMQ LDA    ALARMQ             defptr=alarmq
FA8C:85 29           12            STA      DEFPTR
FA8E:AD 01 7D        13            LDA      ALARMQ+1
FA91:85 2A           14            STA      DEFPTR+1
FA93:60              15            RTS
FA94:                16 *
FA94:20 89 FA        17 AQPLUS10   JSR      DEFPTRALARMQ      defptr=alarmq+10
FA97:                18 * (falls thru)
FA97:                19 *
FA97:A5 29           20 DEFPLUS10  LDA      DEFPTR            defptr=defptr+10
FA99:18              21            CLC
FA9A:69 0A           22            ADC      #10
FA9C:85 29           23            STA      DEFPTR
FA9E:90 02    FAA2   24            BCC      DEF10XX
FAA0:E6 2A           25            INC      DEFPTR+1
FAA2:60              26 DEF10XX    RTS
FAA3:                27 *
FAA3:                28 *
FAA3:AD 02 7D        29 DEFQPTR    LDA      QPTR              defptr=qptr
FAA6:85 29           30            STA      DEFPTR
FAA8:AD 03 7D        31            LDA      QPTR+1
FAAB:85 2A           32            STA      DEFPTR+1
```

```
FAAD:60              33         RTS
FAAE:                34 *
FAAE:                35 *
FAAE:A5 29           36 ZP1DEFPTR LDA    DEFPTR       zp1=defptr
FAB0:85 2B           37            STA    ZP1
FAB2:A5 2A           38            LDA    DEFPTR+1
FAB4:85 2C           39            STA    ZP1+1
FAB6:60              40            RTS
FAB7:                41 *
FAB7:                42 *
FAB7:A9 D3           43 READD3     LDA    #$D3         read display indicator
FAB9:22 0E           44            JSR    \PEEK256
FABB:97 EC FDFABB    45            BBC    ACK4,*
FABE:A5 EC           46            LDA    FROM4
FAC0:29 01           47            AND    #1           return 1 if off
FAC2:60              48            RTS
FAC3:                49 *
FAC3:A5 2A           50 CMPDEFQ    LDA    DEFPTR+1     compare qptr,defptr
FAC5:CD 03 7D        51            CMP    QPTR+1
FAC8:D0 05    FACF   52            BNE    CMPD1
FACA:A5 29           53            LDA    DEFPTR
FACC:CD 02 7D        54            CMP    QPTR
FACF:60              55 CMPD1      RTS
FAD0:                56 ******************************
FAD0:                13            INCLUDE FFPAGE
FAD0:                 2 * FFPAGE
FAD0:                 3 *
FAD0:       0430      4            DS    $ff00-*,$ff
FF00:       0000      5            DO    0
 S                    6 ******************************
 S                    7 userstp   clb   memxpnd
 S                    8           cli               subr to stop u8 until interrupt
 S                    9           stp
 S                   10           seb   memxpnd
 S                   11           rts
 S                   12 ******************************
 S                   13 userwit   clb   memxpnd
 S                   14           cli               subr to 'wait' u8 until interrupt
 S                   15           wit               (clock runs for quick restart)
 S                   16           seb   memxpnd
 S                   17           rts
FF00:                18           FIN
FF00:                19 ******************************
FF00:       000E     20           DS    $FF0E-*,$FF
FF0E:48              21 peek256   pha               save low nibl for subsequent peek16
FF0F:4A              22           lsr   a
FF10:4A              23           lsr   a           shift for upper nibl
FF11:4A              24           lsr   a
FF12:4A              25           lsr   a
FF13:22 18           26           jsr   \setfile    set u4 file accordingly
FF15:68              27           pla
FF16:80 02   FF1A    28           bra   peek16      peek from selected nibl
FF18:BF EE           29 setfile   clb   f1
FF1A:9F EE           30 peek16    clb   f0          f0,f1 determine u4 function
FF1C:85 EA           31 poke16    sta   to4         to4 passes data to u4
FF1E:DF EE           32           clb   req4        indicate comm request to u4
FF20:97 EC FDFF20    33           bbc   ack4,*      insure acknowledge from u4 high
FF23:87 EC FDFF23    34           bbs   ack4,*      ack low means u4 got f0,f1,to4
FF26:3C FF EE        35           ldm   #$ff,port6  don't fight u4 pullups on exit
FF29:60              36           rts
FF2A:                37 ******************************
FF2A:       0000     38           Do    0
```

```
S                    39 inwait     pha    preserve    a
S                    40            lda    #$ff
S                    41            sta    txpre
S                    42            sta    tx
S                    43            seb    txenbl
S                    44 intest     bbs    inflag,ingot
S                    45            jsr    \userwit
S                    46            dec    a
S                    47            bne    intest
S                    48            jmp    $f000
S                    49 ingot      clb    txenbl
S                    50            clb    inflag
S                    51            pla    restore     a
S                    52            rts
FF2A:                53            Fin
FF2A:                54 *****************************
FF2A:        0026    55            ds     $ff50-*,$ff
FF50:                57 *
FF50:20 81 82        58 NEXTCANCEL JSR    GETNEXT         (!)
FF53:C9 17           59            CMP    #CANCEL
FF55:60              60            RTS
FF56:                61 *
FF56:20 C2 82        62 KEYCANCEL  JSR    GETKEY          (!)
FF59:C9 17           63            CMP    #CANCEL
FF5B:60              64            RTS
FF5C:                65 *
FF5C:20 9C FF        66 CONVMODE   JSR    CONVOF          (!)
FF5F:85 10           67            STA    CURRMODE
FF61:60              68            RTS
FF62:                69 *
FF62:20 9C FF        70 CONVKEY    JSR    CONVOF          (!)
FF65:85 11           71            STA    CURRKEY
FF67:60              72            RTS
FF68:                73 *
FF68:4A              74 LSR4       LSR    A               (!)
FF69:4A              75 LSR3       LSR    A
FF6A:4A              76            LSR    A
FF6B:4A              77            LSR    A
FF6C:60              78            RTS
FF6D:                79 *
FF6D:                80 *
FF6D:                81 *
FF6D:                82 * THIS ROUTINE PEEKS THE 4-BITTER. ON ENTRY,
FF6D:                83 * ACCUM CONTAINS THE 8-BIT ADDRESS.
FF6D:                84 * OUTPUT : ACCUM = VALUE
FF6D:                85 *
FF6D:78              86 PEEK8      SEI
FF6E:22 0E           87            JSR    \PEEK256        (!)
FF70:97 EC FDFF70    88            BBC    ACK4,*
FF73:A5 EC           89            LDA    FROM4
FF75:58              90            CLI
FF76:60              91            RTS
FF77:                92 *
FF77:A5 10           93 SAVEMK     LDA    CURRMODE
FF79:8D 96 7E        94            STA    MODESAVE
FF7C:A5 11           95            LDA    CURRKEY
FF7E:8D 97 7E        96            STA    KEYSAVE
FF81:60              97            RTS
FF82:                98 *
FF82:AD 96 7E        99 RESTOREMK  LDA    MODESAVE
FF85:85 10          100            STA    CURRMODE
FF87:AD 97 7E       101            LDA    KEYSAVE
FF8A:85 11          102            STA    CURRKEY
FF8C:60             103            RTS
FF8D:               104 *
FF8D:A0 00          105 DEFZERO    LDY    #0              (!)
FF8F:B1 29          106            LDA    (DEFPTR),Y
FF91:60             107            RTS
FF92:               108 *
FF92:               109 * disable tx and kbd interrupts only
FF92:DF FF          110 CLRINT     CLB    TXENBL
FF94:DF FE          111            CLB    INT1ENBL
FF96:60             112            RTS
FF97:               113 *
```

```
FF97:                    114 * enable tx & kbd interrupts
FF97:CF FE               115 ENBINT   SEB    INT1ENBL
FF99:4C D7 80            116          JMP    SETTX
FF9C:                    117 *
FF9C:                    118 * convert keynum to key/mode 0-f
FF9C:                    119 *
FF9C:AA                  120 CONVOF   TAX
FF9D:BD 3D F8            121          LDA    CONVTAB,X
FFA0:60                  122          RTS
FFA1:                    123 *
FFA1:         0000       124          Do     0
  S                      125 *        blatt=low-pitched sound
  S                      126 BLATT    LDM    #8,VAR1
  S                      127          LDA    #10
  S                      128          JMP    SOUND      to sound routines
FFA1:                    129          Fin
FFA1:                    130 *
FFA1:         0008       131          DS     $FFA9-*,$FF
FFA9:4C 43 F3            132 STUFFIT.FF JMP  STUFFIT
FFAC:                    133 *
FFAC:4C 01 F8            134 PUTDISP.FF JMP  PUTDISP
FFAF:                    135 *
FFAF:                    136 ******************************
0000:                    137          dend
0000:                    138 *

0000:                    14           LST    ON
```

APPENDIX C

© 1987 CL 9, Inc.

```
00  35E                    20  224
01  054                    21  007
02  16C                    22  000
03  000                    23  000
04  000                    24  000
05  1C0                    25  000
06  000                    26  000
07  000                    27  003

08  000                    28  164
09  000                    29  000
0A  000                    2A  3E8
0B  000                    2B  04C
0C  000                    2C  00B
0D  000                    2D  000
0E  008                    2E  000
0F  000                    2F  0F4

10  00B                    30  1C2
11  000                    31  000
12  000                    32  000
13  000                    33  3D0
14  04F                    34  000
15  04C                    35  3D6
16  254                    36  000
17  000                    37  3D5

18  24F                    38  000
19  000                    39  254
1A  000                    3A  3C2
1B  000                    3B  003
1C  000                    3C  0F4
1D  225                    3D  15F
1E  060                    3E  148
1F  000                    3F  003
00  1C3                    20  094
01  1CF                    21  3FF
02  1FD                    22  158
03  15F                    23  260
04  020                    24  254
05  000                    25  054
06  0F1                    26  150
07  290                    27  094

08  1F4                    28  000
09  36F                    29  254
0A  1CC                    2A  000
0B  000                    2B  27C
0C  220                    2C  141
0D  060                    2D  140
0E  2D1                    2E  0F1
0F  1A5                    2F  0C2
```

| | | | |
|---|---|---|---|
| 10 | 15C | 30 | 271 |
| 11 | 1FE | 31 | 1FD |
| 12 | 220 | 32 | 208 |
| 13 | 140 | 33 | 342 |
| 14 | 000 | 34 | 208 |
| 15 | 1FE | 35 | 1FD |
| 16 | 1EE | 36 | 36F |
| 17 | 000 | 37 | 344 |
| | | | |
| 18 | 15D | 38 | 0F3 |
| 19 | 054 | 39 | 153 |
| 1A | 15F | 3A | 0F3 |
| 1B | 0F1 | 3B | 1A3 |
| 1C | 073 | 3C | 094 |
| 1D | 1EB | 3D | 0D1 |
| 1E | 15B | 3E | 14F |
| 1F | 35E | 3F | 155 |
| 00 | 1DF | 20 | 008 |
| 01 | 078 | 21 | 1DF |
| 02 | 000 | 22 | 000 |
| 03 | 094 | 23 | 000 |
| 04 | 000 | 24 | 1D5 |
| 05 | 000 | 25 | 000 |
| 06 | 000 | 26 | 000 |
| 07 | 1DF | 27 | 000 |
| | | | |
| 08 | 341 | 28 | 260 |
| 09 | 000 | 29 | 1DF |
| 0A | 000 | 2A | 020 |
| 0B | 000 | 2B | 217 |
| 0C | 000 | 2C | 27E |
| 0D | 000 | 2D | 0C0 |
| 0E | 343 | 2E | 000 |
| 0F | 070 | 2F | 000 |
| | | | |
| 10 | 040 | 30 | 2C3 |
| 11 | 04F | 31 | 000 |
| 12 | 213 | 32 | 000 |
| 13 | 000 | 33 | 000 |
| 14 | 050 | 34 | 0C1 |
| 15 | 21B | 35 | 110 |
| 16 | 1D2 | 36 | 270 |
| 17 | 000 | 37 | 000 |
| | | | |
| 18 | 1F6 | 38 | 000 |
| 19 | 000 | 39 | 000 |
| 1A | 1DF | 3A | 154 |
| 1B | 000 | 3B | 000 |
| 1C | 000 | 3C | 000 |
| 1D | 2D1 | 3D | 000 |
| 1E | 000 | 3E | 000 |
| 1F | 341 | 3F | 2C3 |
| 00 | 1FF | 20 | 290 |
| 01 | 090 | 21 | 050 |
| 02 | 088 | 22 | 2E5 |
| 03 | 1FF | 23 | 277 |
| 04 | 286 | 24 | 2E4 |
| 05 | 0F2 | 25 | 1FF |
| 06 | 1E8 | 26 | 281 |
| 07 | 000 | 27 | 000 |

| | | | |
|---|---|---|---|
| 08 | 28A | 28 | 267 |
| 09 | 1E6 | 29 | 282 |
| 0A | 000 | 2A | 000 |
| 0B | 088 | 2B | 040 |
| 0C | 1FF | 2C | 0F3 |
| 0D | 288 | 2D | 28C |
| 0E | 000 | 2E | 1DF |
| 0F | 000 | 2F | 000 |
| 10 | 1C1 | 30 | 0F2 |
| 11 | 1C4 | 31 | 04F |
| 12 | 1C8 | 32 | 03C |
| 13 | 2E6 | 33 | 000 |
| 14 | 000 | 34 | 2E3 |
| 15 | 000 | 35 | 0F3 |
| 16 | 050 | 36 | 2E1 |
| 17 | 273 | 37 | 000 |
| 18 | 118 | 38 | 341 |
| 19 | 260 | 39 | 000 |
| 1A | 1E9 | 3A | 060 |
| 1B | 1ED | 3B | 000 |
| 1C | 27B | 3C | 000 |
| 1D | 000 | 3D | 000 |
| 1E | 000 | 3E | 14F |
| 1F | 220 | 3F | 341 |
| 00 | 0F7 | 20 | 07F |
| 01 | 088 | 21 | 054 |
| 02 | 283 | 22 | 000 |
| 03 | 1CB | 23 | 000 |
| 04 | 000 | 24 | 000 |
| 05 | 1EB | 25 | 0F5 |
| 06 | 000 | 26 | 000 |
| 07 | 220 | 27 | 168 |
| 08 | 000 | 28 | 2D0 |
| 09 | 000 | 29 | 000 |
| 0A | 087 | 2A | 1D9 |
| 0B | 14F | 2B | 290 |
| 0C | 000 | 2C | 090 |
| 0D | 000 | 2D | 000 |
| 0E | 201 | 2E | 1D0 |
| 0F | 023 | 2F | 208 |
| 10 | 0D0 | 30 | 1D9 |
| 11 | 000 | 31 | 000 |
| 12 | 000 | 32 | 1D9 |
| 13 | 000 | 33 | 150 |
| 14 | 060 | 34 | 000 |
| 15 | 0F5 | 35 | 152 |
| 16 | 0C0 | 36 | 000 |
| 17 | 341 | 37 | 250 |
| 18 | 124 | 38 | 000 |
| 19 | 064 | 39 | 1CB |
| 1A | 000 | 3A | 14A |
| 1B | 000 | 3B | 14E |
| 1C | 000 | 3C | 27B |

| | | | |
|---|---|---|---|
| 1D | 1E8 | 3D | 220 |
| 1E | 0C1 | 3E | 146 |
| 1F | 050 | 3F | 0F7 |
| 00 | 35F | 20 | 110 |
| 01 | 1D8 | 21 | 010 |
| 02 | 034 | 22 | 07C |
| 03 | 36F | 23 | 1CD |
| 04 | 0F0 | 24 | 1C9 |
| 05 | 208 | 25 | 000 |
| 06 | 0D3 | 26 | 1C0 |
| 07 | 110 | 27 | 1C2 |
| 08 | 054 | 28 | 000 |
| 09 | 152 | 29 | 14F |
| 0A | 000 | 2A | 000 |
| 0B | 074 | 2B | 210 |
| 0C | 15F | 2C | 07A |
| 0D | 150 | 2D | 153 |
| 0E | 010 | 2E | 0F6 |
| 0F | 223 | 2F | 010 |
| 10 | 034 | 30 | 1C2 |
| 11 | 1DA | 31 | 0F6 |
| 12 | 124 | 32 | 1C0 |
| 13 | 203 | 33 | 219 |
| 14 | 000 | 34 | 008 |
| 15 | 000 | 35 | 010 |
| 16 | 1D8 | 36 | 1C9 |
| 17 | 1C2 | 37 | 1D0 |
| 18 | 21F | 38 | 08F |
| 19 | 3FF | 39 | 010 |
| 1A | 141 | 3A | 1C2 |
| 1B | 200 | 3B | 219 |
| 1C | 08F | 3C | 1D0 |
| 1D | 21A | 3D | 078 |
| 1E | 21A | 3E | 2A5 |
| 1F | 3A7 | 3F | 000 |
| 00 | 000 | 20 | 000 |
| 01 | 000 | 21 | 1A1 |
| 02 | 0D2 | 22 | 1FF |
| 03 | 000 | 23 | 07B |
| 04 | 341 | 24 | 077 |
| 05 | 1CD | 25 | 000 |
| 06 | 2C1 | 26 | 000 |
| 07 | 000 | 27 | 0F6 |
| 08 | 2C1 | 28 | 000 |
| 09 | 1FE | 29 | 277 |
| 0A | 000 | 2A | 000 |
| 0B | 070 | 2B | 2C1 |
| 0C | 000 | 2C | 2C1 |
| 0D | 148 | 2D | 27E |
| 0E | 077 | 2E | 078 |
| 0F | 000 | 2F | 15F |
| 10 | 000 | 30 | 0C1 |
| 11 | 27A | 31 | 2C3 |
| 12 | 1C4 | 32 | 000 |

| | | | | |
|---|---|---|---|---|
| 13 | 000 | | 33 | 07A |
| 14 | 000 | | 34 | 007 |
| 15 | 000 | | 35 | 07D |
| 16 | 07F | | 36 | 207 |
| 17 | 0F7 | | 37 | 207 |
| | | | | |
| 18 | 2D2 | | 38 | 07F |
| 19 | 000 | | 39 | 0F0 |
| 1A | 1D1 | | 3A | 2D3 |
| 1B | 15D | | 3B | 206 |
| 1C | 0F0 | | 3C | 078 |
| 1D | 2C6 | | 3D | 205 |
| 1E | 3FF | | 3E | 152 |
| 1F | 000 | | 3F | 14F |
| 00 | 1DB | | 20 | 1DB |
| 01 | 10A | | 21 | 10A |
| 02 | 1E9 | | 22 | 1E9 |
| 03 | 1AB | | 23 | 1AB |
| 04 | 13A | | 24 | 13A |
| 05 | 1B3 | | 25 | 1B3 |
| 06 | 1F3 | | 26 | 1F3 |
| 07 | 10B | | 27 | 10B |
| | | | | |
| 08 | 1FB | | 28 | 1FB |
| 09 | 1BB | | 29 | 1BB |
| 0A | 12A | | 2A | 17B |
| 0B | 170 | | 2B | 1F2 |
| 0C | 126 | | 2C | 1D1 |
| 0D | 12C | | 2D | 1EA |
| 0E | 120 | | 2E | 1F1 |
| 0F | 12E | | 2F | 171 |
| | | | | |
| 10 | 139 | | 30 | 10D |
| 11 | 1E2 | | 31 | 186 |
| 12 | 17F | | 32 | 130 |
| 13 | 1A1 | | 33 | 160 |
| 14 | 1D0 | | 34 | 134 |
| 15 | 18A | | 35 | 164 |
| 16 | 11D | | 36 | 138 |
| 17 | 17B | | 37 | 162 |
| | | | | |
| 18 | 179 | | 38 | 17A |
| 19 | 15A | | 39 | 1CA |
| 1A | 1E3 | | 3A | 1BA |
| 1B | 1FF | | 3B | 1A5 |
| 1C | 1D1 | | 3C | 1F5 |
| 1D | 18B | | 3D | 1AF |
| 1E | 169 | | 3E | 1D7 |
| 1F | 100 | | 3F | 100 |
| 00 | 180 | | 20 | 16A |
| 01 | 1F0 | | 21 | 176 |
| 02 | 180 | | 22 | 174 |
| 03 | 190 | | 23 | 17A |
| 04 | 1A0 | | 24 | 16C |
| 05 | 1B0 | | 25 | 128 |
| 06 | 1C0 | | 26 | 16E |
| 07 | 186 | | 27 | 174 |

| | | | |
|---|---|---|---|
| 08 | 196 | 28 | 1CA |
| 09 | 1F2 | 29 | 1CA |
| 0A | 196 | 2A | 192 |
| 0B | 1A6 | 2B | 179 |
| 0C | 1B6 | 2C | 192 |
| 0D | 1C6 | 2D | 116 |
| 0E | 18A | 2E | 10F |
| 0F | 19A | 2F | 10F |
| 10 | 197 | 30 | 15F |
| 11 | 1FC | 31 | 106 |
| 12 | 181 | 32 | 13B |
| 13 | 191 | 33 | 12F |
| 14 | 1A1 | 34 | 166 |
| 15 | 1B1 | 35 | 16D |
| 16 | 1C1 | 36 | 17D |
| 17 | 187 | 37 | 107 |
| 18 | 116 | 38 | 17F |
| 19 | 1F0 | 39 | 16F |
| 1A | 100 | 3A | 13F |
| 1B | 110 | 3B | 17C |
| 1C | 120 | 3C | 138 |
| 1D | 130 | 3D | 13E |
| 1E | 140 | 3E | 120 |
| 1F | 106 | 3F | 100 |

We claim:

1. A remote control device comprising:
at least one manually actuatable control element;
transducer means for emitting a signal;
circuit means for causing said transducer means to emit said signal in response to said control element being actuated;
serial input means for receiving a command signal from an external source and communicating said command signal to said circuit means, said command signal causing said circuit means to cause said transducer means to emit a signal; and
output means for enabling said remote control device to provide signals to said external source to enable the remote control device to provide status information or other data from the remote control device to the external source in response to a request from said external source;
wherein said circuit means comprises memory means for storing a plurality of commands for causing said transducer means to emit different signals, said serial input means permitting data to be loaded into said memory means from said external source.

2. The remote control device of claim 1 wherein said serial input means is coupled to a computer.

3. Remote control device of claim 1, wherein buffer means is coupled between said serial input means and said external source so that data can be provided to said buffer means at a first rate that is different from the rate at which said buffer means provides data to said serial input means.

4. Remote control device of claim 1 wherein said serial input means receives data at a rate of 19.2 Kbaud.

5. A remote control system comprising:
at least one manually actuatable control element;
transducer means for emitting a signal;
circuit means for causing said transducer means to emit said signal in response to said control element being actuated; and
a modem for receiving a command signal from an external source and communicating said command signal to said circuit means, said command signal causing said circuit means to cause said transducer means to emit a signal, said modem providing status information or other data from the remote control system to the external source in response to a request from said external source, where said circuit means comprises a memory means for storing a plurality of commands for causing said transducer means to emit different signals, said modem permitting data to be loaded into said memory means from said external source.

* * * * *